US009324207B2

(12) United States Patent
Kadode et al.

(10) Patent No.: US 9,324,207 B2
(45) Date of Patent: Apr. 26, 2016

(54) GAMING MACHINE PRODUCING EFFECT WHEN AWARDING BENEFIT AND CONTROL METHOD THEREOF

(75) Inventors: Yutaka Kadode, Tokyo (JP); Kohei Hashimoto, Tokyo (JP); Fumiya Abe, Tokyo (JP)

(73) Assignees: UNIVERSAL ENTERTAINMENT CORPORATION, Tokyo (JP); ARUZE GAMING AMERICA, INC., Las Vegas, NV (US)

( * ) Notice: Subject to any disclaimer, the term of this patent is extended or adjusted under 35 U.S.C. 154(b) by 271 days.

(21) Appl. No.: 13/298,895

(22) Filed: Nov. 17, 2011

(65) Prior Publication Data

US 2012/0064962 A1 Mar. 15, 2012

Related U.S. Application Data

(63) Continuation of application No. 12/837,063, filed on Jul. 15, 2010, now Pat. No. 8,480,477.

(30) Foreign Application Priority Data

Jul. 27, 2009 (JP) ................................ 2009-174709

(51) Int. Cl.
*A63F 9/24* (2006.01)
*A63F 13/00* (2014.01)
(Continued)

(52) U.S. Cl.
CPC ............ *G07F 17/32* (2013.01); *G07F 17/3211* (2013.01); *G07F 17/3265* (2013.01); *G07F 17/34* (2013.01)

(58) Field of Classification Search
CPC ..... G07F 17/32; G07F 17/34; G07F 17/3211; G07F 17/3265
USPC ............................................... 463/16, 20, 25
See application file for complete search history.

(56) References Cited

U.S. PATENT DOCUMENTS 6,012,983 A 1/2000 Walker et al.
6,093,102 A 7/2000 Bennett
(Continued)

FOREIGN PATENT DOCUMENTS

AU 200119729 A1 9/2001
CN 1727025 A 2/2006
JP 2007-301136 11/2007

OTHER PUBLICATIONS

Macao Search Report and Office Action issued Aug. 11, 2011, in Macao Patent Application No. 1/001059(937), with English translation of the Office Action.
(Continued)

*Primary Examiner* — Omkar Deodhar
*Assistant Examiner* — Wei Lee
(74) *Attorney, Agent, or Firm* — KMF Patent Services, PLLC; Kenneth M. Fagin, Esq.; S. Peter Konzel, Esq.

(57) ABSTRACT

When a wild symbol 311*a* is fixedly displayed, a gaming machine of the present invention preferentially displays a fixedly displayed wild symbol 311*a* over a symbol 311 rearranged behind the fixedly displayed wild symbol 311*a* until rearrangement is completed. When the plurality of symbols 311 rearranged including the symbol 311 rearranged behind the fixedly displayed wild symbol 311*a* satisfy a predetermined relation, the symbol 311 rearranged behind the fixedly displayed wild symbol 311*a* is preferentially displayed over the fixedly displayed wild symbol 311*a*. When the predetermined relation is not satisfied, the fixedly displayed wild symbol 311*a* is preferentially displayed over the symbol 311 rearranged behind the fixedly displayed wild symbol 311*a*.

18 Claims, 60 Drawing Sheets

(51) Int. Cl.

| | |
|---|---|
| ***G06F 17/00*** | (2006.01) |
| ***G06F 19/00*** | (2011.01) |
| ***G07F 17/32*** | (2006.01) |
| ***G07F 17/34*** | (2006.01) |

(56) References Cited

U.S. PATENT DOCUMENTS

| | | | | |
|---|---|---|---|---|
| 6,517,433 | B2 | 2/2003 | Loose et al. | |
| 6,960,133 | B1 | 11/2005 | Marks et al. | |
| 7,056,213 | B2 | 6/2006 | Ching et al. | |
| 7,074,127 | B2 | 7/2006 | Cuddy et al. | |
| 7,090,580 | B2 | 8/2006 | Rodgers et al. | |
| 7,094,148 | B2 | 8/2006 | Baerlocher et al. | |
| 7,331,862 | B2 | 2/2008 | Rodgers et al. | |
| 7,331,866 | B2 | 2/2008 | Rodgers et al. | |
| 7,481,708 | B2 | 1/2009 | Baerlocher et al. | |
| 7,666,083 | B2 | 2/2010 | Baerlocher et al. | |
| 7,682,246 | B2 | 3/2010 | Cregan et al. | |
| 7,690,986 | B2 | 4/2010 | Ching et al. | |
| 7,690,987 | B2 | 4/2010 | Baerlocher et al. | |
| 7,758,415 | B2 | 7/2010 | Kojima | |
| 7,775,874 | B2 | 8/2010 | Ching et al. | |
| 7,850,521 | B2 | 12/2010 | Rodgers et al. | |
| 7,857,695 | B2 | 12/2010 | Rodgers et al. | |
| 2004/0048652 | A1 | 3/2004 | Ching et al. | |
| 2004/0092300 | A1 * | 5/2004 | Gauselmann | 463/16 |
| 2005/0227754 | A1 * | 10/2005 | Kaminkow et al. | 463/20 |
| 2006/0025204 | A1 | 2/2006 | Okada | |
| 2006/0183533 | A1 | 8/2006 | Tran et al. | |
| 2006/0264254 | A1 * | 11/2006 | Aoki | 463/20 |
| 2007/0060294 | A1 | 3/2007 | Cuddy et al. | |
| 2007/0238510 | A1 * | 10/2007 | Halprin | 463/20 |
| 2007/0287529 | A1 | 12/2007 | Kojima | |
| 2008/0108411 | A1 | 5/2008 | Jensen et al. | |
| 2008/0113771 | A1 * | 5/2008 | Baerlocher et al. | 463/25 |
| 2008/0113779 | A1 | 5/2008 | Cregan | |
| 2008/0200232 | A1 | 8/2008 | Baerlocher et al. | |
| 2009/0082084 | A1 * | 3/2009 | Okada | 463/20 |

OTHER PUBLICATIONS

Macanese Search Report and Office Action dated Aug. 17, 2012 in connection with corresponding Macanese Patent Application No. I/1129, with English translation thereof.

* cited by examiner

BUTTON LAYOUT

FIG. 9

SYMBOL ARRAY

| | FIRST SYMBOL ARRAY | SECOND SYMBOL ARRAY | THIRD SYMBOL ARRAY | FOURTH SYMBOL ARRAY | FIFTH SYMBOL ARRAY |
|---|---|---|---|---|---|
| CODE NO. | SYMBOL | SYMBOL | SYMBOL | SYMBOL | SYMBOL |
| 00 | J | 9 | RING | K | J |
| 01 | Q | SHOES | J | HEART | A |
| 02 | FEATURE | A | COCKTAIL | HEART | COCKTAIL |
| 03 | 9 | 10 | 10 | Q | J |
| 04 | PERFUME | 9 | SHOES | K | A |
| 05 | J | Q | WILD | COCKTAIL | RING |
| 06 | A | 9 | HEART | SHOES | J |
| 07 | SHOES | SHOES | A | Q | SHOES |
| 08 | HEART | K | J | COCKTAIL | PERFUME |
| 09 | 10 | HEART | FEATURE | 9 | K |
| 10 | K | J | A | K | HEART |
| 11 | PERFUME | K | PERFUME | 10 | HEART |
| 12 | 10 | 9 | SHOES | J | K |
| 13 | COCKTAIL | PERFUME | K | 10 | RING |
| 14 | A | J | PERFUME | PERFUME | 10 |
| 15 | A | FEATURE | 9 | RING | Q |
| 16 | 9 | A | SHOES | A | WILD |
| 17 | RING | RING | COCKTAIL | WILD | 9 |
| 18 | Q | COCKTAIL | A | J | J |
| 19 | J | 9 | Q | A | PERFUME |
| 20 | K | COCKTAIL | SHOES | 10 | RING |
| 21 | SHOES | WILD | K | PERFUME | K |

FIG. 11

PAYOUT AMOUNT
DETERMINATION TABLE

| SYMBOL | THE NUMBER OF SYMBOL REARRANGED | | | |
|---|---|---|---|---|
| | TWO | THREE | FOUR | FIVE |
| A | — | 5 | 15 | 50 |
| K | — | 5 | 15 | 50 |
| Q | — | 5 | 15 | 50 |
| J | — | 5 | 15 | 50 |
| 10 | — | 5 | 15 | 50 |
| 9 | — | 5 | 15 | 50 |
| COCKTAIL | — | 10 | 25 | 75 |
| SHOES | — | 10 | 25 | 75 |
| PERFUME | 5 | 15 | 50 | 75 |
| RING | 5 | 15 | 50 | 75 |
| HEART | 5 | 15 | 50 | 100 |
| FEATURE | (※) | | | |

※ SCATTER SYMBOL: FEATURE GAME IS RUN
WHEN THREE OR MORE ARE REARRANGED

FIG. 12

REARRANGEMENT PROBABILITY TABLE

| EFFECT DATA | PROBABILITY THAT THREE OR MORE TRIGGER SYMBOLS ARE REARRANGED |
|---|---|
| LOW-PROBABILITY EFFECT DATA | 20% |
| MIDDLE-PROBABILITY EFFECT DATA | 54% |
| HIGH-PROBABILITY EFFECT DATA | 100% |

FIG. 13A

FOR-TWO-SYMBOLS EFFECT DETERMINATION TABLE

| TYPE OF EFFECT | NUMERICAL RANGE |
|---|---|
| INDICATION EFFECT | 0～50 |
| NORMAL EFFECT | 51～255 |

(RANGE OF RANDOM NUMBER: 0 TO 255)

FIG. 13B

FOR-TWO-SYMBOLS EFFECT DETERMINATION TABLE

| TYPE OF EFFECT | NUMERICAL RANGE |
|---|---|
| INDICATION EFFECT | 0～242 |
| NORMAL EFFECT | 243～255 |

(RANGE OF RANDOM NUMBER: 0 TO 255)

FIG. 14A

FOR-TWO-SYMBOLS EFFECT DATA TABLE

| EFFECT DATA | NUMERICAL RANGE |
|---|---|
| LOW-PROBABILITY EFFECT DATA | 0～234 |
| MIDDLE-PROBABILITY EFFECT DATA | 235～255 |
| HIGH-PROBABILITY EFFECT DATA | — |

(RANGE OF RANDOM NUMBER: 0 TO 255)

FIG. 14B

FOR-THREE-SYMBOLS EFFECT DATA TABLE

| EFFECT DATA | NUMERICAL RANGE |
|---|---|
| LOW-PROBABILITY EFFECT DATA | 0～147 |
| MIDDLE-PROBABILITY EFFECT DATA | 148～222 |
| HIGH-PROBABILITY EFFECT DATA | 223～255 |

(RANGE OF RANDOM NUMBER: 0 TO 255)

FIG.15
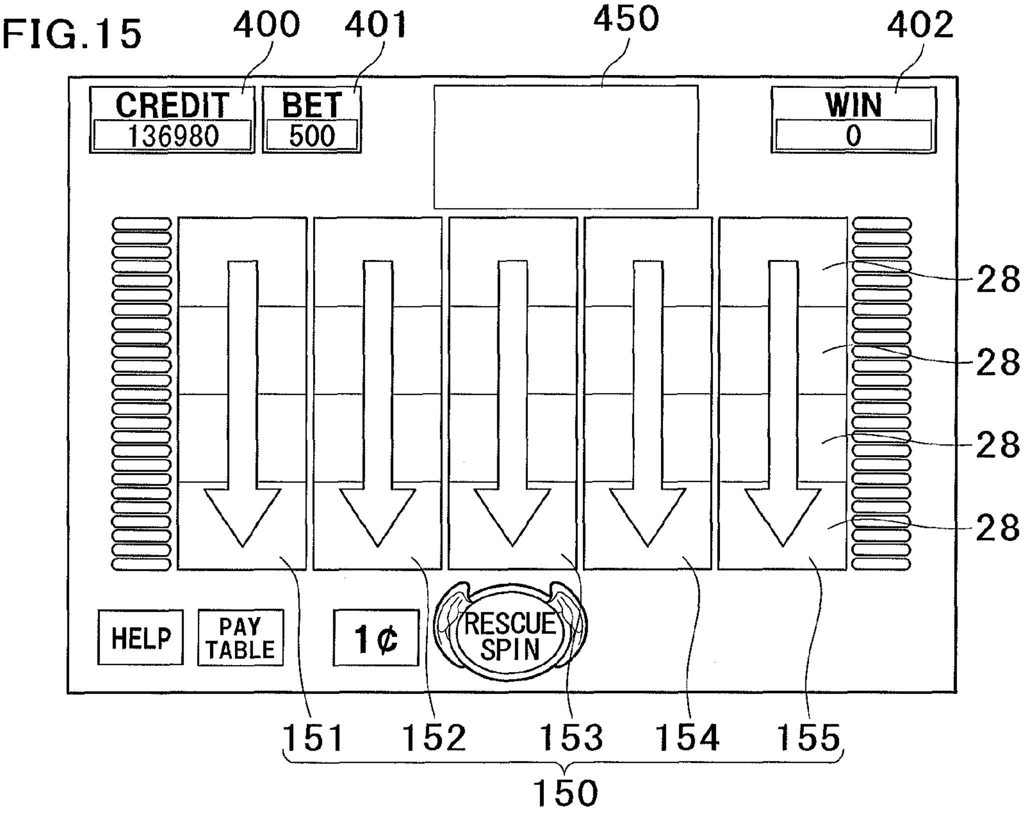
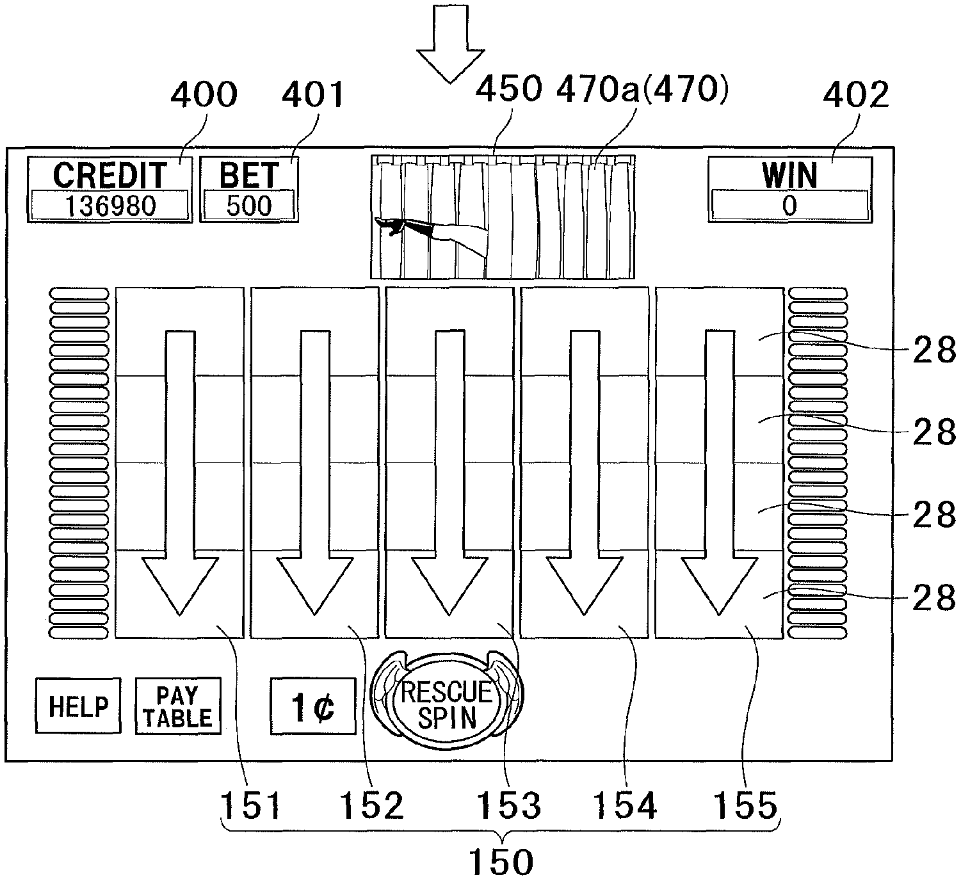

FIG.32
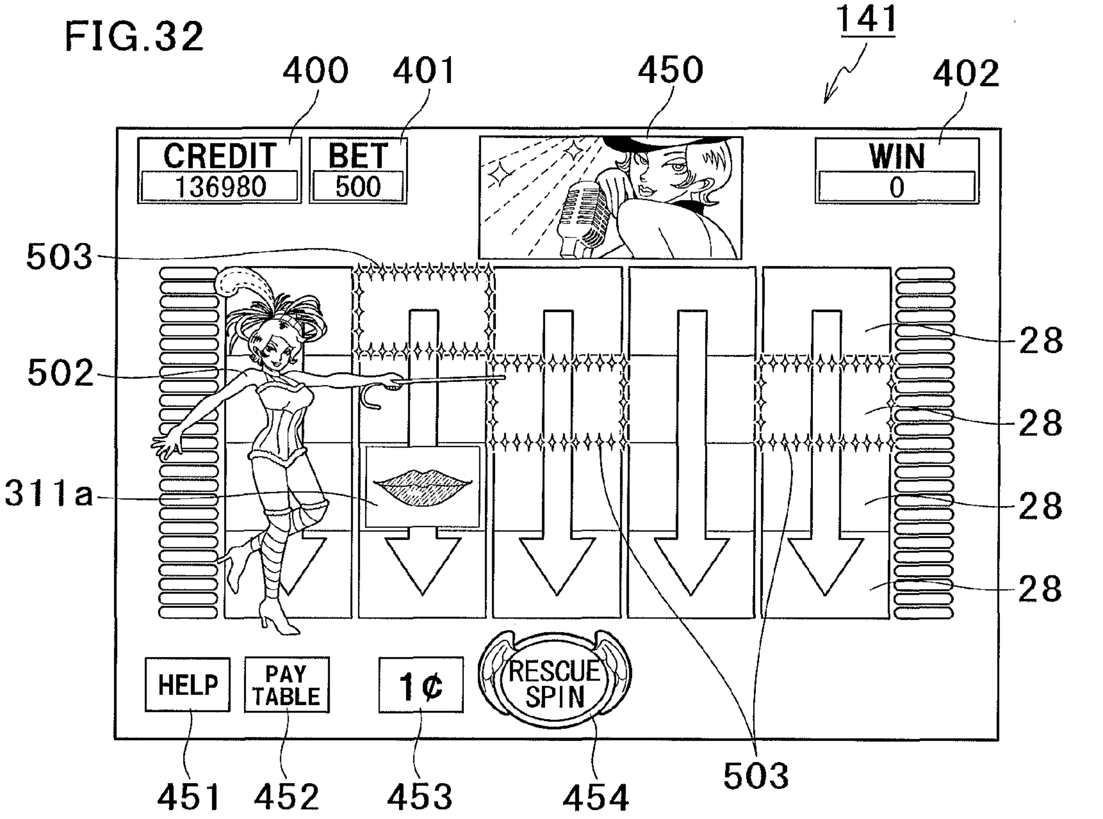
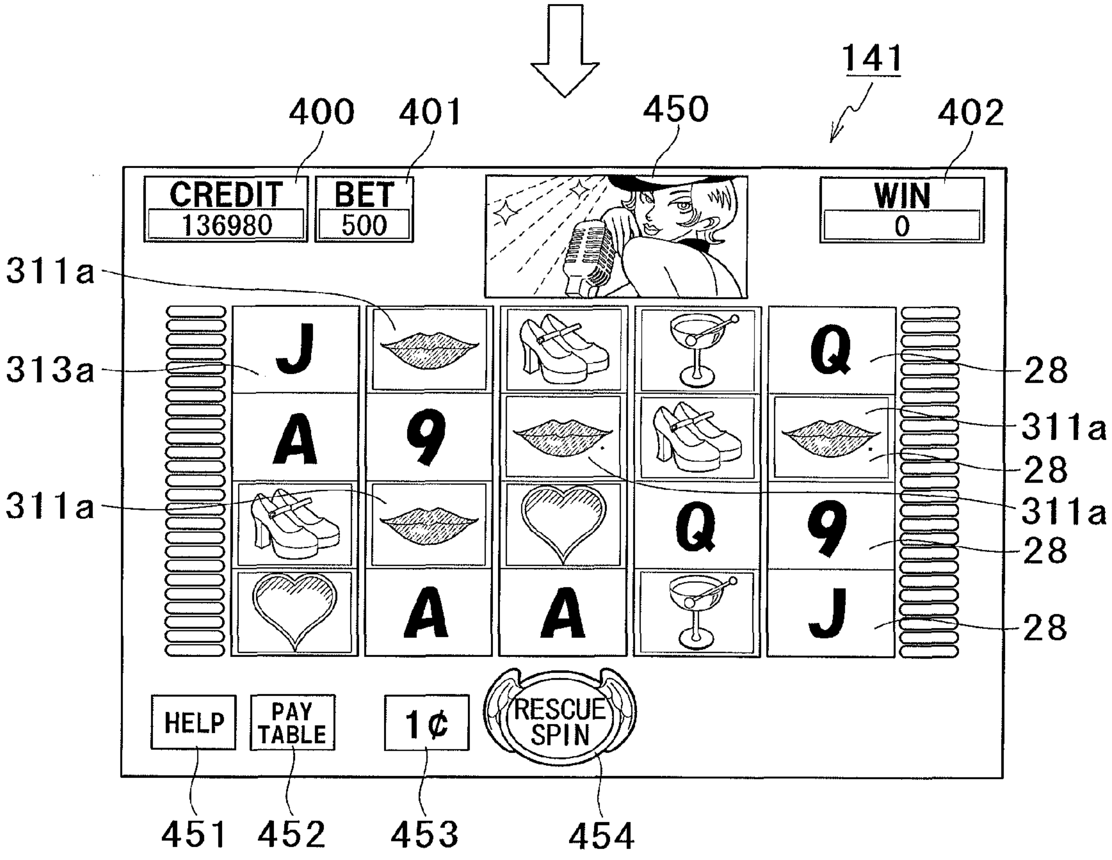

FIG. 45

SYMBOL ANIMATION SOUND DETERMINATION TABLE

| THE NUMBER OF WILD SYMBOLS | SYMBOL ANIMATION SOUNDS |
|---|---|
| ONE | GOOD |
| TWO | GOOD × 2 |
| THREE | GOOD × 3 |
| FOUR | GOOD × 4 |
| FIVE | GOOD × 5 |
| SIX TO NINE | OH Yeah × 5 |
| TEN TO SIXTEEN | EXCELLENT × 5 |

FIG. 51

SPECIFIC SYMBOL COUNT TABLE

| | | | | |
|---|---|---|---|---|
| POSITION INFORMATION | SECOND COLUMN OF FIRST ROW | THIRD COLUMN OF FIRST ROW | FOURTH COLUMN OF FIRST ROW | FIFTH COLUMN OF FIRST ROW |
| FIXEDLY DISPLAYED STATE | 0 | 0 | 0 | 0 |
| POSITION INFORMATION | SECOND COLUMN OF SECOND ROW | THIRD COLUMN OF SECOND ROW | FOURTH COLUMN OF SECOND ROW | FIFTH COLUMN OF SECOND ROW |
| FIXEDLY DISPLAYED STATE | 1 | 0 | 0 | 1 |
| POSITION INFORMATION | SECOND COLUMN OF THIRD ROW | THIRD COLUMN OF THIRD ROW | FOURTH COLUMN OF THIRD ROW | FIFTH COLUMN OF THIRD ROW |
| FIXEDLY DISPLAYED STATE | 0 | 0 | 0 | 0 |
| POSITION INFORMATION | SECOND COLUMN OF FOURTH ROW | THIRD COLUMN OF FOURTH ROW | FOURTH COLUMN OF FOURTH ROW | FIFTH COLUMN OF FOURTH ROW |
| FIXEDLY DISPLAYED STATE | 0 | 0 | 0 | 0 |

FIG. 52

BGM DETERMINATION TABLE

| THE NUMBER OF WILD SYMBOLS | BGM(BPM) |
|---|---|
| ZERO | BGM1(80) |
| ONE TO FOUR | BGM2(100) |
| FIVE TO NINE | BGM3(120) |
| TEN TO SIXTEEN | BGM4(160) |

FIG. 60

(A) SYMBOL ARRAY RANDOM-DETERMINATION TABLE

| SYMBOL ARRAY | FIRST COLUMN | SECOND COLUMN | THIRD COLUMN | FOURTH COLUMN | FIFTH COLUMN | TOTAL |
|---|---|---|---|---|---|---|
| PROBABILITY | 0 | 15/100 | 13/100 | 35/100 | 37/100 | 100/100 |

(B) STAGE RANDOM-SELECTION TABLE

| UPRIGHT POSITION OF THE DISPLAY WINDOW | ODDS |
|---|---|
| UPPER AREA | 25/100 |
| UPPER MIDDLE AREA | 25/100 |
| LOWER MIDDLE AREA | 25/100 |
| LOWER AREA | 25/100 |
| TOTAL | 100/100 |

FIG.61
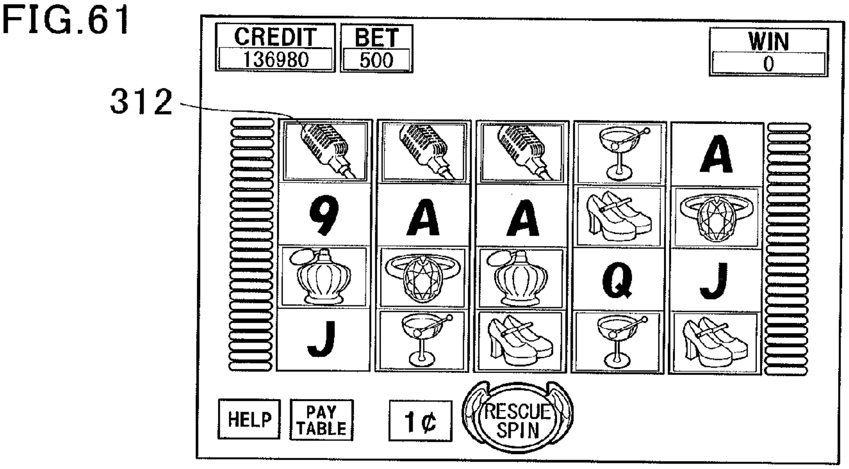
(A)
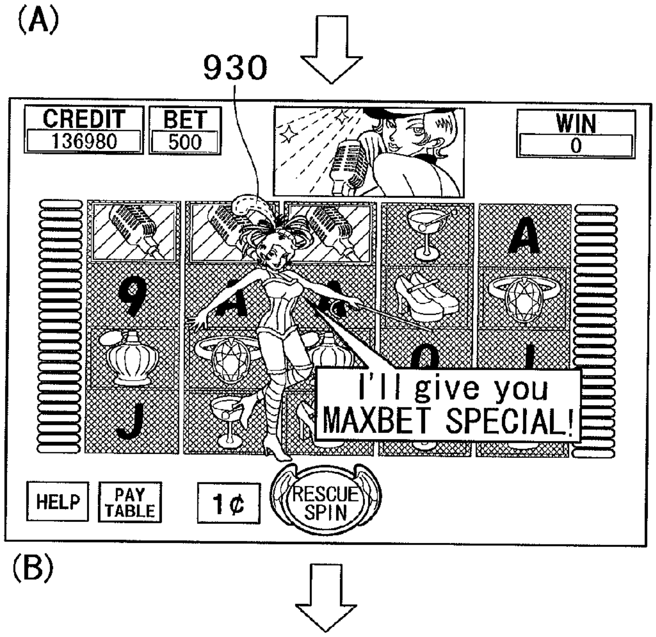
(B)
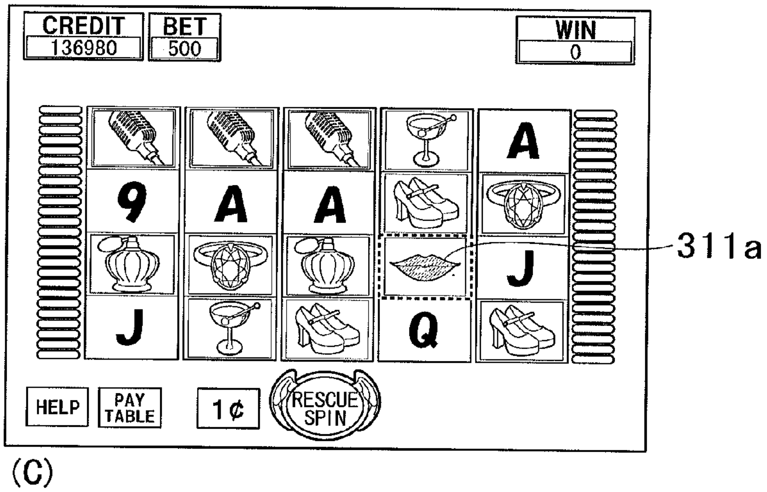
(C)

GAMING MACHINE PRODUCING EFFECT WHEN AWARDING BENEFIT AND CONTROL METHOD THEREOF

CROSS REFERENCE TO RELATED APPLICATIONS

The present application is a continuation of, and claims priority from, co-pending U.S. application Ser. No. 12/837,063, which was filed on Jul. 15, 2010, the entire disclosure of which is incorporated herein by reference. The present application also claims priority from Japanese application No. 2009-174709, which was filed on Jul. 27, 2009, the entire disclosure of which is incorporated herein by reference.

BACKGROUND OF THE INVENTION

1. Field of the Invention

The present invention relates to a gaming machine which produces an effect when awarding a benefit, and a control method thereof.

2. Description of Related Art

A conventional gaming machine having a symbol display unit including a plurality of symbol display regions is arranged so as to award a benefit (e.g. payout or shift to a bonus game or a free game) when a predetermined condition is satisfied (see e.g., Specification of U.S. Pat. No. 6,517,433).

Examples of such a predetermined condition include a condition in which a combination of symbols stopped on symbol display regions constituting an active payline is matched with a predetermined combination and a condition in which the number of specific symbols stopped on the symbol display regions constituting the symbol display unit is not lower than a predetermined number. For example, a gaming machine recited in Specification of U.S. Pat. No. 6,517,433 is arranged so that a benefit (payout or shift to a bonus game or a free game) is awarded if specific symbols or a specific combination of symbols appear on a winning line on which a game value is bet (i.e. on an active payline).

When benefits are awarded, various types of effects are produced. In this regard, how a player feels would be greatly influenced by a change in the type of effects based on a relation between how symbols are displayed on the symbol display unit and an award, and this could produce a new entertainment characteristic for gaming machines.

An object of the present invention is to provide a slot machine providing an entertainment characteristic which is not brought about by the above mentioned prior art, and a control method thereof.

SUMMARY OF THE INVENTION

To solve the above problem, a first aspect of the present invention is a gaming machine described below.

Namely, the gaming machine includes: a plurality of symbol arrays each of which having in predetermined positions a plurality of symbols including picture symbols and a wild symbol regarded as any of the picture symbols;

a symbol display device having a matrix of arrangement areas in which the plurality of symbols in the plurality of symbol arrays are arranged; and a controller programmed to execute the following processes of:

(f1) having the symbol display device rearrange the plurality of symbols in the plurality of arrangement areas;

(f2) awarding a benefit according to the relation among the plurality of symbols rearranged;

(f3) fixedly displaying the wild symbol rearranged in any of the arrangement areas;

(f4) repeating (f1) to (f3) until a predetermined condition is met, wherein, when the wild symbol is fixedly displayed in (f3), the fixedly displayed wild symbol is preferentially displayed over a symbol rearranged behind the fixedly displayed wild symbol, until rearrangement in (f1) is completed, when the plurality of rearranged symbols including the symbol rearranged behind the fixedly displayed wild symbol satisfy a predetermined relation, the symbol rearranged behind the fixedly displayed wild symbol is preferentially displayed over the fixedly displayed wild symbol; and when the predetermined relation is not satisfied, the fixedly displayed wild symbol is preferentially displayed over the symbol rearranged behind the fixedly displayed wild symbol.

In the structure, when the wild symbol is fixedly displayed in (f3), the fixedly displayed wild symbol can be preferentially displayed over the symbol rearranged behind the fixedly displayed wild symbol, until rearrangement completes in (f1). This keeps a player wondering which symbol is rearranged behind the fixedly displayed wild symbol, until the rearrangement is completed.

Further, when the plurality of rearranged symbols including the symbol rearranged behind the fixedly displayed wild symbol satisfy the predetermined relation, the symbol rearranged behind the fixedly displayed wild symbol is preferentially displayed over the fixedly displayed wild symbol. Thus, when the benefit for a relation of symbols including the symbol rearranged behind the fixedly displayed wild symbol is better than the benefit for a relation of the symbols including the fixedly displayed wild symbol, the symbol rearranged behind the fixedly displayed wild symbol is preferentially displayed to notify the player that the benefit for the relation of symbols including the symbol rearranged behind the fixedly displayed wild symbol is awarded.

Further, a second aspect of the present invention is a gaming machine as described below. The gaming machine of the first aspect of the present invention is adapted so that the symbol rearranged behind the fixedly displayed wild symbol is blink-displayed, when preferentially displaying the same over the fixedly displayed wild symbol.

In the above structure, the symbol rearranged behind the fixedly displayed wild symbol is blink-displayed, when preferentially displaying the same over the fixedly displayed wild symbol. This gives player a more visual impression that the symbol rearranged behind the fixedly displayed wild symbol is preferentially displayed over the fixedly displayed wild symbol.

Further, a third aspect of the present invention is a gaming machine as described below.

Namely, the gaming machine includes: a plurality of symbol arrays each of which having in predetermined positions a plurality of symbols including picture symbols and a wild symbol regarded as any of the picture symbols;

a symbol display device having a matrix of arrangement areas in which the plurality of symbols in the plurality of symbol arrays are arranged; and a controller programmed to execute the following processes of:

(g1) after a predetermined maximum bettable amount of or less game media are bet, having the symbol display device rearrange the plurality of symbols in the plurality of arrangement areas;

(g2) awarding a free game according to the relation amongst the plurality of symbols rearranged;

(g3) when the free game is awarded, having the symbol display device rearrange the plurality of symbols in the plurality of arrangement areas;

(g4) awarding a benefit according to the relation among the plurality of symbols rearranged;

(g5) fixedly displaying the wild symbol rearranged in any of the arrangement areas; and (g6) repeating (g3) to (g5) until a predetermined condition is met, wherein, when the wild symbol is fixedly displayed in (g5), the fixedly displayed wild symbol is preferentially displayed over a symbol rearranged behind the fixedly displayed wild symbol, until rearrangement in (g3) is completed, when the plurality of rearranged symbols including the symbol rearranged behind the fixedly displayed wild symbol satisfy a predetermined relation, the symbol rearranged behind the fixedly displayed wild symbol is preferentially displayed over the fixedly displayed wild symbol; and when the predetermined relation is not satisfied, the fixedly displayed wild symbol is preferentially displayed over the symbol rearranged behind the fixedly displayed wild symbol.

In the structure, during the free game, when the wild symbol is fixedly displayed in (g5), the fixedly displayed wild symbol can be preferentially displayed over the symbol rearranged behind the fixedly displayed wild symbol, until rearrangement completes in (g3). This keeps a player playing wondering during a free game, which symbol is rearranged behind the fixedly displayed wild symbol, until the rearrangement is completed.

Further, during the free game, when the plurality of rearranged symbols including the symbol rearranged behind the fixedly displayed wild symbol satisfy the predetermined relation, the symbol rearranged behind the fixedly displayed wild symbol is preferentially displayed over the fixedly displayed wild symbol. Thus, in a free game, when the benefit for a relation of symbols including the symbol rearranged behind the fixedly displayed wild symbol is better than the benefit for a relation of the symbols including the fixedly displayed wild symbol, the symbol rearranged behind the fixedly displayed wild symbol is preferentially displayed to notify the player that the benefit for the relation of symbols including the symbol rearranged behind the fixedly displayed wild symbol is awarded.

Further, a fourth aspect of the present invention is a gaming machine as described below. Namely, the gaming machine of the third aspect of the present invention is adapted so that the symbol rearranged behind the fixedly displayed wild symbol is blink-displayed, when preferentially displaying the same over the fixedly displayed wild symbol.

In the above structure, the symbol rearranged behind the fixedly displayed wild symbol is blink-displayed, when preferentially displaying the same over the fixedly displayed wild symbol. This gives player a more visual impression that the symbol rearranged behind the fixedly displayed wild symbol is preferentially displayed over the fixedly displayed wild symbol.

Further, a fifth aspect of the present invention is a control method of a gaming machine as described below.

Namely, the gaming machine includes: a plurality of symbol arrays each of which having in predetermined positions a plurality of symbols including picture symbols and a wild symbol regarded as any of the picture symbols;

a symbol display device having a matrix of arrangement areas in which the plurality of symbols in the plurality of symbol arrays are arranged, the method comprising:

a first step in which the symbol display device rearranges a plurality of symbols in the plurality of arrangement areas;

a second step for awarding a benefit according to a relation among the plurality of symbols rearranged in the arrangement areas;

a third step for fixedly displaying the rearranged wild symbols in the arrangement areas; and a fourth step for repeating the first step to the third step until a predetermined condition is met, wherein, when the wild symbol is fixedly displayed in the third step, the fixedly displayed wild symbol is preferentially displayed over a symbol rearranged behind the fixedly displayed wild symbol, until rearrangement in the first step is completed, when the plurality of rearranged symbols including the symbol rearranged behind the fixedly displayed wild symbol satisfy a predetermined relation, the symbol rearranged behind the fixedly displayed wild symbol is preferentially displayed over the fixedly displayed wild symbol; and when the predetermined relation is not satisfied, the fixedly displayed wild symbol is preferentially displayed over the symbol rearranged behind the fixedly displayed wild symbol.

In the structure, when the wild symbol is fixedly displayed in the third step, the fixedly displayed wild symbol is preferentially displayed over the symbol rearranged behind the fixedly displayed wild symbol, until rearrangement completes in the first step. This keeps a player wondering which symbol is rearranged behind the fixedly displayed wild symbol, until the rearrangement is completed.

Further, when the plurality of rearranged symbols including the symbol rearranged behind the fixedly displayed wild symbol satisfy the predetermined relation, the symbol rearranged behind the fixedly displayed wild symbol is preferentially displayed over the fixedly displayed wild symbol. Thus, when the benefit for a relation of symbols including the symbol rearranged behind the fixedly displayed wild symbol is better than the benefit for a relation of the symbols including the fixedly displayed wild symbol, the symbol rearranged behind the fixedly displayed wild symbol is preferentially displayed to notify the player that the benefit for the relation of symbols including the symbol rearranged behind the fixedly displayed wild symbol is awarded.

The present invention keeps a player wondering which symbol is rearranged behind the fixedly displayed wild symbol, until the rearrangement is completed. Thus, a slot machine and a control method thereof, realizing a new entertainment characteristic is provided.

BRIEF DESCRIPTION OF THE DRAWINGS

FIG. 9 is a view illustrating arrangement of symbols that are drawn on the peripheral surfaces of the reels of the gaming machine according to First Embodiment of the present invention.

FIG. 11 is a view illustrating a payout amount determination table of the gaming machine according to First Embodiment of the present invention.

FIG. 12 is a view illustrating a rearrangement probability table of the gaming machine according to First Embodiment of the present invention.

FIG. 13A is a view showing a for-two-symbols effect determination table of the gaming machine according to First Embodiment of the present invention.

FIG. 13B is a view showing a for-three symbols effect determination table of the gaming machine according to First Embodiment of the present invention.

FIG. 14A is a view showing a for-two-symbols effect data table of the gaming machine according to First Embodiment of the present invention.

FIG. 14B is a view showing a for-three-symbols effect data table of the gaming machine according to First Embodiment of the present invention.

FIG. 15 is an explanatory diagram showing a display state of a lower image display panel of the gaming machine according to First Embodiment of the present invention.

FIG. 32 is an explanatory diagram illustrating a display state of Second Embodiment of the present invention.

FIG. 45 shows a symbol animation sound determination table of the slot machine according to Fourth Embodiment of the present invention.

FIG. 51 shows a specific symbol count table of the slot machine according to Fifth Embodiment of the present invention.

FIG. 52 is a view illustrating a BGM determination table of the slot machine according to Fifth Embodiment of the present invention.

FIG. 60 is an explanatory diagram of an additional wild symbol random determination table according to Sixth Embodiment of the present invention.

FIG. 61 is an explanatory diagram of effect image display according to Sixth Embodiment of the present invention.

REFERENCE NUMERALS

Figure 1:
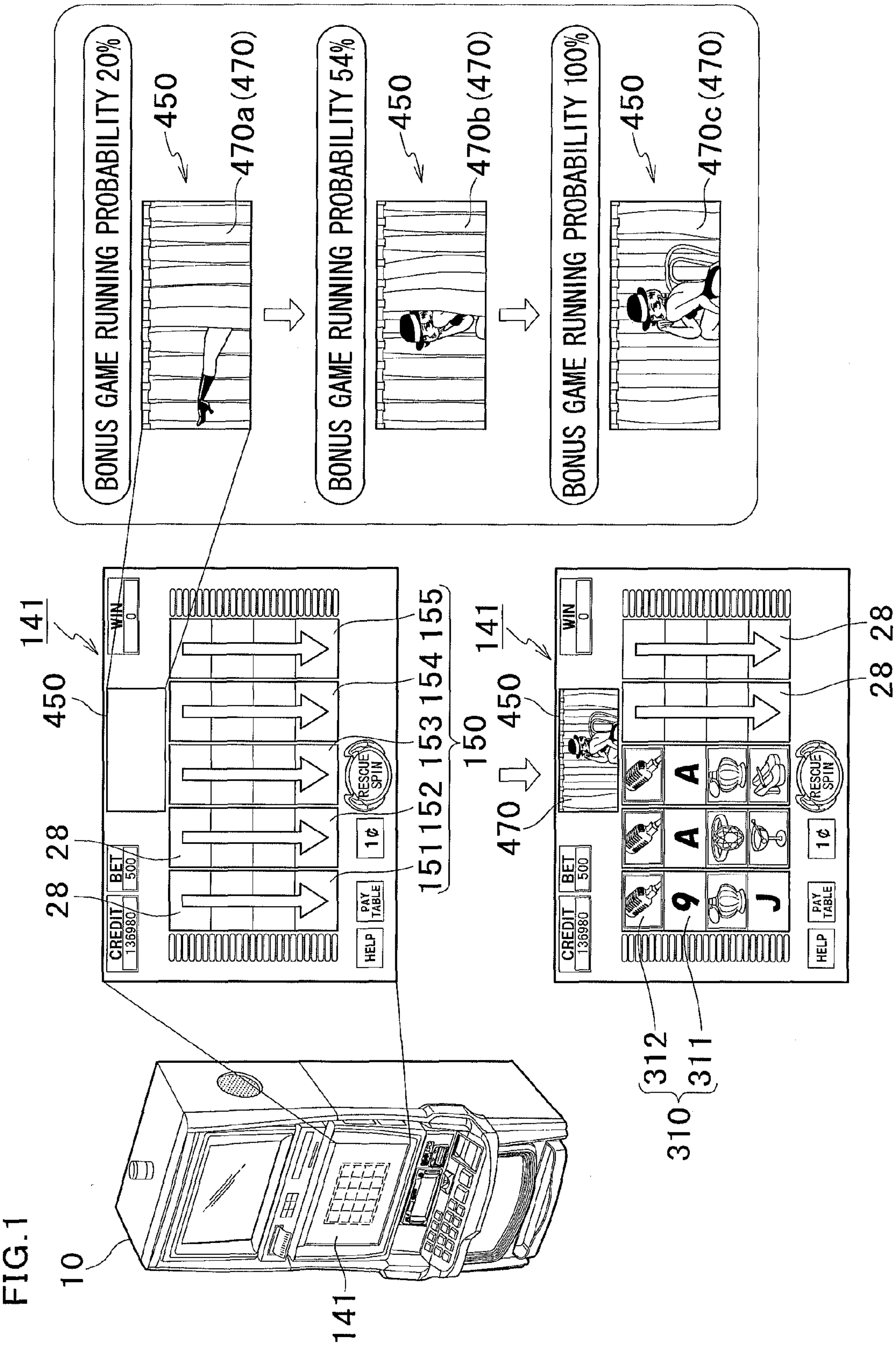
FIG. 1 is an explanatory diagram illustrating a gaming machine and a control method thereof, according to First Embodiment of the present invention.

10 Gaming Machine
28 Arrangement Area
71 Main CPU
73 RAM (Effect Storage Memory)
141 lower image display panel
150 Display Window
310 Symbol
312 Feature Symbol (Trigger Symbol)
450 Effect Display Unit
470 Effect Data

DESCRIPTION OF THE PREFERRED EMBODIMENTS

[First Embodiment]

The following describes First Embodiment of the present invention, with reference to FIGS. 1 to 28.

There have been known gaming machines in which a plurality of reels constituted by a plurality of symbols and to which symbol arrays are allocated are scrolled and then stopped, and a predetermined amount of game media (e.g. a predetermined amount of coins or money) are awarded according to a combination of symbols rearranged. Such gaming machines are disclosed in the specifications of U.S. Pat. Nos. 6,960,133, 6,012,983, and 6,093,102, for example.

Some of those gaming machines are arranged such that a gaming mode is changed if a predetermined condition is established in a game. For example, there are slot machines in which shift to a special game (bonus game) is executed when a predetermined number or more of trigger symbols are rearranged. Among such machines in which a gaming mode is changed, there are gaming machines in which an effect to show a probability of change in the gaming mode before a predetermined condition is established.

For example, the specification of Japanese Unexamined Patent Publication No. 20007-301136 recites a known gaming machine which is arranged so that, before all reels are stopped, if the symbols which have already been stopped form a state in which only one trigger symbol is required to satisfy a condition to shift to a special game (i.e. bonus riichi state), an effect is produced to notify the player of a probability that a condition with which shift to a special game occurs is established (i.e. a probability of a change in the gaming mode).

However, as described above, Specification of Japanese Unexamined Patent Publication No. 2007-301136 teaches that an effect to increase the probability of a change in the gaming mode is produced only when at least one reel is stopped and the bonus riichi state is established. Therefore the player does not hold expectations in obtaining a special game, before the symbols are rearranged (i.e. all reels are being scrolled). Furthermore, since the player can foresee to some degree that the effect which indicates the probability of a change in the gaming mode will be produced, the player may lose interest in playing.

The invention according to First Embodiment was done to solve the problem above, and an object of the invention is to provide a gaming machine which increases the player's expectation on a special game before symbols are rearranged, and a game control method thereof.

A first aspect of the invention according to First Embodiment is a gaming machine in which a plurality of symbols selected from a plurality of types of symbols including a trigger symbol are rearranged in arrangement areas in each unit game and a gaming mode is changed in accordance with the number of trigger symbols included in the rearranged symbols, the gaming machine including:

a display which displays an image;

a memory which stores plural types of image data used for image display on the display; and a controller which suitably samples a set of image data from the memory and causes the display to display an image based on the sampled set of data, wherein, after an arrangement of the symbols is dismissed and before the symbols are rearranged, the controller determines the number of trigger symbols to be rearranged, and based on a sampling frequency determined for each type of the image data and according to the number of the trigger symbols determined, a set of image data is sampled from the memory and an image is displayed on the display based on the sampled set of image data.

According to the arrangement above, the gaming mode is changed according to the number of trigger symbols included in the rearranged symbols. After the arrangement of the symbols is dismissed and before they are rearranged, the number of trigger symbols to be rearranged is determined, and based on the sampling frequency determined for each type of image data in accordance with the determined number of trigger symbols, a set of image data is sampled from the memory and displayed on the display. This makes it possible to alter the player's expectation on a change in the gaming mode such as shift to a special game, by the content of image data displayed on the display.

A second aspect of the invention according to First Embodiment relates to a gaming machine which includes:

plural types of symbols including a trigger symbol; a display having plural arrangement areas in a matrix manner where the symbols are arranged;

an effect running unit which produces an effect by using effect data;

an effect storage memory which stores plural sets of effect data and also stores, in association with each number of the trigger symbols rearranged in the arrangement areas, effect data tables each being associated with at least one set of effect data and defining a possibility that an associated set of effect data is used for the effect; and a controller which is programmed to:

(a1) dismiss the arrangement of the plurality of symbols based on a predetermined timing, (a2) determine the plurality of symbols to be rearranged, (a3) determine whether a special game is to be run by determining whether in the process (a2) the number of the trigger symbols rearranged in the arrangement areas is not lower than a trigger number with which the special game is triggered, (a4) if it is determined in the process (a2) that the number of the trigger symbols to be rearranged is the predetermined number or more, with reference to the effect data table which is stored in the effect storage memory and is associated with the number of the trigger symbols to be rearranged, select a set of effect data used for the effect executed by the effect running unit from the at least one set of effect data associated with the effect data table, (a5) execute the effect by the effect running unit by using the effect data selected in the process (a4), (a6) after the process (a5), rearrange the plurality of symbols determined in the process (a2), (a7) award a payout according to a relation among the symbols rearranged, and (a8) if it is determined in the process (a3) that the special game is to be run, run the special game.

According to the arrangement above, the effect storage memory stores, in association with each number of the trigger symbols rearranged in the arrangement areas, effect data tables each being associated with at least one set of effect data and defining a possibility that an associated set of effect data is used for the effect executed by the effect running unit. If it is determined that the number of trigger symbols to be rearranged is not lower than the predetermined number, with reference to the effect data table associated with the number of trigger symbols to be rearranged, a set of effect data to be used for the effect executed by the effect running unit is selected from the at least one set of effect data associated with the effect data table. The effect is executed by the effect running unit before the symbols are rearranged. Because this allows the player to recognize by the effect executed by the effect running unit that the number of trigger symbols to be rearranged is not lower than the predetermined number, it is possible to increase the player's expectation on a special game before the rearrangement of the symbols. Furthermore, since a set of effect data used for the effect in the effect running unit is selected with reference to the effect data table associated with the number of trigger symbols rearranged on the arrangement areas, it is possible to cause a change in the player's expectation on the special game in accordance with the effect to be executed.

Regarding the gaming machine according to the second aspect of the invention according to First Embodiment, the effect storage memory may store effect data which is associated solely with the effect data table associated with the trigger number or more of trigger symbols. According to the arrangement above, the effect storage memory stores effect data which is associated solely with the effect data table associated with the trigger number or more of trigger symbols. For this reason, when the effect using this effect data is executed, the trigger number or more of trigger symbols are rearranged. This makes it possible to further increase the player's expectation on the special game.

In the gaming machine according to the third aspect of the invention according to First Embodiment, when a predetermined number of trigger symbols are rearranged on the arrangement areas, the number of sets of effect data selected from the effect storage memory is larger than the case where the number of rearranged trigger symbols is not the predetermined number. According to the arrangement above, when a predetermined number of trigger symbols are rearranged on the arrangement areas, the number of sets of effect data selected from the effect storage memory for the effect executed by the effect running unit is larger than the case where the number of rearranged trigger symbols is not the predetermined number. This allows the player to recognize that a probability of rearrangement of the predetermined number or more of trigger symbols is high when the effect using the sets of effect data is executed, thereby making it possible to cause a change in the player's expectation on the special game.

A fourth aspect of the invention according to First Embodiment relates to a gaming machine which includes:

plural types of symbols including a trigger symbol; a display having plural arrangement areas in a matrix manner where the symbols are arranged;

an effect running unit which produces an effect by using effect data;

an effect storage memory which stores at least one set of effect data and also stores, in association with each number of the trigger symbols rearranged in the arrangement areas, effect data tables each being associated with a plurality of sets of effect data and defining a possibility that each set of effect data is used for the effect; and a controller which is programmed to:

(b1) dismiss the arrangement of the symbols based on a predetermined timing, (b2) determine the symbols to be rearranged, (b3) determine whether the effect is executed, (b4) determine whether a special game is to be run by determining whether in the process (b2) the number of the trigger symbols rearranged in the arrangement areas is not lower than a trigger number with which the special game is triggered, (b5) if it is determined in the process (b3) that the effect is to be executed and determined in the process (b2) that the number of the trigger symbols to be rearranged is the predetermined number or more, with reference to the effect data table which is stored in the effect storage memory and is associated with the number of the trigger symbols to be rearranged, select a set of effect data used for the effect executed by the effect running unit from the sets of effect data associated with the effect data table, (b6) by using the set of effect data selected in the process (b5), execute the effect by the effect running unit, (b7) after the process (b6), rearrange the plurality of symbols determined in the process (b2), (b8) award a payout according to a relation among the plurality of symbols rearranged, and (b9) run the special game if it is determined in the process (b4) that the special game is to be run.

According to the arrangement above, the effect storage memory stores, in association with each number of the trigger symbols rearranged in the arrangement areas, effect data tables each being associated with at least one set of effect data and defining a possibility that each set of effect data is used for the effect executed by the effect running unit. If it is determined that the number of trigger symbols to be rearranged is not lower than the predetermined number, with reference to the effect data table associated with the number of trigger symbols to be rearranged, a set of effect data to be used for the effect executed by the effect running unit is selected from the at least one set of effect data associated with the effect data table. The effect is executed by the effect running unit before the symbols are rearranged. Because this allows the player to recognize by the effect executed by the effect running unit that the number of trigger symbols to be rearranged is not lower than the predetermined number, it is possible to increase the player's expectation on the special game before the rearrangement of the symbols. Furthermore, since a set of effect data used for the effect in the effect running unit is selected with reference to the effect data table associated with the number of trigger symbols rearranged on the arrangement areas, it is possible to cause a change in the player's expectation on the special game in accordance with the effect to be executed. When it is determined that the effect is not executed, the effect is not executed even if it is determined that the trigger number or more trigger symbols are to be rearranged. As such, even if the effect is not executed, the trigger number or more trigger symbols may be rearranged. This case provides the player with an unexpected joy.

A fifth aspect of the invention according to First Embodiment relates to a gaming machine which includes:

plural types of symbols including a trigger symbol; a display having plural arrangement areas in a matrix manner where the symbols are arranged;

an effect running unit which produces an effect by using effect data;

an effect storage memory which stores plural sets of effect data and also stores a rearrangement probability table which defines the sets of effect data and a probability that the number of trigger symbols to be rearranged is not lower than a trigger number with which the special game is triggered; and a controller which is programmed to:

(c1) dismiss the arrangement of the symbols based on a predetermined timing, (c2) determine the symbols to be rearranged, (c3) determine whether a special game is to be run by determining whether in the process (c2) the number of the trigger symbols rearranged in the arrangement areas is not lower than the trigger number, (c4) if it is determined in the process (c2) that the number of the rearranged trigger symbols is not lower than the predetermined number, select a set of effect data used for the effect executed by the effect running unit, with reference to the rearrangement probability table in the effect storage memory, (c5) execute the effect by the effect running unit by using the set of effect data selected in the process (c4), (c6) after the process (c5), rearrange the plurality of symbols determined in the process (c2), (c7) award a payout according to a relation among the plurality of symbols rearranged, and (c8) if it is determined in the process (c3) that the special game is to be run, run the special game.

According to the arrangement above, the effect storage memory stores a rearrangement probability table which defines each set of effect data and a probability that the number of trigger symbols to be rearranged is not lower than the trigger number with which the special game is triggered. When it is determined that the number of trigger symbols rearranged is not lower than a predetermined number, a set of effect data used for an effect executed by the effect running unit is selected with reference to the rearrangement probability table. The effect is executed by the effect running unit before the symbols are rearranged. Because this allows the player to recognize by the effect executed by the effect running unit that the number of trigger symbols to be rearranged is not lower than the predetermined number, it is possible to increase the player's expectation on the special game before the rearrangement of the symbols. Furthermore, since a set of effect data used for an effect executed by the effect running unit is selected with reference to the rearrangement probability table, it is possible to cause a change in the player's expectation on the special game by executing the effect.

A sixth aspect of the invention according to the First Embodiment relates to a control method of a game machine which includes:

plural types of symbols including a trigger symbol; a display having plural arrangement areas in a matrix manner where the symbols are arranged;

an effect running unit which produces an effect by using effect data; and an effect storage memory which stores a plurality of sets of effect data and also stores, in association with each number of the trigger symbols rearranged in the arrangement areas, effect data tables each being associated with plural sets of effect data and defining a possibility that each set of effect data is used for the effect, the method comprising the steps of:

(d1) dismissing the arrangement of the symbols in accordance with a predetermined timing;

(d2) determining the symbols to be rearranged;

(d3) determining whether a special game is to be run by determining in the step (d2) whether the number of trigger symbols rearranged on the arrangement areas is not lower than a trigger number with which the special game is triggered;

(d4) if it is determined in the process (d2) that the number of the trigger symbols to be rearranged is the predetermined number or more, with reference to the effect data table which is stored in the effect storage memory and is associated with the number of the trigger symbols to be rearranged, selecting a set of effect data used for the effect executed by the effect running unit from the sets of effect data associated with the effect data table;

(d5) executing the effect by the effect running unit by using the set of effect data selected in the process (d4);

(d6) after the step (d5), rearranging the plurality of symbols determined in the step (d2);

(d7) awarding a payout according to a relation among the plurality of symbols rearranged; and (d8) if it is determined in the step (d3) that the special game is to be run, running the special game.

According to the arrangement above, the effect storage memory stores plural sets of effect data and also stores, in association with each number of the trigger symbols rearranged in the arrangement areas, effect data tables each being associated with at least one set of effect data and defining a possibility that each set of effect data is used for the effect executed by the effect running unit. If it is determined that the number of trigger symbols to be rearranged is not lower than the predetermined number, with reference to the effect data table associated with the number of trigger symbols to be rearranged, a set of effect data to be used for the effect executed by the effect running unit is selected from the sets of effect data associated with the effect data table. The effect is executed by the effect running unit before the symbols are rearranged. Because this allows the player to recognize by the effect executed by the effect running unit that the number of trigger symbols to be rearranged is not lower than the predetermined number, it is possible to increase the player's expectation on the special game before the rearrangement of the symbols. Furthermore, since a set of effect data used for the effect in the effect running unit is selected with reference to the effect data tables associated with the number of trigger symbols rearranged on the arrangement areas, it is possible to cause a change in the player's expectation on the special game in accordance with the effect to be executed.

(Gaming Machine Overview)

A gaming machine according to First Embodiment is arranged such that, after the arrangement of symbols is dismissed and before the symbols are rearranged, the number of trigger symbols to be rearranged is determined, and based on a sampling frequency determined for each type of image data and selected in accordance with the determined number of trigger symbols, a set of image data is sampled from the memory and displayed on a display.

More specifically, as shown in FIG. 1, a control method of a gaming machine includes the steps of:

dismissing an arrangement of symbols 310 based on a predetermined timing;

determining symbols 310 to be rearranged;

determining whether a special game is to be run by determining whether the number of feature symbols 312 (trigger symbols) rearranged on arrangement areas 28 is not lower than a trigger number with which the special game is triggered;

if it is determined that the number of the feature symbols 312 to be rearranged is the predetermined number (two in the present embodiment) or more, with reference to the effect data table which is stored in the effect storage memory and is associated with the number of the feature symbols 312 to be rearranged, selecting a set of effect data used for the effect executed by the effect running unit (e.g. an effect display unit 450 of a lower image display panel 141) from the sets of effect data associated with the effect data table;

executing the effect by the effect running unit by using the set of effect data;

rearranging a plurality of symbols 310;

awarding a payout according to a relation of the plurality of symbols 310 rearranged; and running a special game if it is determined that the special game is to be run.

The effect memory stores a plurality of sets of effect data 470 (such as image data). The effect memory also stores an effect data table which is associated with at least one set of effect data 470 and defines each set of the associated effect data 470 and a possibility that each set of effect data is used for an effect executed by an effect running unit (e.g. an effect display unit 450 of a lower image display panel 141). Details of the effect data table will be given later.

As shown in FIG. 1, the display window 150 of the lower image display panel 141 display five video reels 151-155. A video reel depicts through images the rotational and stop motions of a mechanical reel having a plurality of symbols 310 drawn on the peripheral surface thereof. To each of the video reels 151-155, a symbol array comprised of a previously determined plurality (22 in the present embodiment) of symbols 310 is assigned.

A plurality of arrangement areas 28 form the display window 150 as illustrated in FIG. 1. In other words, the display window 150 is constituted by five rows and four columns of arrangement areas 28 provided in a matrix manner. In the present embodiment, a row indicates a horizontal row of arrangement areas 28 in the display window 150, whereas a column indicates a vertical column of arrangement areas 28 in the display window 150.

In each arrangement area 28, a single symbol 310 of a symbol array allocated to the video reels 151-155 is arranged. The expression "arrangement" means a state of symbols 310, which can be visibly confirmed by a player. That is, the wording means a state where the symbols 310 are displayed in the arrangement areas 28, in FIG. 1. Arranging the symbols 310 again after dismissing the symbols 310 is referred to as "rearranging".

The types of the symbols 310 to be rearranged are randomly determined. When the random determination results in rearrangement of a predetermined number or more (two or more in the present embodiment) of feature symbols 312 (trigger symbols), an effect indicating the probability of shifting to a special game is executed by using effect data 470 on the effect display unit 450 of the lower image display panel 141, before the symbols 310 are rearranged. In other words, when the effect (indication effect) indicating the probability of shifting to a special game is executed, the number of feature symbols 312 rearranged in the display window 150 is always equal to or more than a predetermined number.

In the present embodiment, when it is determined that two feature symbols 312 are to be rearranged in the display window 150, a set of effect data used for an effect executed by the effect display unit 450 of the lower image display panel 141 is selected from low-probability effect data 470*a* and middle-probability effect data 470*b*, with reference to a later-described for-two-symbols effect data table. When it is determined that three feature symbols 312 are to be rearranged in the display window 150, a set of effect data used for an effect executed by the effect display unit 450 of the lower image display panel 141 is selected from low-probability effect data 470*a*, middle-probability effect data 470*b*, and high-probability effect data 470*c*, with reference to a later-described for-three-symbols effect data table.

The special game above is equivalent to a bonus game (feature game). In the present embodiment, the special game is a game in which a free game is repeated. However, the special game is not particularly limited and may be any type of game, provided that the special game is more advantageous than the base game for players. Another bonus game may be adopted in combination, provided that a player is given a more advantageous gaming modes than the base game. For example, the bonus game may be a game that provides a player with a chance of winning more game values than the base game or a game that provides a player with a higher chance of winning game values than the base game. Alternatively, the bonus game may be a game that consumes fewer amounts of game values than the base game. In the bonus game, these games may be provided alone or in combination. It is noted that the special game will be referred to as bonus game hereinbelow.

The "free game" is a game runnable with a bet of fewer game values than the base game. Note that "bet of fewer game values" encompasses a bet of zero game value. The "free game" therefore may be a game runnable without a bet of game value, which awards an amount of game value based on symbols 310 rearranged. In other words, the "free game" may be a game which is started without the premise that a game value is consumed. To the contrary, the "base game" is a game runnable on condition that a game value is bet, which awards an amount of game value based on symbols 310 rearranged. In other words, the "base game" is a game which starts on the premise that a game value is consumed.

The "game value" is a coin, bill, or electrically valuable information corresponding to these. Note that the game value in the present invention is not particularly limited. Examples of the game value include game media such as medals, tokens, electric money, tickets, and the like. The ticket is not particularly limited, and a later-mentioned ticket with a barcode may be adopted for example.

Note that a "unit game" includes a series of operations executed within a period between a start of receiving a bet to a point where a winning may be resulted. For example, bet time for bet reception, game time for rearrangement of symbols 310 having been stopped, and payout time for payout processing to award a payout are executed once each within a single unit game of the base game. In the meanwhile, game time for rearrangement of symbols 310 having been stopped and payout time for payout processing to award a payout are executed once each within a single unit game of the bonus game which requires no betting.

The "feature symbol" is a trigger symbol with which a bonus game is triggered. The "trigger number" indicates the number of feature symbols 312 rearranged on the arrangement areas 28, which triggers the bonus game. In other words, a bonus game is triggered when the trigger number or more of feature symbols 312 are rearranged in the arrangement areas 28, and the gaming mode shifts from the base game to the bonus game.

The trigger number is three in the present embodiment. In other words, a bonus game is triggered when three feature symbols 312 are rearranged in the display window 150. To put it differently, a bonus game is triggered when feature symbols 312 are rearranged in three arrangement areas 28.

[Explanation of Function Flow Diagram]

Figure 2:
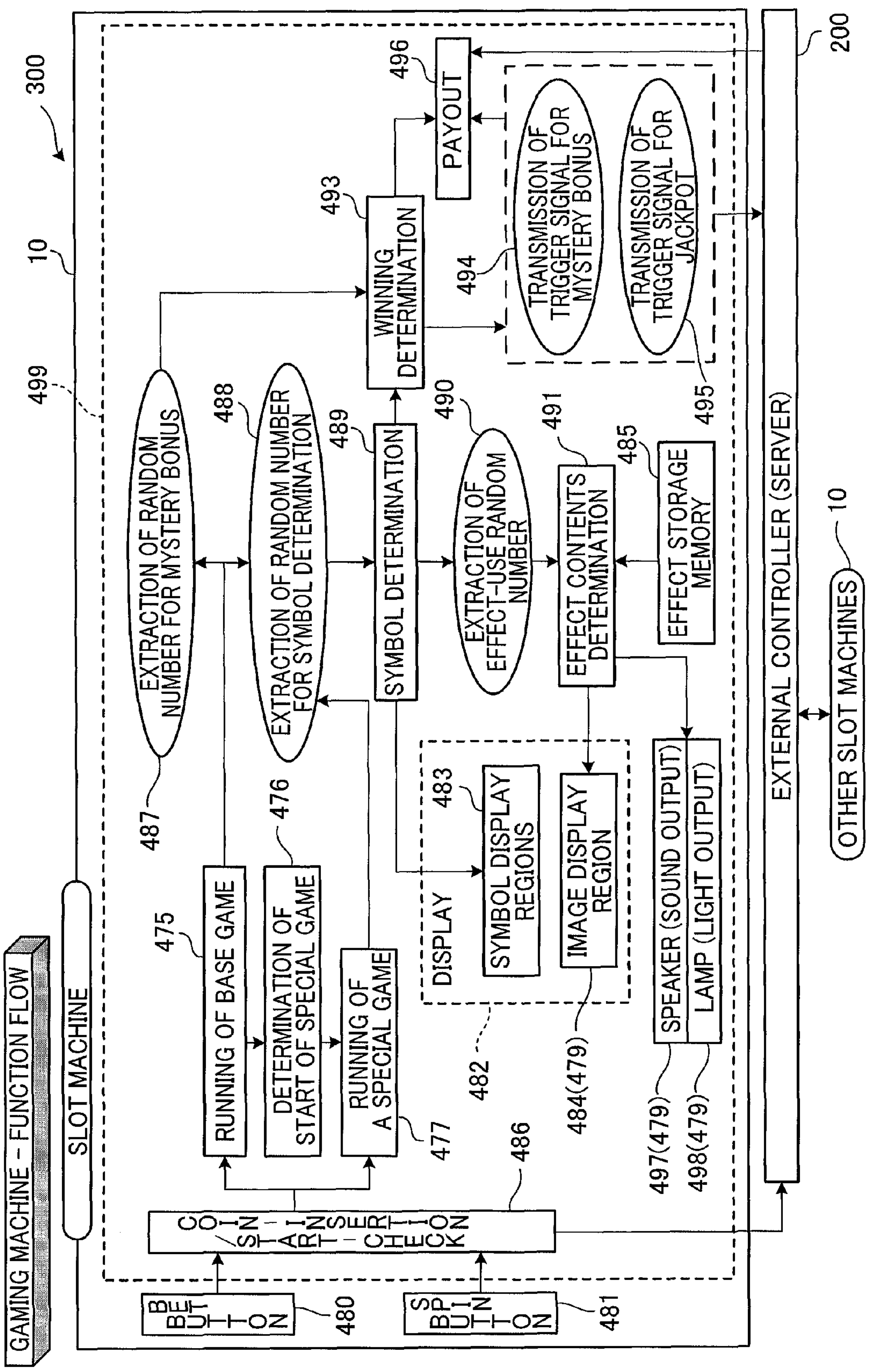
FIG. 2 is a block diagram of the gaming machine according to First Embodiment of the present invention.

The basic functions of the gaming machine 10 executing the control method above will be described with reference to FIG. 2. FIG. 2 is a view illustrating a functional blocks of the gaming machine 10 according to First Embodiment of the present invention.

The gaming machine 10 includes a bet button unit 480, a spin button unit 481, a display unit 482, an effect storage memory 485, a speaker unit 497, and a lamp unit 498. The gaming machine 10 further includes a controller 499 which controls these units. Note that the bet button unit 480 and the spin button unit 481 each being a kind of an input device. The gaming machine 10 is connected to an external controller 200 (server) to be able to perform data communications therewith.

The bet button unit 480 has a function of accepting a player's operation for entering a bet amount. The spin button unit 481 has a function of receiving a start of a game such as base game through a player's operation; i.e., start operation. The display unit 482 has a function of displaying, in the form of a still image, various symbols 310, numerical values, marks, or the like, and displaying moving pictures such as an effect movie. Further, the display unit 482 includes a touch panel as an input device, and has a function of receiving various commands inputted by player's press operations. The display unit 482 has a symbol display region 483 and a image display region 484. The symbol display region 483 displays symbols 310 as shown in FIG. 1. The image display region 484 displays various effect image information to be displayed during a game, in the form of moving image or still image.

The effect storage memory 485 stores a plurality of sets of effect data 470 (e.g. image data, audio data, and lamp output data). The effect storage memory 485 also stores an effect data table which is associated with at least one set of effect data 470 and defines each set of the associated effect data 470 and a probability that each set of effect data 470 is used for an effect executed by the effect running unit 479 (image display region 484, lamp unit 498, and speaker unit 497).

The controller 499 is arranged to execute: a first process to dismiss an arrangement of a plurality of symbols 310 based on a predetermined timing;

a second process to determine a plurality of symbols 310 to be rearranged;

a third process to determine whether a bonus game is to be run by determining whether the number of trigger symbols (feature symbols 312) to be rearranged on the arrangement areas 28 is not lower than the trigger number with which a bonus game (special game) is triggered;

a fourth process to select, with reference to an effect data table which is stored in the effect storage memory 485 and associated with the number of feature symbols 312 to be rearranged, a set of effect data 470 used for an effect executed by the effect running unit 479 from sets of effect data 470 associated with the effect data table, if it is determined that the number of feature symbols 312 to be rearranged is not lower than the predetermined number;

a fifth process to execute the effect by the effect running unit 479 by using the set of effect data 470;

a sixth process to rearrange the plurality of symbols 310;

a seventh process to award a payout according to a relation of the plurality of symbols 310 rearranged; and a step of running a bonus game when it is determined that the bonus game is to be run. In other words, the controller 499 includes a first process unit, a second process unit, a third process unit, a fourth process unit, a fifth process unit, a sixth process unit, and a seventh process unit.

The controller 499 includes a coin insertion/start-check unit 486, a base game running unit 475, a special game start determination unit 476, a special game running unit 477, a mystery-bonus random number sampling unit 487, a symbol determination random number sampling unit 488, a symbol determining unit 489, an effect-use random number sampling unit 490, an effect content determining unit 491, a winning determining unit 493, and a payout unit 496.

The coin insertion/start-check unit 486 has a function to receive operations of the bet button unit 480 and the spin button unit 481 and a function to output operation information indicating that each button unit is operated to the mystery-bonus random number sampling unit 487 and the symbol determination random number sampling unit 488.

The base game running unit 475 has a function of running a base game on condition that the bet button unit 480 is operated. The special game start determination unit 476 determines whether to run a bonus game (special game), based on a combination of rearranged feature symbols 312 resulted from the base game. In other words, the special game start determination unit 476 has a function to determine that the player wins a bonus game (i.e. bonus game trigger) when the trigger number or more of feature symbols 312 which are trigger symbols of the bonus game are rearranged in the symbol display regions 483 (arrangement areas 28), and to shift the process of the special game running unit 477 in such a way that a special game is to be run from the next unit game.

The special game running unit 477 has a function of running a bonus game in which a free game is repeated a plurality of number of times corresponding to a game repeat count, merely in response to an operation on the spin button unit 481.

The mystery-bonus random number sampling unit 487 has a function to sample a random number and outputs the random number to the winning determining unit 493, if, during a base game, operation information is input from the coin insertion/start-check unit 486. The symbol determination random number sampling unit 488 has a function to sample a random number and outputs the random number to the symbol determining unit 489, when, during a base game or a special game (bonus game), operation information is input from the coin insertion/start-check unit 486.

The symbol determining unit 489 has a function to determine which symbols 310 are targets of rearrangement, with reference to the random number transmitted from the symbol determination random number sampling unit 488, a function to output, when the determined symbols 310 include a predetermined number or more of feature symbols 312, the number information of the feature symbols 312 which are the targets of rearrangement to the effect-use random number sampling unit 490, and a function to rearrange the symbols 310 which are the targets of rearrangement in the symbol display regions 483 of the display unit 482, based on later-described effect end information transmitted from the effect content determining unit 491.

Receiving the number information of the feature symbol 312 from the symbol determining unit 489, the effect-use random number sampling unit 490 functions to sample an effect-use random number and functions to output the number information of the feature symbol 312 from the symbol determining unit 489 and the effect-use random number to the effect content determining unit 491.

The effect content determining unit 491 has a function to select a set of effect data 470 by using the number information of the feature symbols 312, the effect data table stored in the effect storage memory 485, and the effect-use random number, a function to output the selected set of effect data 470 to the effect running unit 479, and a function to output effect end information to the effect content determining unit 491 when the effect using the set of effect data 470 executed by the effect running unit 479 is finished. The function to output the selected set of effect data 470 to the effect running unit 479 specifically includes a function to output image information of the selected set of effect data 470 to the image display region 484 of the display unit 482 and a function to output audio illumination information of the selected set of effect data 470 to the speaker unit 497 and the lamp unit 498.

The winning determining unit 493 has a function of determining whether a winning is made when information of symbols 310 rearranged and displayed on the symbol display regions 483 of the display unit 482 is given; a function of calculating an amount of payout based on a winning combination when it is determined that a winning has been made; and a function of outputting to the payout unit 496 a payout signal which is based on the amount of payout.

The winning determining unit 493 has a function to randomly determine whether a mystery bonus trigger is met, by using the mystery-bonus random number.

The payout unit 496 has a function of awarding the player a game value in the form of a coin, a medal, credit, or the like, based on the payout signal from the winning determining unit 493.

(Operation of Gaming Machine 10)

Figure 3:
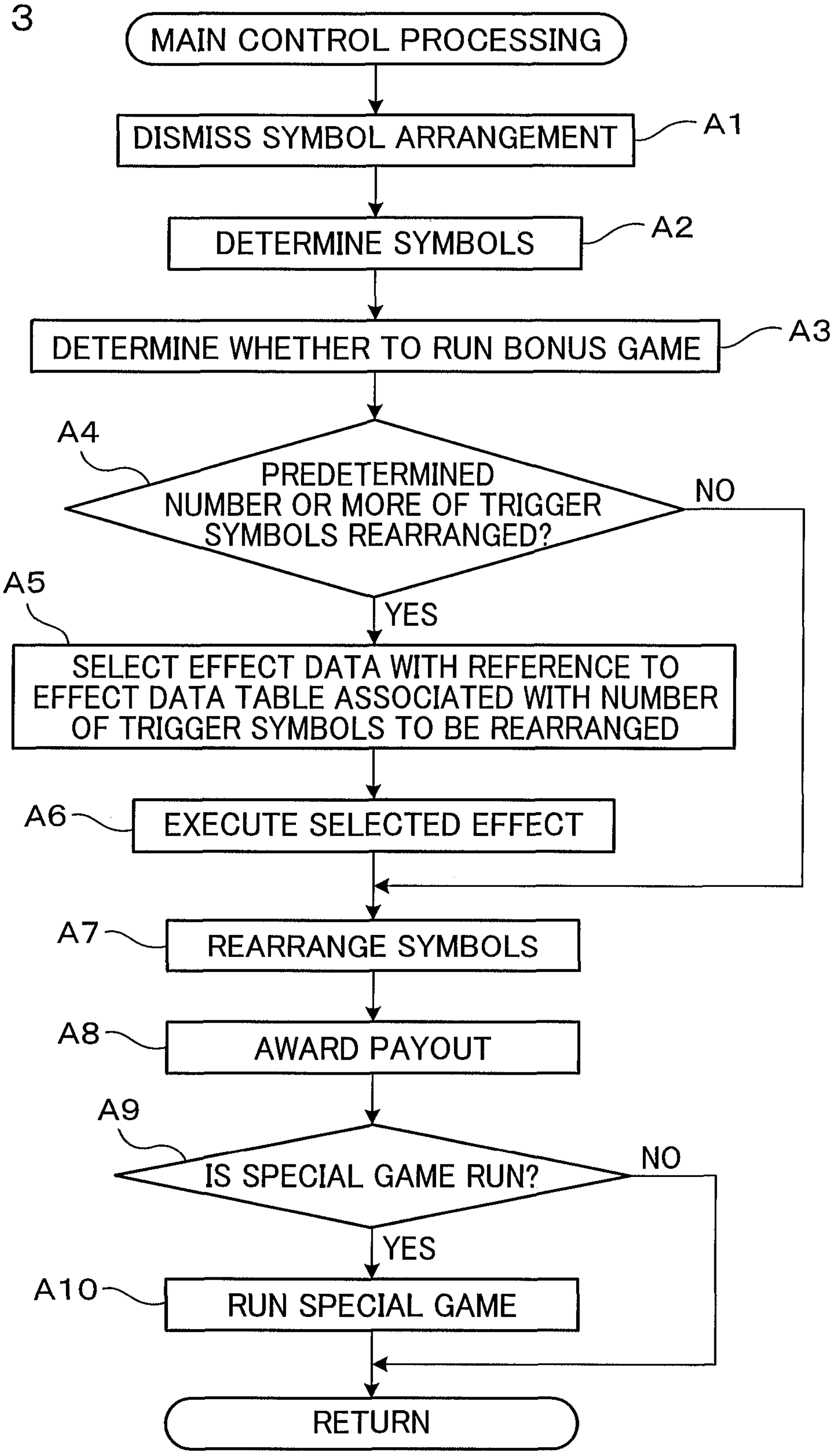
FIG. 3 is a flowchart showing the operation of the gaming machine according to First Embodiment of the present invention.

With reference to a flowchart of FIG. 3, the following describes an operation of the gaming machine 10 having the above described functional blocks.

The gaming machine 10 executes, as shown in FIG. 3, main control processing (A1)-(A10). To be more specific, first, in the symbol display regions 483 (arrangement areas 28), an arrangement of symbols 310 is dismissed (step A1). In other words, the controller 499 executes a first process. Specifically, a series of the following operations are executed.

First, the gaming machine 10 checks if the bet button unit 480 is pressed by a player, and if the spin button unit 481 is subsequently pressed by the player.

Thereafter, when the spin button unit 481 is pressed by the player, the gaming machine 10 starts the scroll of the symbol arrays of the video reels 151-155 on the symbol display regions 483 (arrangement areas 28).

Next, the gaming machine 10 extracts a random number for symbol determination, and determines symbols 310 to be displayed for the player at the time of stopping the scroll of the symbol arrays, for a plurality of respective video reels 151-155 displayed on the display unit 482 (step A2). In other words, the controller 499 executes a second process.

Thereafter, the gaming machine 10 determines whether a bonus game is to be run, based on whether it has been determined that the trigger number or more of trigger symbols (feature symbols 312) are to be rearranged on the symbol display regions 483 (arrangement areas 28) (step A3). To be more specific, in the present embodiment, when the determined number of feature symbols 312 to be rearranged is three, it is determined that a bonus game is to be run. On the other hand, when the number of feature symbols 312 is less than three, it is determined that a bonus game is not to be run. In other words, the controller 499 executes a third process.

Thereafter, the gaming machine 10 determines whether it has been determined that the number of feature symbols 312 to be rearranged is not lower than a predetermined number (step A4). If it is determined that the predetermined number or more of symbols are not to be rearranged (step A4: NO), the process is shifted to the step A7.

On the other hand, if it is determined that the predetermined number or more of symbols are to be rearranged (step A4: YES), with reference to the effect data table which is stored in the effect storage memory 485 and is associated with the number of feature symbols 312 to be rearranged, a set of effect data used for an effect executed by the effect running unit 479 is selected from sets of effect data 470 associated with the effect data table (step A5). In other words, the controller 499 executes a fourth process.

Thereafter, the gaming machine 10 executes the effect by the effect running unit 479 by using the selected set of effect data (step A6). In other words, the controller 499 execute a fifth process. To be more specific, the effect is executed by displaying an image on the image display region 484 of the display unit 482, outputting light by the lamp unit 498, and outputting sound by the speaker unit 497.

Thereafter, the gaming machine 10 stops the scroll (i.e. executes rearrangement) so that the determined symbols 310 are displayed for the player (step A7). In other words, the controller 499 execute a sixth process.

Thereafter, the gaming machine 10 determines whether a relation of symbols 310 rearranged on an activated payline among paylines relates to a winning. If it is determined that the relation relates to a winning, a benefit according to the relation of the symbols 310 is awarded to the player (step A8). In other words, the controller 499 execute a seventh process.

For example, when a combination of symbols related to a payout of coins has been rearranged, the gaming machine 10 pays out coins of the number corresponding to the combination of the symbols 310 to the player.

The gaming machine 10 starts a bonus game (step A10) when the trigger number or more of feature symbols 312 are rearranged on the symbol display regions 483 (arrangement areas 28), i.e. a bonus game trigger is formed (step A9: YES). It is to be noted that, in the present embodiment, a game (free game) in which a lottery relating to the aforementioned determination of to-be-stopped symbols is held a predetermined number of times without using coins is played as a bonus game.

When a combination of symbols related to a jackpot trigger is displayed, the gaming machine 10 pays out coins in an amount of jackpot to the player. The jackpot refers to a function which accumulates parts of coins used by players at the respective gaming machines 10 as the amount of jackpot and which, when the jackpot trigger has been established in any of the gaming machines 10, pays out coins of the accumulated amount of jackpot to that gaming machine 10. In each game (unit game), the gaming machine 10 calculates the amount (amount for accumulation) to be accumulated to the amount of jackpot and transmits to an external controller 200. The external controller 200 accumulates to the amount of jackpot the amounts for accumulation transmitted from the respective gaming machines 10.

Further, in addition to the aforementioned benefits, the gaming machine 10 is provided with benefits such as a mystery bonus and insurance. Mystery bonus is a predetermined amount of coins awarded to a winner of a special lottery. When the spin button unit 481 is pressed by the player, the gaming machine 10 samples a mystery-bonus random number, and randomly determines whether to establish a mystery bonus trigger.

The rescue is a function provided for a purpose of relieving the player from a situation in which benefits such as a bonus game have not been awarded for long periods of time. In the present embodiment, the player can arbitrarily select whether or not to make the rescue effective. To make the rescue effective, a predetermined additional bet is required. In the case where the rescue has been made effective, the gaming machine 10 starts counting the number of games. If the counted number of games reaches a predetermined number while a predetermined award such as a bonus game is not awarded, the gaming machine 10 awards a benefit for rescue (e.g. bonus game award for rescue) to the player.

As the above-described operation of the gaming machine 10 clarifies, the gaming machine 10 realizes a control method comprising the steps of:

dismissing an arrangement of a plurality of symbols 310 based on a predetermined timing;

determining a plurality of symbols 310 to be rearranged;

determining whether a bonus game is to be run by determining whether the number of feature symbols 312 to be rearranged on the arrangement areas 28 is not lower than a trigger number with which a bonus game is triggered;

selecting, with reference to an effect data table which is stored in the effect storage memory 485 and associated with the number of feature symbols 312 to be rearranged, a set of effect data 470 used for an effect executed by the effect running unit 479 from sets of effect data 470 associated with the effect data table, if it is determined that the number of feature symbols 312 to be rearranged is not lower than the predetermined number;

executing the effect by the effect running unit 479 by using the set of effect data 470;

rearranging the plurality of symbols 310;

awarding a payout according to a relation of the plurality of symbols 310 rearranged; and running a bonus game when it is determined that the bonus game is to be run.

According to the control method above, the effect storage memory 485 stores, in association with each number of the feature symbols 312 rearranged in the arrangement areas 28, effect data tables each being associated with at least one set of effect data 470 and defining each set of associated effect data 470 and a possibility that each set of effect data 470 is used for the effect executed by the effect running unit 479. When it is determined that the number of feature symbols 312 to be rearranged is not lower than a predetermined number, with reference to the effect data table which is associated with the number of feature symbols 312 to be rearranged, a set of effect data 470 used for the effect executed by the effect running unit 479 (the image display region 484, the lamp unit 498, and the speaker unit 497) is selected from sets of effect data 470 associated with the effect data table. The effect is executed by the effect running unit 479 before the rearrangement of the symbols 310. Because the effect executed by the effect running unit 479 allows the player to recognize that the number of feature symbols 312 to be rearranged is not lower than the predetermined number, it is possible to increase the player's expectation on a bonus game before the rearrangement of the symbols 310. Furthermore, since a set of effect data 470 used for the effect in the effect running unit 479 is selected with reference to the effect data table associated with the number of feature symbols 312 rearranged on the arrangement areas 28, it is possible to cause a change in the player's expectation on a bonus game in accordance with the effect to be executed.

[Overall Game System 300]

Figure 4:
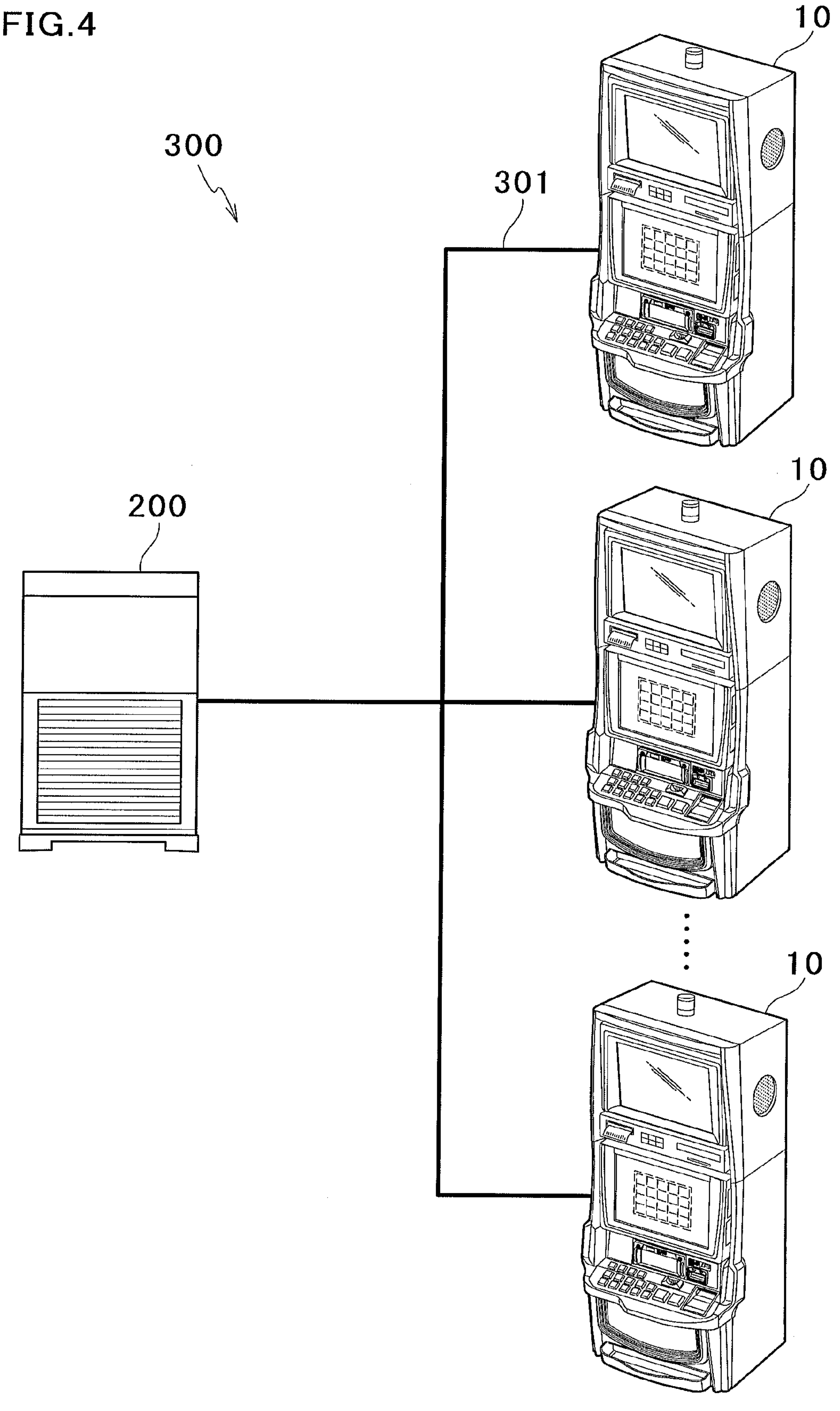
FIG. 4 is a view illustrating a game system according to First Embodiment of the present invention.

The basic functions of the gaming machine 10 have been described above. Next, the following describes a game system 300 including the gaming machine 10, with reference to FIG. 4. FIG. 4 is a view illustrating the game system 300 including the gaming machine 10 according to First Embodiment of the present invention.

The game system 300 includes a plurality of gaming machines 10, and an external controller 200 that is connected to each of the gaming machines 10 through a communication line 301.

The external controller 200 is for controlling the plurality of gaming machines 10. In the present embodiment, the external controller 200 is a so-called hall server which is installed in a game facility having the plurality of gaming machines 10. Each gaming machine (slot machine) 10 is given a unique identification number. The external controller 200 identifies the source of data from any gaming machine 10, by referring to the identification number. Also in the case where the external controller 200 transmits data to a gaming machine 10, the identification numbers are used for specifying the transmission destination.

It is to be noted that the game system 300 may be constructed within a single game facility where various games can be conducted, such as a casino, or may be constructed among a plurality of game facilities. Further, when building the game system 300 in a single game facility, the game system 300 may be built in each floor or each section of the game facility. The communication line 301 may be a wired or wireless line, and can adopt a dedicated line, an exchange line or the like.

[Overall Configuration of Gaming Machine 10]

Figure 5:
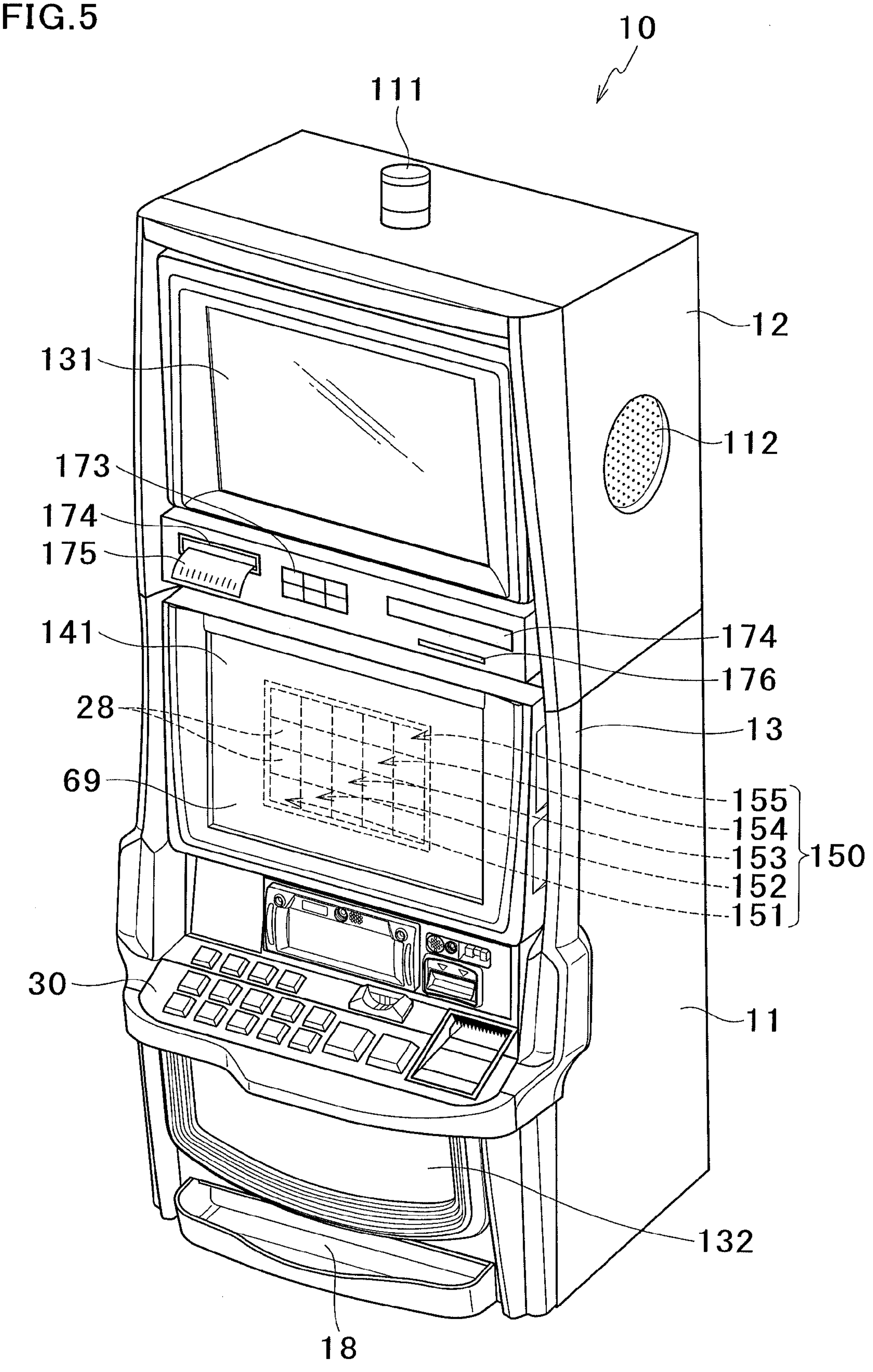
FIG. 5 is a view illustrating the overall configuration of the gaming machine according to First Embodiment of the present invention.
Figure 6:
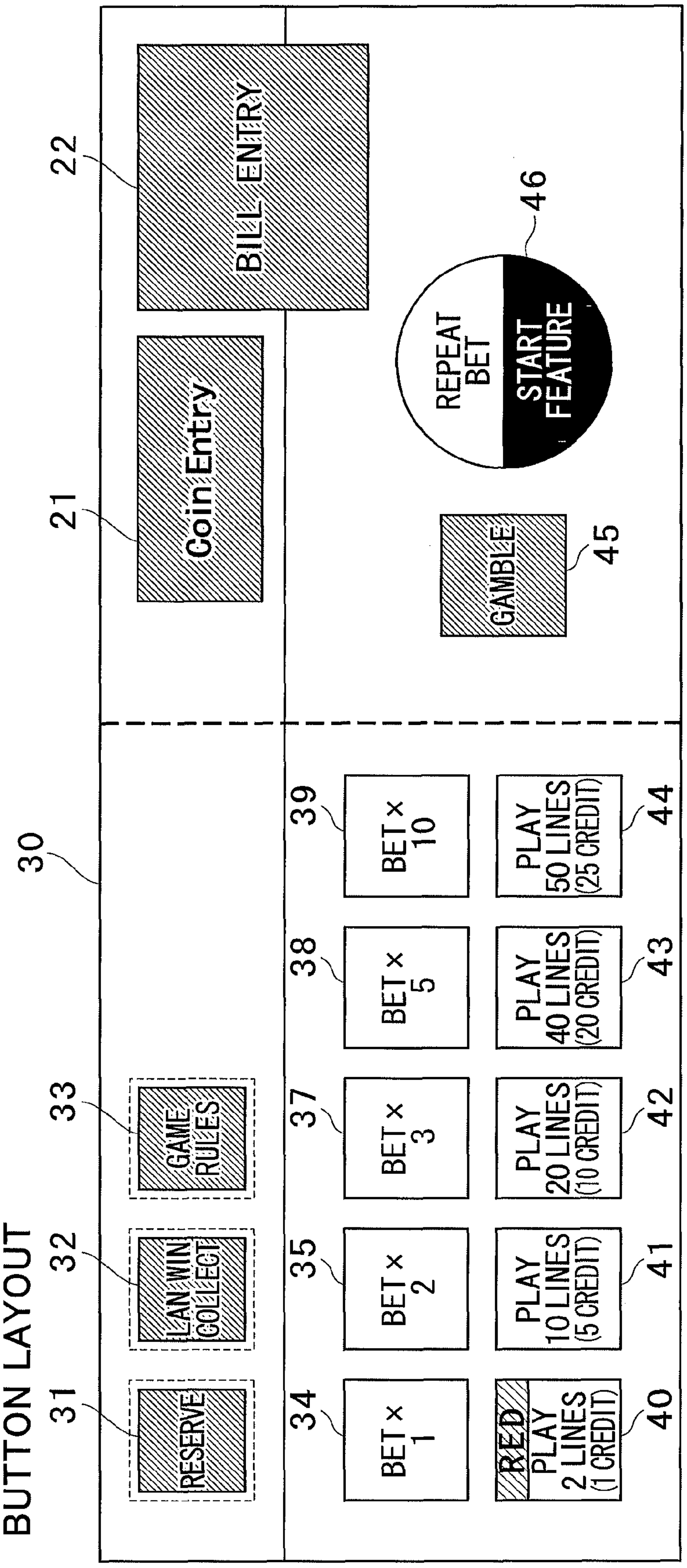
FIG. 6 shows a control panel of the gaming machine according to First Embodiment of the present invention.

The game system 300 of the present embodiment has been described above. Next, with reference to FIG. 5 and FIG. 6, the following describes the structure of the gaming machine 10. FIG. 5 is a view illustrating the overall configuration of the gaming machine 10 according to the embodiment of the present invention. FIG. 6 shows a control panel 30 of the gaming machine 10 according to the embodiment of the present invention.

A coin, a bill, or electrically valuable information corresponding to these is used as a game medium in the gaming machine 10. Further, in the present embodiment, a later-described ticket with a barcode is also used. It is to be noted that the game medium is not limited to these, and for example a medal, a token, electric money or the like can be adopted.

The gaming machine 10 includes a cabinet 11, a top box 12 installed on the upper side of the cabinet 11, and a main door 13 provided at the front face of the cabinet 11.

Figure 7:
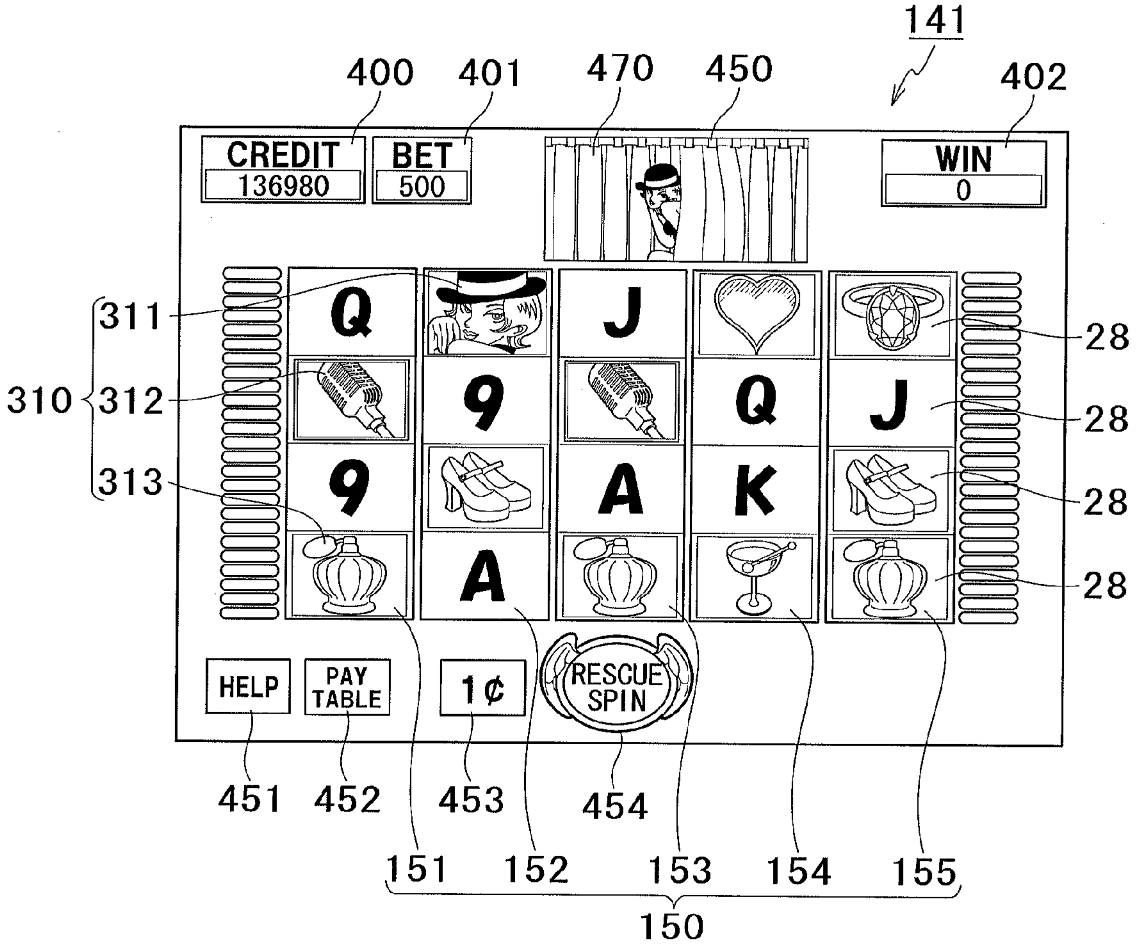
FIG. 7 is an explanatory diagram of a lower image display panel of the gaming machine according to First Embodiment of the present invention.

The main door 13 has a lower image display panel 141. The lower image display panel 141 is formed of a transparent liquid crystal panel. A screen displayed on the lower image display panel 141 has a display window 150 at its center, as shown in FIG. 7. The display window 150 is constituted by 20 arrangement areas 28 forming a matrix of five columns and four rows.

In the arrangement areas 28, the symbol arrays assigned to the respective video reels 151-155 are separately scrolled (variably displayed), and are stopped after predetermined period has elapsed. As a result, a single symbol 310 of each symbol array is displayed on each arrangement area 28.

The types of the symbols 310 are: "WILD" which is a wild symbol 311; "FEATURE" which is a feature symbol 312; and "A", "K", "Q", "J", "10", "9", "COCKTAIL", "SHOES", "PERFUME", "RING", and "HEART" which are ordinary symbols 313.

The "wild symbol" can function as any types of ordinary symbols 313. That is to say, for example, a wild symbol 311 may function as an ordinary symbol 313 "A" or as an ordinary symbol 313 "HEART".

In addition to the above, as shown in FIG. 7, displayed on the lower image display panel 141 are, in its upper part, a credit amount display unit 400, a bet amount display unit 401, an effect display unit 450, and a payout display unit 402. The credit amount display unit 400 displays thereon a credit amount stored in the RAM 73. Further, the bet amount display unit 401 displays the number of coins bet. Further, the payout display unit 402 displays the number of coins paid out. The effect display unit 450 displays an effect image such as an effect using effect data 470.

In the lower part of the lower image display panel 141, a help button 451, a pay-table button 452, a bet unit display unit 453, and a rescue icon image 454.

The help button 451, when pressed by a player, activates a help mode. The help mode provides a player with information to solve his/her problem regarding the game. The pay-table button 452, when pressed by a player, activates a payout display mode in which an amount of payout is displayed. The payout display mode is a mode to display an explanation screen for players to explain relations between winning combinations and payouts.

The bet unit display unit 453 displays a bet unit (payout unit) at the current point. With the bet unit display unit 453, the player is able to know that, for example, the minimum game value required to participate in a unit game is one cent, and that he/she is able to raise his/her bet in increments of one cent.

The rescue icon image 454 displayed in the lower part of the lower image display panel 141 illuminates in blue when 10 or less games are required until a later-described rescue game number counter reaches a predetermined number (e.g. 150). On the other hand, the rescue icon image 454 illuminates in red when more than 10 games are required until the later-described rescue game number counter reaches the predetermined number. The emission colors of the rescue icon image 454 may be arbitrarily determined. Alternatively, it is possible to adopt an arrangement such that the counting of the rescue game number counter starts when the player presses the rescue icon image 454, and the emission color changes from red to blue at this point.

Figure 8:
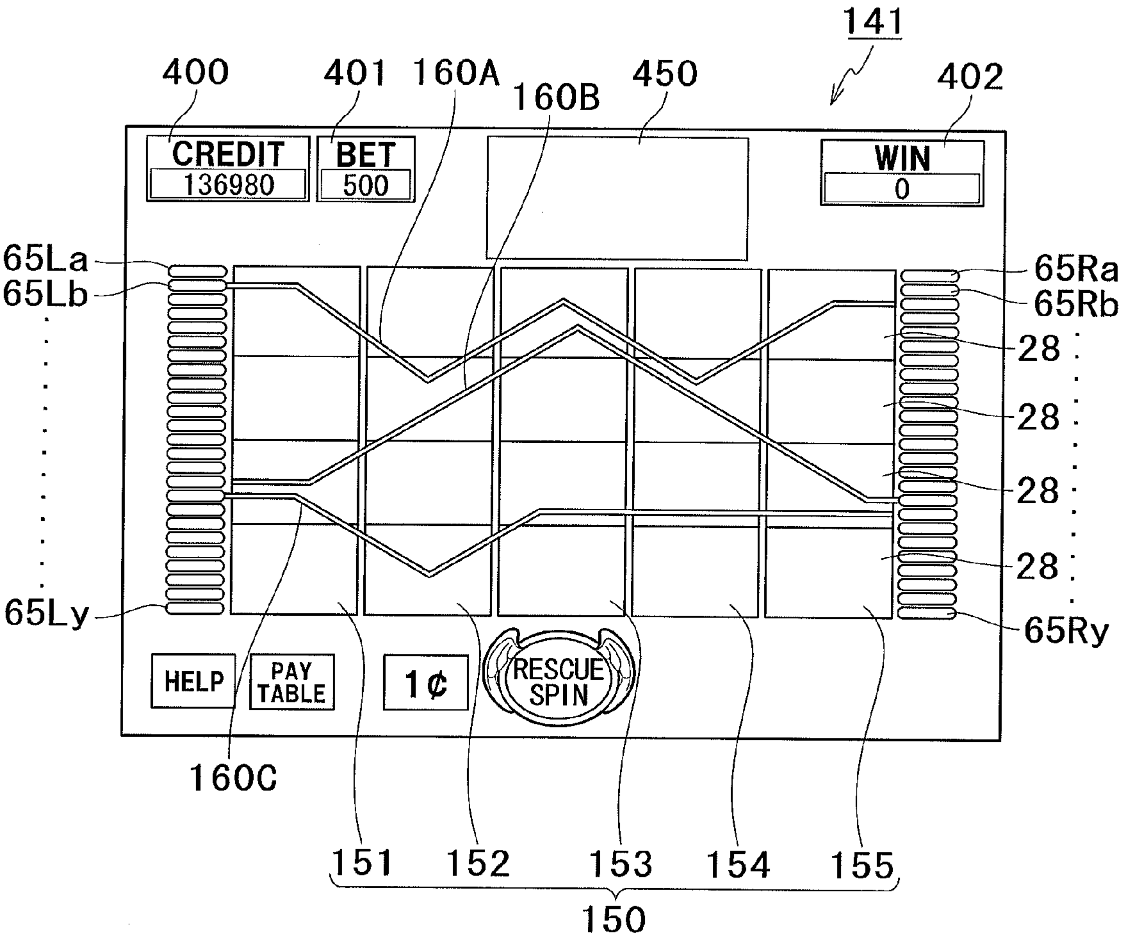
FIG. 8 is an explanatory diagram of paylines of the gaming machine according to First Embodiment of the present invention.

As shown in FIG. 8, on the left and right sides of the display window 150 of the lower image display panel 141, symmetrically-arranged payline occurrence columns are respectively disposed. The payline occurrence column on the left when viewed from the front side includes 25 payline occurrence parts 65L (65La to 65Ly).

On the other hand, the payline occurrence column on the right when viewed from the front side includes 25 payline occurrence parts 65R (65Ra to 65Ry).

Each payline occurrence part (65L, 65R) is assigned with a payline 160 (winning line) in advance. The payline 160 is formed by selecting one of the four arrangement areas 28 (i.e. rows) for each column of the display window 150 and connecting the selected arrangement areas 28. It is to be noted that any desired shape of the payline 160 can be adopted, and examples of the shape of the payline 160 may include a straight line formed by connecting the upper middle arrangement areas 28, a V-shaped line, and a bent line.

To be more specific, the payline 160A is assigned to the payline occurrence part 65Lb, and connects the arrangement areas 28 of the first row of the first column, the second row of the second column, the first row of the third column, the second row of the fourth column, and the first row of the fifth column. The payline 160B is assigned to the payline occurrence part 65Rq, and connects the arrangement areas 28 of the third row of the first column, the second row of the second column, the first row of the third column, the second row of the fourth column, and the third row of the fifth column. The payline 160*c* is assigned to the payline occurrence part 65Lq, and connects the arrangement areas 28 of the third row of the first column, the fourth row of the second column, the third row of the third column, the third row of the fourth column, and the third row of the fifth column.

In FIG. 8, only three paylines 160 are shown for the sake of simplicity. In the present embodiment, however, there are actually 50 paylines 160.

Each of the paylines 160 is activated to be an active payline based on a predetermined condition such as a bet amount on a unit game. In the case of maximum bet indicating that the bet amount is maximum, all of the paylines 160, i.e. 50 paylines 160 are activated. An activated payline 160 (active payline) results in various types of winning for each symbol 310.

The present embodiment deals with a case where the gaming machine 10 is a video slot machine. However, the gaming machine 10 of the present invention may partially adopt a mechanical reel in place of some of video reels 151 to 155.

Further, a touch panel 114 is disposed on a front surface of the lower image display panel 141, and a player is able to input various instructions by operating the touch panel 114. From the touch panel 114, an input signal is transmitted to the main CPU 71.

As shown in FIG. 5 and FIG. 6, below the lower image display panel 141 are provided various buttons on the control panel 30, a coin entry 21 which guides coins into the cabinet 11, and a bill entry 22.

A reserve button 31 is used when a player temporarily leaves the seat or when a player asks a staff person of the game facility to exchange money. A collect button 32 is used when coins stored inside the gaming machine 10 are paid out to the coin tray 18. A game rule button 33 is pressed when the operating method of a game is unclear. When the game rule button 33 is pressed, various types of help information are displayed on the upper image display panel 131 and the lower image display panel 141.

A 1-BET button 34 is arranged so that, each time the button is pressed, one credit is bet on each active payline from the current credit owned by the player. A 2-BET button 35 is pressed to start a game on condition that two gaming media are bet on each active payline. A 3-BET button 37 is pressed to start a game on condition that three gaming media are bet on each active payline. A 5-BET button 38 is pressed to start a game on condition that five gaming media are bet on each active payline. A 10-BET button 39 is pressed to start a game on condition that ten gaming media are bet on each active payline. As such, the bet amount on each active payline is determined when one of the 1-BET button 34, the 2-BET button 35, the 3-BET button 37, the 5-BET button 38, or the 10-BET button 39 is pressed.

A play-2-lines button 40 activates paylines 160 when pressed. In this case, the number of paylines 160 to be activated is 2. A play-10-lines button 41 activates paylines when pressed. In this case, the number of paylines 160 to be activated is 10. A play-20-lines button 42 activates paylines 160 when pressed. In this case, the number of paylines 160 to be activated is 20. A play-40-lines button 43 activates paylines 160 when pressed. In this case, the number of paylines 160 to be activated is 40. A MAX-lines button 44 activates paylines 160 when pressed. In this case, the number of paylines 160 to be activated is maximum (50).

In the present embodiment, pressing the MAX-lines button 44 automatically results Ante Bet. Note that an additional bet to apply the rescue to a game is termed “Ante Bet”. In other words, the rescue is activated only when a game is played with the MAX lines (Ante Bet).

A gamble button 45 is pressed to, for example, shift to a gamble game after a free game ends. This gamble game is played by using obtained credit.

A start button 46 is used to start the scroll of symbols 310. This start button 46 is also used to start a free game and to add a payout obtained in a free game to the credit.

The coin entry 21 guides coins into the cabinet 11. The bill entry 22 is for validating the legitimacy of a bill input, and takes into the cabinet 11 a bill recognized as legitimate. On a lower front surface of the main door 13, that is, below the control panel 30, a belly glass 132 on which a character of the gaming machine 10 or the like is drawn and a coin tray 18 receiving coins paid out from the cabinet 11 are provided.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The gaming machine 10 produces effects by displaying images, outputting sounds, and outputting the light.

A data display 174 and a keypad 173 are provided on the lower side of the upper image display panel 131. The data display 174 includes a fluorescent display, LEDs and the like, and displays the data input by the player via the keypad 173, for example. The keypad 173 is for inputting data.

[Symbol Array]

The overall configuration of the gaming machine 10 has been described above. Next, with reference to FIG. 9, a configuration of the symbol arrays included in the video reels 151-155 of the gaming machine 10 is described. FIG. 9 is a view illustrating arrangement of symbols that are drawn on the peripheral surfaces of the reels of the gaming machine.

A base game symbol table shows arrangements of symbols displayed on the video reels. A first video reel 151 (first symbol array), a second video reel 152 (second symbol array), a third video reel 153 (third symbol array), a fourth video reel 154 (fourth symbol array), and a fifth video reel 155 (fifth symbol array) each is assigned with a symbol array consisting of 22 symbols that correspond to respective code numbers from “00” to “21”.

As shown in FIG. 9, wild symbols 311 are provided in the second to fifth symbol arrays, and no wild symbol 311 is provided in the first symbol array. One feature symbol 312 is provided in each of the first to third symbol arrays, whereas no feature symbols 312 is provided in the fourth and fifth symbol arrays.

[Circuit Structure of Slot Machine]

Figure 10:
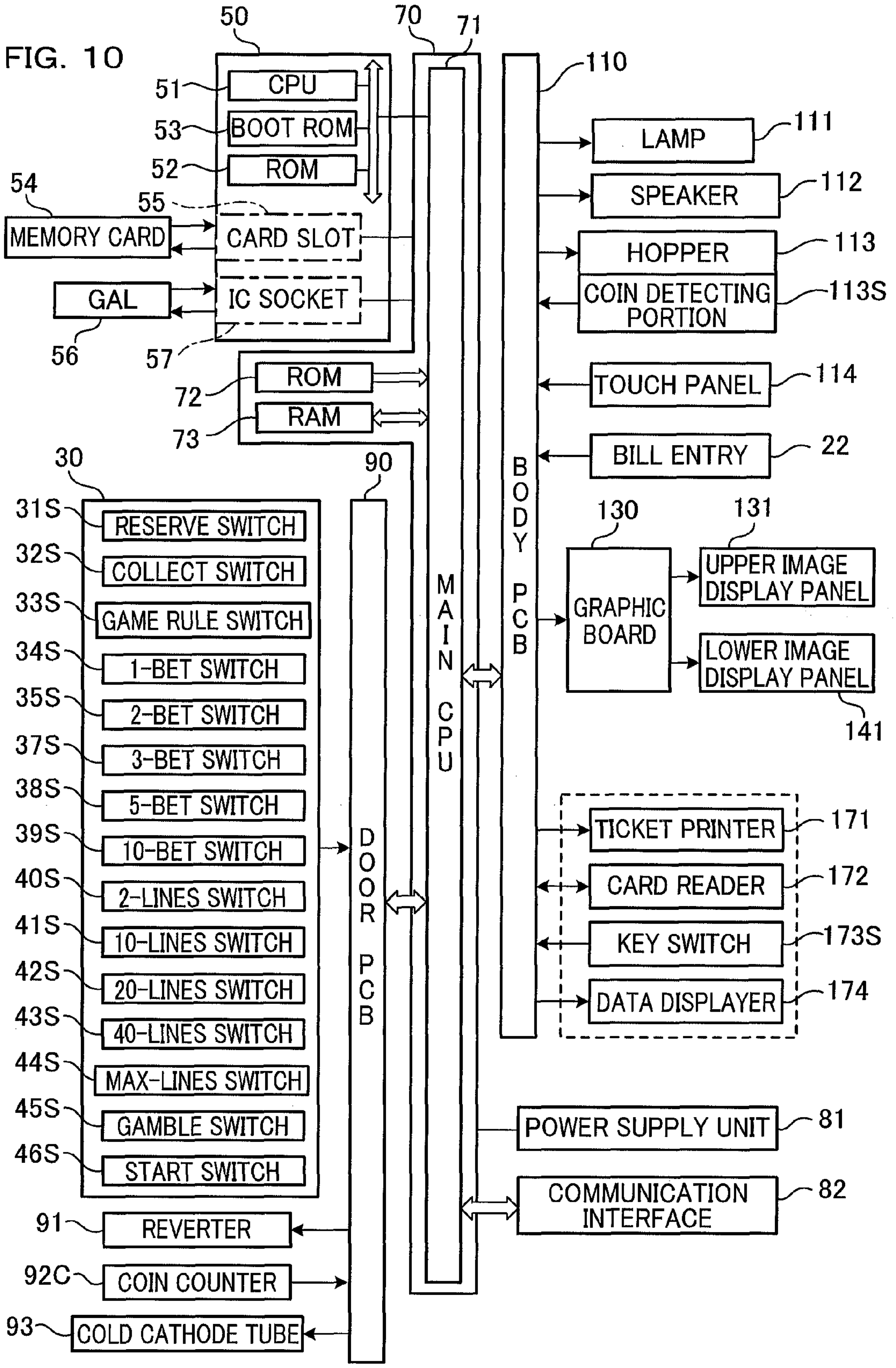
FIG. 10 is a block diagram illustrating an internal configuration of the gaming machine according to First Embodiment of the present invention.

Next, with reference to FIG. 10, a configuration of a circuit included in the gaming machine 10 is described. FIG. 10 is a block diagram illustrating an internal configuration of the gaming machine 10 according to the embodiment of the present invention.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression, a random determination program, and a program for producing effects by images and sounds (e.g. see FIGS. 19 to 28 which are described later). Further, the aforementioned game program includes data (see FIG. 9) specifying the configuration of the symbol array assigned to each video reels 151-155.

The random determination program is a program for randomly determining to-be-stopped symbol of each video reels 151-155. The to-be-stopped symbol is data for determining four symbols 310 to be displayed to the display window 150 out of the 22 symbols forming each symbol array. The gaming machine 10 of the present embodiment determines as the to-be-stopped symbol the symbol to be displayed in a predetermined area (e.g. the uppermost region) out of the four areas provided for each of the video reels 151-155 of the display window 150.

The aforementioned random determination program includes symbol determination data. The symbol determination data is data that specifies random numbers so that each of the 22 symbols (code numbers from “00” to “21”) forming the symbol array is determined at an equal probability (i.e. 1/22), for each video reel 151-155. The probabilities of the respective 22 symbols 310 being determined are basically equal. However, the numbers of the respective types of symbols included in the 22 symbols 310 vary, and thus the probabilities of the respective types of symbols 310 being determined vary (i.e. different weights on the probabilities are generated). It is noted that the probabilities of the respective types of symbols 310 may include a random number.

It is to be noted that, although the data specifies that the equal numbers of symbols 310 be provided to form the symbol arrays of the respective video reels 151-155 in the present embodiment, different numbers of symbols 310 may form the respective video reels 151-155. For example, the symbol array of the first video reel 151 may include 22 symbols whereas the symbol array of the second video reel 152 may include 30 symbols. Such a configuration increases the degree of freedom in setting the probabilities of the respective types of symbols being determined for each of the video reels 151-155.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 10 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50 and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like. The authentication program is a program (tamper check program) for authenticating the game program and the game system program. The pre-authentication program is a program for authenticating the aforementioned authentication program. The authentication program and the pre-authentication program are written along a procedure (authentication procedure) for proving that the program to be the subject has not been tampered.

The motherboard 70 is provided with a main CPU 71, a ROM 72, a RAM 73, and a communication interface 82. The motherboard 70 corresponds to the controller of the present invention.

The ROM 72 includes a memory device such as a flash memory, and stores a program such as BIOS to be executed by the main CPU 71, and permanent data.

When the BIOS is executed by the main CPU 71, processing for initializing predetermined peripheral devices is executed;

further, through the gaming board 50 processing of loading the game program and the game system program stored in the memory card 54 is started.

The RAM 73 stores data and programs which are used in operation of the main CPU 71. For example, when the processing of loading the aforementioned game program, game system program or authentication program is run, the RAM 73 can store the program.

The RAM 73 is provided with working areas used for operations in execution of these programs. Examples of the areas include: an area that stores counters for managing the number of games, the number of bets, the payout amount, the credit amount and the like; and an area that stores symbols (code numbers) determined randomly. In other words, the RAM 73 functions as a game number counter, a bet counter, a payout amount counter, a credit amount counter, and a rescue game number counter which counts the number of games triggering a payout as a result of rescue.

The RAM 73 has a free game count storage area and a re-trigger count storage area. In the free game count storage area is stored data which indicates a remaining free game count T. The re-trigger count storage area stores data indicating a re-trigger count R.

The communication interface 82 is for communicating with the external controller 200 such as a server, through the communication line 301. Further, the motherboard 70 is connected with a later-described door PCB (Printed Circuit Board) 90 and a body PCB 110 by respective USBs.

The motherboard 70 is also connected with a power supply unit 81. When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71. The door PCB 90 is connected with a control panel 30, a reverter 91, a coin counter 92C and a cold cathode tube 93.

The control panel 30 has the following switches corresponding to the aforesaid buttons, respectively: a reserve switch 31S, a collect switch 32S, a game rule switch 33S, a 1-BET switch 34S, a 2-BET switch 35S, a 3-BET switch 37S, a 5-BET switch 38S, a 10-BET switch 39S, a play-2-lines switch 40S, a play-10-lines switch 41S, a play-20-lines switch 42S, a play-40-lines switch 43S, a MAX-lines switch 44S, a gamble switch 45S, and a start switch 46S. Each of the switches outputs a signal to the main CPU 71 upon detection of press of the button corresponding thereto by the player.

Inside the coin entry 21 is provided a reverter 91 and a coin counter 92C. The reverter 91 validates the legitimacy of coins inserted into the coin entry 21, and discharges those not determined as legitimate coins to the coin tray 18. The coin counter 92C detects the received legitimate coins and counts the number of these coins.

The cold cathode tube 93 functions as a backlight installed on the rear face sides of the upper image display panel 131 and the lower image display panel 141, and lights up based on a control signal outputted from the main CPU 71.

The body PCB 110 is connected with a lamp 111, a speaker 112, the hopper 113, a coin detecting portion 113S, a touch panel 114, a bill entry 22, a graphic board 130, a ticket printer 171, a card reader 172, a key switch 173S and a data display 174.

The lamp 111 flashes based on a control signal output from the main CPU 71. The speaker 112 outputs sounds such as BGM, based on a control signal outputted from the main CPU 71.

The hopper 113 pays out a specified number of coins to the coin tray 18, based on a control signal output from the main CPU 71. The coin detecting portion 113S outputs a signal to the main CPU 71 upon detection of coins paid out by the hopper 113.

The touch panel 114 detects a place on the lower image display panel 141 touched by the player's finger or the like, and outputs to the main CPU 71*a* signal corresponding to the detected place. The bill entry 22 outputs, when receiving a legitimate bill, a signal corresponding to the value of the bill to the main CPU 71.

The graphic board 130 controls display of images executed by the respective upper image display panel 131 and lower image display panel 141, based on a control signal outputted from the main CPU 71. The display window 150 of the lower image display panel 141 displays the five video reels 151-155 by which the scrolling and stop motions of the symbol arrays of the respective video reels 151-155 are displayed. The graphic board 130 is provided with a VDP generating image data, a video RAM temporarily storing the image data generated by the VDP, and the like.

The lower image display panel 141 displays a credit amount display unit 400 displaying a credit amount stored in the RAM 73, a bet amount display unit 401 displaying a bet amount stored in the RAM 73, and a payout display unit 402 displaying a payout amount stored in the RAM 73. The lower image display panel 141 corresponds to a display device of the present invention.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

Based on a control signal outputted from the main CPU 71, the ticket printer 171 prints on a ticket a barcode representing encoded data of the credit amount stored in the RAM 73, date, the identification number of the gaming machine 10, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

The data display 174 displays data read by the card reader 172 and data inputted by the player through the keypad 173, based on a control signal outputted from the main CPU 71.

[Payout Amount Determination Table]

The circuit configuration of the gaming machine 10 has been described above. Next, with reference to FIG. 11, a payout amount determination table is described. FIG. 11 shows a payout amount determination table.

The payout amount determination table shows how the types and number of symbols rearranged on a payline 160 (active payline) relate to payout amounts. In the present embodiment, a winning is achieved when at least three symbols which are at least one type of ordinary symbols 313 "A", "K", "Q", "J", "10", "9", "COCKTAIL", and "SHOES" are rearranged on the activated payline 160 or when at least two symbols which are at least one type of ordinary symbols 313 "PERFUME", "RING", and "HEART" are rearranged on the activated payline 160.

As ordinary symbols 313, when one "COCKTAIL", one "SHOES", one "PERFUME", one "RING", and one "HEART" are rearranged on the activated payline 160, a winning combination "jackpot" is achieved.

Regarding winning combinations of ordinary symbols 313 defined by the payout amount determination table, assume that some of (one to four of) ordinary symbols 313 rearranged on the activated payline 160 are replaced with wild symbols 311. A winning resulting from the original ordinary symbols 313 is also achieved in this case.

For example, when an ordinary symbol 313 "A" and four wild symbols 311 are rearranged on the activated payline 160, a winning combination of "A" is achieved and the payout amount in this case is "50". Based on the determined payout amount, payout of coins is executed. The payout of coins is executed by actually discharging coins from the coin payout exit 15A, adding the determined payout amount to the credit amount, or issuing a ticket with a barcode.

Regarding winning combinations of ordinary symbols 313 defined by the payout amount determination table, assume that at least one of ordinary symbols 313 rearranged on the activated payline 160 is replaced with wild symbols 311. In this case, in accordance with the number of replacing wild symbols 311 or the like, the payout amount may be larger than the payout amount defined in the payout amount determination table.

When three feature symbols 312 are rearranged in the display window 150, a bonus game trigger is established. In other words, a bonus game trigger is established when feature symbols 312 are rearranged on three arrangement areas 28 in the display window 150, irrespective of the activated payline 160.

[Rearrangement Probability Table]

Now, a rearrangement probability table will be described. FIG. 12 shows a rearrangement probability table.

The rearrangement probability table associates each set of effect data 470 with a probability (rearrangement probability) that three feature symbols 312 are rearranged in the display window 150 (i.e. a bonus game is run) when an effect using that set of effect data 470 is executed. To be more specific, the table indicates that, when an effect using low-probability effect data 470*a* is executed, the probability that three feature symbols 312 are rearranged in the display window 150 is 20%. In addition to the above, according to the table, when an effect using the middle-probability effect data 470*b* is executed, the probability that three feature symbols 312 are rearranged in the display window 150 is 54%. In addition to the above, according to the table, when an effect using the high-probability effect data 470*c* is executed, the probability that three feature symbols 312 are rearranged in the display window 150 is 100%.

To put it differently, regarding the probabilities that the low-probability effect data 470*a* is selected as a set of effect data 470 for the effect display unit 450, the probability that this set of effect data is selected when two feature symbols 312 are rearranged in the display window 150 is 80%, and the probability when three feature symbols 312 are rearranged is 20%. Similarly, regarding the probabilities that the middle-probability effect data 470*b* is selected as a set of effect data 470 for the effect display unit 450, the probability that this set of effect data is selected when two feature symbols 312 are rearranged in the display window 150 is 46%, and the probability when three feature symbols 312 are rearranged is 54%. Regarding the probabilities that the high-probability effect data 470*c* is selected as a set of effect data 470 for the effect display unit 450, the probability that this set of effect data is selected when two feature symbols 312 are rearranged in the display window 150 is 0%, and the probability when three feature symbols 312 are rearranged is 100%.

As such, the player who sees an effect using the effect data 470 can recognize that a predetermined number of feature symbols 312 are likely to be rearranged. It is therefore possible to cause a change in the player's expectation on a bonus game.

The above-described rearrangement probability is uniquely determined in the present embodiment based on a probability that two feature symbols 312 are rearranged in the display window 150, a probability that three feature symbols 312 are rearranged in the display window 150, an effect determination table which will be described later with reference to FIG. 13A, and FIG. 13B, and an effect data table which will be described below with reference to FIG. 14A, and FIG. 14B. To put it differently, a probability that two feature symbols 312 are rearranged in the display window 150, a probability that three feature symbols 312 are rearranged in the display window 150, an effect determination table, and an effect data table are arranged to cause the rearrangement probability to be equal to the value defined in the rearrangement probability table.

[Effect Determination Table]

Now, the effect determination table will be described below. FIG. 13A shows an effect determination table (for-two-symbols effect determination table) which is used when it is determined that the number of feature symbols 312 rearranged in the display window 150 is two. FIG. 13B shows an effect determination table (for-three symbols effect determination table) which is used when it is determined that the number of feature symbols 312 rearranged in the display window 150 is three.

Each effect determination table defines the types of effects and numerical ranges formed by dividing a range (0 to 255) of random numbers. There are two types of effects: an effect (indication effect) indicating a probability of shift to a bonus game and a normal effect different from the indication effect.

To be more specific, as shown in FIG. 13A, the for-two-symbols effect determination table indicates that, when the number of feature symbols 312 rearranged in the display window 150 is 2, the probability that the indication effect is selected is about 1/5 (51/256), whereas the probability that the normal effect is selected is about 4/5 (205/256). Also, as shown in FIG. 13B, the for-three symbols effect determination table indicates that, when the number of feature symbols 312 rearranged in the display window 150 is three, the probability that the indication effect is selected is about 19/20 (243/256), whereas the probability that the normal effect is selected is about 1/20 (13/256).

[Effect Data Table]

Now, the effect data tables will be described. The effect data tables define a probability that each set of effect data 470 is sampled for the RAM 73. FIG. 14A shows an effect data table (for-two-symbols effect data table) used when it is determined that the number of feature symbols 312 rearranged in the display window 150 is two. FIG. 14B shows an effect data table (for-three-symbols effect data table) used when it is determined that the number of feature symbols 312 rearranged in the display window 150 is three.

Each effect data table defines effect data 470 and numerical ranges formed by dividing a range (0 to 255) of random numbers.

To be more specific, as shown in FIG. 14A, the for-two-symbols effect data table is associated with the low-probability effect data 470*a* and the middle-probability effect data 470*b*. The for-two-symbols effect data table indicates that, when the number of feature symbols 312 rearranged in the display window 150 is 2, the probability that the low-probability effect data 470*a* is selected is about 9/10 (148/256), the probability that the middle-probability effect data 470*b* is selected is about 1/10 (21/256), and the high-probability effect data 470*c* is not selected.

As shown in FIG. 14B, the for-three-symbols effect data table is associated with the low-probability effect data 470*a*, the middle-probability effect data 470*b*, and the high-probability effect data 470*c*. The for-three-symbols effect data table indicates that, when the number of feature symbols 312 rearranged in the display window 150 is three, the probability that the low-probability effect data 470*a* is selected is about 3/5 (148/256), the probability that the middle-probability effect data 470*b* is selected is about 3/10 (73/256), and the probability that the high-probability effect data 470*c* is selected is about 1/10 (34/256).

As such, the high-probability effect data 470*c* is associated only with the for-three-symbols effect data table. For this reason, when an effect using the high-probability effect data 470*c* is executed, three feature symbols 312 are always rearranged in the display window 150, and hence the player's expectation on the bonus game is further increased.

(Display States of Lower Image Display Panel 141)

An example of the display state of the lower image display panel 141 during the operation of the above-described gaming machine 10 and the control method will be specifically described with reference to FIG. 15 to FIG. 18

The following will describe a display state when three feature symbols 312 are rearranged in the display window 150, the indication effect is executed, and the high-probability effect data 470*c* is selected.

As shown in FIG. 15, at least when the start button 46 is pressed by the player, the arrangement of the symbol 310 is dismissed in each arrangement area 28, and symbol arrays allocated to the video reels 151-155 are scrolled.

Figure 16:
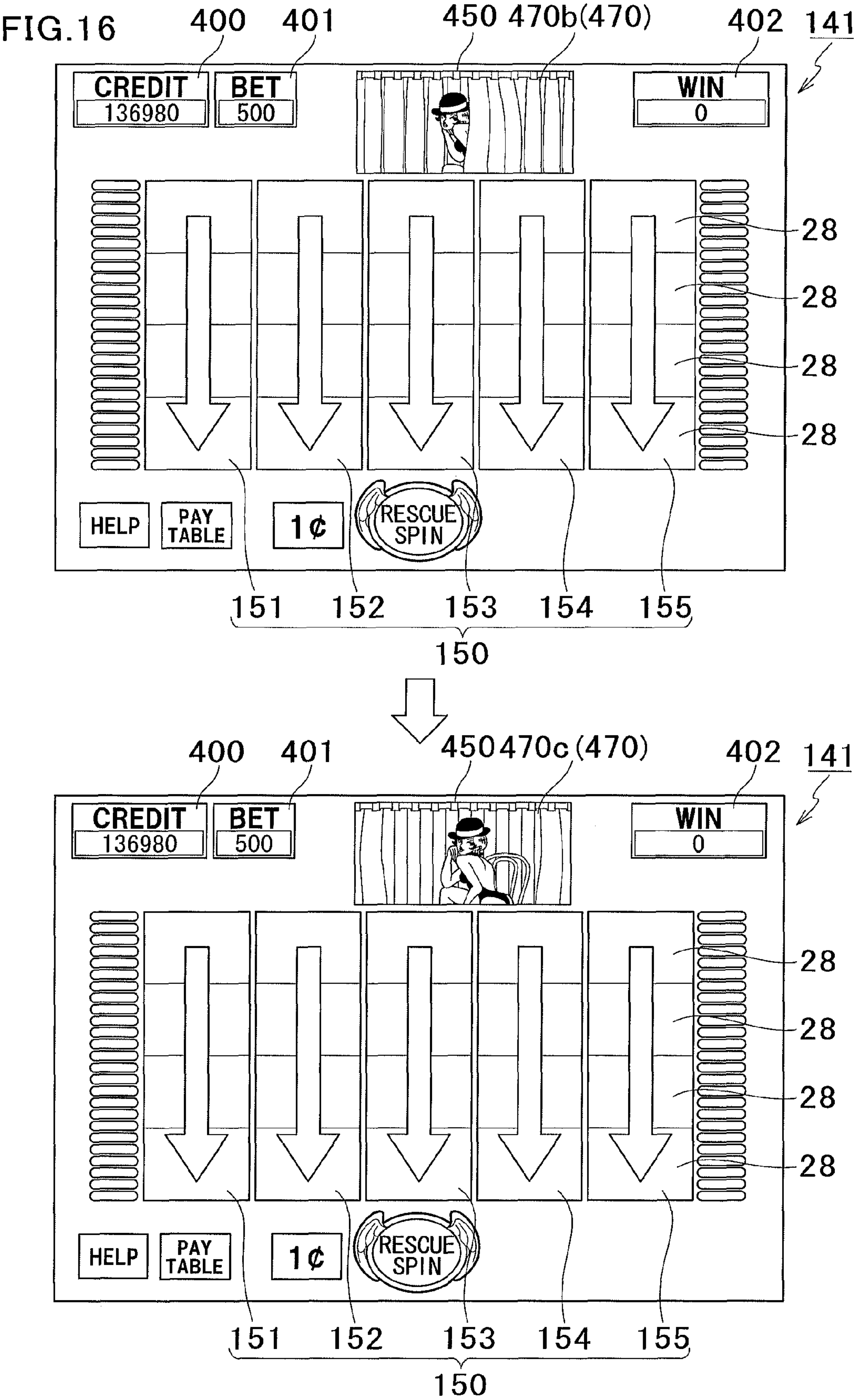
FIG. 16 is an explanatory diagram showing a display state of the lower image display panel of the gaming machine according to First Embodiment of the present invention.

In each arrangement area 28, before the symbol 310 is rearranged, i.e. while the symbol arrays are being scrolled, the effect display unit 450 executes the indication effect. To be more specific, first, an effect using the low-probability effect data 470*a* is executed by the effect display unit 450. Subsequently, as shown in FIG. 16, an effect using middle-probability effect data 470*b* is executed, and lastly an effect using the high-probability effect data 470*c* is executed. As such, the sets of effect data 470 are used in the order of the low-probability effect data 470*a*, the middle-probability effect data 470*b*, and the high-probability effect data 470*c*. This gradually increases the player's expectation on the bonus game.

Figure 17:
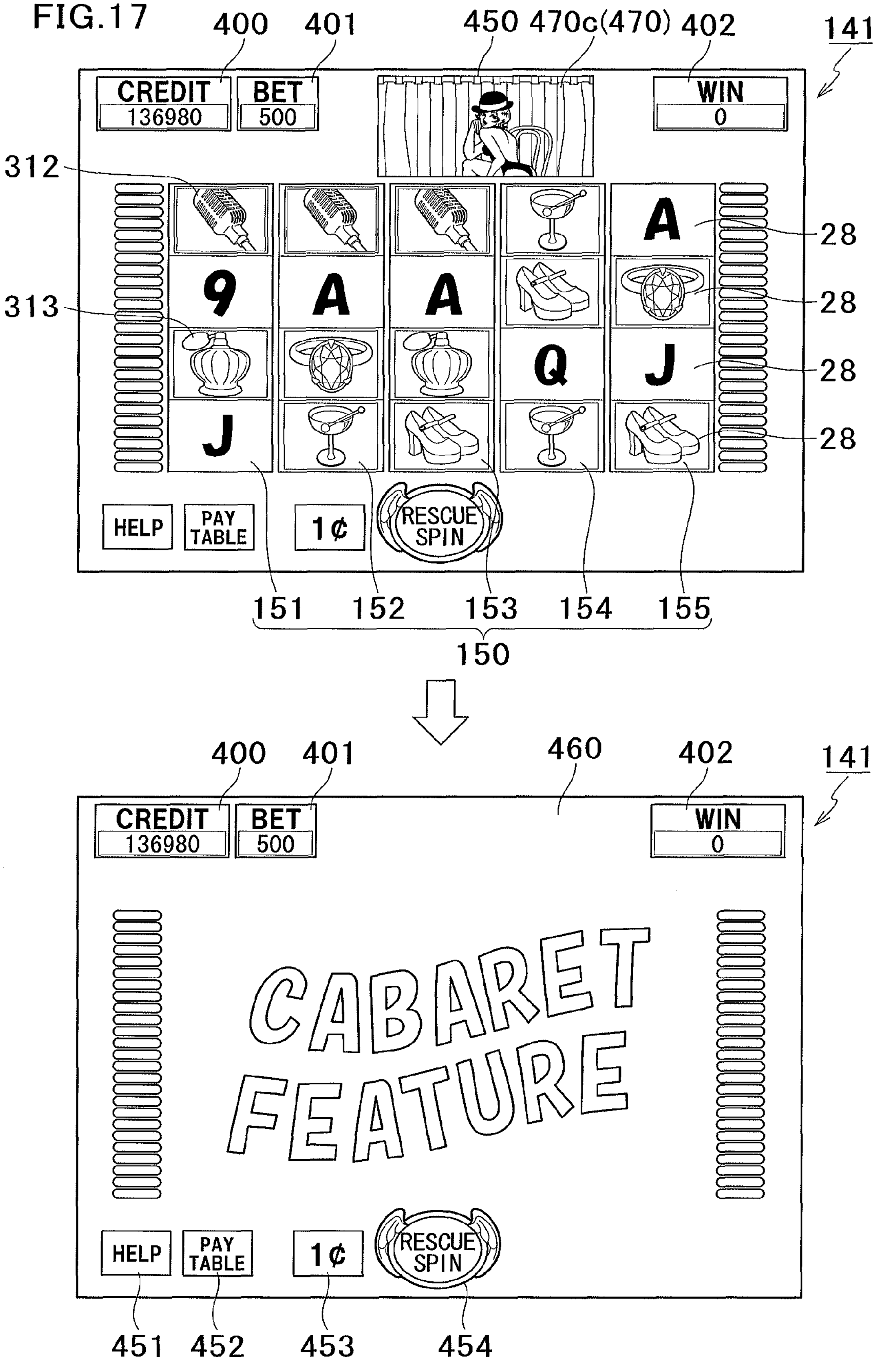
FIG. 17 is an explanatory diagram showing a display state of the lower image display panel of the gaming machine according to First Embodiment of the present invention.

After the effect using the high-probability effect data 470*c* by the effect display unit 450 is finished, as shown in FIG. 17, the scroll of the symbol arrays is stopped and hence the symbols 310 are rearranged on the arrangement areas 28. As shown in FIG. 17, when three feature symbols 312 are rearranged in the display window 150, a bonus game occurrence image 460 is displayed at the center of the lower image display panel 141 to notify the player that the gaming mode shifts from the base game to the bonus game.

Figure 18:
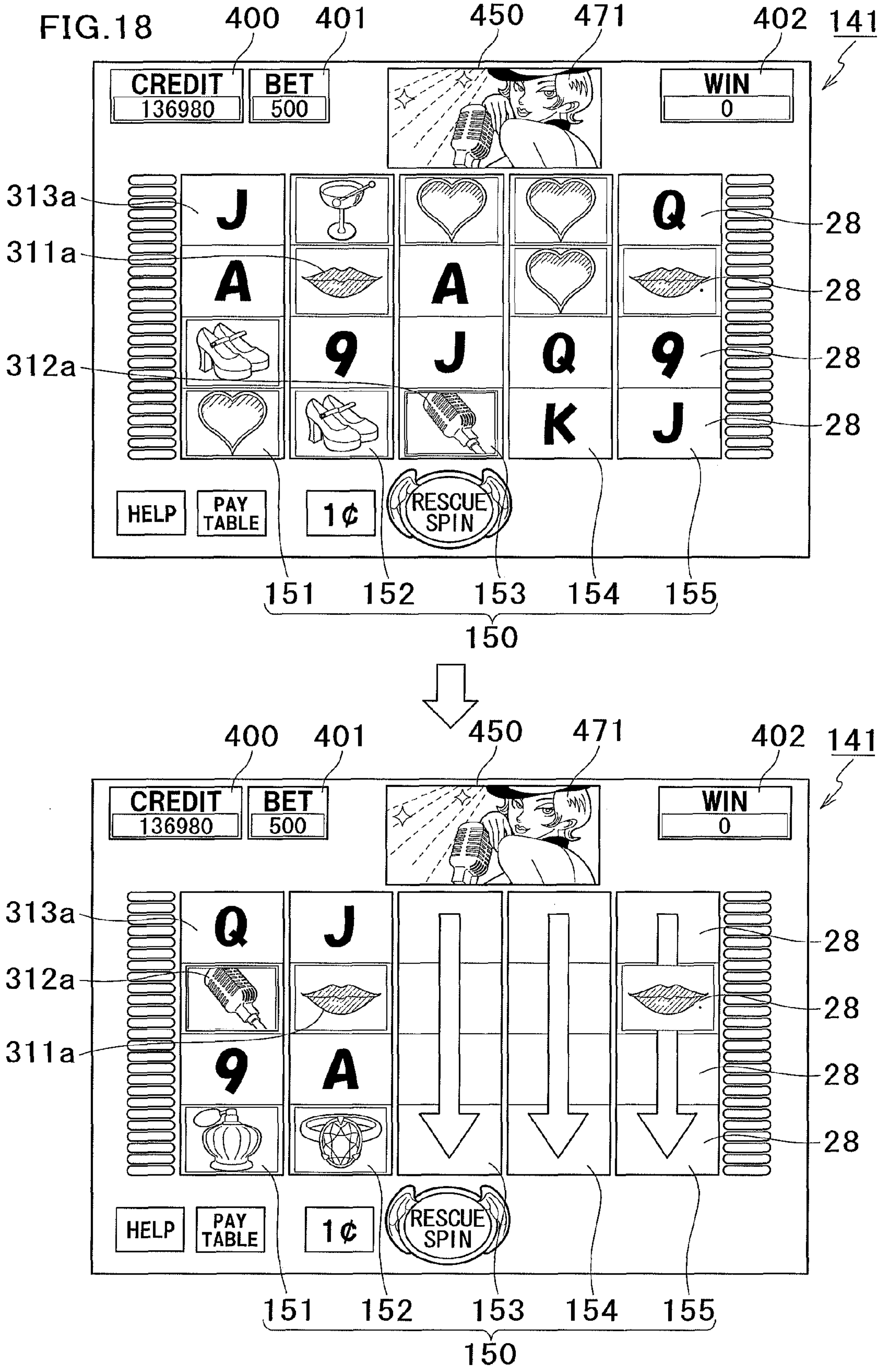
FIG. 18 is an explanatory diagram showing a display state of the lower image display panel of the gaming machine according to First Embodiment of the present invention.

As the gaming mode shifts from the base game to the bonus game, as shown in FIG. 18, the colors of an ordinary symbol 313 and a feature symbol 312 are changed so that these symbols are modified to an ordinary symbol 313*a* and a feature symbol 312*a*, respectively. A wild symbol 311 is modified in terms of its design to a wild symbol 311*a*. The effect display unit 450 displays an effect image 471 regarding the bonus game.

Furthermore, as shown in FIG. 18, when a wild symbol 311*a* is rearranged on an arrangement area 28 during a free game in the bonus game, the wild symbol 311*a* is fixedly displayed in that arrangement area 28. The term "fixed display" indicates that a wild symbol 311*a* arranged (displayed) in the arrangement area 28 is continuously displayed in that arrangement area 28 in subsequent free games.

In the present embodiment, a wild symbol 311*a* is displayed by single-frame image data. In the arrangement area 28 where the wild symbol 311*a* is rearranged, image data to be displayed in the display window 150 is generated by the VDP of the graphic board 130 so as to replace the image data of the symbol array of the video reel, and the generated image data is stored in the video RAM or the like.

For example, in the arrangement area 28 of the second column is displayed a symbol array of the video reel 152 (second symbol array) (see FIG. 9). As shown in FIG. 18, when an ordinary symbol 313*a* "J" having the code number "14" is displayed in the arrangement area 28 which is the upper region (first row), in the upper-middle (second row), lower-middle (third row), and lower (fourth row) arrangement areas 28 are displayed a feature symbol 312*a* "FEATURE", an ordinary symbol 313*a* "A", and an ordinary symbol 313*a* "COCKTAIL, respectively. As shown in FIG. 18, in the upper-middle region (second row) a wild symbol 311*a* is displayed (fixedly displayed) in place of the symbol "FEATURE".

[Contents of Program]

The display state of the lower image display panel 141 has been described above. Next, with reference to FIGS. 19 to 28, programs to be run in the gaming machine 10 in First Embodiment is described.

<Main Control Processing>

Figure 19:
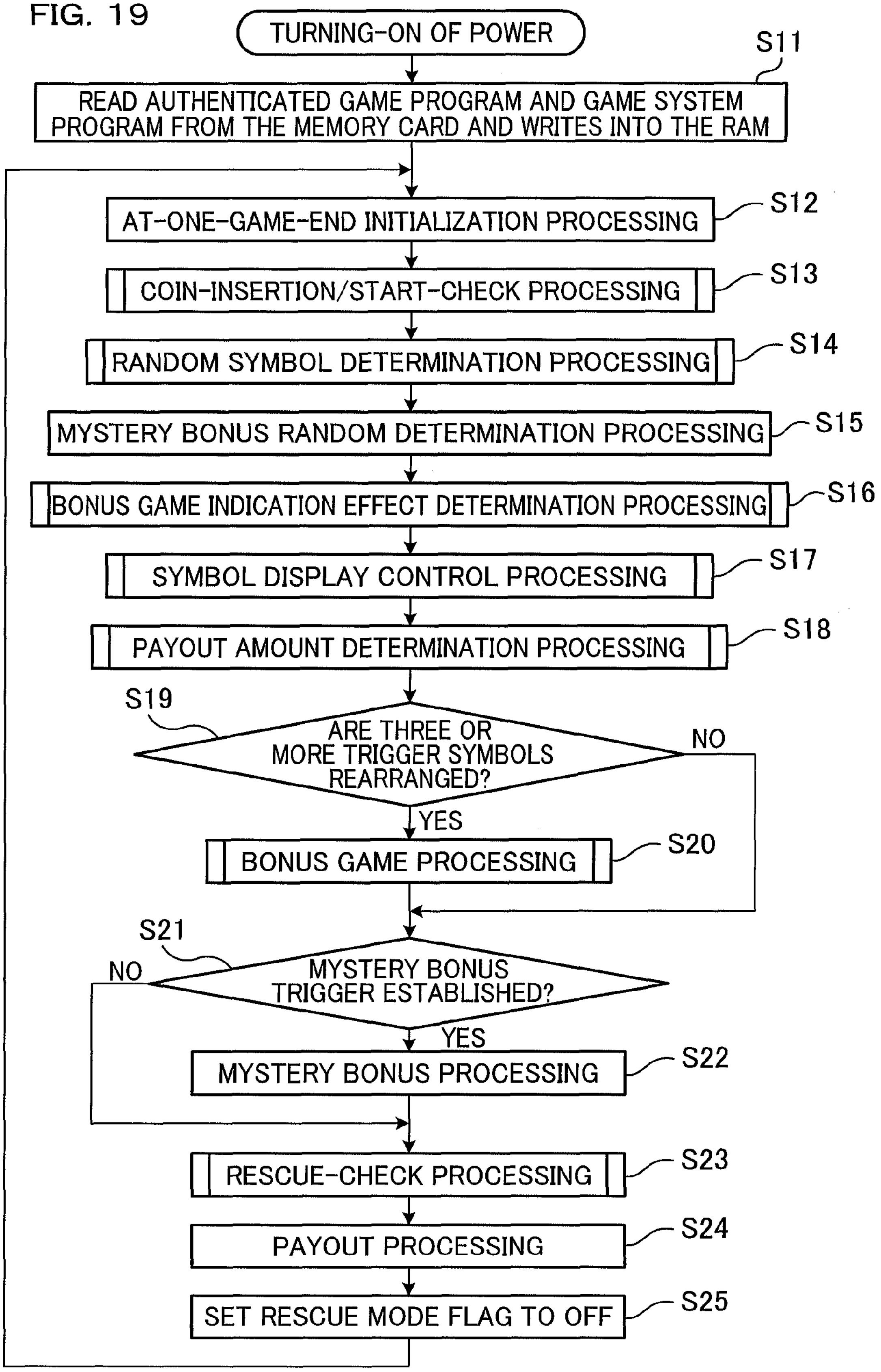
FIG. 19 is a view illustrating a flowchart of a main control processing for the gaming machine according to First Embodiment of the present invention.

First, with reference to FIG. 19, main control processing is described. FIG. 19 is a view illustrating a flowchart of the main control processing for the gaming machine 10 according to First Embodiment of the present invention.

First, when the power is supplied to the gaming machine 10, the main CPU 71 reads the authenticated game program and game system program from the memory card 54 through the gaming board 50 and writes the programs into the RAM 73 (step S11).

Next, the main CPU 71 executes at-one-game-end initialization processing (step S12). For example, data that becomes unnecessary after each game in the working areas of the RAM 73, such as the number of BETs and the symbols determined by lottery, is cleared.

Next, the main CPU 71 executes coin-insertion/start-check processing which is described later with reference to FIG. 20 (step S13). In the processing, input from the BET switch and the spin switch is checked.

Next, the main CPU 71 executes random symbol determination processing which is described later with reference to FIG. 23 (step S14). In the processing, to-be-stopped symbols are determined based on the random number for symbol determination.

Next, the main CPU 71 executes mystery bonus random determination processing (step S15). In the processing, whether or not to establish a mystery bonus trigger is randomly determined. For example, the main CPU 71 extracts a random number for mystery bonus from the numbers in a range of "0 to 99", and establishes the mystery bonus trigger when the extracted random number is "0".

Next, the main CPU 71 executes bonus game indication effect determination processing which is described later with reference to FIG. 24 (step S16).

The main CPU 71 then executes symbol display control processing which is described later with reference to FIG. 25 (step S17). In the processing, scrolling of the symbol array of each video reel 151-155 is started, and the to-be-stopped symbol determined in the random symbol determination processing of step S14 is stopped at the arrangement area 28.

Next, the main CPU 71 executes payout amount determination processing which is described later with reference to FIG. 26 (step S18). In the processing, the payout amount is determined based on the combination of symbols displayed along the winning line and is stored into a payout amount storage area provided in the RAM 73.

Thereafter, the main CPU 71 determines whether three trigger symbols (feature symbols 312) are rearranged in the display window 150 (step S19). When the main CPU 71 determines that three feature symbols 312 are rearranged in the display window 150 (step S19: YES), the main CPU 71 executes bonus game processing which is described later with reference to FIG. 28 (step S20).

After the process of step S20 or when determining in step S19 that three feature symbols 312 are not rearranged in the display window 150 (step S19: NO), the main CPU 71 determines whether or not the mystery bonus trigger is established (step S21). When determining that the mystery bonus trigger has been established (step S21: YES), the main CPU 71 executes the mystery bonus processing (step S22). In the processing, the payout amount (e.g. 300) being set for the mystery bonus is stored into the payout amount storage area provided in the RAM 73.

After the process of step S22 or when determining in step S21 that the mystery bonus trigger has not been established (step S21: NO), the main CPU 71 executes rescue-check processing which is described later with reference to FIG. 27 (step S23). In the processing, whether or not to execute payout by the rescue is checked.

The main CPU 71 executes payout processing (step S24). The main CPU 71 adds the value stored in the payout amount storage area to a value stored in a credit amount storage area provided in the RAM 73. It is to be noted that operations of the hopper 113 may be controlled based on input from the CASH-OUT switch 32S, and coins of the number corresponding to the value stored in the payout amount storage area may be discharged from the coin payout exit 15A. Further, operations of the ticket printer 171 may be controlled and a ticket with a barcode may be issued on which a value stored in the payout amount storage area is recorded.

After the payout processing, a rescue mode flag is set to off (step S25). After the processing has been executed, the processing is shifted to the step S12.

<Coin-Insertion/Start-Check Processing>

Figure 20:
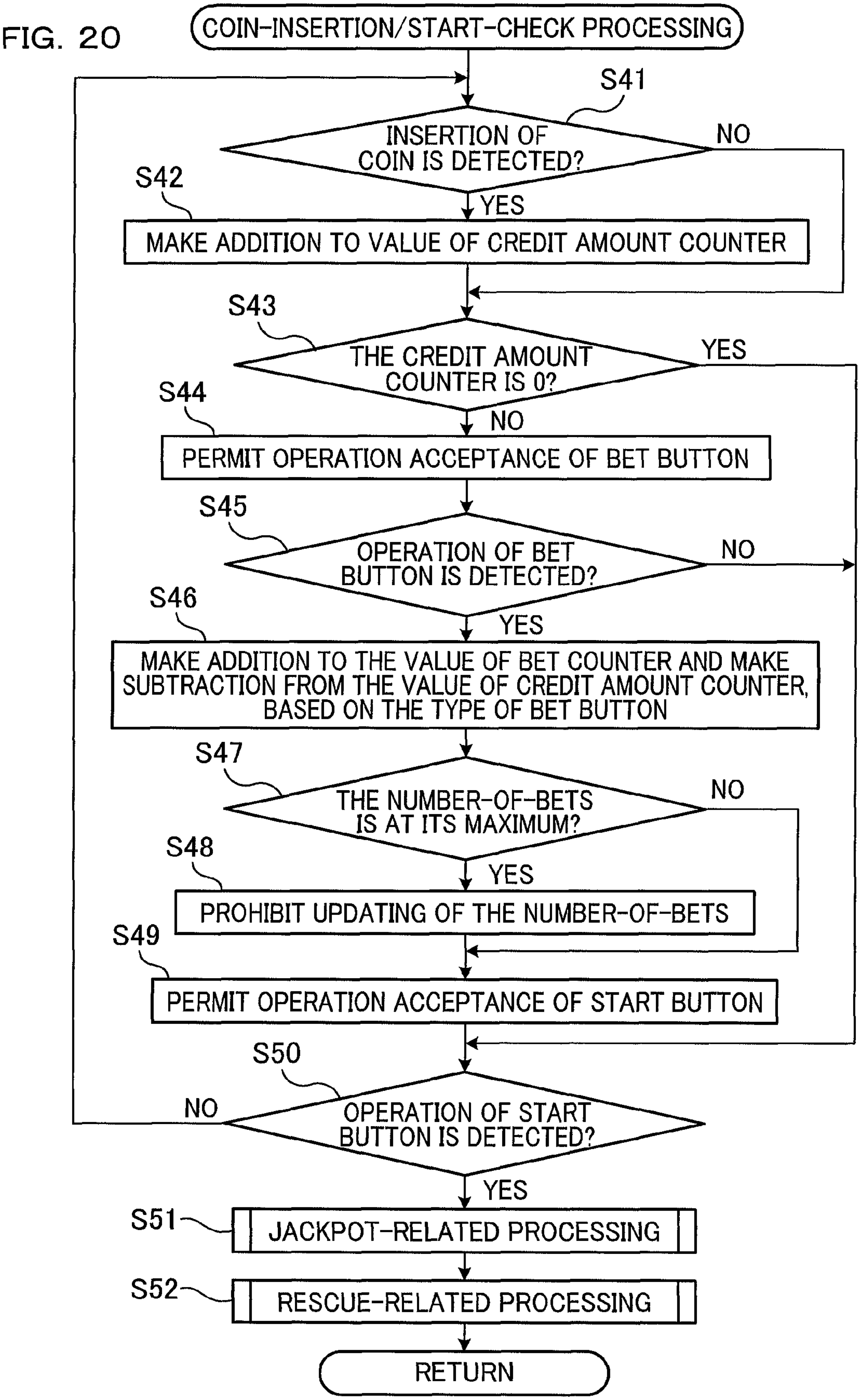
FIG. 20 is a view illustrating a flowchart of a coin-insertion/start-check processing for the gaming machine according to First Embodiment of the present invention.

Next, with reference to FIG. 20, coin-insertion/start-check processing is described. FIG. 20 is a view illustrating a flowchart of the coin-insertion/start-check processing for the gaming machine 10 according to First Embodiment of the present invention.

First, the main CPU 71 determines whether or not insertion of a coin has been detected by the coin counter 92C (step S41). When determining that the insertion of a coin has been detected (step S41: YES), the main CPU 71 makes an addition to the value stored in the credit amount storage area (step S42). It is to be noted that, in addition to the insertion of a coin, the main CPU 71 may determine whether or not insertion of a bill has been detected by the bill validator 115, and when determining that the insertion of a bill has been detected, the main CPU 71 may add a value according to the bill to the value stored in the credit amount storage area.

After step S42 or when determining in step S41 that the insertion of a coin has not been detected (step S41: NO), the main CPU 71 determines whether or not the value stored in the credit amount storage area is zero (step S43). When the main CPU 71 determines that the value stored in the credit amount storage area is not zero (step S43: NO), the main CPU 71 permits operation acceptance of the BET buttons (step S44).

Next, the main CPU 71 determines whether or not operation of any of the BET buttons has been detected (step S45). When the main CPU 71 determines that the BET switch has detected press of the BET button by the player (step S45: YES), the main CPU 71 makes an addition to a value stored in a bet amount storage area provided in the RAM 73 and makes a subtraction from the value stored in the credit amount storage area, based on the type of the BET button (step S46).

The main CPU 71 then determines whether or not the value stored in the bet amount storage area is at its maximum (step S47). When the main CPU 71 determines that the value stored in the bet amount storage area is at its maximum (step S47: YES), the main CPU 71 prohibits updating of the value stored in the bet amount storage area (step S48). After step S48 or when determining in step S47 that the value stored in the bet amount storage area is not at its maximum (step 47: NO), the main CPU 71 permits operation acceptance of the spin button (step S49).

After step S49 or when determining in step S45 that the operation of any of the BET buttons has not been detected (step S45: NO), or when determining in step S43 that the value stored in the credit amount storage area is zero (step S43: YES), the main CPU 71 determines whether or not operation of the spin button has been detected (step S50). When the main CPU 71 determines that the operation of the spin button has not been detected (step S50: NO), the process is shifted to step S41.

When the main CPU 71 determines that the operation of the spin button has been detected, the main CPU 71 executes jackpot-related processing which is described later with reference to FIG. 21 (step S51). In the processing, the amount to be accumulated to the amount of jackpot is calculated, and the amount is transmitted to the external controller 200.

Next, the main CPU 71 executes rescue-related processing which is described later with reference to FIG. 22 (step S52). In the processing, counting of the number of games is executed which triggers a payout by the rescue. After the processing has been executed, the coin-insertion/start-check processing is completed.

<Jackpot-Related Processing>

Figure 21:
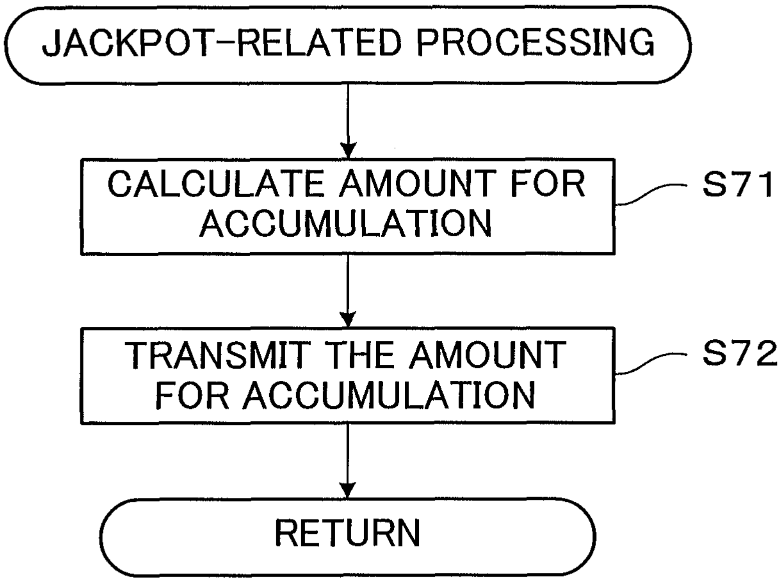
FIG. 21 is a view illustrating a flowchart of a jackpot-related processing for the gaming machine according to First Embodiment of the present invention.

Now, with reference to FIG. 21, the jackpot-related processing is described. FIG. 21 is a view illustrating a flowchart of the jackpot-related processing for the gaming machine 10 according to First Embodiment of the present invention.

First, the main CPU 71 calculates the amount for accumulation (step S71). The main CPU 71 obtains the product of the value stored in the bet amount storage area and a preset accumulation ratio, so that the amount for accumulation to the amount of jackpot is calculated.

Next, the main CPU 71 transmits the calculated amount for accumulation to the external controller 200 (step S72). Upon reception of the amount for accumulation, the external controller 200 updates the amount of jackpot. After the processing has been executed, the jackpot-related processing is completed.

[Rescue-Related Processing]

Figure 22:
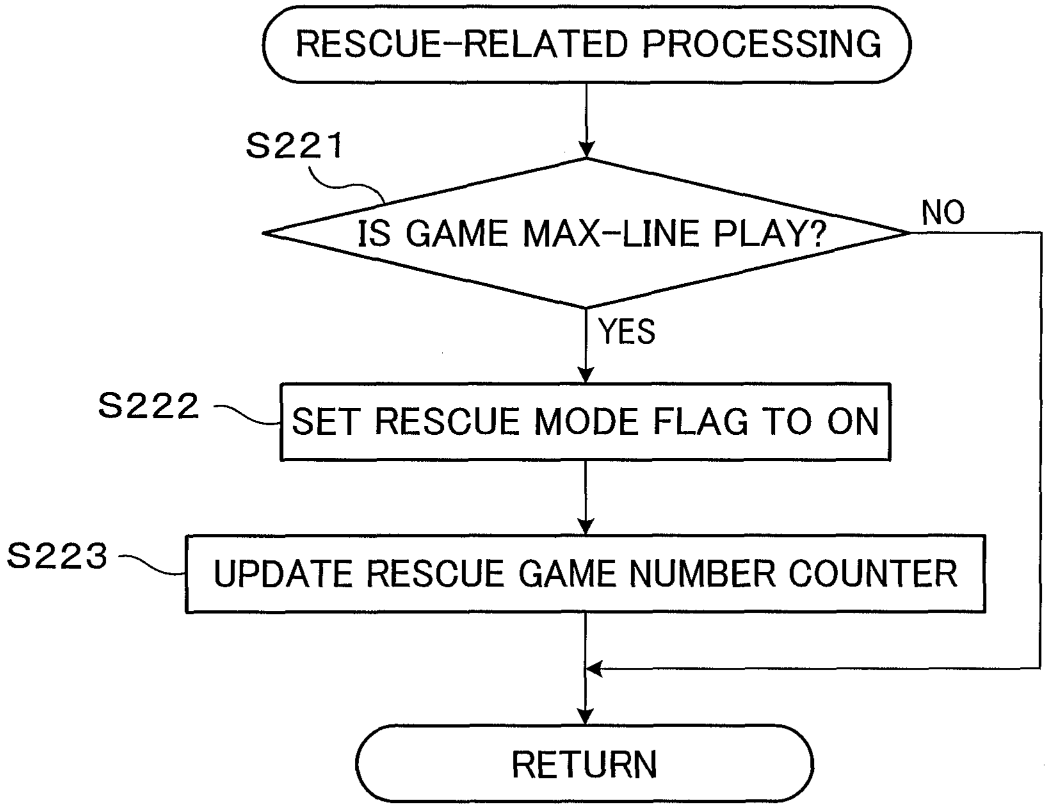
FIG. 22 is a view illustrating a flowchart of a rescue-related processing for the gaming machine according to First Embodiment of the present invention.

Next, with reference to FIG. 22, the rescue-related processing is described. FIG. 22 is a view illustrating a flowchart of the rescue-related processing for the gaming machine 10 according to First Embodiment of the present invention.

First, the main CPU 71 determines whether a game is played with "MAX line" (step S221). More specifically, whether a game is played with "MAX line" ("Ante Bet") is determined according to whether the MAX-lines button 44 has been pressed. Note that an additional bet to apply the rescue to a game is termed "Ante Bet". Therefore, the rescue is applied to a game only when the game is played with this "Ante Bet". In the present embodiment, the "Ante Bet" is made by pressing the MAX-lines button 44.

When it is determined that the game not played with "MAX LINE" (step S221: NO), the rescue-related processing is completed.

On the other hand, if it is determined that the game is played with "MAX LINE" (step S221: YES), the main CPU 71 turns on a rescue mode flag (step S222). Thereafter, the rescue game number counter in the RAM 73 is updated (step S223). This rescue game number counter manages the number of games until a payout is executed on account of the rescue. In S223, the main CPU 71 adds 1 to the rescue game number counter.

After the processing of S223 has been executed, the rescue-related processing is completed.

<Random Symbol Determination Processing>

Figure 23:
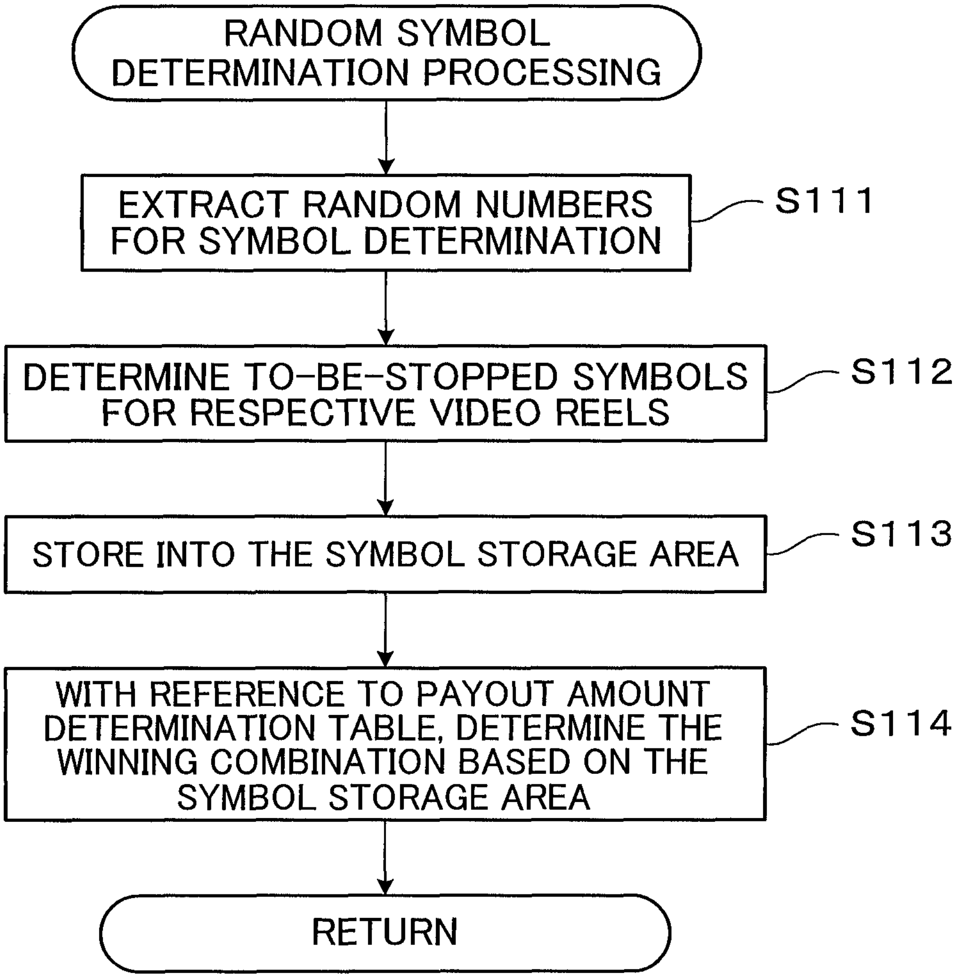
FIG. 23 is a view illustrating a flowchart of the random symbol determination processing for the gaming machine according to First Embodiment of the present invention.

Next, with reference to FIG. 23, the random symbol determination processing is described. FIG. 23 is a view illustrating a flowchart of the random symbol determination processing for the gaming machine 10 according to First Embodiment of the present invention.

First, the main CPU 71 extracts a random number for symbol determination (step S111). The main CPU 71 then randomly determines to-be-stopped symbols for the respective video reels 151-155 (step S112). The main CPU 71 executes random determination for each video reel 151-155, and determines any one of the 22 symbols (code numbers from "00" to "21") as a to-be-stopped symbol. At this time, each of the 22 symbols (code numbers from "00" to "21") is determined at an equal probability (i.e. 1/22).

The main CPU 71 then stores the determined to-be-stopped symbols for the respective video reels 151-155 into a symbol storage area provided in the RAM 73 (step S113). Next, the main CPU 71 refers to the payout amount determination table (see FIG. 11) and determines a winning combination based on the symbol storage area (step S114). The main CPU 71 determines a winning combination based on a combination of symbols 310 displayed on an activated payline 160 on the video reels 151-155 and based on the payout amount determination table. After the processing has been executed, the random symbol determination processing is completed.

<Bonus Game Indication Effect Determination Processing>

Figure 24:
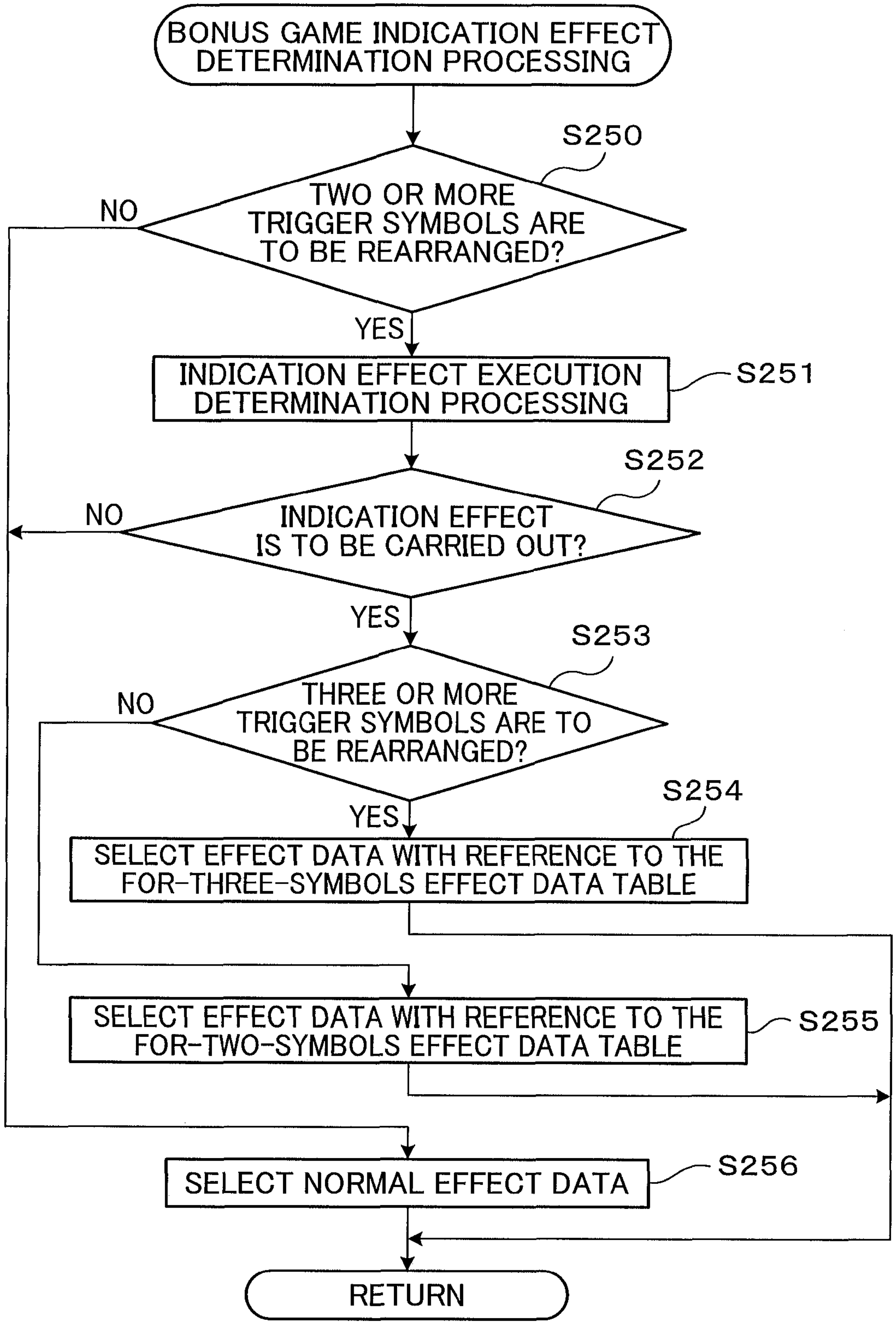
FIG. 24 is a view illustrating a flowchart of a bonus game indication effect determination processing for the gaming machine according to First Embodiment of the present invention.

Next, with reference to FIG. 24, the bonus game indication effect determination processing is described. FIG. 24 is a view illustrating a flowchart of the bonus game indication effect determination processing for the gaming machine 10 according to First Embodiment of the present invention.

First, in this processing, during the random symbol determination processing described with reference to FIG. 23, the main CPU 71 determines whether two or more feature symbols 312 are to be rearranged in the display window 150 (step S250). When it is determined that two or more symbols are not to be rearranged in the display window 150 (step S250: NO), the normal effect data is selected (step S256) and the bonus game indication effect determination processing is completed.

On the other hand, when it is determined that two or more symbols are to be rearranged in the display window 150, indication effect execution determination processing is executed (step S251). In this processing, in the random symbol determination processing described with reference to FIG. 23, if it is determined that two feature symbols 312 are to be rearranged in the display window 150, whether the indication effect is executed is determined based on the for-two-symbols effect determination table (FIG. 13A) and the sampled random number. In the meanwhile, if it is determined that three feature symbols 312 are to be rearranged in the display window 150, whether the indication effect is executed is determined with reference to the for-three symbols effect determination table (FIG. 13B) and the sampled random number.

Thereafter, the main CPU 71 determines in the step S251 whether the indication effect is to be executed (step S252). If it is determined that the indication effect is not to be executed (step S252: NO), the normal effect data is selected (step S256) and the bonus game indication effect determination processing is completed.

On the other hand, if it is determined that the indication effect is to be executed (step S251: YES), the main CPU 71 determines, in the random symbol determination processing described with reference to FIG. 23, whether the number of feature symbols 312 to be rearranged is three (step S253). If it is determined that the number of feature symbols 312 is three (step 253: YES), a set of effect data 470 for an effect is selected from the low-probability effect data 470*a*, the middle-probability effect data 470*b*, and the high-probability effect data 470*c* with reference to the for-three-symbols effect data table (FIG. 14B) (step S254), and the bonus game indication effect determination processing is completed.

On the other hand, if it is determined that the number of feature symbols 312 is not three (step 253: NO), a set of effect data 470 for an effect is selected from the low-probability effect data 470*a* and the middle-probability effect data 470*b* with reference to the for-two-symbols effect data table (FIG. 14A) (step S255), and the bonus game indication effect determination processing is completed.

<Symbol Display Control Processing>

Figure 25:
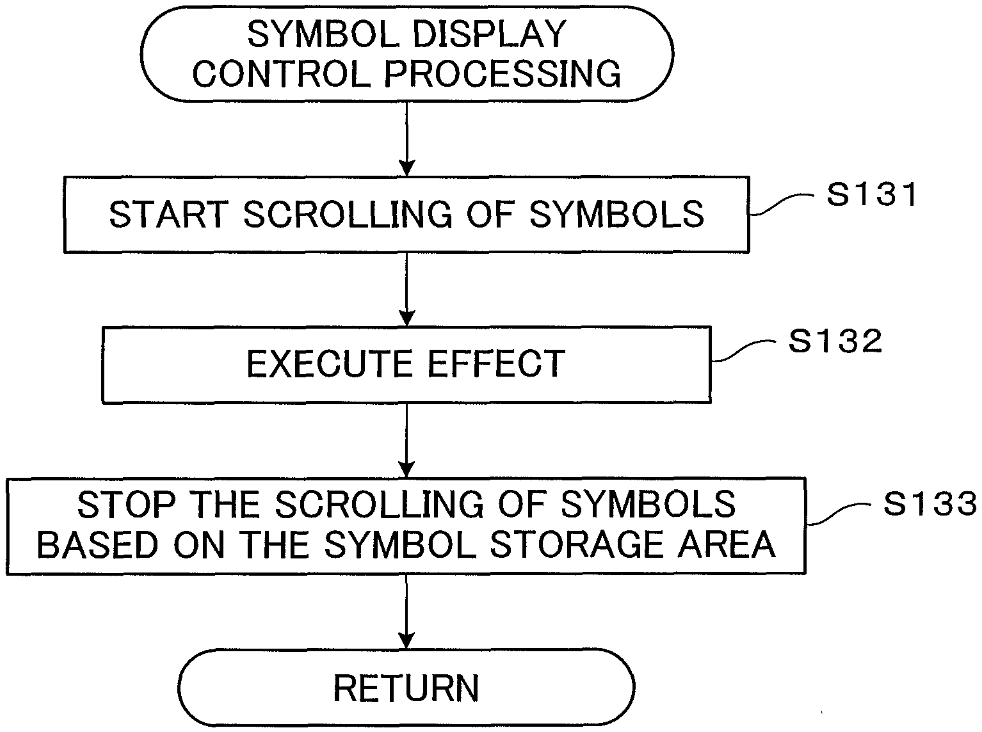
FIG. 25 is a view illustrating a flowchart of the symbol display control processing for the gaming machine according to First Embodiment of the present invention.

Next, with reference to FIG. 25, the symbol display control processing is described. FIG. 25 is a view illustrating a flowchart of the symbol display control processing for the gaming machine according to First Embodiment of the present invention.

First, the main CPU 71 starts scrolling of the symbol arrays of the respective video reels 151-155 that are displayed in the arrangement areas 28 of the display window 150 of the lower image display panel 141 (step S131). Thereafter, the main CPU 71 carries out an effect by the effect display unit 450 of the lower image display panel 141 by using a set of effect data selected in the bonus game indication effect determination processing described with reference to FIG. 24 in the case of base game, or by using a set of effect data which is selected in the step S195 which will be described later with reference to FIG. 28 in the case of bonus game (step S132). The main CPU 71 then stops the scrolling of the symbol arrays of the respective video reels 151-155, based on the aforementioned symbol storage area (step S133). After the processing has been executed, the symbol display control processing is completed.

<Payout Amount Determination Processing>

Figure 26:
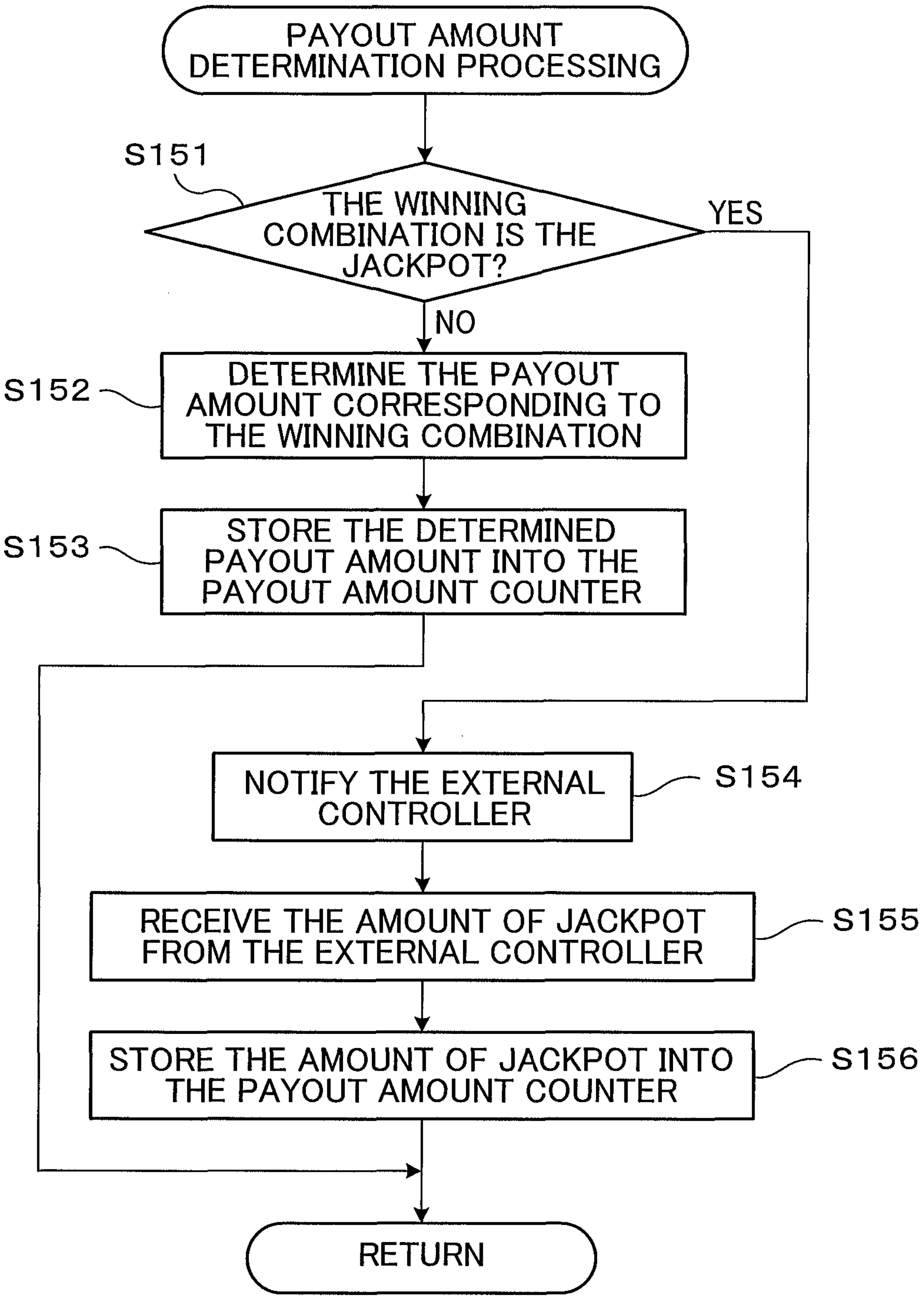
FIG. 26 is a view illustrating a flowchart of the payout amount determination processing for the gaming machine according to First Embodiment of the present invention.

Next, with reference to FIG. 26, the payout amount determination processing is described. FIG. 26 is a view illustrating a flowchart of the payout amount determination processing for the gaming machine according to First Embodiment of the present invention.

The main CPU 71 first determines whether or not the winning combination is the jackpot (step S151). When the main CPU 71 determines that the winning combination is not the jackpot (step S151: NO), the main CPU 71 determines the payout amount corresponding to the winning combination (step S152). The determination of the payout amount is identical with the aforesaid explanation with reference to FIG. 11. It is to be noted that the main CPU 71 determines "0" as the payout amount in the case where the game is lost. Next, the main CPU 71 stores the determined payout amount into the payout amount storage area (step S153). After the processing has been executed, the payout amount determination processing is completed.

When the main CPU 71 determines that the winning combination is the jackpot (step S151: YES), the main CPU 71 notifies the external controller 200 of the winning of the jackpot (step S154). It is to be noted that, upon reception of the notification, the external controller 200 transmits to the gaming machine 10 the amount of jackpot having updated up to that time. At this time, a part (e.g. 80%) of the amount of jackpot may be the payout subject and the rest (e.g. 20%) may be carried over for the upcoming establishment of the jackpot trigger.

Next, the main CPU 71 receives the amount of jackpot from the external controller 200 (step S155). The main CPU 71 then stores the received amount of jackpot into the payout amount storage area (step S156). After the processing has been executed, the payout amount determination processing is completed.

<Rescue-Check Processing>

Figure 27:
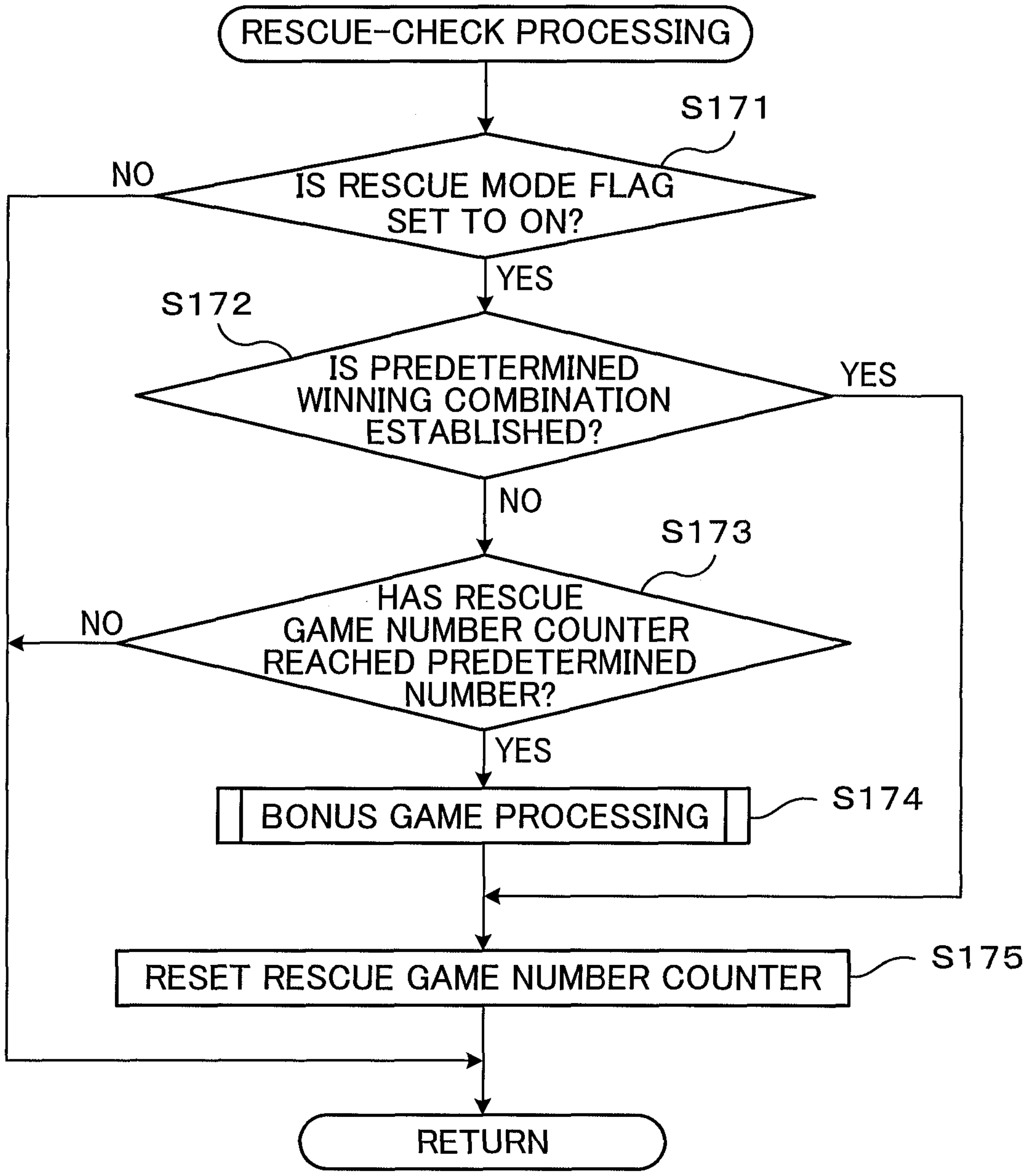
FIG. 27 is a view illustrating a flowchart of a rescue-check processing for the gaming machine according to First Embodiment of the present invention.

Next, with reference to FIG. 27, rescue-check processing is described. FIG. 27 is a view illustrating a flowchart of the rescue-check processing for the gaming machine 10 according to the embodiment of the present invention.

First, the main CPU 71 determines whether or not the rescue mode flag is in the on state (step S171). If it is determined that the rescue mode flag is not in the on state (step S171: NO), the main CPU 71 ends the rescue-check processing.

When the main CPU 71 determines that the rescue mode flag is in the on state (step S171: YES)), the main CPU 71 determines whether or not a predetermined winning combination has been established (step S172). In the present embodiment, "bonus game trigger", "jackpot" and "mystery bonus" are subjects of the predetermined winning combination.

When it is determined that the predetermined winning combination is met (step S172: YES), the process is shifted to the step S175.

On the other hand, when the main CPU 71 determines that the predetermined winning combination has not been established (step S172: NO), the main CPU 71 determines whether or not the rescue game number counter has reached a predetermined number of times (e.g. 50) (step S173). The main CPU 71 ends the rescue-check processing if it is determined that the rescue game number counter has not reached the predetermined number (step S173: NO).

On the other hand, when it is determined that the rescue game number counter has reached the predetermined number (step S173: YES), the main CPU 71 carries out the bonus game processing described with reference to FIG. 28 (step S174), and the process is shifted to the step S175.

In the step S175, the rescue game number counter is reset. After the processing has been executed, the rescue-check processing is completed.

<Bonus Game Processing>

Figure 28:
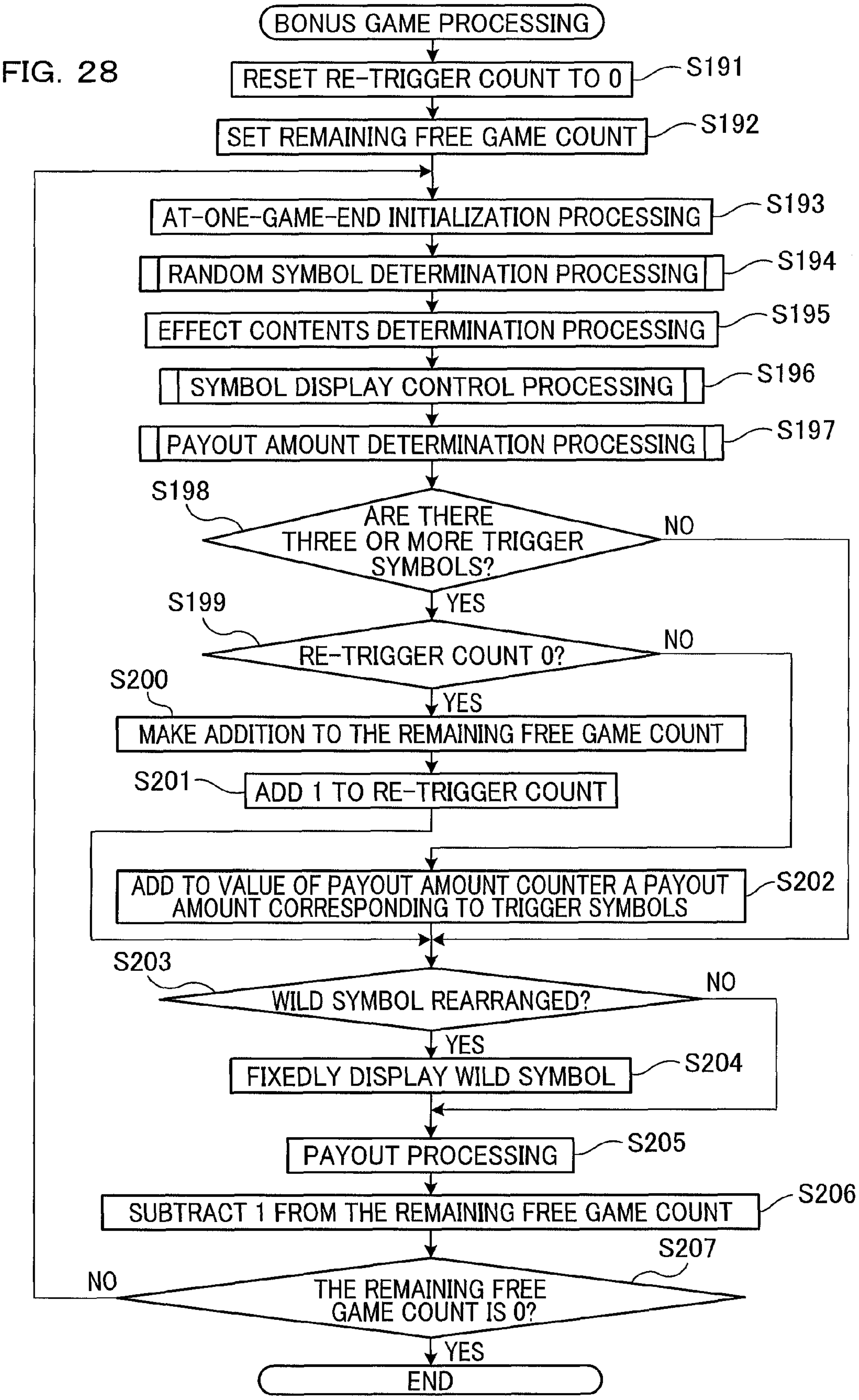
FIG. 28 is a view illustrating a flowchart of the bonus game processing for the gaming machine according to First Embodiment of the present invention.

Next, with reference to FIG. 28, the bonus game processing is described.

First, the main CPU 71 sets a re-trigger count R to R=0 in the re-trigger count storage area of the RAM 73 (step S191). Subsequently, the main CPU 71 sets a remaining free game count T to T=F (10 in the present embodiment) in the free game count storage area of the RAM (step S192). Also, the main CPU 71 causes the lower image display panel 141 to display a bonus game occurrence image 460 (see FIG. 17).

After the step S192, the main CPU 71 carries out the step S193 and the step S194. These steps are substantially identical with the steps S12 and S13 which have been described with reference to FIG. 19.

The main CPU 71 executes effect contents determination processing (step S195). The main CPU 71 extracts an effect-use random number, and determines any of the effect contents from the preset plurality of effect contents by lottery.

After the step S195, the main CPU 71 carries out the step S196 and the step S197. These steps are substantially identical with the steps S17 and S18 described with reference to FIG. 19.

After the step S197, the main CPU 71 determines whether three trigger symbols (feature symbols 312*a*) are rearranged in the display window 150 (step S198). If it is determined that three trigger symbols (feature symbols 312*a*) are not rearranged in the three display window 150 (step S198: NO), the process is shifted to the step S203.

On the other hand, if it is determined that three trigger symbols (feature symbols 312*a*) are rearranged in the display window 150 (step S198: YES), the main CPU 71 determines whether a re-trigger count R stored in the re-trigger count storage area of the RAM 73 is R=0 (step S199). When it is determined that the re-trigger count R is R=0 (step S199: YES), a predetermined number (10 in the present embodiment) is added to a remaining free game count T stored in the free game count storage area of the RAM 73 (step S200), the re-trigger count stored in the free game count storage area of the RAM 73 is increased by 1 (step S201), and the process is shifted to the step 203.

On the other hand, if it is determined that the re-trigger count R is not R=0 (step S199: NO), the main CPU 71 adds a predetermined payout amount (3 in the present embodiment)

to the value stored in the payout amount storage area of the RAM 73 (step S202), and the process is shifted to the step S203.

In the step S203, the main CPU 71 determines whether a wild symbol 311*a* is rearranged. When it is determined that no wild symbol 311*a* is rearranged (step S203: NO), the process is shifted to the step S205.

On the other hand, if it is determined that a wild symbol 311 is rearranged (step S203: NO), the main CPU 71 fixedly displays the wild symbol 311*a* in the same arrangement area 28 in subsequent free games in the bonus game (step S204), and the process is shifted to the step S205.

The main CPU 71 executes payout processing in the step S205. This step is substantially identical with the step S28 described with reference to FIG. 19.

Thereafter, the main CPU 71 subtracts 1 from the remaining free game count T in the free game count storage area of the RAM 73 (step S206). Next, the main CPU 41 determines whether the remaining free game count T stored in the free game count storage area of the RAM 73 is 0 (step S207). If it is determined that the remaining free game count T is not T=0 (step S207: NO), the main CPU 71 returns to the step S193. On the other hand, when it is determined that the remaining free game count T is T=0 (step S207: YES), the main CPU 71 completes the bonus game processing.

(Outline of First Embodiment)

As described above, a gaming machine 10 according to First Embodiment of the present invention, in which a plurality of symbols 310 selected from plural types of symbols including a feature symbol 312 are rearranged in arrangement areas 28 in each unit game and a gaming mode is changed in accordance with the number of feature symbols 312 included in the rearranged symbols 310, includes:

a lower image display panel 141 which displays an image;

a RAM 73 which stores plural types of image data to display an image on the lower image display panel 141; and a main CPU 71 which suitably samples a set of image data from the RAM 73 so as to execute image display on the lower image display panel 141, wherein, the Main CPU executes:

determination of the number of feature symbols 312 to be rearranged, after an arrangement of the symbols 310 is dismissed and before the symbols 310 are rearranged; and control such that, based on a sampling frequency determined in accordance with the determined number of feature symbols 312, a set of image data is sampled from the RAM 73 to display an image on the lower image display panel 141.

According to the arrangement above, the gaming mode is changed in accordance with the number of feature symbols 312 in the rearranged symbols 310. Furthermore, after an arrangement of the symbols 310 is dismissed and before the symbols are rearranged, the number of feature symbols 312 to be rearranged is determined, and based on a sampling frequency determined in accordance with each type of image data and selected according to the determined number of feature symbols 312, a set of image data is sampled from the RAM 73 and an image is displayed on the lower image display panel 141. As such, it is possible to cause a change in the player's expectation on changes in the gaming mode such as shift to a bonus game, by the contents of image data displayed on the lower image display panel 141.

The gaming machine 10 according to First Embodiment of the present invention includes:

a display window 150 having plural types of symbols 310 including a feature symbol 312 and arrangement areas 28 aligned in a matrix manner where the symbols 310 are provided;

an effect display unit 450 which executes an effect by using effect data;

a RAM 73 which stores plural sets of effect data and also stores, in association with each number of the feature symbols 312 rearranged in the arrangement areas 28, effect data tables each being associated with at least one set of effect data and defining each of the at least one set of associated effect data and a possibility that each set of the associated effect data is selected for use in the effect;

a main CPU 71 which is programmed to:

(a1) dismiss the arrangement of the plurality of symbols 310 based on a predetermined timing;

(a2) determine the plurality of symbols 310 to be rearranged;

(a3) determine whether a bonus game is to be run by determining whether it is determined in the process (a2) that three feature symbol 312 which are a trigger of a bonus game is to be rearranged in the arrangement areas 28;

(a4) if it is determined in the process (a2) that two or more feature symbols 312 are to be rearranged, select a set of effect data for the effect executed by an effect display unit 450 from at least one set of effect data associated with the effect data table in the RAM 73, which table is associated with the number of feature symbols 312 to be rearranged;

(a5) execute the effect by the effect display unit 450 by using the set of effect data selected in the process (a4);

(a6) after the process (a5), rearrange the plurality of symbols 310 determined in the process (a2);

(a7) award a payout according to a relation of the plurality of rearranged symbols 310; and (a8) run the bonus game if it is determined in the process (a3) that the bonus game is to be run.

According to the arrangement above, the RAM 73 stores, in association with each number of the feature symbols 312 rearranged in the arrangement areas 28, effect data tables each being associated with at least one set of effect data and defining each of the at least one set of associated effect data and a possibility that each set of the associated effect data is selected for use in the effect executed by the effect display unit 450. When it is determined that a predetermined number or more of feature symbols 312 are to be rearranged, a set of effect data for the effect executed by an effect display unit 450 is selected from at least one set of effect data associated with the effect data table associated with the number of feature symbols 312 to be rearranged. The effect is executed by the effect display unit 450 before the symbol 310 are rearranged. As such, executing the effect by the effect display unit 450 allows the player to recognize that two or more feature symbols 312 are to be rearranged. This makes it possible to increase the player's expectation on a bonus game before the symbols 310 are rearranged. Furthermore, since a set of effect data used for the effect by the effect display unit 450 is selected with reference to the effect data table associated with the number of feature symbols 312 rearranged in the arrangement areas 28, it is possible to cause a change in the player's expectation on a bonus game by the executed effect.

In addition to the above, the gaming machine 10 according to First Embodiment of the present invention is arranged so that the RAM 73 stores a set of effect data associated only with a for-three-symbols effect data table. According to this arrangement, when an effect using this set of effect data is executed, three feature symbols 312 are to be rearranged and hence the player's expectation on a bonus game is further increased.

In addition to the above, the gaming machine 10 according to First Embodiment of the present invention is arranged so that, when a predetermined number of feature symbols 312 are rearranged on the arrangement areas 28, the number of sets of effect data selected from the RAM 73 is larger than the case where the number of rearranged feature symbols 312 is not the predetermined number. According to the arrangement above, when an effect using the sets of effect data is executed, the player recognizes that the probability that the number of feature symbols 312 to be rearranged is the predetermined number is high, and hence it is possible to cause a change in the player's expectation on a bonus game.

The gaming machine 10 according to First Embodiment of the present invention includes:

a display window 150 having plural types of symbols 310 including a feature symbol 312 and arrangement areas 28 aligned in a matrix manner where the symbols 310 are provided;

an effect display unit 450 which executes an effect by using effect data;

a RAM 73 which stores a plurality of sets of effect data and also stores, in association with each number of the feature symbols 312 rearranged in the arrangement areas 28, effect data tables each being associated with at least one set of effect data and defining each of the at least one set of associated effect data and a possibility that each set of the associated effect data is selected for use in the effect; and a main CPU 71 which is programmed to:

(b1) dismiss the arrangement of the plurality of symbols 310 based on a predetermined timing;

(b2) determine the plurality of symbols 310 to be rearranged;

(b3) determine whether the effect is executed;

(b4) determine whether a bonus game is to be run based on whether it has been determined in the process (b2) that three feature symbols 312 which trigger the bonus game are to be rearranged in the arrangement area 28;

(b5) if it is determined in the process of (b3) that the effect is to be executed and it is determined in the process of (b2) that two or more feature symbols 312 are to be rearranged, select a set of effect data used for the effect executed by the effect display unit 450 from the sets of effect data associated with the effect data table in the RAM 73, which table is associated with the number of feature symbols 312 to be rearranged;

(b6) execute the effect by the effect display unit 450 by using the set of effect data selected in the process of (b5);

(b7) after the process of (b6), rearrange the plurality of symbols 310 determined in the process of (b2);

(b8) award a payout according to a relation of the plurality of rearranged symbols 310; and (b9) run the bonus game if it is determined in the process of (b4) that the bonus game is to be run.

According to the arrangement above, the RAM 73 stores, in association with each number of the feature symbols 312 rearranged in the arrangement areas 28, effect data tables each being associated with at least one set of effect data and defining each of the at least one set of associated effect data and a possibility that each set of the associated effect data is selected for use in the effect executed by the effect display unit 450. When it is determined that two or more feature symbols 312 are to be rearranged, a set of effect data used for the effect executed by the effect display unit 450 is selected from sets of effect data associated with the effect data table associated with the number of feature symbols 312 to be rearranged. The effect is executed by the effect display unit 450 before the symbols 310 are rearranged. As such, since the execution of the effect by the effect display unit 450 allows the player to recognize that two or more feature symbols 312 are to be rearranged, it is possible to increase the player's expectation on a bonus game before the symbols 310 are rearranged. In addition to the above, since a set of effect data used for an effect by the effect display unit 450 is selected with reference to the effect data table associated with the number of feature symbols 312 to be rearranged in the arrangement areas 28, the execution of the effect causes a change in the player's expectation on a special game. On the other hand, when it is determined that no effect is to be executed, the effect is not executed even if it is determined that three feature symbols 312 are to be rearranged. As such, three feature symbols 312 may be rearranged even if no effect is executed, and this may provide the player with an unexpected pleasure.

The gaming machine 10 according to First Embodiment of the present invention includes:

a lower image display panel 141 having plural types of symbols 310 including a feature symbol 312 and plural arrangement areas 28 arranged in a matrix manner where the symbols 310 are arranged;

an effect display unit 450 which executes an effect by using effect data;

a RAM 73 storing plural sets of effect data and a rearrangement probability table which defines each set of effect data and a probability that three feature symbols 312 triggering a bonus game are to be rearranged; and a main CPU 71 which is programmed to:

(c1) dismiss the arrangement of the plurality of symbols 310 based on a predetermined timing;

(c2) determine the plurality of symbols 310 to be rearranged;

(c3) determine whether to run a bonus game based on whether it is determined in the process of (c2) that three feature symbols 312 are to be rearranged in the arrangement areas;

(c4) if it is determined in the process of (c2) that two or more feature symbols 312 are to be rearranged, select a set of effect data used for an effect executed by an effect display unit 450, with reference to the rearrangement probability table of the RAM 73;

(c5) execute the effect by the effect display unit 450 by using the set of effect data selected in the process of (c4);

(c6) rearrange the plurality of symbols 310 determined in the process of (c2), after the process of (c5);

(c7) award a payout according a relation of the plurality of rearranged symbols 310; and (c8) run the bonus game if it is determined in the process of (c3) that the bonus game is to be run.

According to the arrangement above, the RAM 73 stores a rearrangement probability table defining each set of effect data and a probability that three feature symbols 312 triggering a bonus game are to be rearranged. When it is determined that two or more feature symbols 312 are to be rearranged, a set of effect data used for an effect executed by the effect display unit 450 is selected with reference to the rearrangement probability table. The effect is executed by the effect display unit 450 before the symbol 310 are rearranged. As such, since the execution of the effect by the effect display unit 450 allows the player to recognize that two or more feature symbols 312 are to be rearranged, it is possible to increase the player's expectation on a bonus game before the symbols 310 are rearranged. Furthermore, since a set of effect data used for the effect by the effect display unit 450 is selected with reference to the rearrangement probability table, it is possible to cause a change in the, player's expectation on a bonus game by the executed effect.

A control method of the gaming machine 10 according to First Embodiment of the present invention, which is a control method of the gaming machine 10 which includes:

a display window 150 having plural types of symbols 310 including a feature symbol 312 and arrangement areas 28 aligned in a matrix manner where the symbols 310 are provided;

an effect display unit 450 which executes an effect by using effect data;

a RAM 73 which stores a plurality of sets of effect data and also stores, in association with each number of the feature symbols 312 rearranged in the arrangement areas 28, effect data tables each being associated with plural sets of effect data and defining each of the at least one set of associated effect data and a possibility that each set of the associated effect data is selected for use in the effect, includes the steps of:

(d1) dismissing the arrangement of the plurality of symbols 310 based on a predetermined timing;

(d2) determining the plurality of symbols 310 to be rearranged;

(d3) determine whether a bonus game is to be run based on whether it has been determined in the step (d2) that three feature symbols 312 which trigger the bonus game are to be rearranged in the arrangement area 28;

(d4) if it is determined in the step (d2) that two or more feature symbols 312 are to be rearranged, selecting a set of effect data used for the effect executed by the effect display unit 450 from sets of effect data associated with the effect data table in the RAM 73, which table is associated with the number of feature symbols 312 to be rearranged;

(d5) executing the effect by the effect display unit 450 by using the set of effect data selected in the step (d4);

(d6) after the step (d5), rearranging the plurality of symbols 310 determined in the step (d2);

(d7) awarding a payout according to a relation of the plurality of rearranged symbols 310; and (d8) running the bonus game if it is determined in the step (d3) that the bonus game is to be run.

According to the arrangement above, the RAM 73 stores, in association with each number of the feature symbols 312 rearranged in the arrangement areas 28, effect data tables each being associated with at least one set of effect data and defining each of the at least one set of associated effect data and a possibility that each set of the associated effect data is selected for use in the effect executed by the effect display unit 450. When it is determined that two or more feature symbols 312 are to be rearranged, a set of effect data used for the effect executed by the effect display unit 450 is selected from sets of effect data associated with the effect data table associated with the number of feature symbols 312 to be rearranged. The effect is executed by the effect display unit 450 before the symbol 310 are rearranged. As such, since the execution of the effect by the effect display unit 450 allows the player to recognize that two or more feature symbols 312 are to be rearranged, it is possible to increase the player's expectation on a bonus game before the symbols 310 are rearranged. Furthermore, since a set of effect data used for the effect by the effect display unit 450 is selected with reference to the effect data table associated with the number of feature symbols 312 rearranged in the arrangement areas 28, it is possible to cause a change in the player's expectation on a bonus game by the executed effect.

The present embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

For example, the present embodiment is arranged so that a bonus game is triggered when feature symbols 312 are rearranged in three arrangement areas 28 of the display window 150, irrespective of an activated payline 160. Alternatively, a bonus game may be triggered only when three feature symbols 312 are rearranged on an activated payline 160.

(Second Embodiment)

The present specification includes the following aspect of the invention in addition to the aspect described above. The aspect will be described as Second Embodiment as below. In the following description, features identical with those in the foregoing embodiment are assigned with the same reference numerals and the descriptions thereof will be suitably omitted.

Second Embodiment of the present invention relates to a gaming machine which can increase the player's expectation on game media paid out in a free game and a game control method of the gaming machine.

(Background Art of Second Embodiment)

There have been known slot machines configured to display a plurality of types of symbols scrolled and then stopped, and to award a predetermined amount of game media (e.g. a predetermined amount of coins or money) according to a combination of symbols presented after stopping the scroll. Such slot machines are disclosed in the specifications of U.S. Pat. Nos. 6,960,133, 6,012,983, and 6,093,102, for example.

Among those slot machines is a slot machine which runs a free game when a predetermined condition (e.g. rearrangement of a particular symbol during a game) is met during a game. The free game is a game playable without a need of betting a game media. For example, the specification of the publication of Australian patent application No. 200119729 discloses a slot machine which runs a sub game as a free game, when a predetermined condition (e.g. a particular arrangement of symbols) is met during a base game.

(Technical Problem to Be Solved by Invention of Second Embodiment)

Since the free game is played without consuming a game medium, players in general plays a game with a strong hope for a payout of game media. However, when free games of the same contents are repeated, the player's expectation on game media paid out as a result of free games is decreased.

The present invention is made in view of the above problem, and an object thereof is to provide a gaming machine and a game control method thereof capable of giving a player a better expectation on game media paid out as a result of free games.

(Technical Solution of Second Embodiment)

A gaming machine according to Second Embodiment of the present invention, which has the below-described structure, includes: a display device which rearranges a plurality of symbols and can fixedly display a specific symbol; and a controller programmed to execute the following processes of:

(e1) running a base game requiring a bet of game media, in which game a predetermined amount of game media is awarded according to symbols selected from the plurality of symbols and rearranged on the symbol display device;

(e2) running a free game requiring a bet of game media smaller in amount than the game media bet in the base game, in which game media whose amount is determined in accordance with symbols selected from the plurality of symbols and rearranged on the display device and the specific symbol fixedly displayed on the display device;

(e3) running a special game in which the free game is repeated plural times, when a predetermined condition is met in the base game;

(e4) when in the free game the specific symbol is included in the symbols rearranged on the display device, displaying on the display device an image indicating a position where the specific symbol is to be rearranged, before the symbols are rearranged; and (e5) in the free game, fixedly displaying the rearranged specific symbol on the display device.

According to the arrangement above, when the symbols rearranged on the display device include a specific symbol in each free game of the special game, an image indicating a position where the specific symbol is to be rearranged is displayed on the display device before the symbols are rearranged. As a result, the player who sees the image recognizes, before the symbol are rearranged, that a specific symbol is to be rearranged and where the specific symbol will be rearranged. This increases the player's expectation on game media paid out as a result of the free game.

In addition to the above, the specific symbol according to Second Embodiment of the present invention may include a wild symbol which can substitute for any types of symbols. According to the arrangement above, when the specific symbol is a wild symbol which can substitute for any types of symbols, it is possible to further increase the player's expectation on game media paid out as a result of a free game.

In addition to the above, the gaming machine according to Second Embodiment of the present invention may be arranged so that, when (e4) the symbols rearranged on the display device includes the specific symbol in each free game, the controller displays, before the symbols are rearranged, an image on the display device which image indicates a position where the specific symbol is to be rearranged and corresponds to the number of rearranged specific symbols. According to the arrangement above, since the image indicating the position where the specific symbol is to be rearranged corresponds to the number of rearranged specific symbols, the player's expectation on game media paid out in a free game is suitably increased as the number of rearranged specific symbols indicated by the image increases.

In addition to the above, the gaming machine according to Second Embodiment of the present invention may be arranged so that, when (e4) the symbols rearranged on the display device includes the specific symbol in each free game, the controller displays, before the symbols are rearranged, an image on the display device which image indicates a position where the specific symbol is to be rearranged when the symbols rearranged on the display device includes the specific symbols, whereas, the controller displays, before the symbols are rearranged, an image indicating an arbitrary position when the symbols to be rearranged on the display device do not include the specific symbol. According to the arrangement above, in each free game in a special game, when the symbols to be rearranged do not include a specific symbol, the display device displays an image indicating an arbitrary position before the symbols are rearranged. Seeing the image, the player puts expectation on the rearrangement of a specific symbol but then recognizes that no specific symbol is rearranged after the symbols are rearranged. This stimulates the player's expectation on a free game.

A game control method of a gaming machine according to Second Embodiment of the present invention, which is a game control method of the gaming machine having the structure described below, includes the steps of:

running a base game requiring a bet of a game medium, in which game a predetermined amount of game media is awarded according to symbols selected from the plurality of symbols and rearranged on the symbol display device;

running a free game requiring a bet of game media smaller in amount than the game media bet in the base game, in which game media whose amount is determined in accordance with symbols selected from the plurality of symbols and rearranged on the display device and the specific symbol fixedly displayed on the display device;

running a special game in which the free game is repeated plural times, when a predetermined condition is met in the base game;

when in the free game the specific symbol is included in the symbols rearranged on the display device, displaying on the display device an image indicating a position where the specific symbol is to be rearranged, before the symbols are rearranged; and in each free game, fixedly displaying the rearranged specific symbol on the display device.

According to the arrangement above, when the symbols rearranged on the display device includes a specific symbol in each free game in the special game, an image indicating a position where the specific symbol is to be rearranged is displayed on the display device before the symbols are rearranged. As a result, the player who sees the image recognizes, before the symbol are rearranged, that a specific symbol is to be rearranged and where the specific symbol will be rearranged. This increases the player's expectation on game media paid out as a result of the free game.

(Advantageous Effects of Second Embodiment)

According to the invention of Second Embodiment, the player seeing the image recognizes, before the symbols are rearranged, that a specific symbol is to be rearranged and where the specific symbol is to be rearranged. This therefore increases the player's expectation on game media paid out as a result of a free game.

(Best Mode for Carrying Out the Invention of Second Embodiment)

The following will describe Second Embodiment of the present invention with reference to the figures.

(Outline of Gaming Machine of Second Embodiment)

Figure 29:
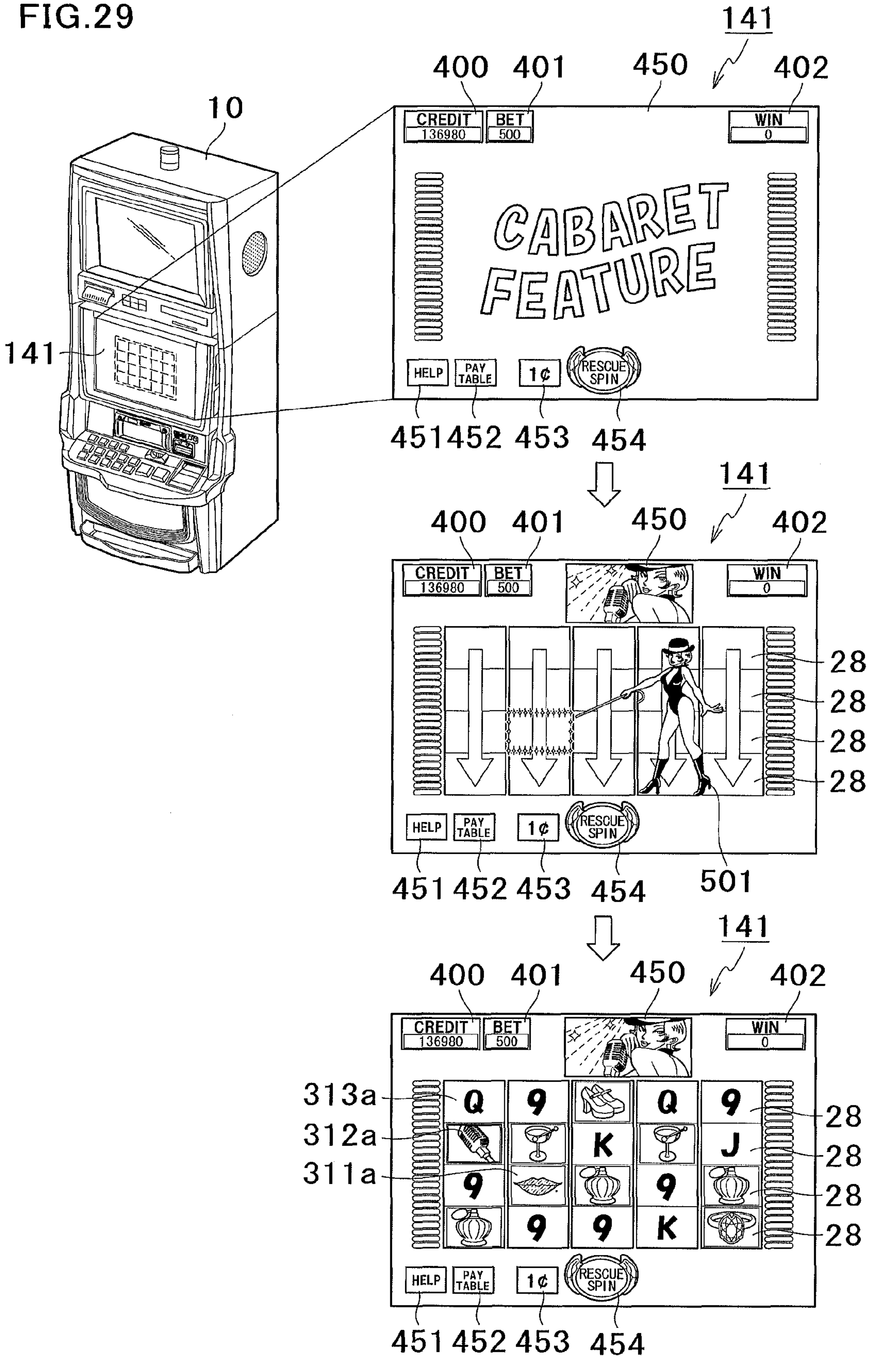
FIG. 29 outlines a game control method of a gaming machine of Second Embodiment of the present invention.

As shown in FIG. 29, a slot machine (gaming machine) 10 runs a special game constituted by a plurality of free games, when a predetermined condition is met in a base game. In the special game, each free game is arranged so that, when symbols 310 rearranged on a lower image display panel 141 includes a specific symbol 314, a process is executed to display on the lower image display panel 141 an image 501 indicating a position where the specific symbol 314 is to be rearranged, before the symbols 310 are rearranged on the lower image display panel 141.

The slot machine 10 in the present embodiment may be an independent slot machine 10 intended for a single player, or a slot machine 10 connected to and in communication with another slot machine 10 so as that the and the other slot machines 10 as a whole enable participation of plural players as illustrated in FIG. 4. The present embodiment deals with a case where the entire structure and system enables participation of plural players, and where each slot machine 10 is capable of serving as an independent gaming machine.

A game runnable with a bet of less game media than the base game is referred to as "free game". The expression "less game media than the base game" includes a case where a bet amount is zero. The "free game" therefore may be a game runnable without a bet of game medium. In other words, "free game" is a game which is started without the premise of consuming a game medium. On the other hand, a later-described "base game" is a game which is started on condition that a game medium is bet. In other words, "base game" is a game which starts on the premise that a game media is consumed.

The expression "rearrange" means dismissing an arrangement of symbols 310, and once again arranging symbols 310. The expression "arrangement" means a state of symbols 310, which can be visibly confirmed by a player. Further, "special game" is a game in which the free game is repeated a plurality of number of times corresponding to a game repeat count. A "specific symbol 314" and an ordinary symbol 313*a* constitute a plurality of symbols 310. In other words, "symbol 310" is a superordinate concept of "specific symbol 314" and "ordinary symbol 313*a*". In the present embodiment, the specific symbol 314 includes a wild symbol 311*a*. For this reason, the specific symbol 314 may be a wild symbol 311*a*. A wild symbol 310*a* is a symbol substitutable for any type of symbols 310.

The specific symbol 314 may include a trigger symbol (feature symbol 312*a*). For this reason, the specific symbol 314 may be a feature symbol 312*a*. The feature symbol 312*a* is a symbol serving as a trigger for starting at least a special game. That is, the feature symbol 312*a* triggers transition from the base game to the special game. The feature symbol 312*a* may trigger, in a special game, an increase in at least one of the feature symbol 312*a* and the wild symbol 311*a*. Also, the feature symbol 312*a* may trigger an increase in the game repeat count of the special game in the special game.

The expression "position where a specific symbol 314 is rearranged" indicates an arrangement area 28 where a specific symbol 314 is rearranged, among twenty arrangement areas 28 forming five columns and four rows.

Specifically, the slot machine 10 includes a symbol display device (lower image display panel 141) where a plurality of symbols 310 including the specific symbols 314 are rearranged, and a controller programmed to execute the following processes of (e1) to (e5).

In the step (e1), a base game is run so that, on condition that a game medium is bet, symbols 310 randomly selected from a plurality of symbols 310 are rearranged on the lower image display panel 141 and a game medium according to the number of rearranged symbols 310 is paid out. In the step (e2), a free game is run so that, on condition that a game medium smaller in number than those in the base game is bet, symbols 310 randomly selected from the plurality of symbols 310 are rearranged on the lower image display panel 141 and a game medium is paid out according to the rearranged symbols 310 and the specific symbol 314 fixedly displayed on the lower image display panel 141. In the step (e3), a special game is run so that the free game is repeated plural times when a predetermined condition is met in the base game. The "predetermined condition" is for example the number or positions of feature symbols 312*a* rearranged, positional relation among the feature symbols 312*a*, a combination of these conditions, or the like.

In the step (e4), if in each free game the symbols 310 rearranged on the lower image display panel 141 includes a specific symbol 314, an image 501 indicating a position where the specific symbol 314 is to be rearranged is displayed on the lower image display panel 141, before the symbols 310 are rearranged. In the step (e5), in each free game, the rearranged specific symbol 314 is fixedly displayed on the lower image display panel 141.

Note that the gaming result may be a gain to be awarded to the player. Further, the "gain" in this specification means, for example, an increase in the number of specific symbols 314, an increase in the game repeat count of free games in a special game, an increase in the payout odds, or the like.

The slot machine (gaming machine) 10 having the above-described structure realizes a game control method which is arranged so that, in each free game in a special game, when the symbols 310 rearranged on the lower image display panel 141 include a specific symbol 314, an image 501 indicating a position where the specific symbol 314 is to be rearranged is displayed on the lower image display panel 141, before the symbols 310 are rearranged on the lower image display panel 141.

To be more specific, the game control method of the slot machine 10 includes the steps of:

running a base game requiring a bet of a game medium, in which game a predetermined amount of game media is awarded according to symbols 310 selected from the plurality of symbols 310 and rearranged on the lower image display panel 141;

running a free game requiring a bet of game media smaller in amount than the game media bet in the base game, in which game media whose amount is determined in accordance with symbols 310 selected from the plurality of symbols 310 and rearranged on the lower image display panel 141 and the specific symbol 314 fixedly displayed on the lower image display panel 141;

running a special game in which the free game is repeated plural times, when a predetermined condition is met in the base game;

when in the free game the specific symbol 314 is included in the symbols 310 rearranged on the lower image display panel 141, displaying on the lower image display panel 141 an image 501 indicating a position where the specific symbol 314 is to be rearranged, before the symbols 310 are rearranged; and fixedly displaying in each free game the rearranged specific symbol 314 on the lower image display panel 141.

As such, according to the slot machine 10 having the above-described structure and the game control method having the above-described steps, in each free game in a special game, when the symbols 310 rearranged on the lower image display panel 141 include a specific symbol 314, an image 501 indicating a position (arrangement area 28) where the specific symbol 314 is to be rearranged is displayed on the lower image display panel 141, before the symbols 310 are rearranged. According to this arrangement, the player seeing the image 501 recognizes, before the symbols 310 are rearranged, that a specific symbol 314 is to be rearranged and where the specific symbol 314 is to be rearranged. This therefore increases the player's expectation of game media paid out as a result of a free game.

In addition to the above, the slot machine 10 carries out a process such that, in each free game in a special game, when the symbols 310 to be rearranged on the lower image display panel 141 includes a specific symbol 314, an image which indicates a position where the specific symbol 314 is to be rearranged and corresponds to the number of specific symbol 314 to be rearranged is displayed on the lower image display panel 141, before the symbols 310 are rearranged on the lower image display panel 141. To be more specific, the image displayed on the lower image display panel 141 when the number of rearranged specific symbols 314 displayed on the lower image display panel 141 as a result of the rearrangement is equal to or more than a predetermined number (e.g. two) is different from the image displayed on the lower image display panel 141 when the number of rearranged specific symbols 314 displayed on the lower image display panel 141 is less than the predetermined number (e.g. one).

The slot machine 10 executes a process such that, in each free game in a special game, when the symbols 310 to be rearranged on the lower image display panel 141 do not include a specific symbol 314, an image indicating an arbitrary position, i.e. a position (arrangement area 28) where no specific symbol 314 is rearranged is displayed, before the symbols 310 are rearranged on the lower image display panel 141.

The slot machine (gaming machine) 10 having the above-described structure realizes a game control method which is arranged so that, in each free game in a special game, when the symbols 310 to be rearranged in the lower image display panel 141 include a specific symbol 314, an image which indicates a position (arrangement area 28) where the specific symbol 314 is to be rearranged and corresponds to the number to specific symbols 314 to be rearranged is displayed on the lower image display panel 141, before the symbols 310 are rearranged on the lower image display panel 141. The slot machine (gaming machine) 10 having the above-described structure realizes a game control method which is arranged so that, in each free game in a special game, when the symbols 310 to be rearranged in the lower image display panel 141 do not include a specific symbol 314, an image indicating an arbitrary position (arrangement area 28) is displayed on the lower image display panel 141, before the symbols 310 are rearranged on the lower image display panel 141.

To be more specific, the game control method of the slot machine 10 includes the steps of:

running a base game requiring a bet of a game medium, in which game a predetermined amount of game media is awarded according to symbols 310 selected from the plurality of symbols 310 and rearranged on the lower image display panel 141;

running a free game requiring a bet of game media smaller in amount than the game media bet in the base game, in which game media whose amount is determined in accordance with symbols 310 selected from the plurality of symbols 310 and rearranged on the lower image display panel 141 and the specific symbol 314 symbol fixedly displayed on the lower image display panel 141;

running a special game in which the free game is repeated plural times when a predetermined condition is met in the base game;

in the free game, when the symbols 310 to be rearranged on the lower image display panel 141 include a specific symbol 314, displaying on the lower image display panel 141 an image indicating a position where the specific symbol 314 is to be rearranged and corresponding to the number of specific symbols 314 to be rearranged, before the symbols 310 are rearranged, and when the symbols 310 to be rearranged on the lower image display panel 141 do not include a specific symbol 314, displaying on the lower image display panel 141 an image indicating an arbitrary position, before the symbols 310 are rearranged; and in the free game, fixedly displaying the rearranged specific symbol 314 on the lower image display panel 141.

As such, according to the slot machine 10 having the above-described structure and the game control method having the above-described steps, the image indicating a position (arrangement area 28) where the specific symbol 314 is to be rearranged corresponds to the number of specific symbols 314 to be rearranged. For this reason, the player's expectation on game media paid out as a result of a free game is increased as the number of specific symbols 314 to be rearranged, which is indicated by the image, is increased.

In addition to the above, in each free game in a special game, when the symbols 310 to be rearranged on the lower image display panel 141 do not include a specific symbol 314, an image indicating an arbitrary position (arrangement area 28) is displayed on the lower image display panel 141 before the symbols 310 are rearranged. Seeing the image, the player puts expectation on the rearrangement of a specific symbol 314, but then recognizes that no specific symbol 314 is rearranged after the symbols 310 are rearranged. This stimulates the player's expectation on a free game.

(Function Flow of Slot Machine 10)

As shown in FIG. 2, the slot machine (gaming machine) 10 which is structured above includes a bet button unit 480, a spin button unit 481, and a display unit 482, and also include a controller 499 which controls these units.

The effect content determining unit 491 has a function such that, in each free game in a special game, when the symbols 310 which are targets of rearrangement determined by the symbol determining unit 489 include a specific symbol 314, an image indicating a position (arrangement area 28) where the specific symbol 314 is to be rearranged in the image display region 484 of the display unit 482 is displayed before the symbols 310 are rearranged in the symbol display region 483 of the display unit 482. The image displayed in the image display region 484 varies in accordance with the number of specific symbols 314 to be rearranged. To be more specific, an image displayed in the image display region 484 when the number of specific symbols 314 to be rearranged is one is different from an image displayed when the number of specific symbols 314 to be rearranged is in the range of 2 to 4.

In addition to the above, the effect content determining unit 491 has a function such that, in each free game in a special game, when the symbols 310 which are targets of rearrangement determined by the symbol determining unit 489 do not include a specific symbol 314, an image indicating an arbitrary position (arrangement area 28) is displayed on the image display region 484 of the display unit 482, before the symbols 310 are rearranged in the symbol display region 483 of the display unit 482.

(Operation of Slot Machine 10)

Figure 30:
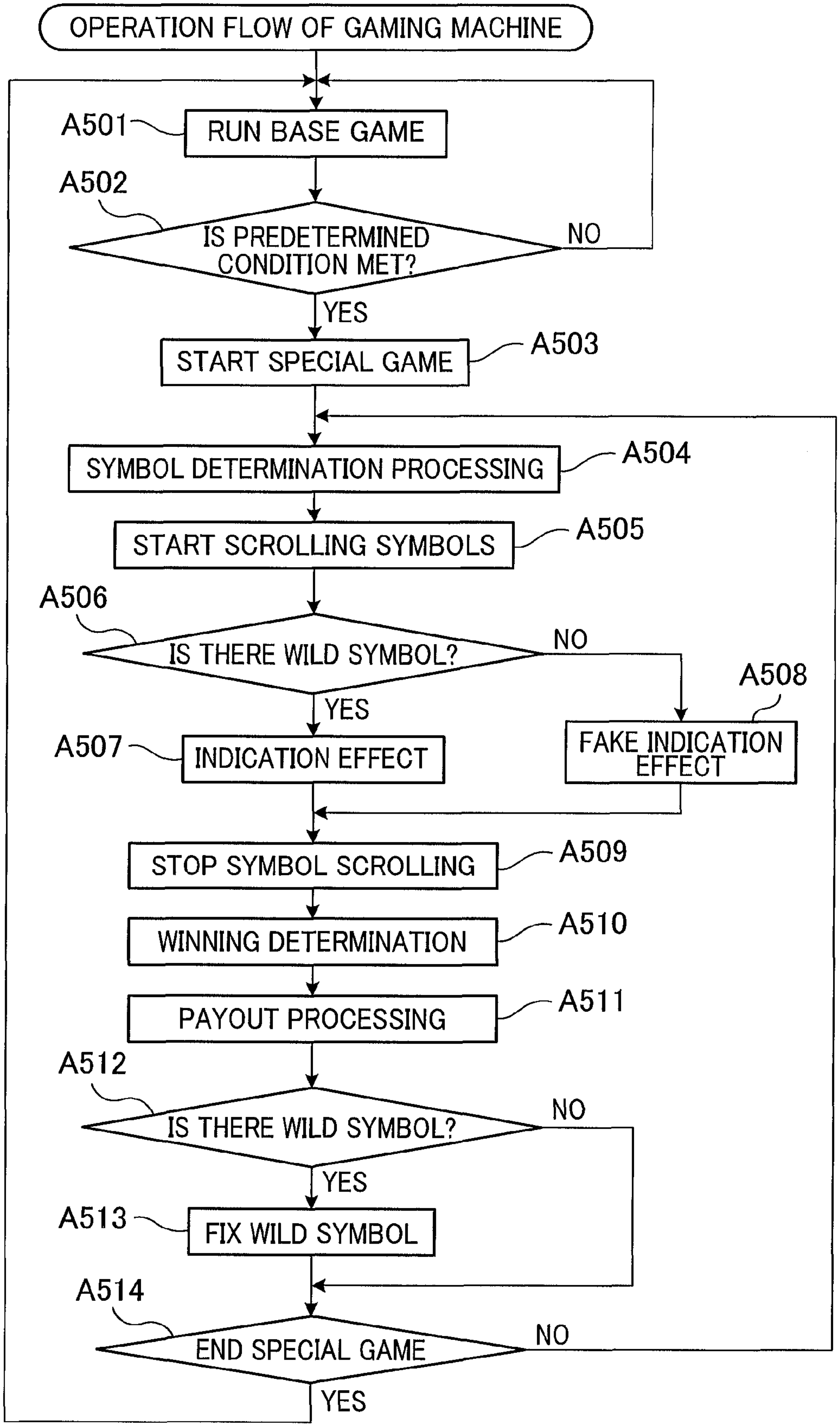
FIG. 30 is a flowchart illustrating the game control method of the gaming machine of Second Embodiment of the present invention.

With reference to a flowchart of FIG. 30, the following describes an operation of the slot machine (gaming machine) 10 having the above described functional blocks.

First, the slot machine 10 runs a base game (step A501). This base game has already been described above.

Thereafter, the slot machine 10 determines whether a predetermined condition is met (step A502). When it is determined that the predetermined condition is not met (step A502: NO), the step A501 is executed again and hence the base game is repeated. On the other hand, when it is determined that the predetermined condition is met (step A502: YES), the slot machine 10 starts a special game (step A503). In the present embodiment, a free game is repeated as the content of the special game.

When the special game starts, the slot machine 10 extracts a random number for symbol determination. Then, for each of a plurality of video reels 151-155 displayed on the display unit 482, the slot machine 10 determines symbols 310 to be presented to the player when scrolling of symbol arrays is stopped (step A504). Thereafter, the slot machine 10 starts the scroll of the symbol arrays of the video reels 151-155 (step A505).

Thereafter, the slot machine 10 determines whether the symbols 310 displayed for the player after the scroll of the symbol arrays is stopped include a wild symbol 311*a* (step A506). It is noted that, while the wild symbol 311*a* is regarded as a specific symbol 314, the specific symbol 314 may be a feature symbol 312*a*.

When it is determined that a wild symbol 311*a* is included, (step A506: YES), an indication effect is executed (step A507). The indication effect is an effect to display on the display unit 482 an image indicating a position (arrangement area 28) where the wild symbol 311*a* is to be displayed, and this image varies in accordance with the number of wild symbols 311*a* displayed on the display unit 482. On the other hand, when it is determined that no wild symbol 311*a* is included (step A506: NO), a fake indication effect is executed (step A508). The fake indication effect is an effect to display on the display unit 482 an image indicating an arbitrary position (arrangement area 28) where no wild symbol 311*a* is to be displayed.

Thereafter, the slot machine 10 stops scrolling the symbol arrays of the video reels 151-155 so that the symbols 310 determined are presented to the player (step A509). Thereafter, the slot machine 10 determines whether a combination of the symbols 310 displayed for the player relates to winning (step A510).

When the combination of symbols 310 displayed for the player is a combination related to winning, the slot machine 10 awards a benefit to the player according to the combination (step A511)

Thereafter, the slot machine 10 determines whether the symbols 310 displayed for the player include a wild symbol 311*a* (step A512). If it is determined that a wild symbol 311*a* is included (step A512: YES), this wild symbol 511*a* is fixedly displayed on the display unit 482 (step A513).

After the step A513 or if it is determined in the step A512 that no wild symbol 311*a* is included (step A512: NO), whether the special game is finished is determined (step A514). If it is determined that the special game is finished (step A514: YES), the process returns to the step A501 and the base game is run. On the other hand, if it is determined that the special game is not finished (step A514: NO), the process returns to the step A504 and the special game is repeated.

(Display Status)

The following describes an exemplary display status of the lower image display panel (display device) 141 in the operation of the slot machine 10.

(Bonus Game Screen: During Game)

Figure 31:
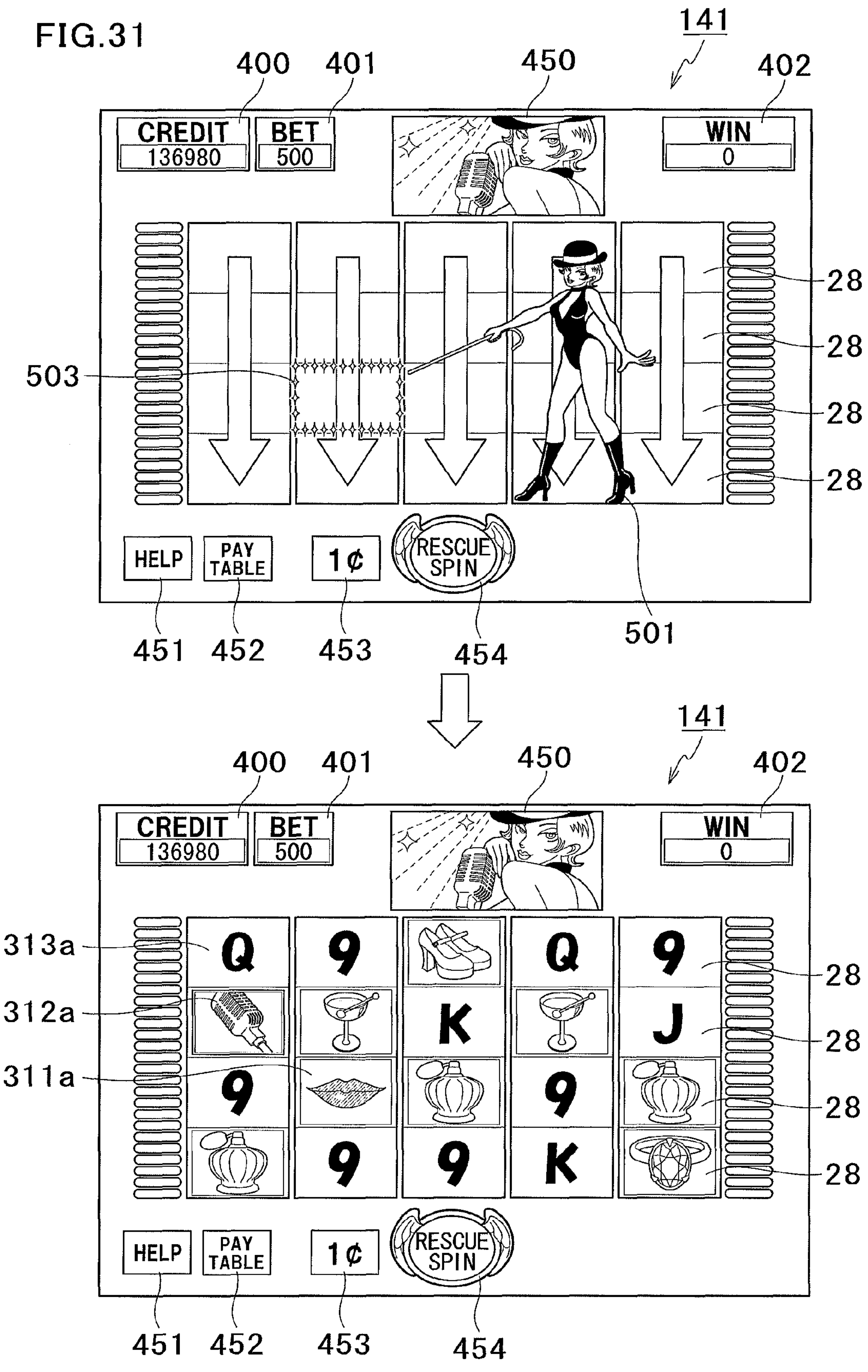
FIG. 31 is an explanatory diagram illustrating a display state of Second Embodiment of the present invention.

FIG. 31 illustrates an exemplary bonus game screen which is a screen displayed on the lower image display panel 141, during the bonus game.

To be more specific, in each free game of a bonus game, in case where one wild symbol 311*a* is displayed when the scroll of the symbol arrays of the video reels 151-155 is stopped, a character 501 of a woman in black dress with a wand is displayed on the lower image display panel 141 while the symbol arrays of all video reels 151-155 are being scrolled. This character 501 points by the wand an arrangement area 28 where a wild symbol 311*a* is to be displayed after the scroll of the symbol arrays of the video reels 151-155 is stopped. On the arrangement area pointed by the wand, a shining frame image 503 is displayed. The character 501 is an example of an image indicating an arrangement area 28 where a wild symbol 311*a* is to be stopped when the number of wild symbols 311*a* stopped and displayed for the player is one.

Thereafter, before the scroll of the symbol array of the first video reel (e.g. video reel 151) is stopped, the character 501 and the frame image 503 are deleted. At the same time, as the scroll is stopped from the symbol array of the first video reel and consequently the scroll of the symbol arrays of all video reels 151-155 is stopped, the symbols 310 are displayed for the player. In this regard, the wild symbol 311*a* is displayed in the arrangement area 28 which was pointed by the character 501.

As such, viewing the character 501 and the frame image 503, the player recognizes that a wild symbol 311*a* will be displayed after the scroll of the symbol arrays of the video reels 151-155 and recognizes a position where the wild symbol 311*a* is to be displayed, before the symbols 310 are displayed after the scroll of the symbol arrays of the video reels 151-155 is stopped. For this reason, the player's expectation on game media paid out as a result of a free game is increased. Furthermore, since the symbol shown for the player is the wild symbol 311*a* which can substitute for any types of symbols 310, it is possible to further increase the player's expectation on game media paid out as a result of a free game.

(Bonus Game Screen: During Game)

FIG. 32 illustrates an exemplary bonus game screen which is a screen displayed on the lower image display panel 141, during the bonus game.

To be more specific, in each free game of a bonus game, in case where two to four wild symbols 311*a* are displayed when the scroll of the symbol arrays of the video reels 151-155 is stopped, a character 502 of a woman in white dress with a wand is displayed on the lower image display panel 141 while the symbol arrays of all video reels 151-155 are being scrolled. This character 502 points by the wand the plurality of arrangement areas 28 in a random order, in which areas the wild symbols 311*a* are to be displayed when the scroll of the symbol arrays of the video reels 151-155 is stopped. In the arrangement areas 28 pointed by the wand, shining frame images 503 are displayed. The character 502 is an example of an image indicating the arrangement areas 28 where the wild symbols 311*a* are to be displayed, when the number of wild symbols 311*a* to be displayed for the player is in the range of 2 to 4. In the case of FIG. 32, one wild symbol 311*a* has been fixedly displayed.

Thereafter, the character 502 and all frame images 503 are deleted before the scroll of the symbol array of the first video reel is stopped. At the same time, as the scroll is stopped from the symbol array of the first video reel and consequently the scroll of the symbol arrays of all video reels 151-155 is stopped, the symbols 310 are displayed for the player. In this regard, the wild symbols 311*a* are stopped at the plurality of arrangement areas 28 which was pointed by the character 502.

As such, the player who sees the character 502 in white dress recognizes that, when the scroll of the symbol arrays of all video reels 151-155 is stopped, more wild symbols 311*a* will displayed than in the case of the character 501 in black dress. It is therefore possible to suitably increases the player's expectation on game media paid out as a result of a free game.

(Bonus Game Screen: During Game)

Figure 33:
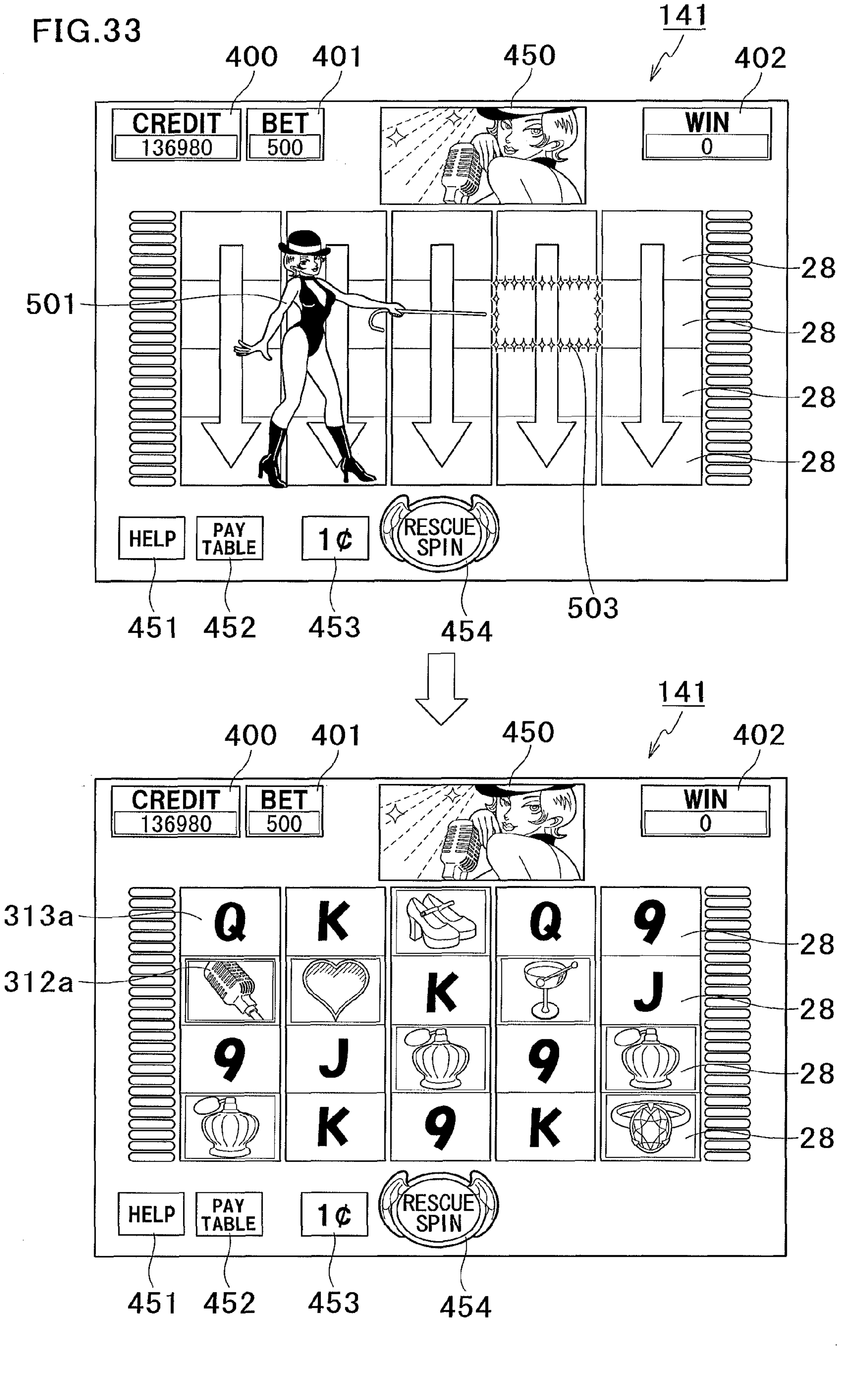
FIG. 33 is an explanatory diagram illustrating a display state of Second Embodiment of the present invention.

FIG. 33 illustrates an exemplary bonus game screen which is a screen displayed on the lower image display panel 141, during the bonus game.

To be more specific, in each free game in a bonus game, in case where the number of wild symbols 311*a* displayed is zero when the scroll of the symbol arrays of the video reels 151-155 is stopped, i.e., when no wild symbol 311*a* is to be displayed, a character 501 in black dress with a wand is displayed on the lower image display panel 141 while the symbol arrays of the video reels 151-155 are being scrolled. This character 501 points by the wand an arbitrary arrangement area 28. In the arrangement area 28 pointed by the wand, a shining frame image 503 is displayed. The character 501 is an example of an image indicating an arbitrary arrangement area 28 where no wild symbol 311*a* is to be displayed for the player. In the present embodiment, this character 501 is identical with the image indicating an arrangement area 28 where a wild symbol 311*a* is to be displayed when one wild symbol 311*a* is displayed for the player.

Thereafter, the character 501 and the frame image 503 are deleted before the scroll of the symbol array of the first video reel is stopped. At the same time, as the scroll is stopped from the symbol array of the first video reel and consequently the scroll of the symbol arrays of all video reels 151-155 is stopped, the symbols 310 are displayed for the player. In this case, no wild symbol 311*a* is displayed in the arrangement area 28 which was pointed by the character 501. In FIG. 33, an ordinary symbol 313*a* "COCKTAIL" is displayed in the arrangement area 28 which was pointed by the character 501.

As such, viewing the character 501 and the frame image 503, the player expects a wild symbol 311*a* to be displayed after the scroll of the symbol arrays of the video reels 151-155 is stopped, but then realizes that no wild symbol 311*a* is displayed after the symbols 310 are displayed as a result of stopping the scroll of the symbol arrays of the video reels 151-155. This stimulates the player's expectation on a free game.

The displayed wild symbol 311*a* will be fixedly displayed on the lower image display panel 141 from the next free game. For this reason, the lower image display panel 141 is controlled so that the symbol arrays of the video reels 151-155 are scrolled and stopped behind the fixedly displayed wild symbol 311*a*. In this regard, the lower image display panel 141 is composed of two layers of panels, and a wild symbol 311*a* is fixedly displayed on the front-side panel whereas the symbol arrays of the video reels 151-155 are scrolled and stopped on the rear-side panel. This makes it possible to simplify the display control of the lower image display panel 141 and allows the player to visually recognize the fixedly displayed wild symbol 311*a* with ease.

(Bonus Game Processing)

Figure 34:
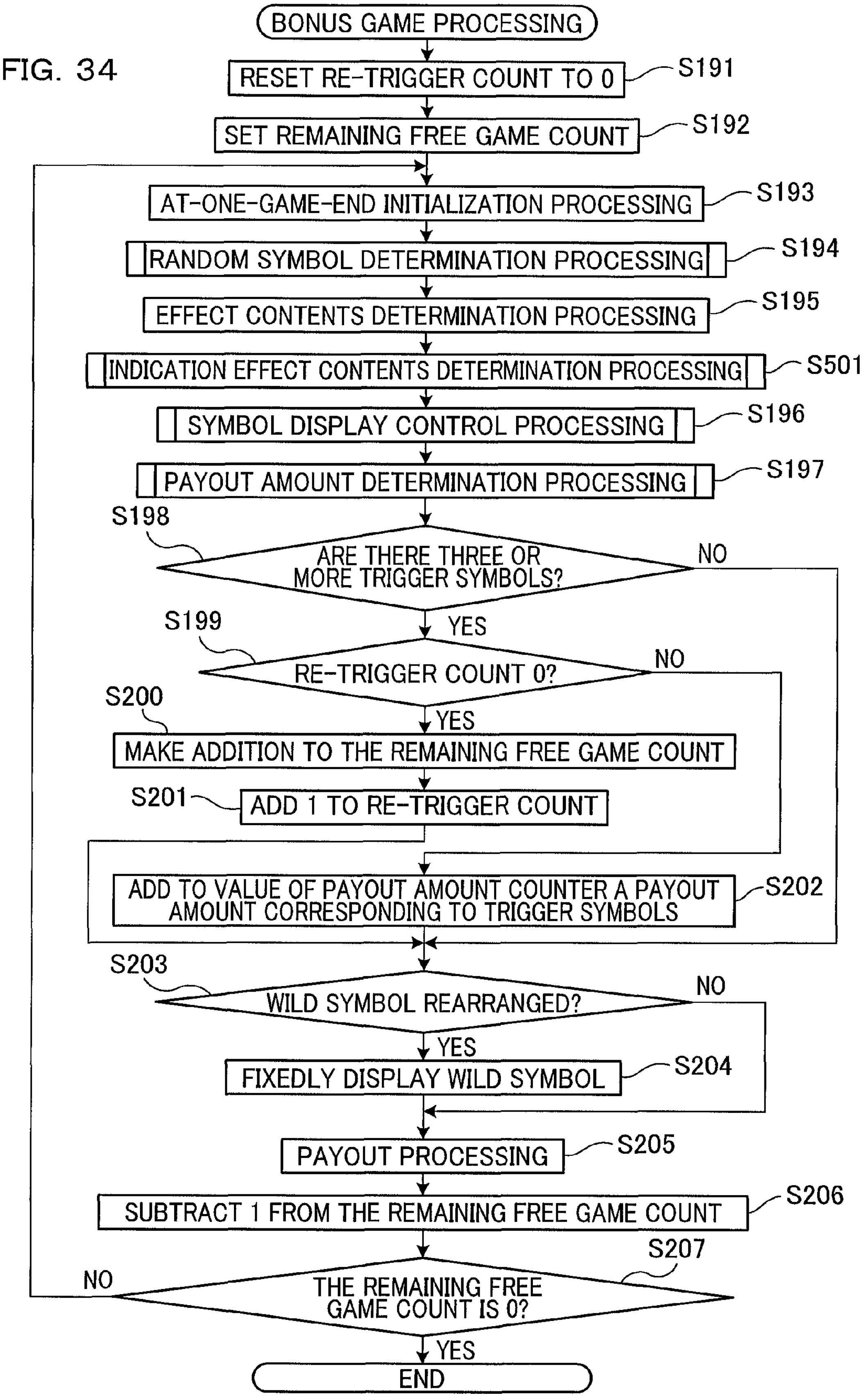
FIG. 34 shows a flowchart of the bonus game processing according to Second Embodiment of the present invention.

Next, the following describes the bonus game processing, with reference to FIG. 34.

In the bonus game processing of the present embodiment, the main CPU 71 carries out indication effect contents determination processing after the effect contents determination processing in the step S195 and before the symbol display control processing in the step S196 (step S501).

The other steps are not described because they are identical with those illustrated in FIG. 28.

(Indication Effect Contents Determination Processing)

Figure 35:
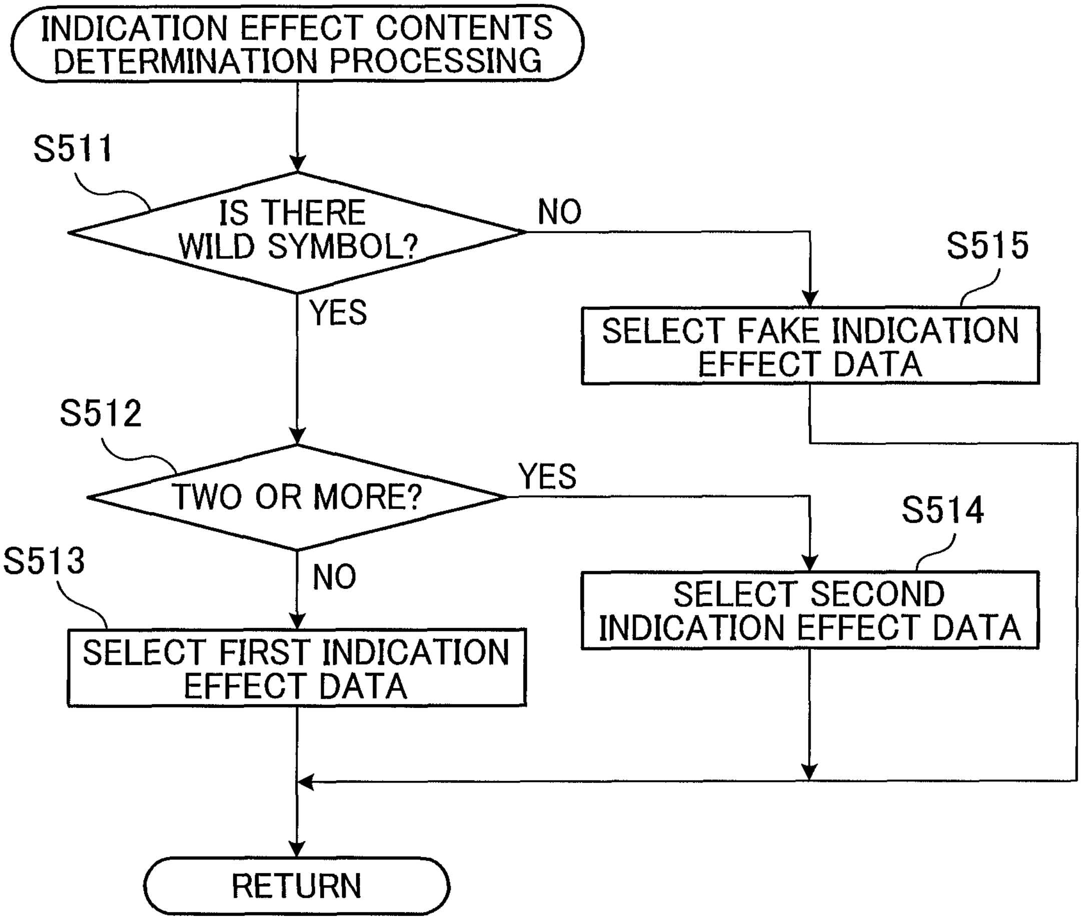
FIG. 35 shows a flowchart of a indication effect contents determination processing according to Second Embodiment of the present invention.

Now, referring to FIG. 35, indication effect contents determination processing will be described. FIG. 35 is a flowchart indicating a sub routine of the indication effect contents determination processing.

First, the main CPU 71 determines whether a wild symbol 311*a* is included in the to-be-stopped symbols of the video reels 151-155 determined in the random symbol determination processing (step S511). If the main CPU 71 determines that a wild symbol 311*a* is included (step S511: YES), it is determined whether the number of wild symbols 311*a* is not lower than two (step S512).

When it is determined that the number of wild symbols 311*a* is not more than two, i.e. the number of wild symbols 311*a* is one (step S512: NO), the main CPU 71 selects first indication effect data (step S513), and ends the sub routine. The first indication effect data relates to the effect using the character 501 shown in FIG. 31. On the other hand, when it is determined that the number of wild symbols 311*a* is not less than two (step S512: YES), the main CPU 71 selects second indication effect data (step S514), and ends the sub routine. The second indication effect data relates to the effect using the character 502 illustrated in FIG. 32.

If the main CPU 71 determines in the step S511 that no wild symbol 311*a* is included (step S511: NO), fake indication effect data is selected (step S515) and the sub routine is finished. The fake indication effect data relates to the effect using the character 501 illustrated in FIG. 33.

(Indication Effect Contents Determination Processing)

Figure 36:
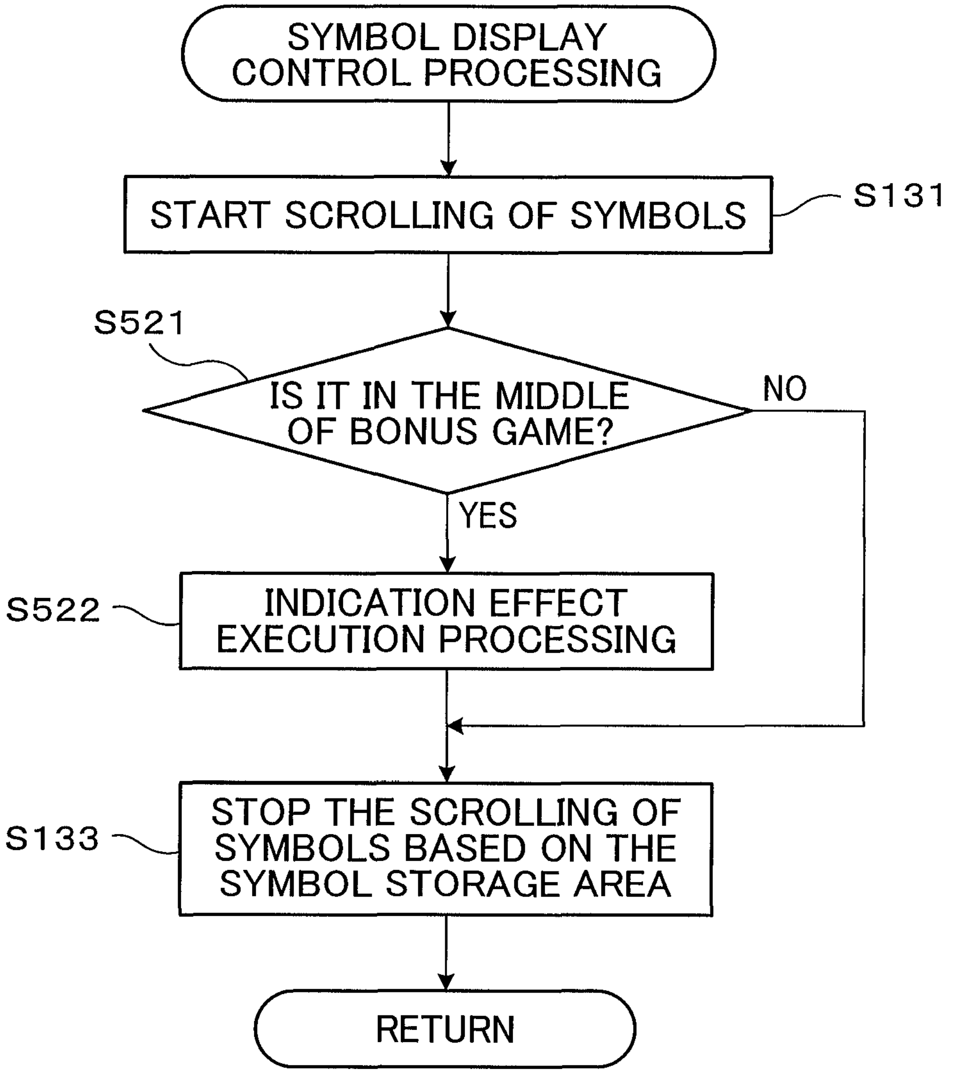
FIG. 36 is a view illustrating a flowchart of the symbol display control processing according to Second Embodiment of the present invention.

Now, referring to FIG. 36, symbol display control processing of the present embodiment will be described. In the present embodiment, the sub routine of the symbol display control processing shown in FIG. 36 is executed in place of the symbol display control processing described with reference to FIG. 25.

First, the main CPU 71 starts scrolling of the symbol arrays of the respective video reels 151-155 that are displayed to the lower image display panel 141 (step S131). Subsequently, the main CPU 71 determines whether a bonus game is being run (step S521). If it is determined that a bonus game is being run (step S521: YES), the main CPU 71 carries out an indication effect by using indication effect data selected in the indication effect contents determination processing (step S522).

If the indication effect data selected in the indication effect contents determination processing is first indication effect data, as shown in FIG. 31, an effect is executed so that the arrangement area 28 where a wild symbol 311*a* is to be displayed is pointed by the character 501 and the frame image 503 is displayed in that arrangement area 28.

Seeing the character 501 and the frame image 503, the player recognizes, before the symbols 310 are displayed after the scroll of the symbol arrays of the video reels 151-155 is stopped, that a wild symbol 311*a* will be displayed after the scroll of the symbol arrays of all video reels 151-155 is stopped and in which arrangement area 28 the wild symbol 311*a* will be displayed. It is therefore possible to increase the player's expectation on game media paid out as a result of the free game. Furthermore, since the symbol shown for the player is the wild symbol 311*a* which can substitute for any types of symbols 310, it is possible to further increase the player's expectation on game media paid out as a result of a free game.

When the indication effect data selected in the indication effect contents determination processing is second indication effect data, as shown in FIG. 32, an effect is executed so that the plurality of arrangement areas 28 where the wild symbols 311*a* will be displayed are pointed by the character 502 and the frame images 503 are displayed in the respective arrangement areas 28.

As such, the player who sees the character 502 in white dress recognizes that, when the scroll of the symbol arrays of all video reels 151-155 is stopped, more wild symbols 311*a* will displayed than in the case of the character 501 in black dress. It is therefore possible to suitably increase the player's expectation on game media paid out as a result of a free game.

When the indication effect data selected in the indication effect contents determination processing is fake indication effect data, as shown in FIG. 33, an effect is executed so that an arbitrary arrangement area 28 is pointed by the character 501 and the frame image 503 is displayed in that arrangement area 28.

As such, viewing the character 501 and the frame image 503, the player expects a wild symbol 311*a* to be displayed after the scroll of the symbol arrays of the video reels 151-155 is stopped, but then realizes that no wild symbol 311*a* is displayed after the symbols 310 are displayed as a result of stopping the scroll of the symbol arrays of the video reels 151-155. This stimulates the player's expectation on a free game.

After the process above or if it is determined in the step S521 that a bonus game is not being run (step S521: NO), the scroll of the symbol arrays of the video reels 151-155 is stopped based on the symbol storage area (step S133). After the processing has been executed, the symbol display control processing is completed.

(Modifications of Present Embodiment)

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

For example, in the embodiment above, the fake indication effect is executed using the character 501 which is an image indicating an arrangement area 28 where a wild symbol 311*a* is to be displayed, when the number of wild symbols 311*a* to be displayed for the player is one. For this reason, when the character 501 is displayed, the player assumes that the number of wild symbols 311*a* to be displayed for the player is 0 or 1 when the scroll of the symbol arrays of all video reels 151-155 is stopped. Alternatively, the fake indication effect may be executed by using the character 502 which is an image indicating a plurality of arrangement areas 28 where wild symbols 311*a* are to be displayed, respectively, when the number of wild symbols 311*a* to be displayed for the player is in the range of 2 to 4. In this case, when the character 502 is displayed, the player assumes that the number of wild symbol 311*a* to be displayed is 0, 2, 3, or 4. In the case of fake indication effect, the character 502 points a plurality of arrangement areas 28, but a wild symbol 311*a* is displayed in none of the arrangement areas 28 pointed by the character 502 after the symbols 310 are displayed as a result of stopping the scroll of the symbol arrays of all video reels 151-155. This further stimulates the player's expectation on a free game.

In addition to the above, while in the embodiment above the indication effect and the fake indication effect are executed in each free game in a bonus game, the indication effect and the fake indication effect may be executed at a predetermined probability. For example, when the number of wild symbols 311*a* to be displayed for the player is 0, 2, 3, or 4, the character 501 or 502 which is an image indicating an arrangement area 28 where a wild symbol 311*a* is to be displayed may be displayed at a probability of 50%. In this case, it is possible to execute complicated effects such that, even if the character 501 or the character 502 is displayed while the symbol arrays of the video reels 151-155 are being scrolled, no wild symbol 311*a* is displayed for the player after the scroll of the symbol arrays of all video reels 151-155 is stopped, or even if the character 501 or the character 502 is not displayed while the symbol arrays of the video reels 151-155 are being scrolled, a wild symbol 311*a* is displayed for the player after the scroll of the symbol arrays of all video reels 151-155 is stopped. This makes it possible to increase the player's expectation on obtaining a wild symbol 311*a*.

In addition to the above, the embodiment above is arranged so that the indication effect and the fake indication effect are executed in each free game of a bonus game. Alternatively, the indication effect and the fake indication effect may be executed in a base game. This makes it possible to increase the player's expectation on game media paid out as a result of a base game.

(Third Embodiment)

In addition to the above structure, the present specification also deals with the following structure. The structure is described below as Third Embodiment of the present invention. Note that members and parts that are identical to the foregoing embodiment are given the identical symbols, and no further explanations are provided. Further, a gaming machine (slot machine) of the present embodiment is referred to as a slot machine 600 for the purpose of distinguishing from the other embodiments.

[Explanation of Operation Flow]

Figure 38:
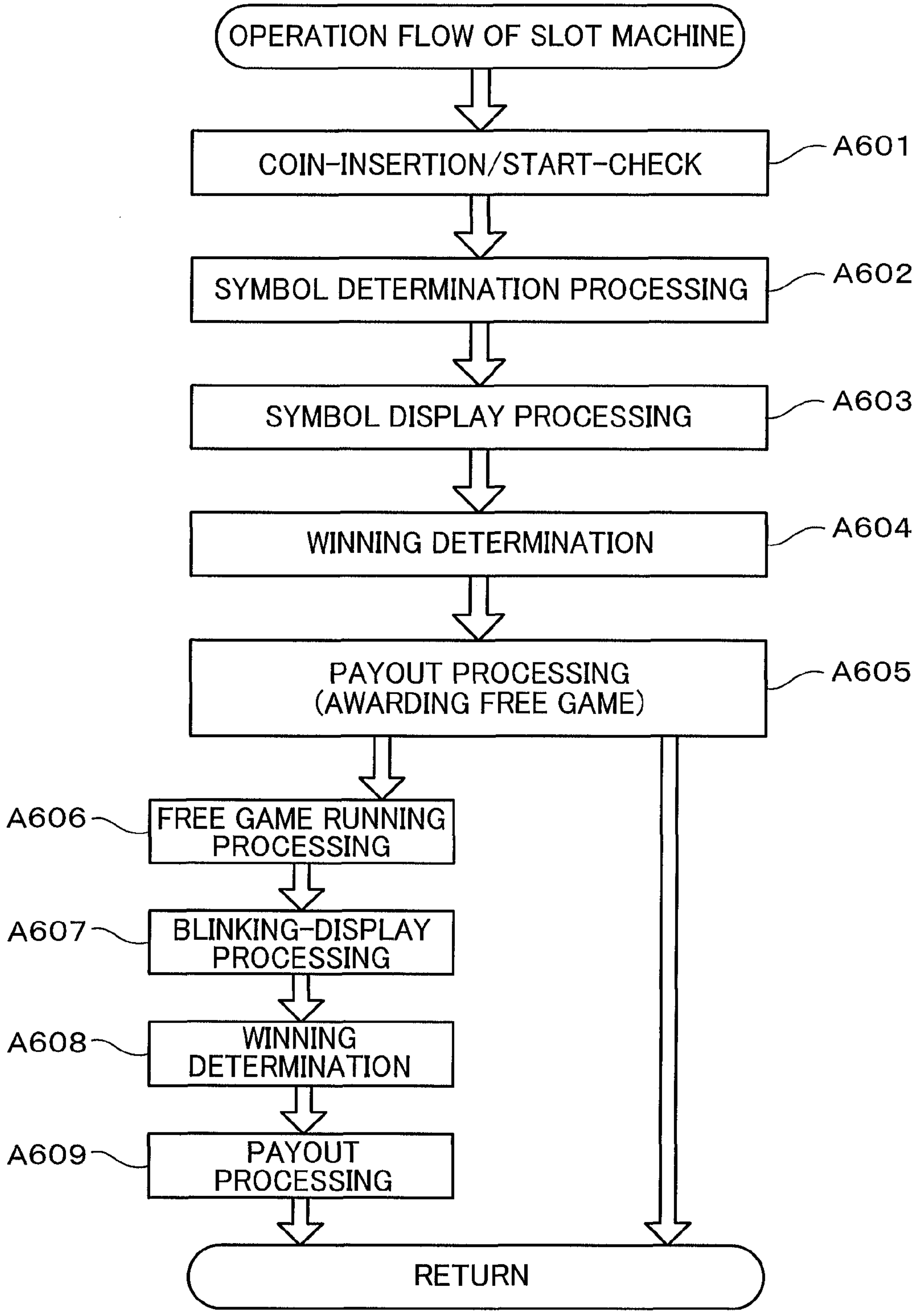
FIG. 38 is a view illustrating a operation flow of the slot machine according to Third Embodiment of the present invention.

With reference to FIG. 38, a operation flow of a slot machine according to Third Embodiment is described. FIG. 38 is a diagram showing an operation flow of the slot machine related to the Third Embodiment.

First, the slot machine checks whether or not a bet button unit 480 has been pressed by a player, and subsequently checks whether or not a spin button unit 481 has been pressed by the player (Coin-insertion/Start-check: step A601). At the same time, the remaining credit amount is checked.

Next, when the player presses the spin button unit 481, the slot machine extracts a random number for symbol determination. Then, for each of the plurality of video reels displayed on the display unit 482, the slot machine determines symbols to be presented to the player when scrolling of symbol arrays is stopped (symbol determination process: step A602).

Next, the slot machine starts scrolling of the symbol array of each of the video reels and then stops scrolling so that the determined symbols are displayed for the player (symbol display process: step A603).

When scrolling of the symbol array of each video reel is stopped, the slot machine determines whether or not a combination of symbols displayed for the player is a combination related to winning (winning determination: step A604).

When the combination of symbols displayed for the player is a combination related to winning, the slot machine offers benefits according to the combination to the player (payout processing: step A605). For example, the slot machine may award a bonus game (free game) to the player, when the displayed symbol combination relates to awarding of a bonus game (free game). In this case, a predetermined number of bonus games (free games) are awarded to the player.

Figure 41:
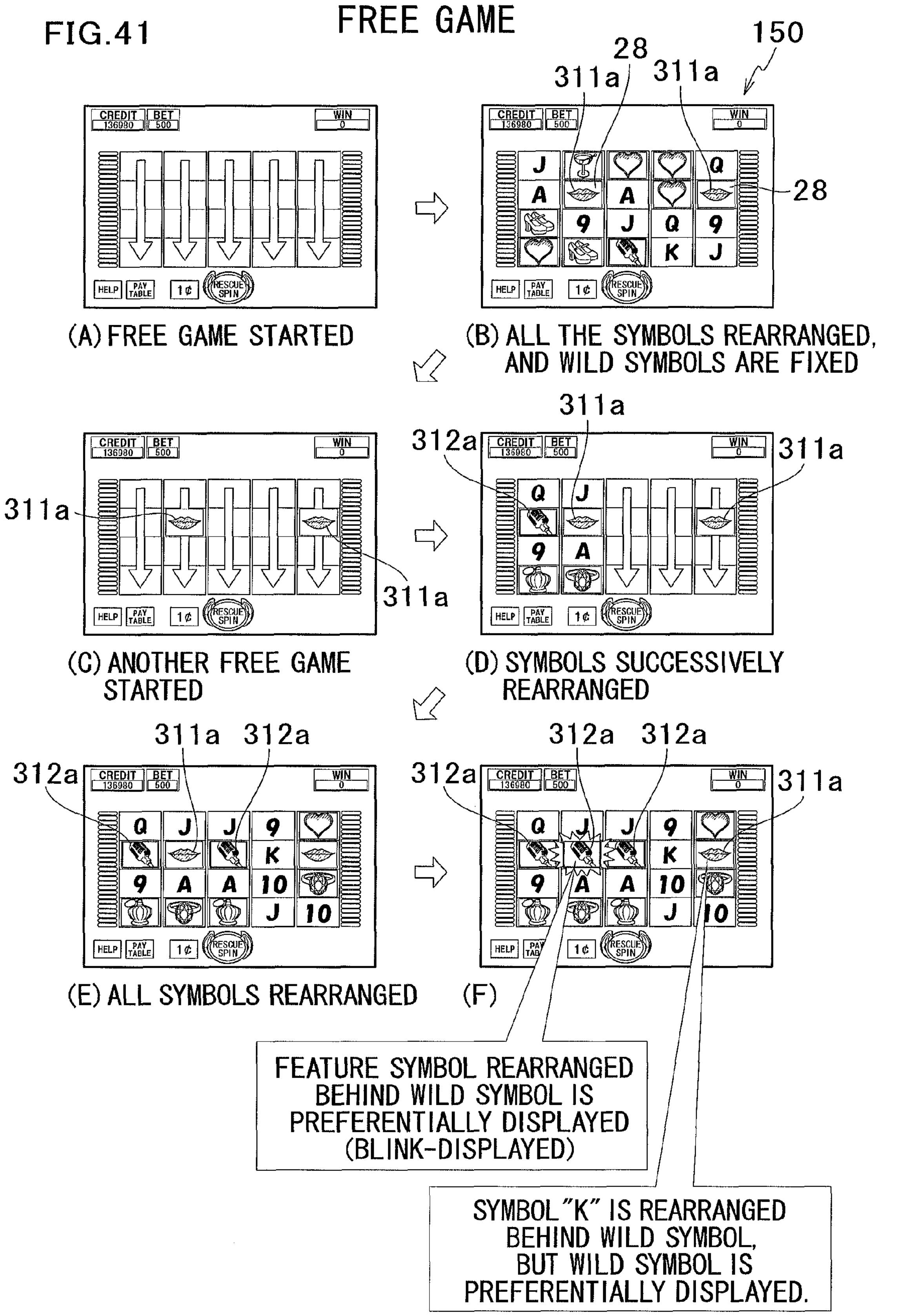
FIG. 41 is an explanatory diagram of effect image display according to Third Embodiment of the present invention.

Subsequently, through a free game running process, the bonus game (free game) is run (step A606). Then, in the free game is run blinking-display processing (step A607). This is a process of displaying an animation in which, when a symbol stopped behind the fixedly displayed wild symbol is preferentially displayed over the fixedly displayed wild symbol, the symbol stopped behind the fixedly displayed wild symbol and the fixedly displayed wild symbol are alternately displayed, As shown in FIG. 41 (F).

Then, the slot machine executes winning determination in the free game (step A608), and then awards a benefit according to the result (payout processing: A609).

After the processes above, the step A601 is executed again. The basic functions of the slot machine have been described above.

Next, the following describes a program run by a slot machine 600 according to the Third Embodiment. Note that the explanation for members and program processes that are identical to those described in the foregoing embodiments is omitted as needed in the following description.

A characteristic of the Third Embodiment of the present invention is symbol display control processing (blinking-display processing) which is executed before the bonus game processing. The following description therefore mainly deals with the bonus game processing and the symbol display control processing. When the bonus game processing and the symbol display control processing of the present embodiment are executed, a series of images are sequentially displayed as shown in FIG. 37.

<Bonus Game Processing of Third Embodiment>

Figure 37:
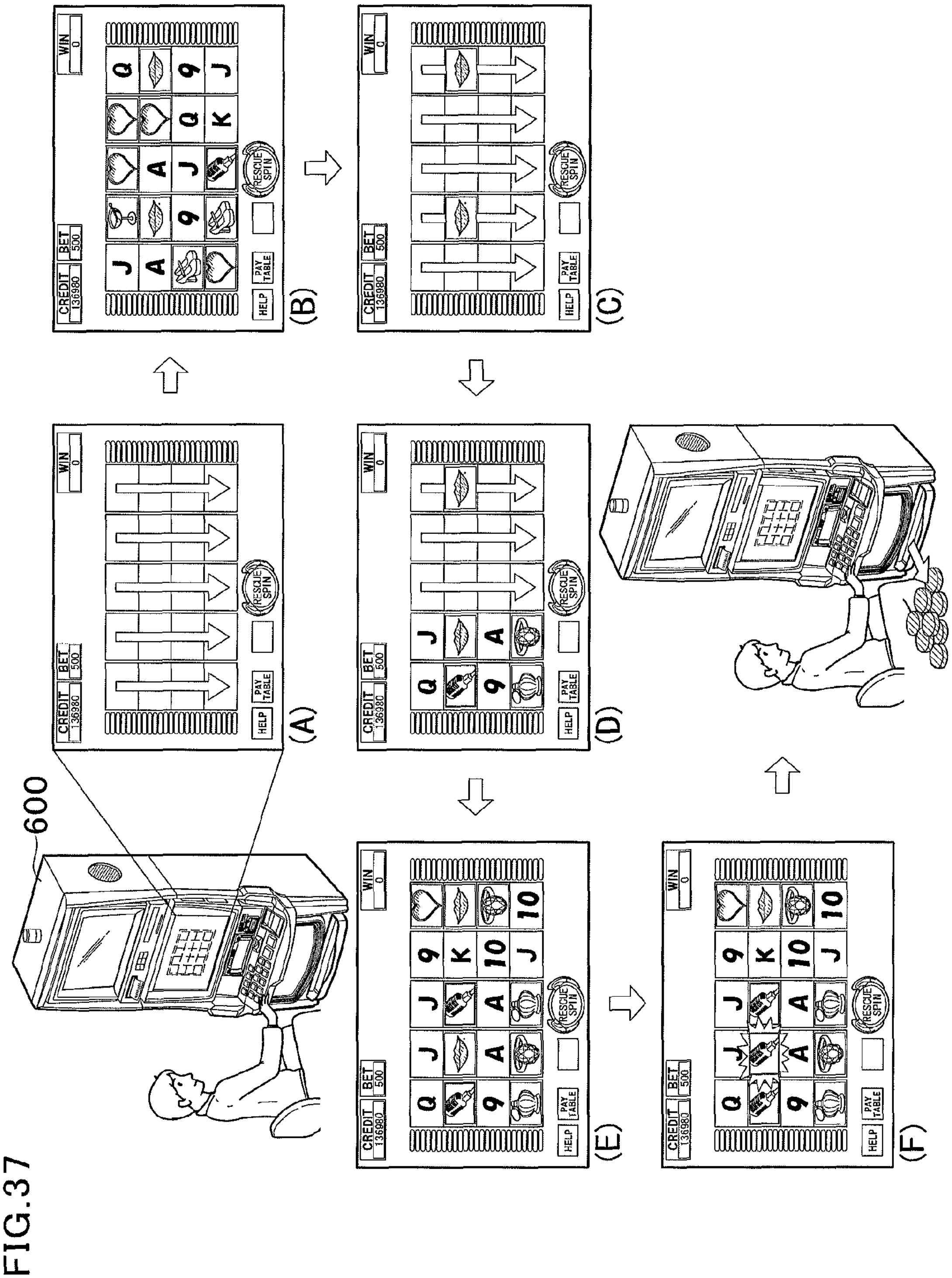
FIG. 37 outlines a game in a slot machine of Third Embodiment of the present invention.
Figure 39:
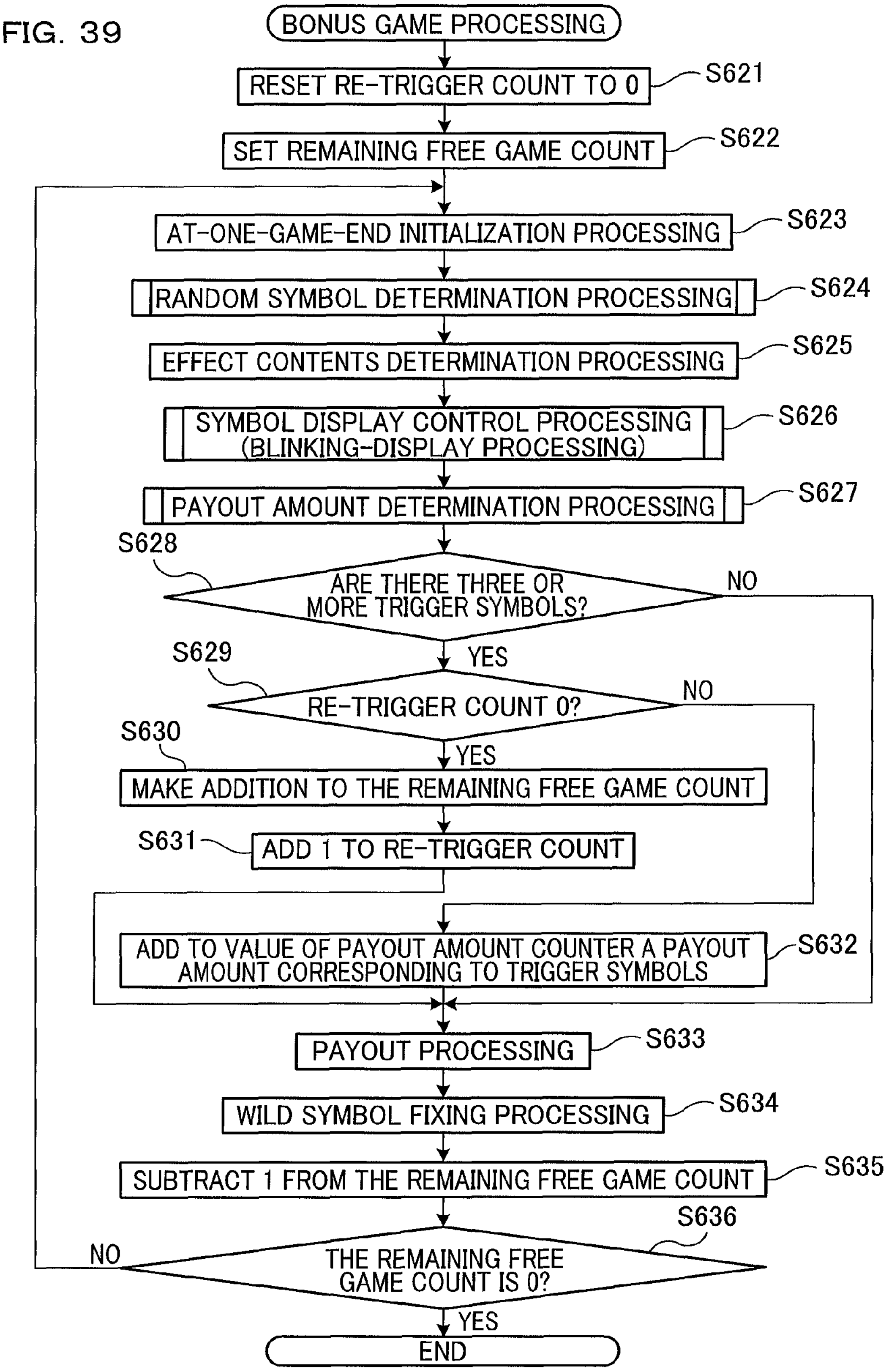
FIG. 39 shows a flowchart of the bonus game processing for a slot machine according to Third Embodiment of the present invention.
Figure 40:
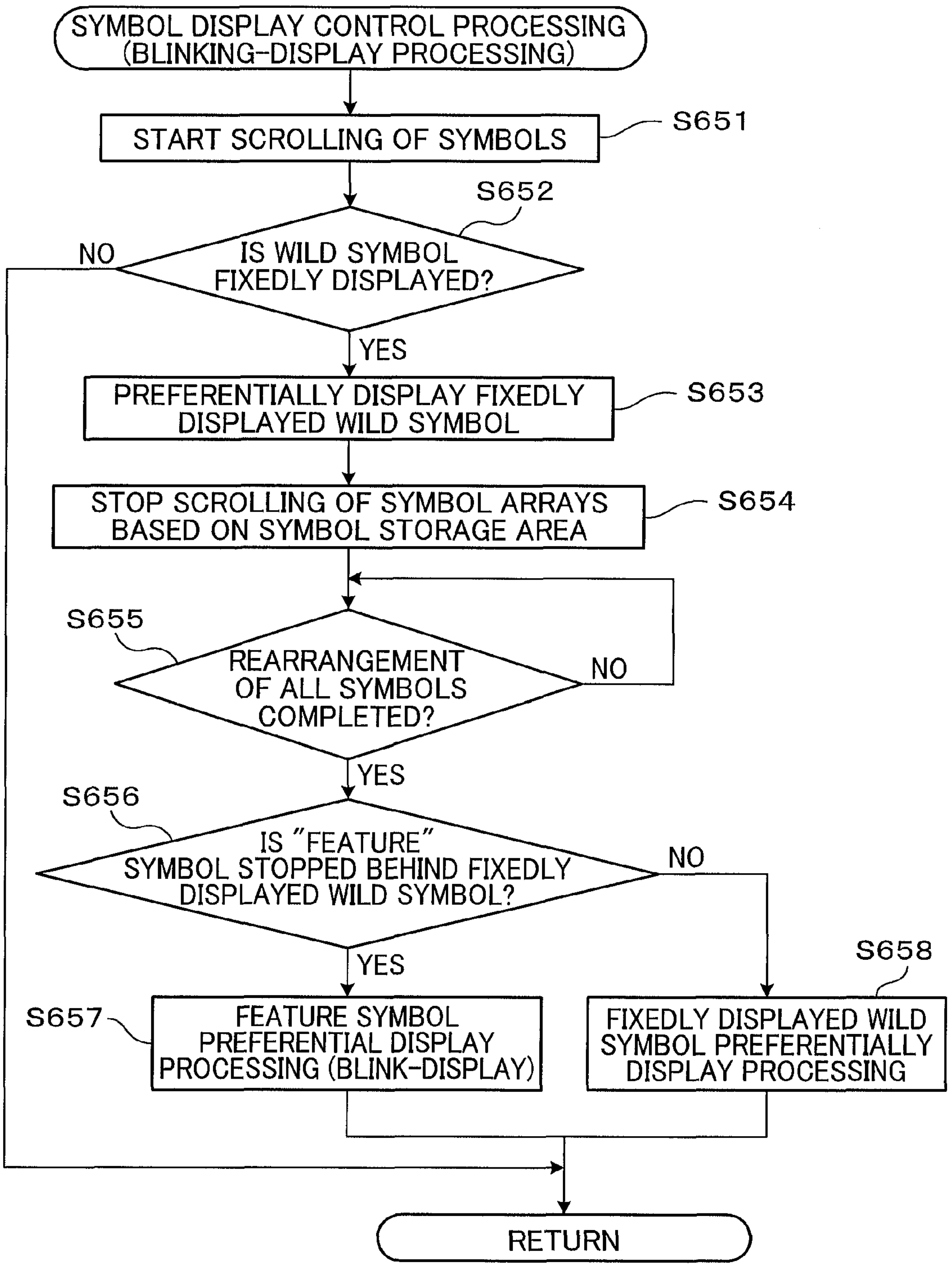
FIG. 40 shows a flowchart of the symbol display control processing (blinking-display processing) according to Third Embodiment of the present invention.

First, with reference to FIG. 37 to FIG. 41, the following describes the bonus game processing of Third Embodiment. FIG. 37 outlines a game in a slot machine 600 of Third Embodiment. FIG. 38 is a view illustrating an operation flow of the slot machine according to Third Embodiment. FIG. 39 shows a flowchart of the bonus game processing for a slot machine 600 according to Third Embodiment. FIG. 40 shows a flowchart of the symbol display control processing (blinking-display processing) according to Third Embodiment. FIG. 41 is an explanatory diagram of effect image display according to Third Embodiment.

The bonus game processing of the present embodiment is executed when, in step S19, three trigger symbols (feature symbols 312*a*) are determined as to be rearrange on an activated payline 160 (step S20). Further the bonus game processing is also executed when conditions for rescue is met in step S173 (step S174).

When the bonus game processing is executed, a re-trigger count is set to "0" in a re-trigger count storage area of the RAM 73 (step S621). The re-trigger count in this specification is the number indicating how many times a process of increasing the remaining free game count has been executed in the free games, the process being executed when three feature symbols 312 serving as the trigger symbols are rearranged on the display window 150. In the present embodiment, the re-trigger count is restricted to "1".

Next, the remaining free game count T in the free game count storage area of the RAM 73 is set to T=10 (step S622). Further, the main CPU 71 displays a free game occurrence image on the lower image display panel 141.

After step S622, the main CPU 71 executes the steps S623 to S636. These steps are substantially identical with the steps described hereinabove, and hence the following will only describe differences between the steps.

Next, the main CPU 71 executes at-one-game-end initialization processing (step S623). For example, data that becomes unnecessary after each free game in the working areas of the RAM 73, such as the symbols randomly determined, is cleared.

The main CPU 71 then executes random symbol determination processing (step S624). In step S624, to-be-stopped symbols are randomly determined using the symbol arrays of the free game, based on the random number for symbol determination.

The main CPU 71 executes effect contents determination processing (step S625). The main CPU 71 extracts a effect-use random number, and randomly determines any of the effect contents from the preset plurality of sets of effect contents.

Next, the main CPU 71 executes the symbol display control processing (blinking-display processing) (step S626).

When the symbol display control processing (blinking-display processing) is executed, the symbol arrays on the video reels 151 to 155 start scroll as indicated by the flowchart of FIG. 40 (see also FIG. 41 (A)) (step S651).

Then, whether or not a wild symbol 311*a* is fixedly displayed is determined (step S652). The expression "wild symbol 311*a* is fixedly displayed" means that, during a free game, a wild symbol 311*a* stopped in a display window 150 is kept displayed within the arrangement area 28 stopped. Then, when the wild symbol 311*a* is fixedly displayed, the subsequent free game is run, while keeping the wild symbol 311*a* fixedly displayed. That is, the player is able to start the subsequent free game with the wild symbol 311*a* already arranged in the arrangement area 28 fixedly displayed, the wild symbol 311*a* functioning as an almighty symbol and regarded as any of the picture symbols ("A", "K", "Q", "J", "10", "9", "COCKTAIL", "SHOES", "PERFUME", "RING", "HEART"). Therefore, the player is able to play the subsequent free game under an advantageous condition.

If the wild symbol 311*a* is not fixedly displayed (step S652: NO), the process is ended. On the other hand, when the wild symbol 311*a* is fixedly displayed (step S652: YES), the fixed wild symbol 311*a* is preferentially displayed until the symbol arrays of all the video reels 151 to 155 are stopped (step S653). For example, until the symbol arrays of all the video reels 151 to 155 are stopped, the symbol "FEATURE" rearranged behind the fixedly displayed wild symbol 311*a* (see FIG. 41 (D)) is preferentially displayed over the fixedly displayed wild symbol 311*a*. Further, as shown in FIGS. 41 (C) (D), while the symbol arrays of the video reels 151 to 155 are scrolling, the video reels 152 and 155 scroll behind the fixedly displayed wild symbol 311*a*, and the wild symbol 311*a* is preferentially displayed.

Next, the to-be-stopped symbols determined in the random symbol determination processing of step S624 are successively stopped in predetermined positions (e.g. upper r of the display window 150) (step S654). That is, four symbols including the to-be-stopped symbols are displayed in the display window 150. For example, when the to-be-stopped symbol is the symbol associated with the code number of "10" and it is to be displayed to the upper area, the symbols associated with the respective code numbers of "11", "12" and "13" are to be displayed to the respective upper middle area, lower middle area, and lower area in the display window 150 (see FIG. 41(E)).

Next, whether all the video reels 151 to 155 are stopped is determined (i.e. Are all the symbols rearranged in the display window 150?) (step S655). If all the video reels 151 to 155 are not stopped (step S655: NO), stopping of all the reels is waited.

On the other hand, if all the video reels 151 to 155 are stopped (step S655: YES), there is determined if the symbol stopped behind the fixedly displayed wild symbol 311*a* is a feature symbol 312*a* (step S656).

If the symbol stopped behind the fixedly displayed wild symbol 311*a* is a feature symbol 312*a* (step S656: YES), a "FEATURE" symbol preferential display process (blink-display) is executed (step S657). As shown in FIG. 41 (F), this is a process which preferentially displays the feature symbol 312*a* stopped behind the fixedly displayed wild symbol 311*a* over the fixedly displayed wild symbol 311*a*. At this time, the feature symbol 312*a* and the wild symbol 311*a* are alternately displayed to blink-display the feature symbol 312*a*.

On the other hand, if the symbol stopped behind the fixedly displayed wild symbol 311*a* is not a feature symbol 312*a* (step S656: NO), a fixedly displayed wild symbol preferentially display process is executed (step S658). For example, as shown in FIG. 41 (F), behind the fixed wild symbol 311*a* on the video reel 155, the symbol "K" is stopped. The fixedly displayed wild symbol 311*a* is preferentially displayed over this symbol "K". The symbol display control processing is completed after step S657 or step S658.

After the symbol display control processing, the main CPU 71 executes a payout amount determination processing (step S627). In step S627, a payout amount is determined on the premise that coins whose number is identical with those bet on the base game which has triggered the free game are bet.

Next, after step S627, the main CPU 71 determines whether three feature symbols 312*a* each serving as a trigger symbol are rearranged in the display window 150 (step S628).

When it is determined that three feature symbols 312*a* each serving as a trigger symbol are rearranged (step S628: YES), whether or not the re-trigger count is "0" is determined (step S629). Here, when the re-trigger count is not determined as to be "0" (step S629: NO), the payout amount corresponding to the arrangement of three feature symbols 312*a* each serving as the trigger symbol is added to a payout amount counter (step S632).

On the other hand, when the re-trigger count is determined as to be "0" (step S629: YES), the number of free games to be added ("10 times" in the present embodiment) is added to the remaining free game count (step S630). Through this process, the free game count storage area of the RAM 73, "10" is added to the remaining game count T indicated by remaining game count data.

Next, "1" is added to the re-trigger count stored in the re-trigger count storage area of the RAM 73 (step S631).

Next, in step S628, when it is determined that three feature symbols 312*a* each serving as the trigger symbol are not rearranged on the display window 150 (step S628: NO), the main CPU 71 executes payout processing after step S631 or step S632 (step S633). This process is not described here because it is identical to step S24.

Next, the wild symbol fixing process is executed (step S634). Through this, as shown in FIG. 41 (B), the wild symbol 311*a* stopped in the display window 150 is kept fixedly displayed in the arrangement area 28 and carried over to the subsequent free game.

Thereafter, the main CPU 71 subtracts 1 from the remaining free game count T in the free game count storage area of the RAM 73 (step S635).

Next, the main CPU 71 determines whether the free game count T="0", based on the remaining game data stored in the free game count storage area of the RAM 73 (step S636). When it is determined that T≠0 (step S636: NO), the main CPU 71 brings the process back to S623. On the other hand, when it is determined in step S636 that T=0 (step S636: YES), the main CPU 71 ends the bonus game processing.

With the slot machine 600 of Third Embodiment described herein above, when the wild symbol 311*a* is fixedly displayed, the fixedly displayed wild symbol 311*a* can be preferentially displayed over any of the symbols rearranged behind the fixedly displayed wild symbol 311*a*, until the scrolling of all the video reels 151 to 155 are stopped. This keeps a player wondering which symbol is stopped behind the fixedly displayed wild symbol 311*a*, until the scrolling of all the video reels 151 to 155 are stopped.

Further, when the symbols stopped including the symbol rearranged behind the fixedly displayed wild symbol 311*a* satisfy a predetermined relation (when "FEATURE" is achieved), the symbol (feature symbol 312*a*) rearranged behind the fixedly displayed wild symbol 311*a* is preferentially displayed over the fixedly displayed wild symbol 311*a*. Thus, when the benefit for a relation of symbols including the symbol rearranged behind the fixedly displayed wild symbol 311*a* is better than the benefit for a relation of the symbols including the fixedly displayed wild symbol 311*a*, the symbol rearranged behind the fixedly displayed wild symbol 311*a* is preferentially displayed to notify the player that the benefit for the relation of symbols including the symbol rearranged behind the fixedly displayed wild symbol 311*a* is awarded.

Further, in Third Embodiment, the symbol rearranged behind the fixedly displayed wild symbol 311*a* is blink-displayed, when preferentially displaying the same over the fixedly displayed wild symbol 311*a*. This gives player a more visual impression that the symbol rearranged behind the fixedly displayed wild symbol is preferentially displayed over the fixedly displayed wild symbol.

Thus, Third Embodiment of the present invention is described above. The slot machine 600 of the present embodiment may be altered in various ways. For example, the structure described hereinbelow is also possible.

Further, the present embodiment deals with a case where the number of paylines 160 is 50; however, the number of paylines is not limited to this in the present invention.

Further, the present embodiment deals with a case where the slot machine 600 is a video slot machine. However, the slot machine 600 of the present invention may partially adopt a mechanical reel in place of the video reels 151 to 155.

(Outline of Third Embodiment)

As hereinabove described, according to a first aspect of the invention in relation to Third Embodiment, a gaming machine (slot machine 600) includes:

a plurality of symbol arrays (video reels 151 to 155) having, in predetermined positions, a plurality of symbols including picture symbols ("A", "K", "Q", "J", "10", "9", "COCKTAIL", "SHOES", "PERFUME", "RING", "HEART") and a wild symbol (wild symbol 311*a*) which can be regarded as any of the picture symbols;

a symbol display device (lower image display panel 141) having a plurality of arrangement areas (arrangement area 28) arranged in a matrix in which the plurality of symbols provided to the plurality of symbol arrays are arranged; and a controller (motherboard 70) programmed as to execute the following processes of:

(f1) having the symbol display device rearrange the plurality of symbols in the plurality of arrangement areas;

(f2) awarding a benefit according to the relation among the plurality of symbols rearranged;

(f3) fixedly displaying the wild symbol rearranged in any of the arrangement areas; and (f4) repeating (f1) to (f3) until a predetermined condition is met, wherein, when the wild symbol is fixedly displayed in (f3), the fixedly displayed wild symbol is preferentially displayed over a symbol rearranged behind the fixedly displayed wild symbol, until rearrangement in (f1) is completed, when the plurality of rearranged symbols including the symbol rearranged behind the fixedly displayed wild symbol satisfy a predetermined relation, the symbol rearranged behind the fixedly displayed wild symbol is preferentially displayed over the fixedly displayed wild symbol; and when the predetermined relation is not satisfied, the fixedly displayed wild symbol is preferentially displayed over the symbol rearranged behind the fixedly displayed wild symbol.

In the structure, when the wild symbol is fixedly displayed in (f3), the fixedly displayed wild symbol can be preferentially displayed over the symbol rearranged behind the fixedly displayed wild symbol, until rearrangement completes in (f1). This keeps a player wondering which symbol is rearranged behind the fixedly displayed wild symbol, until the rearrangement is completed.

Further, when the plurality of rearranged symbols including the symbol rearranged behind the fixedly displayed wild symbol satisfy the predetermined relation, the symbol rearranged behind the fixedly displayed wild symbol is preferentially displayed over the fixedly displayed wild symbol. Thus, when the benefit for a relation of symbols including the symbol rearranged behind the fixedly displayed wild symbol is better than the benefit for a relation of the symbols including the fixedly displayed wild symbol, the symbol rearranged behind the fixedly displayed wild symbol is preferentially displayed to notify the player that the benefit for the relation of symbols including the symbol rearranged behind the fixedly displayed wild symbol is awarded.

Further, a second aspect of the present invention in relation to Third Embodiment is a gaming machine as described below. The gaming machine of the first aspect of the present invention in relation to Third Embodiment is adapted so that the symbol rearranged behind the fixedly displayed wild symbol is blink-displayed, when preferentially displaying the same over the fixedly displayed wild symbol.

In the above structure, the symbol rearranged behind the fixedly displayed wild symbol is blink-displayed, when preferentially displaying the same over the fixedly displayed wild symbol. This gives player a more visual impression that the symbol rearranged behind the fixedly displayed wild symbol is preferentially displayed over the fixedly displayed wild symbol.

Further, a third aspect of the invention in relation to Third Embodiment provides the following gaming machine.

Namely, the gaming machine includes: a plurality of symbol arrays each of which having in predetermined positions a plurality of symbols including picture symbols and a wild symbol regarded as any of the picture symbols;

a symbol display device having a matrix of arrangement areas in which the plurality of symbols in the plurality of symbol arrays are arranged; and a controller programmed to execute the following processes of:

(g1) after a predetermined maximum bettable amount of or less game media are bet, having the symbol display device rearrange the plurality of symbols in the plurality of arrangement areas;

(g2) awarding a free game according to the relation amongst the plurality of symbols rearranged;

(g3) when the free game is awarded, having the symbol display device rearrange the plurality of symbols in the plurality of arrangement areas;

(g4) awarding a benefit according to the relation among the plurality of symbols rearranged;

(g5) fixedly displaying the wild symbol rearranged in any of the arrangement areas; and (g6) repeating (g3) to (g5) until a predetermined condition is met, wherein, when the wild symbol is fixedly displayed in (g5), the fixedly displayed wild symbol is preferentially displayed over a symbol rearranged behind the fixedly displayed wild symbol, until rearrangement in (g3) is completed, when the plurality of rearranged symbols including the symbol rearranged behind the fixedly displayed wild symbol satisfy a predetermined relation, the symbol rearranged behind the fixedly displayed wild symbol is preferentially displayed over the fixedly displayed wild symbol; and when the predetermined relation is not satisfied, the fixedly displayed wild symbol is preferentially displayed over the symbol rearranged behind the fixedly displayed wild symbol.

In the structure, during the free game, when the wild symbol is fixedly displayed in (g5), the fixedly displayed wild symbol can be preferentially displayed over the symbol rearranged behind the fixedly displayed wild symbol, until rearrangement completes in (g3). This keeps a player playing wondering during a free game, which symbol is rearranged behind the fixedly displayed wild symbol, until the rearrangement is completed.

Further, during the free game, when the plurality of rearranged symbols including the symbol rearranged behind the fixedly displayed wild symbol satisfy the predetermined relation, the symbol rearranged behind the fixedly displayed wild symbol is preferentially displayed over the fixedly displayed wild symbol. Thus, in a free game, when the benefit for a relation of symbols including the symbol rearranged behind the fixedly displayed wild symbol is better than the benefit for a relation of the symbols including the fixedly displayed wild symbol, the symbol rearranged behind the fixedly displayed wild symbol is preferentially displayed to notify the player that the benefit for the relation of symbols including the symbol rearranged behind the fixedly displayed wild symbol is awarded.

Further, a fourth aspect of the present invention relating to Third Embodiment is the following gaming machine. The gaming machine of the third aspect of the present invention in relation to Third Embodiment is adapted so that the symbol rearranged behind the fixedly displayed wild symbol is blink-displayed, when preferentially displaying the same over the fixedly displayed wild symbol.

In the above structure, the symbol rearranged behind the fixedly displayed wild symbol is blink-displayed, when preferentially displaying the same over the fixedly displayed wild symbol. This gives player a more visual impression that the symbol rearranged behind the fixedly displayed wild symbol is preferentially displayed over the fixedly displayed wild symbol.

Further, a fifth aspect of the present invention relating to Third Embodiment is a control method for the following gaming machine.

Namely, the gaming machine includes: a plurality of symbol arrays each of which having in predetermined positions a plurality of symbols including picture symbols and a wild symbol regarded as any of the picture symbols;

a symbol display device having a matrix of arrangement areas in which the plurality of symbols in the plurality of symbol arrays are arranged, the method comprising:

a first step in which the symbol display device rearranges a plurality of symbols in the plurality of arrangement areas;

a second step for awarding a benefit according to a relation among the plurality of symbols rearranged in the arrangement areas;

a third step for fixedly displaying the rearranged wild symbols in the arrangement areas; and a fourth step for repeating the first step to the third step until a predetermined condition is met, wherein, when the wild symbol is fixedly displayed in the third step, the fixedly displayed wild symbol is preferentially displayed over a symbol rearranged behind the fixedly displayed wild symbol, until rearrangement in the first step is completed, when the plurality of rearranged symbols including the symbol rearranged behind the fixedly displayed wild symbol satisfy a predetermined relation, the symbol rearranged behind the fixedly displayed wild symbol is preferentially displayed over the fixedly displayed wild symbol; and when the predetermined relation is not satisfied, the fixedly displayed wild symbol is preferentially displayed over the symbol rearranged behind the fixedly displayed wild symbol.

In the structure, when the wild symbol is fixedly displayed in the third step, the fixedly displayed wild symbol can be preferentially displayed over the symbol rearranged behind the fixedly displayed wild symbol, until rearrangement completes in the first step. This keeps a player wondering which symbol is rearranged behind the fixedly displayed wild symbol, until the rearrangement is completed.

Further, when the plurality of rearranged symbols including the symbol rearranged behind the fixedly displayed wild symbol satisfy the predetermined relation, the symbol rearranged behind the fixedly displayed wild symbol is preferentially displayed over the fixedly displayed wild symbol. Thus, when the benefit for a relation of symbols including the symbol rearranged behind the fixedly displayed wild symbol is better than the benefit for a relation of the symbols including the fixedly displayed wild symbol, the symbol rearranged behind the fixedly displayed wild symbol is preferentially displayed to notify the player that the benefit for the relation of symbols including the symbol rearranged behind the fixedly displayed wild symbol is awarded.

(Fourth Embodiment)

Here, in view of the following problem in an existing gaming machine, a gaming machine 10 of the present invention may further have the structure and functions described as Fourth Embodiment.

Fourth Embodiment of the present invention relates to a gaming machine and a game control method capable of providing a sound effect during a bonus game.

(Background Art of Fourth Embodiment)

There has been known a slot machine which runs a base game started on the premise that a predetermined amount of bet is placed, in which game a plurality of symbol arrays displayed on a display unit starts to scroll and stops scrolling after a predetermined period, and a payout is awarded based on the combination of resulting symbols stop displayed. In such a slot machine, a special game which is more advantageous to the player than the base game is run when a predetermined condition is met during a base game.

(Technical Problem of Fourth Embodiment)

During a special game in general, BGM played becomes more up-tempo than the BGM of the base game, and lights are frequently blinked. This enables the player playing the special game as well as the other players around to know that the special game is running. The player playing the special game is able to let the others playing the base game know he/she is in a more advantageous situation, and sometimes feels better than the others.

However, when a plurality of players are playing the special game, there is no significant difference in BGM and lighting effects between the games played by the players. Therefore, even if the players playing the special game are in a more advantageous situation than the others, it has been difficult to show the others that they are in a more advantageous situation.

The gaming machine and the game control method of Fourth Embodiment, according to the present invention are made to solve the above problems, and aim at providing a gaming machine and a control method thereof capable of enabling a player playing a bonus game to show people around changes and more advantageous situation he/she is in, thereby enabling the player to feel he/she is better than the others.

(Technical Solution of Fourth Embodiment)

A gaming machine of Fourth Embodiment according to the present invention is a gaming machine, including:

a speaker that outputs a sound for providing an effect to a game;

a display having a plurality of arrangement areas aligned in matrix for arranging therein a plurality of symbols including a specific symbol;

a sound storing memory that stores a plurality of types of sounds each of which type is assigned to the number of specific symbols to be rearranged in the arrangement area; and a controller, wherein the controller is programmed to execute the processes of:

(h1) running a base game on condition that a game medium is bet, in which game symbols selected from the plurality of symbols are rearranged in the arrangement areas and a payout is awarded according to a predetermined combination of symbols rearranged;

(h2) running a special game which is advantageous for a player and which offers a higher chance of payout than the base game, when a predetermined condition is met in the base game; and (h3) when a payout is to be awarded in relation to one or more specific symbols arranged in one or more of the arrangement areas in the special game, obtaining from the sound storing memory a sound assigned to the number of related specific symbols and outputting the sound from the speaker.

In the above structure, when a payout is to be awarded in relation to one or more specific symbols in the special game, a sound assigned to the number of specific symbols related to the payout is output from the speaker. This could enable the player to show changes and a more advantageous situation he/she is in during the special game to the people around the player, and make the player feel better than the others.

Further, a gaming machine of Fourth Embodiment according to the present invention is a gaming machine, including:

a speaker that outputs a sound for providing an effect to a game;

a display having a plurality of arrangement areas aligned in matrix for arranging therein a plurality of symbols including a specific symbol capable of making an animated motion;

a sound storing memory that stores a plurality of types of sounds each of which type is assigned to the number of specific symbols to be rearranged in the arrangement area; and a controller, wherein the controller is programmed to execute the processes of:

(i1) running a base game on condition that a game medium is bet, in which game symbols selected from the plurality of symbols are rearranged in the arrangement areas and a payout is awarded according to a predetermined combination of symbols rearranged;

(i2) running a special game which is advantageous for a player and which offers a higher chance of payout than the base game, when a predetermined condition is met in the base game; and (i3) when a payout is to be awarded in relation to one or more specific symbols arranged in one or more of the arrangement areas in the special game, obtaining from the sound storing memory a sound assigned to the number of related specific symbols and outputting the sound from the speaker in sync with the animated motion of the specific symbol.

In the above structure, when a payout is to be awarded in relation to one or more specific symbols in the special game, the or each of specific symbols being capable of making an animated motion, a sound assigned to the number of related specific symbols is obtained and output from the speaker in sync with the animated motion of the specific symbol. This could enable the player to show changes and a more advantageous situation he/she is in during the special game to the people around the player, and make the player feel better than the others.

Further, a game control method of Fourth Embodiment, according to the present invention is a game control method of a gaming machine having a speaker that outputs a sound for providing an effect to a game;

a display having a plurality of arrangement areas aligned in matrix for arranging therein a specific symbol, a sound storing memory that stores a plurality of types of sounds each of which type is assigned to the number of specific symbols to be rearranged in the arrangement area; and the gaming machine running a base game on condition that a game medium is bet, in which game symbols selected from the plurality of symbols are rearranged in the arrangement areas and a payout is awarded according to a predetermined combination of symbols rearranged, and running a special game which offers to a player a higher chance of awarding a payout than the base game, the method including the steps of:

(j1) running the base game;

(j2) running the special game, when a predetermined condition is met in the base game;

(j3) when a payout is to be awarded in relation to one or more specific symbols arranged in one or more of the arrangement areas in the special game, obtaining from the sound storing memory a sound assigned to the number of related specific symbols and outputting the sound from the speaker.

In the above structure, when a payout is to be awarded in relation to one or more specific symbols in the special game, a sound assigned to the number of specific symbols related to the payout is output from the speaker. This could enable the player to show changes and a more advantageous situation he/she is in during the special game to the people around the player, and make the player feel better than the others.

(Advantageous Effects of Fourth Embodiment)

The gaming machine of Fourth Embodiment, according to the present invention, could enable the player to show changes and a more advantageous situation he/she is in during the special game to the people around the player, and make the player feel better than the others.

(Best Mode for Carrying Out the Invention of Fourth Embodiment)

The following describes a slot machine 10 (gaming machine) and the game control method thereof of Fourth Embodiment, according to the present invention, with reference to FIG. 42 to FIG. 48. Note that no further explanation is provided as to structures and process functions that are identical to those of the first embodiment.

(Overview of Game of Slot Machine of Fourth Embodiment)

Figure 42:
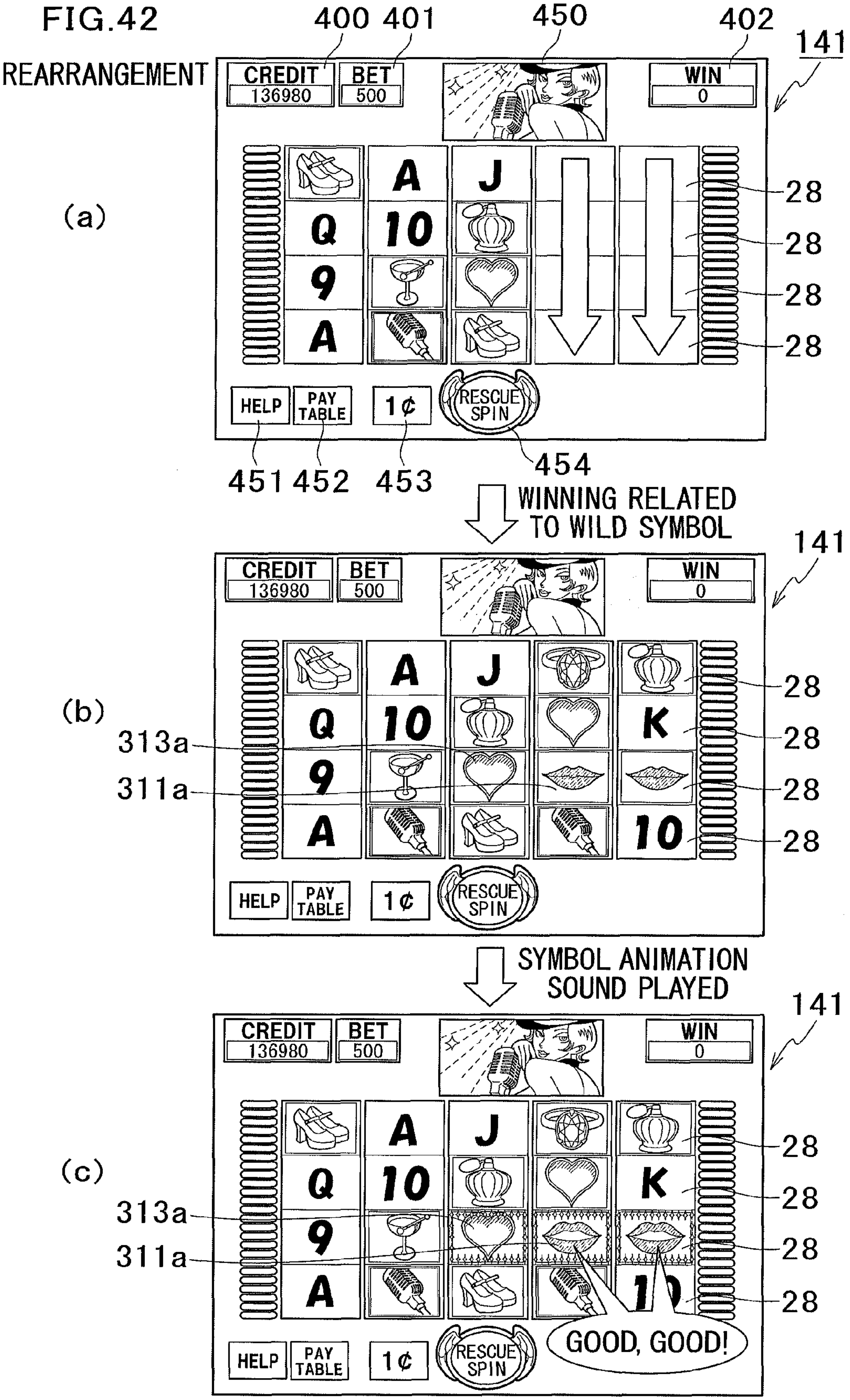
FIG. 42 outlines a game in a slot machine according to Fourth Embodiment of the present invention.

As shown in FIG. 42, the slot machine 10 (gaming machine) of Fourth Embodiment, according to the present invention, includes:

a lower image display panel 141 having a plurality of arrangement areas 28 aligned in matrix for arranging therein a plurality of symbols including a wild symbol 311*a*; and a RAM 73 that stores a plurality of types of symbol animation sounds each of which type is assigned to the number of wild symbols 311*a* to be rearranged in the arrangement areas 28;

running a base game on condition that a game medium is bet, in which game symbols selected from the plurality of symbols are rearranged in the arrangement areas 28 and a payout is awarded according to a predetermined combination of symbols rearranged;

running a bonus game which is advantageous for a player and which offers a higher chance of payout than the base game, when a predetermined condition is met in the base game; and when a payout is to be awarded in relation to one or more wild symbols 311*a* arranged in one or more of the arrangement areas 28 in the bonus game, obtaining from the RAM 73 a symbol animation sound assigned to the number of related wild symbols 311*a* and output the sound from the speaker 112.

Here, the "symbol animation sound" is a sound output from the speaker 112, when a payout for a winning related to the wild symbol 311*a* stopped is to be awarded to the player in the bonus game. In the present embodiment, there are seven types of symbol animation sounds. These symbol animation sounds are stored in a symbol animation sound determination table shown in FIG. 45, in the RAM 73. This is detailed later with reference to FIG. 45.

Further, the "payout related to the wild symbol 311*a* is to be awarded" means awarding of a benefit in the form of credit and coin to the player, when a winning is achieved in the bonus game and when the symbols related to the winning include a wild symbol 311*a*.

Further, as shown in FIG. 42, a slot machine 10 (gaming machine) of Fourth Embodiment, according to the present invention, includes:

a lower image display panel 141 having a plurality of arrangement areas 28 aligned in matrix for arranging therein a plurality of symbols including a wild symbol 311*a* capable of making an animated motion; and a RAM 73 that stores a plurality of types of symbol animation sounds each of which type is assigned to the number of wild symbols 311*a* to be rearranged in the arrangement areas 28;

running a base game on condition that a game medium is bet, in which game symbols selected from the plurality of symbols are rearranged in the arrangement areas 28 and a payout is awarded according to a predetermined combination of symbols rearranged;

running a bonus game which is advantageous for a player and which offers a higher chance of payout than the base game, when a predetermined condition is met in the base game; and when a payout is to be awarded in relation to one or more wild symbols 311*a* arranged in one or more of the arrangement areas 28 in the bonus game, obtaining from the RAM 73 a symbol animation sound assigned to the number of related wild symbols 311*a* and output the symbol animation sound from the speaker 112 in sync with the animated motion of the wild symbol 311*a*.

Here, the "animated motion" is a motion created by a plurality of sill images. In the present embodiment, the wild symbol 311*a* adopts an image of lips which open and close.

Refer to FIG. 42. In a bonus game, a plurality of symbols are rearranged in the plurality of arrangement areas 28 displayed on the lower image display panel 141 of the slot machine 10 (see FIG. 42(*a*)). Next, when the wild symbols 311*a* among the symbols rearranged in the plurality of arrangement areas 28 relates to a winning (see FIG. 42(*b*)), a not-shown speaker 112 outputs a symbol animation sound saying "Good, Good!!". At this time, the two wild symbols 311*a* related to the winning make an animated motion of opening the lips to look as if the wild symbols 311*a* are saying the phrase in the symbol animation sound (see FIG. 42 (*c*)).

As described, when a payout is awarded in relation to the wild symbol 311*a* in the bonus game, the speaker 112 outputs a symbol animation sound corresponding to the number of the wild symbols 311*a* related to the payout. This could enable the player to show changes and a more advantageous situation he/she is in during the bonus game to the people around the player, and make the player feel better than the others.

Further, as is already mentioned, when a payout is to be awarded in relation to one or more wild symbols 311*a* in the bonus game, the or each of wild symbols 311*a* being capable of making an animated motion, obtaining a symbol animation sound assigned to the number of related wild symbols 311*a* and output the sound from the speaker 112 in sync with the animated motion of the specific symbol. This could enable the player to show changes and a more advantageous situation he/she is in during the bonus game to the people around the player, and make the player feel better than the others.

Figure 43:
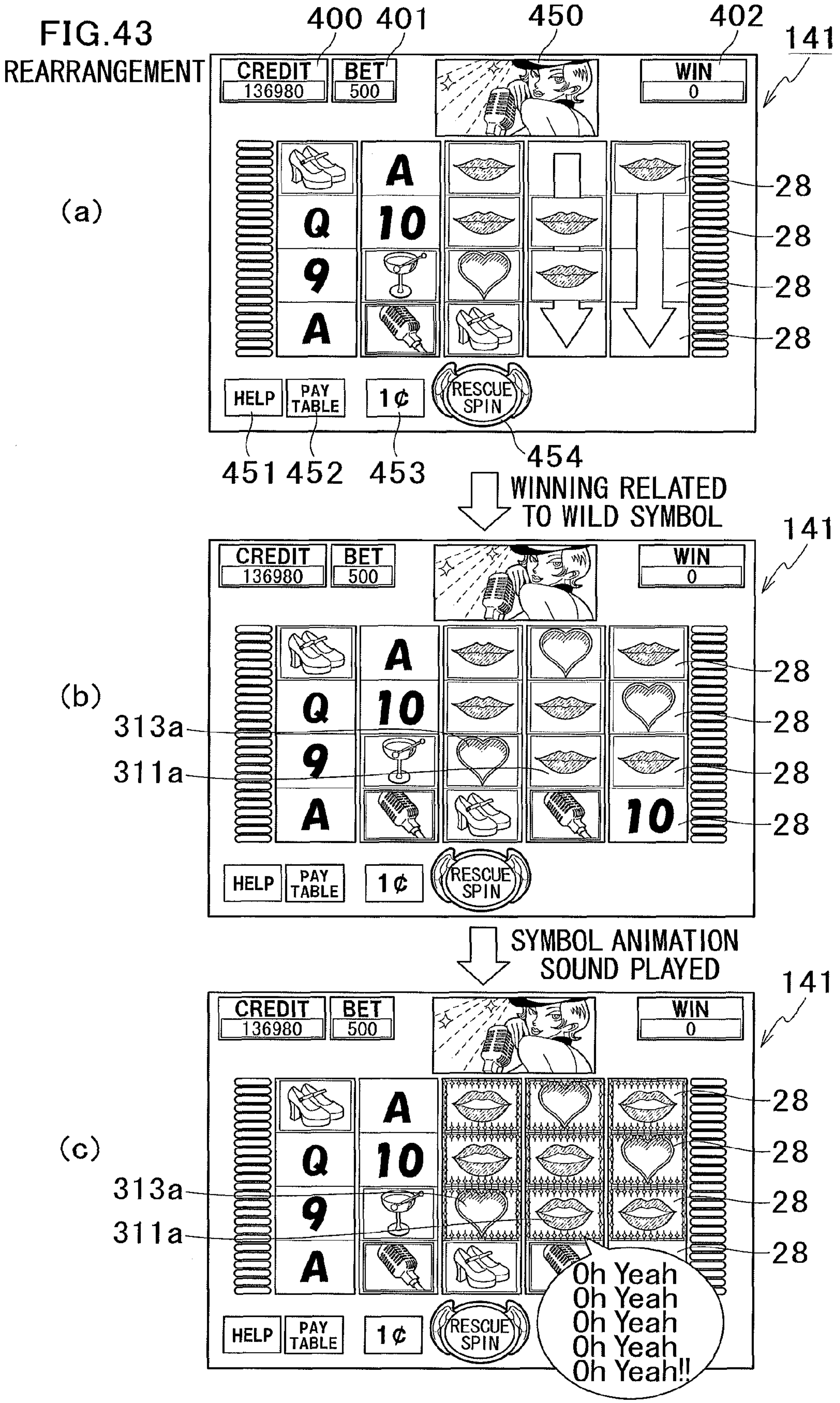
FIG. 43 outlines a game in a slot machine according to Fourth Embodiment of the present invention.

Further, as shown in FIG. 43, a slot machine 10 (gaming machine) of Fourth Embodiment, according to the present invention, includes:

a lower image display panel 141 having a plurality of arrangement areas 28 aligned in matrix for arranging therein a plurality of symbols including a wild symbol 311*a* capable of making an animated motion; and a RAM 73 that stores a plurality of types of symbol animation sounds each of which type is assigned to the number of wild symbols 311*a* to be rearranged in the arrangement areas 28, the slot machine 10 being capable of:

running a base game on condition that a game medium is bet, in which game symbols selected from the plurality of symbols are rearranged in the arrangement areas 28 and a payout is awarded according to a predetermined combination of symbols rearranged;

running a bonus game which is advantageous for a player and which offers a higher chance of payout than the base game, when a predetermined condition is met in the base game; and when a wild symbol 311*a* is rearranged in the arrangement area 28 in the bonus game, fixing the wild symbol 311*a* in that arrangement area 28;

when a payout is to be awarded in relation to the wild symbols 311*a* rearranged in the arrangement areas 28, including the wild symbol 311*a* having been rearranged and fixed in the arrangement areas 28, obtaining from the RAM 73 a symbol animation sound corresponding to the number of related wild symbols 311*a* and outputting the sound from the speaker 112 in sync with the animated motion of the wild symbol 311*a*.

Refer to FIG. 43. First, in the bonus game, a plurality of symbols are rearranged in the plurality of arrangement areas 28 displayed on the lower image display panel 141 provided to the slot machine 10 (see FIG. 43(*a*)). At this time, a wild symbol 311*a* having previously stopped is fixed on the symbol display device (lower image display panel 141). Next, if a winning is achieved in relation to six wild symbols 311*a*, out of the symbols rearranged in the plurality of arrangement areas 28, including the wild symbol 311*a* having been originally stopped and fixed and the wild symbols 311*a* newly arranged (see FIG. 43(*b*)), the not-shown speaker 112 outputs a symbol animation sound saying "Oh Yeah, Oh Yeah, Oh Yeah, Oh Yeah, Oh Yeah!!". At this time, the six wild symbols 311*a* related to the winning makes an animated motion of opening the lips so as to look as if the wild symbols 311*a* are saying the phrase of the symbol animation sound (see FIG. 43(*c*)).

As described, in the bonus game, when a wild symbol 311*a* capable of making an animated motion is rearranged in the arrangement area 28, the wild symbol 311*a* is fixed to that arrangement area 28. When a payout is to be awarded in relation to the wild symbols 311*a* rearranged in the arrangement areas 28, including the wild symbol 311*a* having been rearranged and fixed in the arrangement areas 28, a symbol animation sound corresponding to the number of related wild symbols 311*a* is obtained and is output from the speaker 112 in sync with the animated motion of the wild symbol 311*a*. This could enable the player to show changes and a more advantageous situation he/she is in during the bonus game to the people around the player, and make the player feel better than the others.

(Operation Flow of Slot Machine)

The slot machine 10 of Fourth Embodiment having the above described effect providing function executes sound contents determination processing for determining the sound for use in the bonus game in the effect content determining unit 491 shown in FIG. 2. Further, an effect storage memory 485 shown in FIG. 2 stores a symbol animation sound determination table. The following provides more details with reference to FIG. 44 showing the operation flow of the slot machine 10 of Fourth Embodiment.

Figure 44:
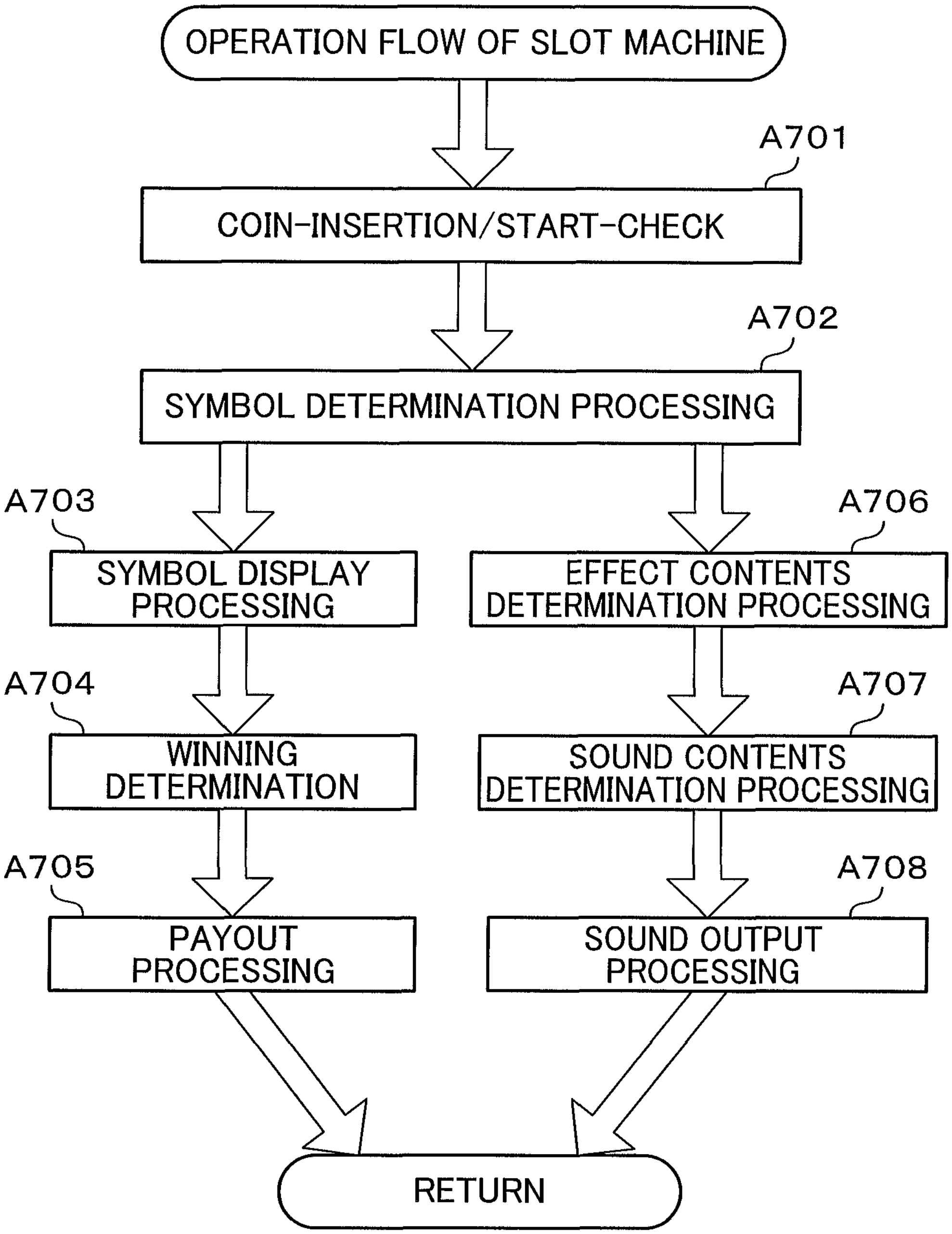
FIG. 44 is a view illustrating a operation flow of the slot machine according to Fourth Embodiment of the present invention.

First, as shown in FIG. 44, the slot machine 10 checks if the bet button unit 480 shown in FIG. 2 is pressed by a player, and if the spin button unit 481 is subsequently pressed by the player (Coin-insertion/Start-check: step A701). At the same time, the remaining credit amount is checked.

Next, when the player presses the spin button unit 481, the slot machine 10 extracts a random number for symbol determination. Then, for each of the plurality of video reel displayed on the display unit 482, the slot machine determines symbols to be presented to the player when scrolling of symbol arrays is stopped (symbol determination process: step A702).

Next, the slot machine 10 starts scrolling of the symbol array of each of the video reels and then stops scrolling so that the determined symbols are displayed for the player (symbol display process: step A703).

When scrolling of the symbol array of each video reel is stopped, the slot machine 10 determines whether or not a combination of symbols displayed for the player is a combination related to winning (winning determination: step A704).

When the combination of symbols displayed for the player is a combination related to winning, the slot machine 10 offers benefits according to the combination to the player (Payout Process: step A705). For example, when a combination of symbols relates to a payout of one or more coins, the slot machine 10 pays out to the player the number of coins according to the combination of symbols.

On the other hand, after the symbol determination process, the slot machine 10 randomly determines any one of the plurality of sets of predetermined effect contents, based on randomly determined symbols or the like (effect contents determination processing: step A706).

Then, the slot machine 10 determines the sound contents such as the symbol animation sound, based on the randomly determined symbols. At this time, when one or more wild symbols 311*a* among the determined symbols relate to a winning, the slot machine 10 determines one symbol animation sound out of seven types of symbol animation sounds indicated in the symbol animation sound table of FIG. 45 stored in the effect storage memory 485, according to the number of winning-related wild symbols 311*a* (sound contents determination processing: step A707).

Then, the slot machine 10 outputs from the speaker 112 the symbol animation sound thus determined (sound output process: step A708).

After the processes above, the step A701 is executed again. The basic functions of the slot machine 10 have been described above.

(Symbol Animation Sound Determination Table)

Next, FIG. 45 shows the symbol animation sound determination table. As shown in FIG. 45, the slot machine 10 of Fourth Embodiment has seven types of symbol animation sounds associated with different numbers of winning-related wild symbols 311*a* in the bonus game. The symbol animation sound determination table is stored in the RAM 73 shown in FIG. 10.

Specifically, when the number of winning-related wild symbols 311*a* is one, the speaker 112 outputs a symbol animation sound saying "Good". Further, when the number of winning-related wild symbols 311*a* is two, the speaker 112 outputs a symbol animation sound saying "Good, Good". Further, when the number of winning-related wild symbols 311*a* is three, the speaker 112 outputs a symbol animation sound saying "Good, Good, Good". When the number of winning-related wild symbols 311*a* is four, the speaker 112 outputs a symbol animation sound saying "Good, Good, Good, Good". When the number of winning-related wild symbols 311*a* is five, the speaker 112 outputs a symbol animation sound saying "Good, Good, Good, Good, Good". Further, when the number of winning-related wild symbols 311*a* is between six and nine, the speaker 112 outputs a symbol animation sound saying "Oh Yeah, Oh Yeah, Oh Yeah, Oh Yeah, Oh Yeah". When the number of winning-related wild symbols 311*a* is between ten and sixteen, the speaker 112 outputs a symbol animation sound saying "Excellent, Excellent, Excellent, Excellent, Excellent".

As described, the symbol animation sound is varied according to the number of winning-related wild symbols 311*a*. Further, the larger the number of the winning-related wild symbols 311*a*, the more up-tempo and more lively symbol animation sound is output from the speaker 112. This could enable the player to show changes and a more advantageous situation he/she is in during the bonus game to the people around the player, and make the player feel better than the others. The symbol animation sound however is not limited to those described above, and may be suitably modified as needed.

(Contents of Program)

Figure 46:
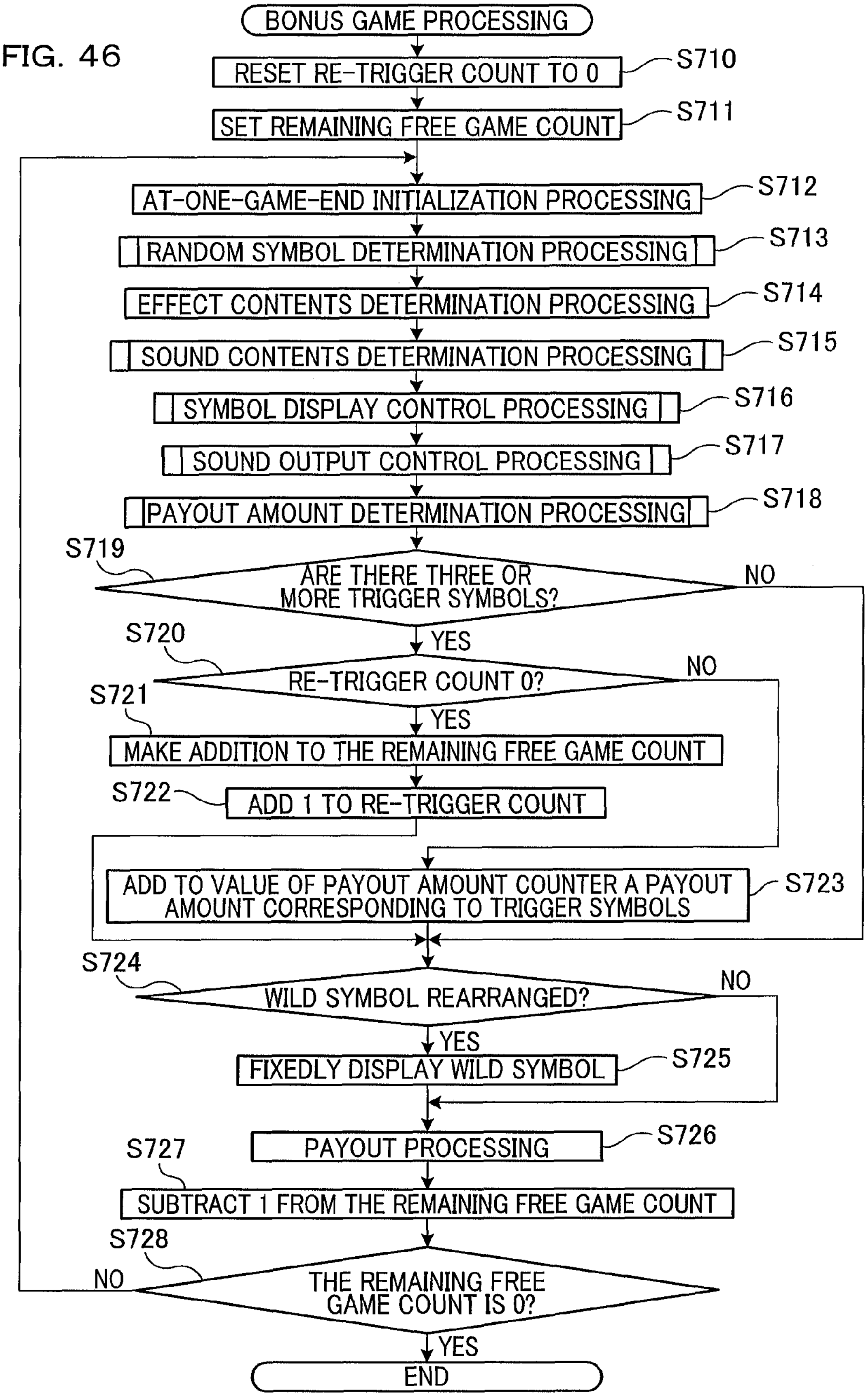
FIG. 46 shows a flowchart of the bonus game processing for the slot machine according to Fourth Embodiment of the present invention.
Figure 47:
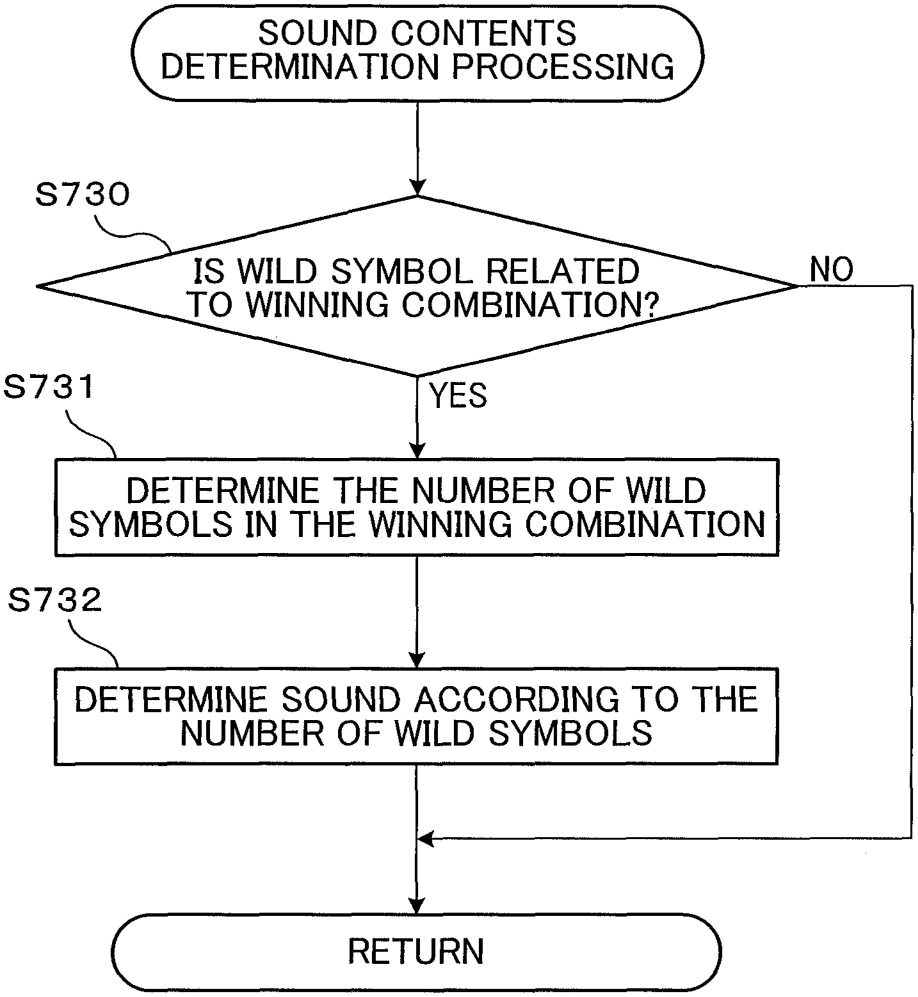
FIG. 47 is a view illustrating a flowchart of sound contents determination processing for the slot machine according to Fourth Embodiment of the present invention.
Figure 48:
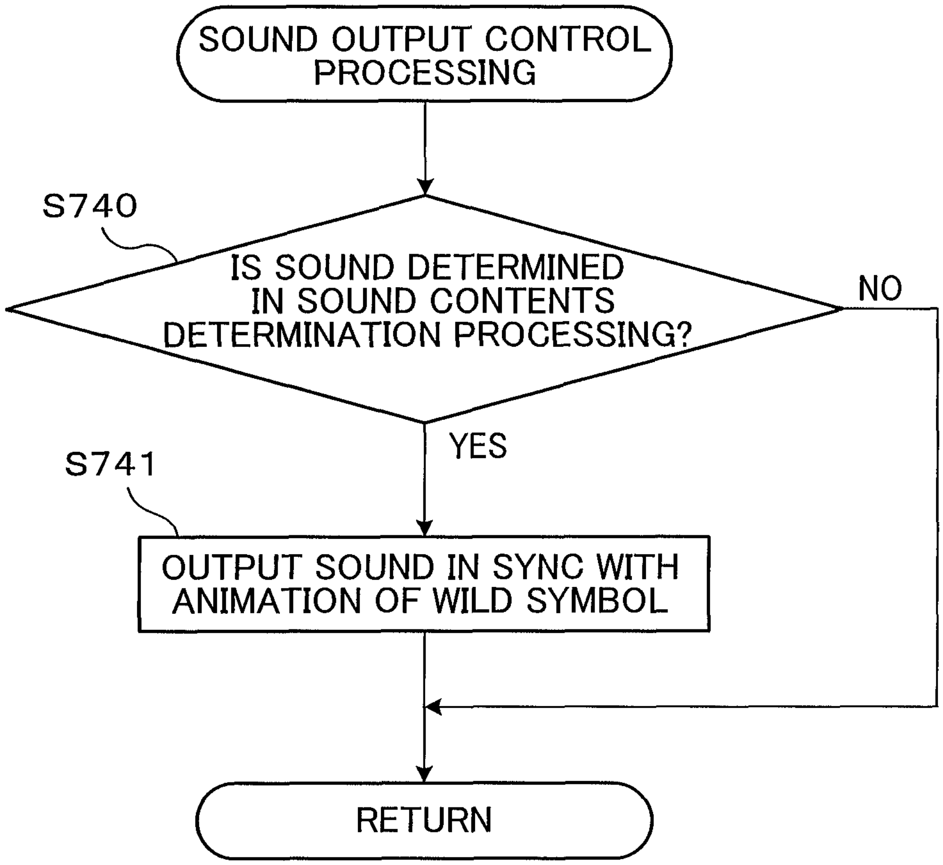
FIG. 48 is a view illustrating a flowchart of sound output control processing for the slot machine according to Fourth Embodiment of the present invention.

Next, with reference to FIGS. 46 to 48, the program to be executed by the slot machine 10 is described.

<Bonus Game Processing>

The slot machine 10 of Fourth Embodiment of the present invention executes the bonus game processing shown in FIG. 46, in place of the bonus game processing shown in FIG. 28. FIG. 46 shows a flowchart of the bonus game processing for the slot machine 10 according to Fourth Embodiment of the present invention.

First, the main CPU 71 sets a re-trigger count R so that R=0, in a re-trigger count storage area of the RAM 73 (step S710). Next, the main CPU 71 sets a remaining free game count T so that T=F (10 times in the present embodiment) in the free game count storage area of the RAM 73 (step S711). Further, the main CPU 71 displays a bonus game occurrence image on the lower image display panel 141.

Next, after step S711 the main CPU 71 executes at-one-game-end initialization processing (step S712). For example, data that becomes unnecessary after each game in the working areas of the RAM 73, such as the number of BETs and the symbols randomly determined, is cleared. After that, the main CPU 71 executes random symbol determination processing (step S713). In the processing, to-be-stopped symbols are determined based on the random number for symbol determination.

The main CPU 71 executes the effect contents determination processing (step S714). The main CPU 71 extracts an effect-use random number, and randomly determines any of the effect contents from the preset plurality of effect contents.

The main CPU 71 executes the sound contents determination processing (step S715). In this process, the sound according to the number of winning-related wild symbols 311*a* is determined, based on the to-be-stopped symbols determined through the random symbol determination processing of step S713. This is detailed later with reference to FIG. 47.

Next, the main CPU 71 executes the symbol display control processing (step S716). In the processing, scrolling of the symbol arrays is started, and the to-be-stopped symbol determined in the random symbol determination processing of step S713 is stopped at predetermined positions.

Next, the main CPU 71 executes a sound output control processing (step S717). In this process, a symbol animation sound determined in the sound contents determination processing of step S715 is output from the speaker 112. This is detailed later with reference to FIG. 48.

The main CPU 71 executes a payout amount determination processing (step S718). In the process, the payout amount is determined based on the combination of symbols displayed along the winning line L, and is stored into a payout amount counter provided in the RAM 73.

After the process of step S718, the main CPU 71 determines whether three trigger symbols (feature symbols 312*a*) are rearranged in the arrangement areas 28 (step S719). If the number of trigger symbols (feature symbols 312*a*) rearranged in the arrangement areas 28 is not three (step S719: NO), the process is shifted to step S724.

On the other hand, if it is determined that three trigger symbols (feature symbols 312*a*) are rearranged in the arrangement area 28 (step S719: YES), the main CPU 71 determines whether the re-trigger count R stored in the re-trigger count storage area of the RAM 73 is R=0 (step S720). If the re-trigger count R is determined as to be R=0 (step S720: YES), the a predetermined number (10 in the present embodiment) is added to the remaining free game count T stored in the free game count storage area of the RAM 73 (step S721), and 1 is added to the re-trigger count stored in the free game count storage area of the RAM 73 (step S722). The process then shifts to step S724.

On the other hand, when it is determined that the re-trigger count R is not R=0 (step S720: NO), the main CPU 71 adds a predetermined payout amount (3 in the present embodiment) to the value stored in the payout amount storage area of the RAM 73 (step S723). The process then shifts to step S724.

In step S724, the main CPU 71 determines whether a wild symbol 311*a* is rearranged. When it is determined that no wild symbol 311*a* is rearranged (step S724: NO), the process shifts to step S726.

On the other hand, when it is determined that a wild symbol 311*a* is rearranged (step S724: YES), the main CPU 71 fixedly displays that wild symbol 311*a* in such a manner that the wild symbol 311*a* is kept arranged in the same arrangement area 28 even in the subsequent free games in the bonus game (step S725). The process then shifts to step S726.

The main CPU 71 executes the payout processing (step S726).

Next, the main CPU 71 subtracts 1 from the remaining free game count T in the free game count storage area of the RAM 73 (step S727). Next, the main CPU 71 determines whether or not the remaining free game count T stored in the free game count storage area of the RAM 73 is T=0 (step S728). When it is determined that the remaining free game count T is not T=0 (step S728: NO), the main CPU 71 shifts the process to step S712. On the other hand, if it is determined that the remaining free game count T is T=0 (step S728: YES), the main CPU 71 ends the bonus game processing.

<Sound Contents Determination Processing>

FIG. 47 shows a flowchart of the sound contents determination processing of the slot machine 10 of Fourth Embodiment, according to the present invention.

When the sound contents determination processing is executed, the main CPU 71 determines whether a wild symbol 311*a* relates to a winning combination, based on the symbols determined in the random symbol determination processing of step S713 shown in FIG. 46. That is, as is already described with reference to FIG. 42 and FIG. 43, the main CPU 71 determines whether a wild symbol 311*a* having stopped or a wild symbol 311*a* having been stopped and fixedly displayed since the previous game relates to a winning (step S730).

When the main CPU 71 determines that no wild symbol 311*a* is related to the winning combination (step S730: NO), this sub routine is ended.

On the other hand, when the main CPU 71 determines that the wild symbol 311*a* is related to the winning combination (step S730: YES), the main CPU 71 counts the number of the wild symbols 311*a* related to the winning combination (step S731). Then, based on the symbol animation sound determination table described with reference to FIG. 45, the symbol animation sound is determined according to the number of winning-related wild symbols 311*a* (step S732).

Then, the main CPU 71 ends this sub routine.

<Sound Output Control Processing>

FIG. 48 is a view illustrating a flowchart of the sound output control processing of the slot machine 10 of Fourth Embodiment, according to the present invention.

When the sound output control processing is executed, the main CPU 71 first determines whether the symbol animation sound is determined in the sound contents determination processing described with reference to FIG. 47 (step S740).

When the main CPU 71 determines that the symbol animation sound is not determined (step S740: NO), this sub routine is ended.

On the other hand, when the main CPU 71 determines that the symbol animation sound is determined (step S740: YES), the symbol animation sound determined is output in sync with the animated motion of the wild symbol 311*a* (step S741).

Then, the main CPU 71 ends this sub routine.

(Outline of Fourth Embodiment)

As hereinabove described, the slot machine 10 of Fourth Embodiment in relation to the present invention is a slot machine 10 including:

a speaker 112 that outputs a symbol animation sound for providing an effect to a game;

a lower image display panel 141 having a plurality of arrangement areas 28 aligned in matrix for arranging therein a plurality of symbols including a wild symbol 311*a;* a RAM 73 that stores a plurality of types of symbol animation sounds each of which type is assigned to the number of wild symbols 311*a* to be rearranged in the arrangement areas 28;

the main CPU 71, wherein the main CPU 71 is programmed to execute the processes of:

(h1) running a base game on condition that a game medium is bet, in which game symbols selected from the plurality of symbols are rearranged in the arrangement areas 28 and a payout is awarded according to a predetermined combination of symbols rearranged;

(h2) running a bonus game which is advantageous for a player and which offers a higher chance of payout than the base game, when a predetermined condition is met in the base game; and (h3) when a payout is to be awarded in relation to one or more wild symbol 311*a* arranged in one or more of the arrangement areas 28 in the bonus game, obtaining from the RAM 73 a symbol animation sound assigned to the number of related wild symbols 311*a* and output the sound from the speaker 112.

In the above structure, when a payout is to be awarded in relation to one or more wild symbols 311*a* in the bonus game, a symbol animation sound assigned to the number of wild symbols 311*a* related to the payout is output from the speaker 112. This could enable the player to show changes and a more advantageous situation he/she is in during the bonus game to the people around the player, and make the player feel better than the others.

Further, the slot machine 10 of Fourth Embodiment in relation to the present invention is a slot machine 10 including:

a speaker 112 that outputs a symbol animation sound for providing an effect to a game;

a lower image display panel 141 having a plurality of arrangement areas 28 aligned in matrix for arranging therein a plurality of symbols including a wild symbol 311*a* capable of making an animated motion; and a RAM 73 that stores a plurality of types of symbol animation sounds each of which type is assigned to the number of wild symbols 311*a* to be rearranged in the arrangement areas 28; and a main CPU 71, wherein the main CPU 71 is programmed to execute the processes of:

(i1) running a base game on condition that a game medium is bet, in which game symbols selected from the plurality of symbols are rearranged in the arrangement areas 28 and a payout is awarded according to a predetermined combination of symbols rearranged;

(i2) running a bonus game which is advantageous for a player and which offers a higher chance of payout than the base game, when a predetermined condition is met in the base game; and (i3) when a payout is to be awarded in relation to one or more wild symbols 311*a* arranged in one or more of the arrangement areas 28 in the bonus game, obtaining from the RAM 73 a symbol animation sound assigned to the number of related wild symbols 311*a* and output the sound from the speaker 112 in sync with the animated motion of the wild symbol 311*a*.

In the above structure, when a payout is to be awarded in relation to one or more wild symbols 311*a* in the bonus game, the or each of wild symbols 311*a* being capable of making an animated motion, obtaining a symbol animation sound assigned to the number of related wild symbols 311*a* and output the sound from the speaker 112 in sync with the animated motion of the wild symbol 311*a*. This could enable the player to show changes and a more advantageous situation he/she is in during the bonus game to the people around the player, and make the player feel better than the others.

Further, a game control method of the present embodiment is a game control method of a slot machine 10 including:

a speaker 112 that outputs a symbol animation sound for providing an effect to a game;

a lower image display panel 141 having a plurality of arrangement areas 28 arranged in matrix for arranging therein the wild symbol 311*a;* a RAM 73 that stores a plurality of types of symbol animation sounds each of which type is assigned to the number of wild symbols 311*a* to be rearranged in the arrangement areas 28;

the gaming machine running a base game on condition that a game medium is bet, in which game symbols selected from the plurality of symbols are rearranged in the arrangement areas 28 and a payout is awarded according to a predetermined combination of symbols rearranged, and running a bonus game which offers to a player a higher chance of awarding a payout than the base game, the method comprising the steps of:

(j1) running the base game;

(j2) running the bonus game, when a predetermined condition is met in the base game;

(j3) when a payout is to be awarded in relation to one or more wild symbols 311*a* arranged in one or more of the arrangement areas 28 in the bonus game, obtaining from the RAM 73 a symbol animation sound assigned to the number of related wild symbols 311*a* and output the sound from the speaker 112.

In the above game control method, when a payout is to be awarded in relation to one or more wild symbols 311*a* in the bonus game, a symbol animation sound assigned to the number of wild symbols 311*a* related to the payout is output from the speaker 112. This could enable the player to show changes and a more advantageous situation he/she is in during the bonus game to the people around the player, and make the player feel better than the others.

The above Fourth Embodiment thus described solely serves as a specific example of the present invention, and the present invention is not limited to such an example. Specific structures and various means may be suitably designed or modified. Further, the effects of the present invention described in the above Fourth Embodiment are not more than examples of most preferable effects achievable by the present invention. The effects of the present invention are not limited to those described in Fourth Embodiments described above.

For example, Fourth Embodiment of the present invention deals with a case where, in a bonus game, the symbol animation sound is determined according to the number of wild symbols 311*a* related to a winning combination, in consideration of both the wild symbol 311*a* having been stopped and fixedly displayed since the previous game and the wild symbol 311*a* newly stopped by rearrangement. However, the present invention is not limited to this, and the symbol animation sound may be determined according to the number of wild symbols 311*a* related to the winning combination, only in consideration of the wild symbol 311*a* newly stopped after rearrangement, and the wild symbol 311*a* having been stopped and fixedly displayed since the previous game may be counted out.

Further, Fourth Embodiment of the present invention deals with a case where the symbol animation sound is determined according to the number of wild symbols 311*a* related to a winning combination, only in the bonus game. The present invention however is not limited to this, and the symbol animation sound may be determined according to the number of the wild symbols 311*a* related to the winning combination, also in the base game. Such a structure enable the player playing a base game to show a more advantageous situation he/she is in to the people around the player, and make the player feel better than the others, without transition to the bonus game.

Further, Fourth Embodiment of the present invention deals with a case where the symbol animation sound is varied according to the number of wild symbols 311*a* related to the winning combination. However, the present invention is not limited to this, and for example, it may be other effects such as the intensity of light or the frequency of blinking that is varied according to the number of wild symbols 311*a* related to the winning combination. Further, an effect which is a combination of the symbol animation sound and light may be provided. This could more effectively enable the player to show a more advantageous situation he/she is in to the people around the player, and make the player feel better than the others.

(Fifth Embodiment)

In addition to the above structure, the present specification also deals with the following structure. The structure is described below as Fifth Embodiment of the present invention. Note that members and parts that are identical to the foregoing embodiment are given the identical symbols, and no further explanations are provided.

Fifth Embodiment of the present invention relates to a gaming machine and a game control method thereof capable of providing an excitement to a player.

(Background Art of Fifth Embodiment)

There have been known slot machines configured to display a plurality of types of symbols scrolled and then stopped, and to award a predetermined amount of game media (e.g. a predetermined amount of coins or money) according to a combination of symbols presented after stopping the scroll. Such slot machines are disclosed in the specifications of U.S. Pat. Nos. 6,960,133, 6,012,983, and 6,093,102, for example.

Among those slot machines is a slot machine which runs a free game when a predetermined condition (e.g. rearrangement of a particular symbol during a game) is met during a game. The free game is a game playable without a need of betting a game media. For example, the specification of the publication of Australian patent application No. 200119729 discloses a slot machine which runs a free game as a sub game, when a predetermined condition (e.g. a particular arrangement of symbols) is met during a base game.

(Technical Problem to Be Solved by Invention of Fifth Embodiment)

Since the free game is played without consuming a game medium, players in general plays a game with a strong hope for occurrence of the free game. However, when repeating the free game a plurality of times, repeating the same type of game may cause the player to get board of the free game, and the player may no longer enjoy the excitement from the game.

The present invention is made in view of the above problem, and it is an object of the present invention to provide a gaming machine and a game control method which provides an exciting games to the player.

(Technical Solution of Fifth Embodiment)

A gaming machine of Fifth Embodiment, according to the present invention, is a gaming machine including: a display device which rearranges a plurality of symbols including a specific symbol, and which is capable of fixedly displaying the specific symbol;

a storage device storing a list of numbers of fixedly displayed specific symbols and associated BGM;

a speaker which outputs the BGM;

a controller programmed to execute the following processes of:

(k1) running a base game requiring a bet of a certain amount of game media, in which game symbols selected from the plurality of symbols are rearranged on the display device, and a certain amount of game media is awarded according to the rearranged symbols;

(k2) running a free game requiring a bet of a less amount of game media than the base game, which game rearranges symbols selected from the plurality of symbols on the display device, fixedly displays on the display device a specific symbol rearranged, and awards a certain amount of game media according to the rearranged symbols and the specific symbol fixedly displayed on the display device;

(k3) when a predetermined condition is met in the base game, running a special game that repeats the free game a plurality of number of times; and (k4) counting the number of specific symbols fixedly displayed at the start of the free game, and outputting the BGM associated with the number of specific symbols.

In the above structure, a specific symbol out of the symbols rearranged in the free game is fixedly displayed. The BGM in the free game is associated with the number of the fixedly displayed specific symbols. Further, a certain amount of game media is paid out in the free game according to the fixedly displayed specific symbol and the rearranged symbols. The BGM to be output in the free game is changed with an increase in the number of the fixedly displayed specific symbols relating to the amount of game media paid out. The change in the BGM output notifies the player of the change in the amount of the game medium to be paid out in the free game. The player therefore is able to get excited in every free game where an additional specific symbol may be stopped.

Further, in (k4), the controller raises the tempo of BGM output, with an increase in the number of specific symbols fixedly displayed on the display device.

In the above structure, the tempo of the BGM is raised according to an increase in the number of a specific symbols fixedly displayed. Thus, every time an additional specific symbol is fixedly displayed in the progression of the free game, the BGM is changed to more up-tempo BGM. As a result, the player is able to get further excitement from the game.

Further, a game control method of Fifth Embodiment, according to the present invention, is a game control method for a gaming machine, including the steps of:

running a base game requiring a bet of a certain amount of game media, in which game symbols selected from a plurality of symbols are rearranged on a display device, and a certain amount of game media is awarded according to the rearranged symbols;

running a free game requiring a bet of a less amount of game media than the base game, which game rearranges symbols selected from the plurality of symbols on the display device, fixedly displays on the display device a specific symbol rearranged, and awards a certain amount of game media according to the rearranged symbols and the specific symbol fixedly displayed on the display device;

when a predetermined condition is met in the base game, running a special game that repeats the free game a plurality of number of times; and counting the number of specific symbols fixedly displayed at the start of the free game, and outputting the BGM associated with the number of specific symbols.

In the above structure, a specific symbol out of the symbols rearranged in the free game is fixedly displayed. The BGM in the free game is associated with the number of the fixedly displayed specific symbols. Further, a certain amount of game media is paid out in the free game according to the fixedly displayed specific symbol and the rearranged symbols. The BGM to be output in the free game is changed with an increase in the number of the fixedly displayed specific symbols relating to the amount of game media paid out. The change in the BGM output notifies the player of the change in the amount of the game medium to be paid out in the free game. The player therefore is able to get excited in every free game where an additional specific symbol may be stopped.

(Advantageous Effect of Fifth Embodiment)

In the present invention, the change in the BGM output notifies the player of the change in the amount of the game medium to be paid out in the free game. The player therefore is able to get excited in every free game where an additional specific symbol may be stopped.

(Best Mode for Carrying Out the Invention of Fifth Embodiment)

The following will describe Fifth Embodiment of the present invention with reference to the figures.

(Gaming Machine Overview)

Figure 49:
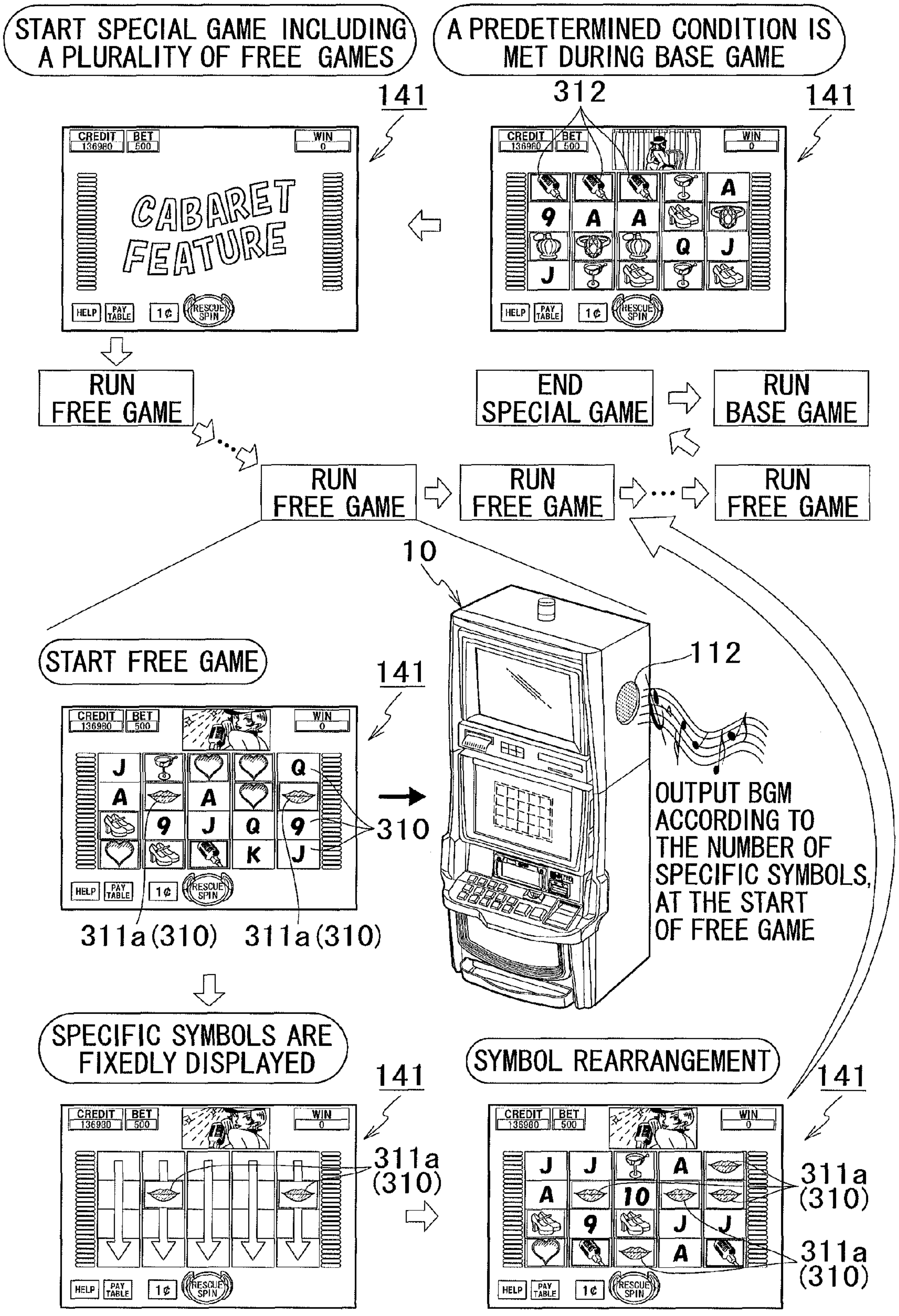
FIG. 49 outlines a game in a slot machine according to Fifth Embodiment of the present invention.

As shown in FIG. 49, a slot machine (gaming machine) 10 runs a special game which is a plurality of free games, when a predetermined condition is met in the base game. In each free game, if symbols 310 rearranged on the display device (lower image display panel 141) includes a specific symbol (wild symbol 311*a* in the present embodiment), the slot machine 10 fixedly displays that specific symbol on the lower image display panel 141 in the subsequent free games. Further, at the start of each free game, the slot machine 10 counts the number of specific symbols fixedly displayed, and outputs BGM associated with the number of the specific symbols.

This slot machine 10 in the present embodiment may be an independent model intended for a single player, or a slot machine 10 connected to and in communication with another slot machine 10 so as that the and the other slot machines 10 as a whole enable participation of plural players as illustrated in FIG. 4. The present embodiment deals with a case of a slot machine 10 of an independent model intended for a single player.

A game runnable with a bet of less game media than the base game is referred to as “free game”. The “bet of less amount of the game medium than the base game” encompasses betting of no game media. The “free game” therefore may be a game runnable without a bet of game medium. In other words, “free game” is a game which is started without the premise of consuming a game medium. The later-described “base game” on the other hand is a game run on condition that a certain amount of game media is bet. In other words, “base game” is a game which starts on the premise that a game media is consumed.

The expression “rearrange” means dismissing an arrangement of symbols 310, and once again arranging symbols 310. The expression “arrangement” means a state of symbols 310, which can be visibly confirmed by a player. Further, “special game” is a game in which the free game is repeated a plurality of number of times corresponding to a game repeat count. Note that the number of repetition of the free game in the special game may be preset or increased during the special game.

The “predetermined condition” is a condition such as the number of predetermined symbols (feature symbols 312*a* in the present embodiment) rearranged, the positions where such symbols are rearranged, the positional relation among the predetermined symbols, or the like, or a combination of these conditions.

The “fixedly display” means that, when symbols 310 rearranged on the lower image display panel 141 in each free game includes a specific symbol, the symbol 310 indicating the specific symbol is kept displayed in the same position of the lower image display panel 141, until the end of the special game including a plurality of free games. The present embodiment deals with a case where it is the specific symbol that is kept displayed. However, the present invention is not limited to this, and it is possible to fixedly display a symbol 310 different from the specific symbol, which indicates that the specific symbol will be kept displayed.

The expression “at the start of free game” means a period between the start of the special game until the time when symbols 310 are rearranged in a free game, or a period between the end of a game media awarding process which is after the rearrangement of symbols 310 in a previous free game and the time when symbols 310 are rearranged in the subsequent free game. For example, if no game medium is awarded in the previous free game, rearrangement of symbols 310 in the next free game may be set as the start of a free game. Further, for example, in the free game, the start of free game may be the start of displaying an effect which lasts until the symbols 310 rearranged and displayed in the previous free game are once again rearranged and displayed. Alternatively, any part of such an effect may be set as the start.

The expression "an increase in the number of specific symbols fixedly displayed on the display device (lower image display panel 141)" means that the number of the specific symbols 314 is increased as a result of having a specific symbol rearranged and fixedly displayed in a free game for the first time, or having a specific symbol rearranged and fixedly displayed in a position different from the positions of the specific symbols 314 having been already fixedly displayed. Note that the number of the specific symbols may be increased when a specific symbol is to be rearranged in a position where a specific symbol 314 has been already been fixedly displayed, by fixedly displaying that specific symbol in a different position.

Specifically, the slot machine 10 includes: a lower image display panel 141 on which a plurality of symbols 310 including a specific symbol 314 are rearranged; a store storage device (RAM 73) storing a list of numbers of fixedly displayed specific symbols 314 and associated BGM; a speaker 112 which outputs the BGM; and a controller 499 programmed to execute the following steps of (k1) to (k4).

(k1) A base game is run which requires a bet of a certain amount of game media, in which game symbols 310 selected from the plurality of symbols 310 are rearranged on the lower image display panel 141, and a certain amount of game media is awarded according to the rearranged symbols 310. (k2) A free game is run which requires a bet of a less amount of game media than the base game, and which game rearranges symbols 310 selected from the plurality of symbols 310 on the lower image display panel 141, fixedly displays on the lower image display panel 141 a specific symbol rearranged, and awards a certain amount of game media according to the rearranged symbols 310 and the specific symbol fixedly displayed on the lower image display panel 141. (k3) When a predetermined condition is met in the base game, a special game is run which repeats the free game a plurality of number of times. (k4) The number of specific symbols fixedly displayed at the start of the free game is counted, and the BGM associated with the number of specific symbols is output.

The slot machine (gaming machine) 10 having such a structure realizes a game control method wherein, when symbols 310 rearranged on the lower image display panel 141 in any free game of the special game includes a specific symbol, the specific symbol is fixedly displayed on the lower image display panel 141, the number of specific symbols fixedly displayed is counted at the start of each free game, and BGM is output according to the number of the specific symbols.

Specifically, the game control method of the slot machine 10 includes the steps of: running a base game requiring a bet of a certain amount of game media, in which game symbols 310 selected from a plurality of symbols 310 are rearranged on the lower image display panel 141, and a certain amount of game media is awarded according to the rearranged symbols 310;

running a free game requiring a bet of a less amount of game media than the base game, which game rearranges symbols 310 selected from the plurality of symbols 310 on the display device the lower image display panel 141, fixedly displays on the display device the lower image display panel 141*a* specific symbol rearranged, and awards a certain amount of game media according to the rearranged symbols and the specific symbol fixedly displayed on the lower image display panel 141;

when a predetermined condition is met in the base game, running a special game that repeats the free game a plurality of number of times; and counting the number of specific symbols fixedly displayed at the start of the free game, and outputting the BGM associated with the number of specific symbols.

In the slot machine 10 or the game control method having the above described structure or the steps, a specific symbol 310 out of the symbols rearranged in the free game is fixedly displayed. The BGM in the free game is associated with the number of the fixedly displayed specific symbols. Further, a certain amount of game media is paid out in the free game according to the fixedly displayed specific symbol and the rearranged symbols. The BGM to be output in the free game is changed with an increase in the number of the fixedly displayed specific symbols relating to the amount of game media paid out. The change in the BGM output notifies the player of the change in the amount of the game medium to be paid out in the free game. The player therefore is able to get excited in every free game where an additional specific symbol may be stopped.

Further, when symbols 310 rearranged on the lower image display panel 141 in any free game of the special game includes a specific symbol, the slot machine 10 fixedly displays the specific symbol on the lower image display panel 141, counts the number of specific symbols fixedly displayed at the start of each free game, and raises the tempo of BGM according to an increase in the number of the specific symbols fixedly displayed on the lower image display panel 141.

The expression "raises the tempo of BGM according to an increase in the number of specific symbols" indicates that a faster piece of BGM is associated with the greater number of specific symbols stored in the RAM 73. It is not necessary to associate a piece of BGM for each of the different numbers of specific symbols. One piece of BGM may be associated with a predetermined range of numbers of specific symbols. In this case, for example, the tempo of BGM output is raised every time the number of specific symbols increases by a predetermined amount.

The slot machine (gaming machine) 10 having such a structure realizes a game control method wherein, when symbols 310 rearranged on the lower image display panel 141 in any free game of the special game includes a specific symbol, the specific symbol is fixedly displayed on the lower image display panel 141, the number of specific symbols fixedly displayed is counted at the start of each free game, and BGM is output according to the number of the specific symbols. Further, the slot machine (gaming machine) 10 having such a structure realizes a game control method wherein, when symbols 310 rearranged on the lower image display panel 141 in any free game of the special game includes a specific symbol, the specific symbol is fixedly displayed on the lower image display panel 141, the number of specific symbols fixedly displayed is counted at the start of each free game, and the tempo of BGM is raised according to an increase in the number of the specific symbols fixedly displayed on the lower image display panel 141.

Specifically, the game control method of the slot machine 10 includes the steps of: running a base game requiring a bet of a certain amount of game media, in which game symbols 310 selected from a plurality of symbols 310 are rearranged on the lower image display panel 141, and a certain amount of game media is awarded according to the rearranged symbols 310;

running a free game requiring a bet of a less amount of game media than the base game, which game rearranges symbols 310 selected from the plurality of symbols 310 on the lower image display panel 141, fixedly displays on the lower image display panel 141*a* specific symbol rearranged, and awards a certain amount of game media according to the rearranged symbols and the specific symbol fixedly displayed on the lower image display panel 141;

when a predetermined condition is met in the base game, running a special game that repeats the free game a plurality of number of times; and counting the number of specific symbols fixedly displayed at the start of the free game, and raising the tempo of the BGM according to an increase in the number of specific symbols fixedly displayed on the lower image display panel 141.

In the slot machine 10 or the game control method having the above described structure and the steps, the tempo of the BGM is raised according to an increase in the number of a specific symbols fixedly displayed. Thus, every time an additional specific symbol is fixedly displayed in the progression of the free game, the BGM is changed to more up-tempo BGM. As a result, the player is able to get further excitement from the game.

(Function Flow Block of Slot Machine 10)

The following describes functions of the slot machine (gaming machine) 10 of the present embodiment having the above described structure, with reference to FIG. 2.

An effect storage memory 485 stores a list of numbers of specific symbols and associated pieces of BGM. Further, the effect storage memory 485 stores position information of the specific symbols to be fixedly displayed. A speaker unit 497 outputs BGM according to the number of the specific symbols fixedly displayed.

The special game start determination unit 476 determines whether to run a special game, based on a combination of rearranged symbols 310 in the base game. Specifically, the special game start determination unit 476 has a function of determining whether symbols 310 rearranged in the base game satisfies a predetermined condition, and if the predetermined condition is met, instructing a special game running unit 477 to run the special game. That is, the special game start determination unit 476 determines whether to start the special game which runs a plurality of the subsequent unit games as a free game, when the symbols 310 rearranged in the base game satisfies a predetermined condition.

Note that a “unit game” includes a series of operations executed within a period between a start of receiving a bet to a point where a winning may be resulted. That is, bet time for receiving a bet, rearrangement of symbols having been stopped, and a payout time for the payout processing to award a payout are executed once each within a single unit game. Note that, if the free game is started without a need of placing a bet, the unit game does not include the bet time.

The special game running unit 477 has a function of running a special game that repeats the free game a plurality of number of times corresponding to a game repeat count, based on an instruction given by the special game start determination unit 476.

The symbol determining unit 489 has functions of: during the free game, selecting symbols 310 to be rearrange in positions other than the fixedly displaying position of the specific symbol stored in the effect storage memory 485, by using a random number from a symbol determination random number sampling unit 488; rearranging the selecting symbols 310 in the symbol display region 483 of the display unit 482 serving as the display device; storing in the effect storage memory 485 the position of the specific symbol among the selected symbols 310, as the position information of the fixedly displayed specific symbol; and fixedly displaying the specific symbol in the symbol display region 483 of the display unit 482, based on the effect storage memory 485. Further, the symbol determining unit 489 outputs information of the symbols 310 to be rearranged in the free game and information of the specific symbol fixedly displayed, to the winning determining unit 493.

The effect content determining unit 491 has functions of: counting the specific symbols fixedly displayed by using the position information of the fixedly displayed specific symbols stored in the effect storage memory 485; selecting BGM according to the number of the specific symbols fixedly displayed; and outputting the BGM determined to the speaker unit 497.

The winning determining unit 493 has functions of: determining whether or not a winning is achieved based on the information of the symbols 310 rearranged and the specific symbols fixedly displayed, which is output from the symbol determining unit 489, in the free game; when it is determined that a winning is achieved, calculating an amount of payout based on the winning combination; and outputting a payout signal based on the amount of payout to the payout unit 496.

That is, in the free game, there is paid out a certain amount of game media according to the rearranged symbols 310 and the specific symbols fixedly displayed on the display unit 482

(Operation of Slot Machine 10)

Figure 50:
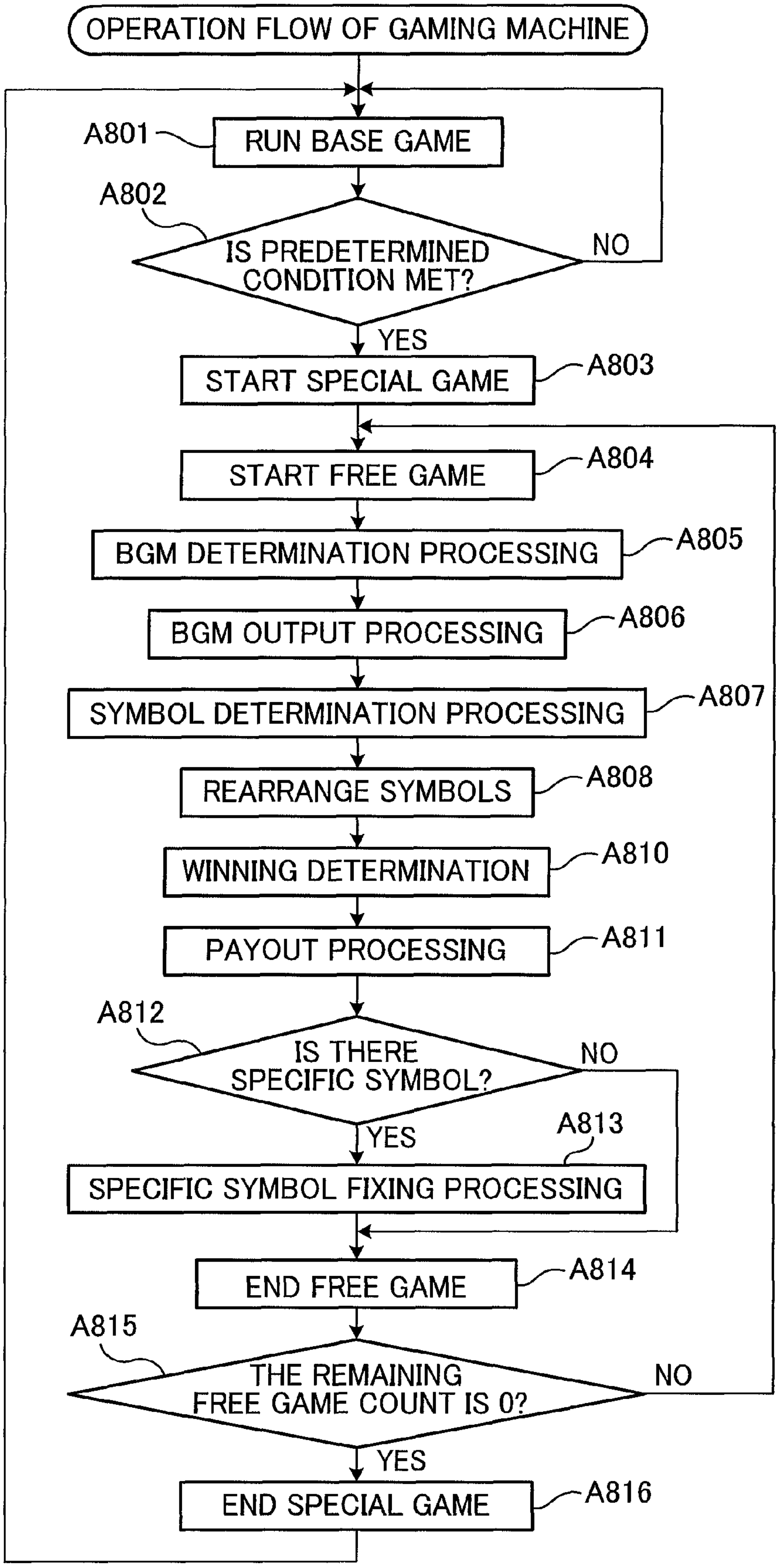
FIG. 50 is a view illustrating a operation flow of the slot machine according to Fifth Embodiment of the present invention.

With reference to a flowchart of FIG. 50, the following describes an operation of the slot machine (gaming machine) 10 having the above described functional blocks.

First, the slot machine 10 runs a base game (step A801). The base game is as described hereinabove.

Next, the slot machine 10 determines whether a predetermined condition is met (step A802). When it is determined that the predetermined condition is not met (step A802: NO), the process returns to step A801. On the other hand, when it is determined that the predetermined condition is met (step A802: YES), the slot machine 10 starts the special game (step A803).

After the start of the special game, the slot machine 10 starts a free game (step A804). Then, when the free game is started, the BGM determination processing is executed (step A805). Specifically, the effect storage memory 485 counts the specific symbols fixedly displayed by using the position information of the fixedly displayed specific symbols, and then selects the associated piece of BGM from the effect storage memory 485. Then, a BGM output process is executed to output the BGM determined in the BGM determination processing (step A806).

Next, the slot machine 10 extracts a random number for symbol determination, and determines symbols 310 to be rearranged in positions of the symbol display region 483 on the display unit 482, other than the position where the specific symbol is fixedly displayed (step A807).

Next, the slot machine 10 rearranges the symbols 310 thus determined in the symbol display region 483 of the display unit 482 (step A808). At this time, the specific symbol is fixedly displayed in the position indicated by the position information stored in the effect storage memory 485.

Next, the slot machine 10 determines whether a combination of the symbols 310 displayed on the display unit 482 relates to a winning (step A810). Next, when the combination of the symbols 310 displayed on the display unit 482 relates to a winning, the slot machine 10 awards a benefit to a player according to the type of combination of the symbols 310 (step A811).

Next, the slot machine 10 determines whether symbols 310 displayed on the display unit 482 includes a specific symbol (step A812). If it is determined that the specific symbol is included (step A812: YES), a specific symbol fixing process is executed (step A813). Specifically, the position where the specific symbol is rearranged is stored as position information in the effect storage memory 485.

After step A813, or if it is determined in step A812 that no specific symbol 314 is included (step A812: NO), the free game is ended (step A814). After that, there is determined whether the remaining free game count is "0" (step A815). When it is determined that the remaining free game count is "0" (step A815: YES), the special game is ended (step A816). In a process of ending the special game, the position information in the effect storage memory 485 is reset. Then, the process returns to step A801, and the base game is run. On the other hand, when it is determined that the remaining free game count is not "0" (step A815: NO), the process returns to step A804, and the free game is repeated.

(Effect Mode)

The following describes an exemplary effect on the lower image display panel (display device) 141 during the special game, in the operation of the slot machine 10. Note that the present embodiment deals with a case where the specific symbol to be fixedly displayed is a wild symbol 311*a*. However, the present invention is not limited to this. Further, the special game is hereinafter referred to as "bonus game".

(Bonus Game Screen)

Figure 53:
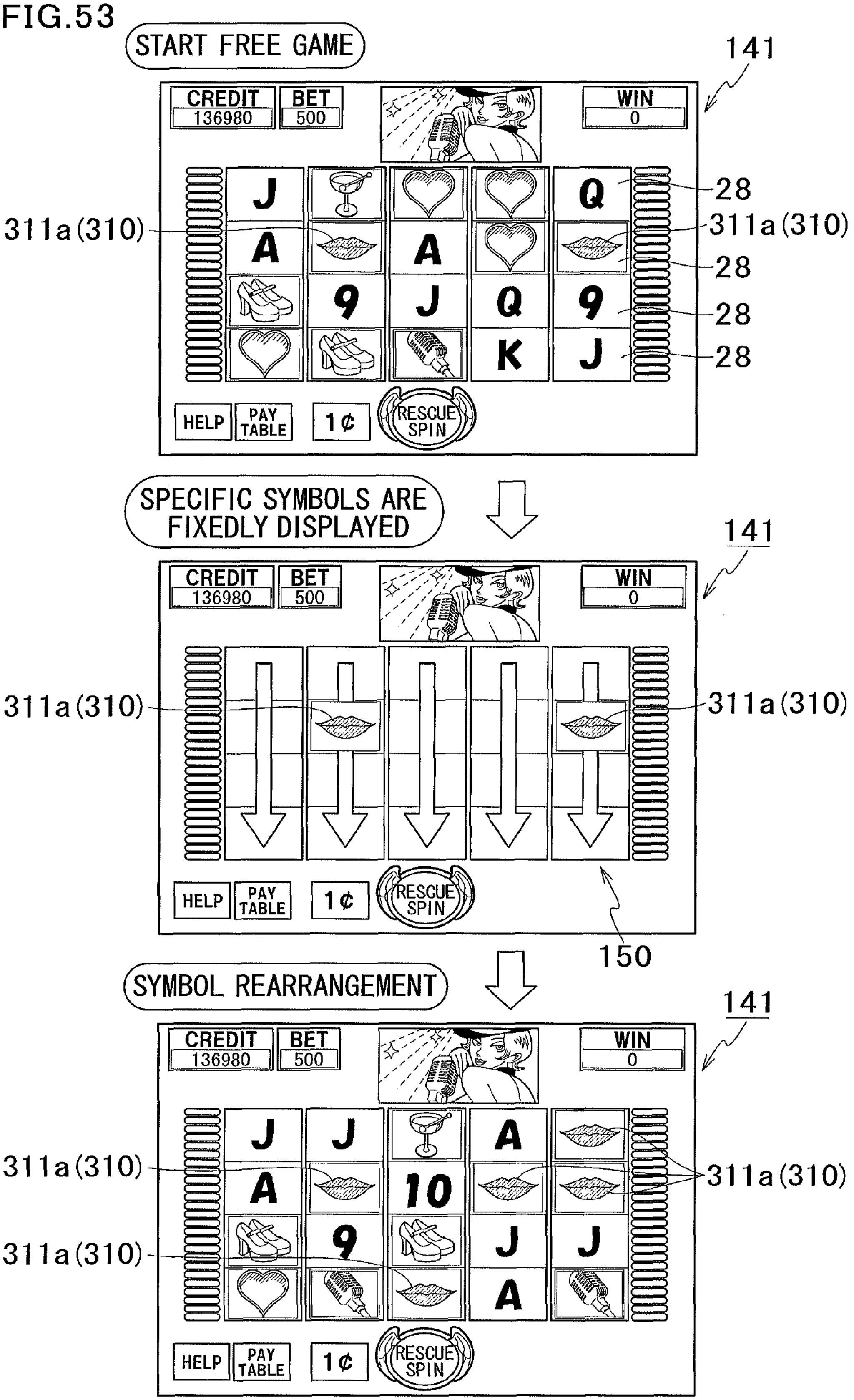
FIG. 53 is a view illustrating states of effect in the slot machine according to Fifth Embodiment of the present invention.

FIG. 53 shows a display state of a unit game, in relation to a single free game of the bonus game. The upper area of FIG. 53 shows arrangement of symbols 310 at the start of the free game. Note that the arrangement of the symbols 310 at the start of a free game is the same as the arrangement of symbols 310 rearranged in the previous free game. As is described, the display window 150 in which symbols 310 are rearranged has a plurality of arrangement areas 28 arranged in matrix of five columns and four rows. In the upper area of FIG. 53, a total of two wild symbols 311*a* are displayed: one of which is at the second column of the second row, and the other at the fifth column of the second row. These wild symbols 311*a* are rearranged and fixedly displayed in the previous free game, or in a free game even before the previous free game, and are specific symbols to be fixedly displayed in the current free game.

The middle part of FIG. 53 shows the display window 150 being scrolled for rearranging the symbols 310. During this scroll, the above mentioned two wild symbols 311*a* are fixedly displayed. That is, of the arrangement areas 28, the wild symbols 311*a* are fixedly displayed at the second column of the second row and the fifth column of the second row. Scrolling occurs in the other arrangement areas 28. In the present embodiment, the number of fixedly displayed wild symbol 311*a* is counted based on the specific symbol count table, before the scroll is started. Further, there is provided an effect such that BGM corresponding to the number of wild symbols 311*a* is selected by referring to a BGM determination data table stored in the RAM 73, and is output from the speaker 112 (see FIG. 49). Note that, in the present embodiment, it is only the second to fifth symbol arrays that contains the wild symbols 311*a* (see FIG. 9). Therefore, there is a possibility of fixedly displaying as many as sixteen wild symbols 311*a*.

(Data Table)

The following describes the above mentioned specific symbol count table and the BGM determination table, with reference to FIG. 51 and FIG. 52.

(Specific Symbol Count Table)

The following describes a specific symbol determination table stored in the RAM 73, with reference to FIG. 51. The specific symbol count table has a position information column and a fixed-display state column. The position information column stores position information of the arrangement areas 28 except for those in the first column. The fixed-display state column stores information on whether or not a wild symbol 311*a* is fixedly displayed in a position indicated by the position information. Specifically, "0" in the fixed-display state column indicates that no wild symbol 311*a* is fixedly displayed in the corresponding position, and "1" in the fixed-display state column indicates that a wild symbol 311*a* is fixedly displayed in the corresponding position. In the example of FIG. 51, "1" is stored in relation to the second column of the second row, and the fifth column of the second row. This corresponds to the display condition as shown in the upper area and the middle area of FIG. 53.

(BGM Determining Table)

The following describes a BGM determination table stored in the RAM 73, with reference to FIG. 52. The BGM determination table includes a wild symbol count column and a BGM column. The wild symbol count column stores the number of wild symbols, or the range of the number of wild symbols. The BGM column stores BGM associated with the number of the wild symbols or the range of the number of the wild symbols.

Specifically, when the number of fixedly displayed wild symbols 311*a* is 0, BGM1 at the BPM (Beat Per Minute) of 80 is selected. Further, when the number of fixedly displayed wild symbols 311*a* ranges from 1 to 4, BGM2 at the BPM of 100 is selected. Further, when the number of fixedly displayed wild symbols 311*a* ranges from 5 to 9, BGM3 at the BPM of 120 is selected. Further, when the number of fixedly displayed wild symbols 311*a* ranges from to 16, BGM4 at the BPM of 160 is selected. As described, BGM to be determined is varied according to the number of the fixedly displayed wild symbols 311*a*. Further, the more up-tempo BGM is determined for a larger number of fixedly displayed wild symbols 311*a*.

The lower area of FIG. 53 shows the state where symbols 310 are rearranged in the arrangement areas 28 except for the arrangement areas 28 in which the fixedly displayed wild symbols 311*a* are arranged. In the example of the lower area of the FIG. 53, the wild symbols 311*a* are additionally rearranged in the third column of the fourth row, the fourth column of the second row, and the fifth column of the first row. That is, if there is another free game, a wild symbol 311*a* is displayed in addition to two wild symbols 311*a* having already been fixedly displayed and there will be three wild symbols 311*a* fixedly displayed. This means that the corresponding positions of the specific symbol count table are changed to "1".

Further, for example, suppose that a payline 160 that covers the entire second row is activated. In the example of the lower area of FIG. 53, the wild symbols 311*a* are fixedly displayed at the second column of the second row and the fifth column of the second row, and the symbol 310 of "10" is rearranged at the third column of the second row and another wild symbol 311*a* is rearranged at the fourth column of the second row. Therefore, at least a winning involving the symbol of "10" is determined. That is, the player is able to receive a payout equivalent to the payout obtained when a winning is achieved by having four symbols of "10" aligned on the payline 160.

The BGM in the free game is associated with the number of the fixedly displayed wild symbols 311*a*. Further, a certain amount of game media is paid out in the free game according to the fixedly displayed wild symbol 311*a* and the rearranged symbols 310. The BGM to be output in the free game is changed with an increase in the number of the fixedly displayed wild symbols 311*a* relating to the amount of game media paid out. The change in the BGM output notifies the player of the change in the amount of the game medium to be paid out in the free game. The player therefore is able to get excited in every free game where an additional wild symbol 311*a* may be stopped.

Further, the every time the free game is repeated and the wild symbol 311*a* is rearranged, the number of wild symbols 311*a* fixedly displayed is increased. The tempo of BGM is increased according to this increase in the number of wild symbols 311*a* fixedly displayed. In the BGM determination table, the tempo of BGM is raised sequentially from the BGM1 to BGM4. Therefore, more up-tempo BGM is selected with an increase in the number of the wild symbols 311*a* fixedly displayed. Thus, every time an additional wild symbol 311*a* is rearranged and fixedly displayed in the progression of the free game, the BGM is changed to more up-tempo BGM. As a result, the player is able to get further excitement from the game.

(Bonus Game Processing)

Figure 54:
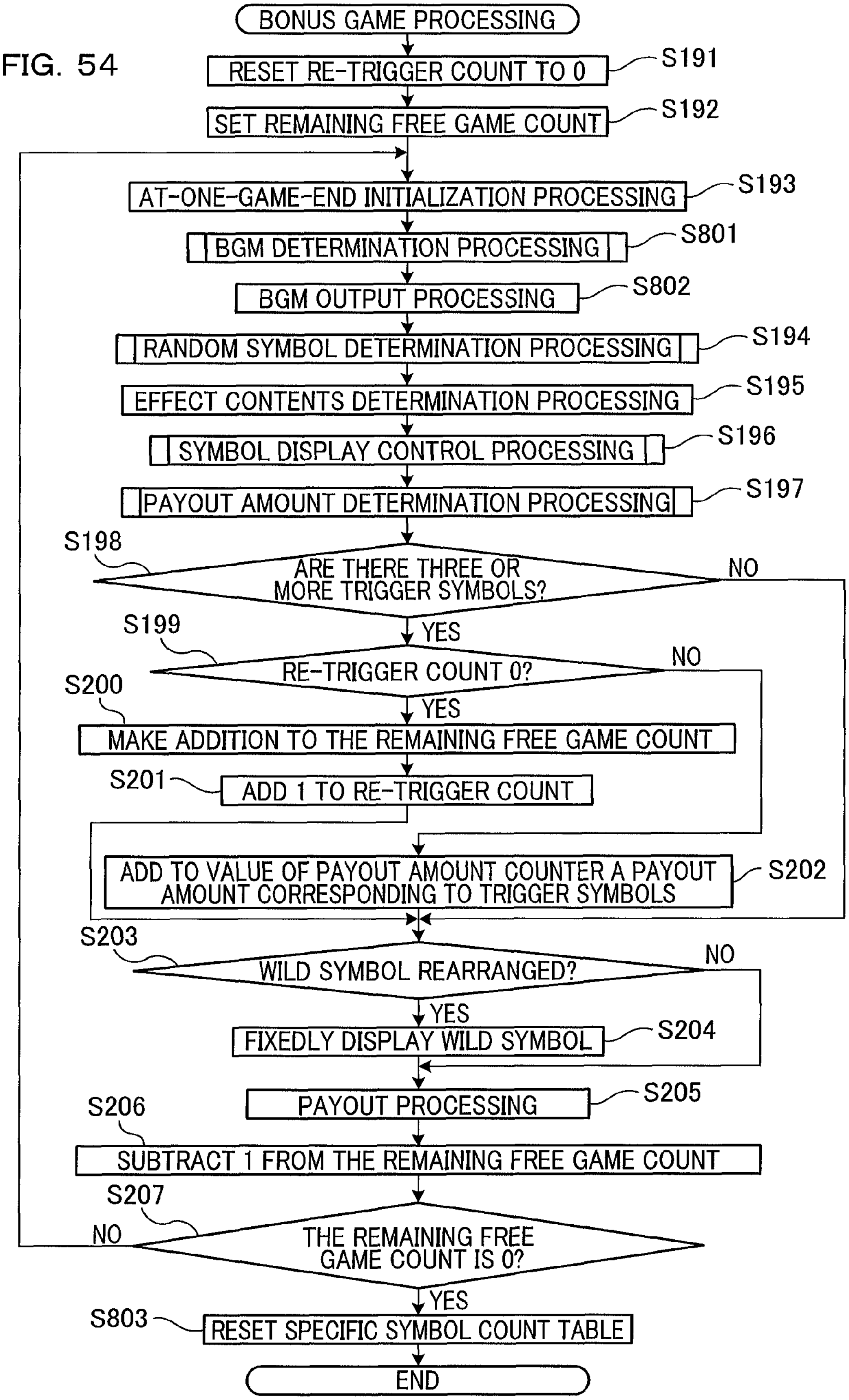
FIG. 54 shows a flowchart of the bonus game processing for the slot machine according to Fifth Embodiment of the present invention.
Figure 55:
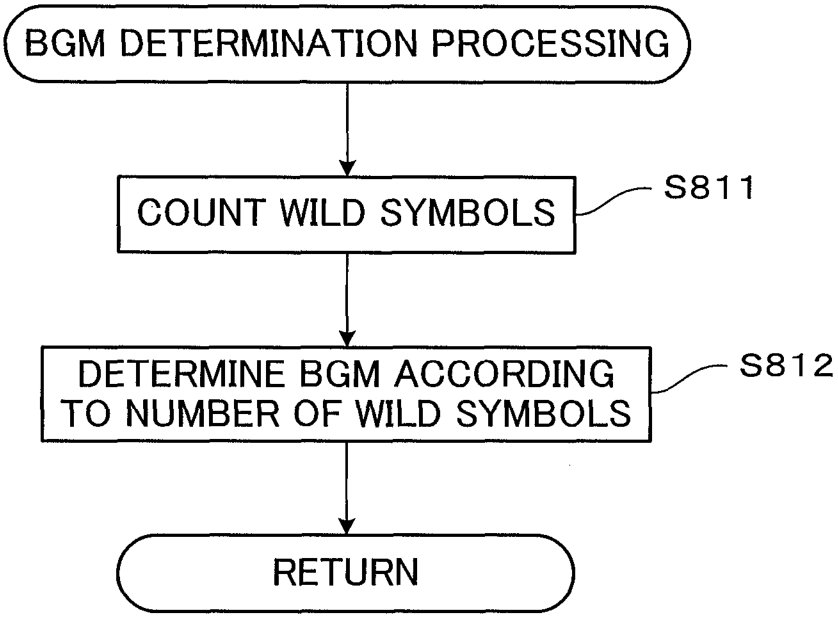
FIG. 55 is a view illustrating a flowchart of a BGM determination processing for the slot machine according to Fifth Embodiment of the present invention.

Next, the following describes the bonus game processing with reference to FIG. 54 and FIG. 55. Note that no further description is provided as to the steps that are identical to those of the first embodiment which are described with reference to FIG. 28.

In the bonus game processing of the present embodiment, the main CPU 71 first executes the processes of step S191, step S192, and step S193, and executes the BGM determination processing thereafter (step S801). Specifically, as shown in FIG. 55, in the BGM determination processing, the main CPU 71 counts the number of fixedly displayed wild symbols 311*a* referring to the specific symbol count table of FIG. 51 (step S811). Then, referring to the BGM determination table of FIG. 52, the main CPU 71 selects the BGM corresponding to the number of counted wild symbols 311*a* (step S812). The process then returns to the bonus game processing.

The main CPU 71 executes a BGM output process (step S802). That is, the main CPU 71 executes control for outputting the BGM determined in step S801 from the speaker 112. Then, the main CPU 71 executes the processes of step S194 and step S195.

Next, the main CPU 71 executes the symbol display control processing (step S196). This is the same process as that described in the first embodiment, except in additional control is executed while the symbol arrays are scrolling, for keeping wild symbols 311*a* fixed as is shown in the middle part of FIG. 53 in positions indicated by the specific symbol count table of FIG. 51 for fixedly displaying the wild symbols 311*a*. In short, scrolling does not take place in these positions. The main CPU 71 then executes control for stopping (rearranging) the symbols 310 in the arrangement areas 28 other than the above mentioned positions.

Next, the main CPU 71 executes a payout amount determination processing (step S197). In this process, a payout amount is determined based on the fixedly displayed wild symbols 311*a* and the rearranged symbols 310 other than those fixedly displayed. Then, the main CPU 71 executes the processes of step S198 to step S202.

Next, the main CPU 71 determines if a wild symbol 311*a* is rearranged additionally to those having been fixedly displayed (step S197). When it is determined that no additional wild symbol 311*a* is rearranged (step S203: NO), the process shifts to step S205. On the other hand, when it is determined that there is additional wild symbol 311*a* rearranged (step S203: NO), the main CPU 71 updates the fixedly display state of the corresponding position in the specific symbol count table of FIGS. 51 to "1", and executes the process for fixedly displaying the wild symbol 311*a* (step S204). Thus, the additionally rearranged wild symbol 311*a* is fixed to the same arrangement area 28 in the subsequent free games of the same bonus game. The main CPU 71 then executes processes of step S205 to step S207.

In the process of S207, if it is determined that the remaining free game count is 0 (step S207: YES), the main CPU 71 executes a specific symbol count table reset process. Specifically, the main CPU 71 stores "0" in the fixedly display state of all the positions in the specific symbol count table. Thus, when the first free game is run when the subsequent special game is started, there will be no fixedly displayed symbols in the first free game, and BGM corresponding to a case of no fixedly displayed symbols is output. Then, the main CPU 71 ends this routine.

The BGM in the free game is associated with the number of the fixedly displayed wild symbols 311*a*. Further, a certain amount of game media is paid out in the free game according to the fixedly displayed wild symbol 311*a* and the rearranged symbols 310. The BGM to be output in the free game is changed with an increase in the number of the fixedly displayed wild symbols 311*a* relating to the amount of game media paid out. The change in the BGM output notifies the player of the change in the amount of the game medium to be paid out in the free game. The player therefore is able to get excited in every free game where an additional wild symbol 311*a* may be stopped.

(Modification of First Embodiment)

The above embodiment thus described solely serves as a specific example of the present embodiment, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

For example, the present embodiment deals with a case where the BGM is determined according to the number of the wild symbols 311*a* indicated in the BGM determination table. However, the present invention is not limited to this, and the BGM may be determined according to the number of wild symbols 311*a* which is not the number of wild symbols 311*a* indicated in the BGM determination table.

Further, in the present embodiment, the tempo of BGM is made faster according to an increase in the number of fixedly displayed wild symbols 311*a*. However, the present invention is not limited to this. It may be the tone of the BGM which is varied from the lower tone to the higher tone according to an increase in the number of fixedly displayed wild symbols 311*a*. Further, the BGM may be selected from different pieces of music. Alternatively, the BGM may be the same piece of music played at different speeds.

The present embodiment deals with a case where the specific symbol is the wild symbol. However, the specific symbol may be any type of symbols 310.

(Sixth Embodiment)

In addition to the above structure, the present specification also deals with the following structure. The structure is described below as Sixth Embodiment of the present invention. Note that members and parts that are identical to the foregoing embodiment are given the identical symbols, and no further explanations are provided. Further, a slot machine of the present embodiment is referred to as a slot machine 910 for the purpose of distinguishing from the other embodiments.

As background art, there has been known a gaming machine including a symbol display unit having a plurality of symbol display regions, wherein a benefit (shifting to bonus game or free game) is awarded when a predetermined condition is satisfied (e.g. Patent Document 1: specification of U.S. Pat. No. 6,517,433).

The above mentioned predetermined condition is satisfied, for example, when symbols stopped in the symbol display regions structuring an active payline forms a predetermined combination, or when the number of specific symbols stopped in the symbol display regions structuring the symbol display unit equals to or surpasses a predetermined number. In the gaming machine of Patent Document 1 for example, a bonus game is run when a specific symbol or a specific symbol combination appears on a winning line (i.e. active payline) on which a bet of game value is placed.

The above mentioned gaming machine in general is structured to enable incrementing of bet amount for each one of active paylines.

In the above mentioned gaming machine, it is always the same special prize which is awarded for satisfying the predetermined condition. For example, in the gaming machine of Patent Document 1, the special prize (free game in this case) is awarded upon occurrence of a specific symbol combination on the active winning line. As long as the condition is met, the contents of free game awarded is always the same, irrespective of the amount of bet placed on each active winning line.

Thus, while the known gaming machine is advantageous in that whether the special prize is won is easily understood based on the arrangement of the symbols stopped on the symbol display unit, the game tends to be monotonous due to the identical special prize. Further, some players, who incremented the amount of bet placed for each winning line while playing the game, expect some kind of gain should be rewarded.

The invention of Sixth Embodiment is made in view of the above problem, and it is an object to provide a gaming machine and control method wherein, when a player satisfies a predetermined condition, a special gain is rewarded to the player at the time of running a free game awarded as a benefit, so as to cause higher expectation of the player for the benefit to be awarded.

To solve the above problem, a first aspect of the present invention relative to Sixth Embodiment is the following gaming machine.

Namely, the gaming machine includes: a plurality of symbol arrays each of which having in predetermined positions a plurality of symbols including picture symbols and a wild symbol regarded as any of the picture symbols;

a symbol display device having a matrix of arrangement areas in which the plurality of symbols in the plurality of symbol arrays are arranged; and a controller programmed to execute the following processes of:

(11) after a predetermined maximum bettable amount of or less game media are bet, having the symbol display device rearrange the plurality of symbols in the plurality of arrangement areas;

(12) executing paying out of game media or awarding of a free game, according to the relation among the plurality of symbols rearranged;

(13) when a predetermined condition is met, adding in the free game a predetermined number of wild symbols to any symbol array randomly selected from the plurality of symbol arrays;

(14) having the symbol display device rearrange the plurality of symbols in the plurality of arrangement areas, as the free game; and (15) awarding a benefit according to the relation among the plurality of symbols rearranged.

In the above structure, when a predetermined condition is met, a predetermined number of wild symbols are added in the free game to any symbol array randomly selected from the plurality of symbol arrays. Thus, when a free game is run, there is used a symbol array having many wild symbols each of which is deemed as any one of the picture symbols. This results in a higher probability and higher expectation of the player for a benefit.

Further, a second aspect of the present invention relative to Sixth Embodiment is the gaming machine described below. Namely, the gaming machine is the first aspect of the present invention relative to Sixth Embodiment adapted so that the predetermined condition in the step of (13) is betting a predetermined maximum bettable amount of game media in the step of (11).

In the above structure, a predetermined number of wild symbols are added in the free game to any symbol array randomly selected from the plurality of symbol arrays, when the maximum bettable amount of game media is bet. Thus, when a player having bet the maximum bettable amount of game media plays a free game, a symbol array having many wild symbols each of which is deemed as any of the picture symbols. This results in a higher probability and higher expectation of that player for a benefit.

Further, a third aspect of the present invention relative to Sixth Embodiment is a gaming machine described below.

Namely, the gaming machine is the second aspect of the present invention relative to Sixth Embodiment adapted so that, after a predetermined maximum bettable amount of or less game media are bet in the step (11), the symbol display device rearranges the plurality of symbols in the plurality of arrangement areas, sequentially from one side of the plurality of symbol arrays; and in the random selection of (13), the probability of having the predetermined number of wild symbols being added is the highest for the symbol array which is rearranged at the end in the step of (11) among the plurality of symbol arrays.

In the above structure, the probability of having the predetermined number of wild symbols being added is made the highest for the symbol array which is rearranged at the end in the step of (11) among the plurality of symbol arrays. Thus, the symbol array to be rearranged at the end in the free game has the higher probability of having the predetermined number of wild symbols added thereto. When the predetermined number of wild symbols are added to the symbol array to be rearranged at the end, the player can enjoy the game with the expectation for the possible benefit until the rearrangement of all the symbols is completed.

Further, a fourth aspect of the present invention relative to Sixth Embodiment is a gaming machine described below.

Namely, the gaming machine includes: a plurality of symbol arrays each of which having in predetermined positions a plurality of symbols including picture symbols and a wild symbol regarded as any of the picture symbols;

a symbol display device having a matrix of arrangement areas in which the plurality of symbols in the plurality of symbol arrays are arranged; and a controller programmed to execute the following processes of:

(m1) after a predetermined maximum bettable amount of or less game media are bet, having the symbol display device rearrange the plurality of symbols in the plurality of arrangement areas;

(m2) executing paying out of game media or awarding of a free game, according to the relation among the plurality of symbols rearranged;

(m3) when a predetermined condition is met, replacing in a free game a predetermined number of picture symbols in any symbol array randomly selected from the plurality of symbol arrays with one or more wild symbols;

(m4) having the symbol display device rearrange the plurality of symbols in the plurality of arrangement areas, as the free game; and (m5) awarding a benefit according to the relation among the plurality of symbols rearranged.

In the above structure, when a predetermined condition is met, a predetermined number of picture symbols in any symbol array randomly selected from the plurality of symbol arrays are replaced with one or more wild symbols in the free game. Thus, when a free game is run, there is used a symbol array having many wild symbols each of which is deemed as any one of the picture symbols. This results in a higher probability and higher expectation of the player for a benefit.

Further, a fifth aspect of the present invention relative to Sixth Embodiment is a gaming machine described below. Namely, the gaming machine is the fourth aspect of the present invention relative to Sixth Embodiment adapted so that the predetermined condition in the step of (m3) is betting a predetermined maximum bettable amount of game media in the step of (m1).

In the above structure, a predetermined number of picture symbols in any symbol array randomly selected from the plurality of symbol arrays are replaced with one or more wild symbols in the free game, when the maximum bettable amount of game media is bet. Thus, when a player having bet the maximum bettable amount of game media plays a free game, a symbol array having many wild symbols each of which is deemed as any of the picture symbols. This results in a higher probability and higher expectation of that player for a benefit.

Further, a sixth aspect of the present invention relative to Sixth Embodiment is a gaming machine described below.

Namely, the gaming machine is the fifth aspect of the present invention relative to Sixth Embodiment adapted so that, after a predetermined maximum bettable amount of or less game media are bet in the step (m1), the symbol display device rearranges the plurality of symbols in the plurality of arrangement areas, sequentially from one side of the plurality of symbol arrays; and in the random selection of (m3), the probability of having the predetermined number of picture symbols replaced with one or more wild symbols is the highest for the symbol array which is rearranged at the end in the step of (m1) among the plurality of symbol arrays.

In the above structure, the probability of having the predetermined number of picture symbols replaced with one or more wild symbols is made the highest for the symbol array which is rearranged at the end in the step of (m1) among the plurality of symbol arrays. Thus, the symbol array to be rearranged at the end in the free game has the higher probability of having the predetermined number of symbols therein replaced with one or more wild symbols. When the predetermined number of symbols in the symbol array to be rearranged at the end is replaced with one or more wild symbols, the player can enjoy the game with the expectation for the possible benefit until the rearrangement of all the symbols is completed.

Further, a seventh aspect of the present invention relative to Sixth Embodiment is a control method for a gaming machine described below.

Namely, the gaming machine includes: a plurality of symbol arrays each of which having in predetermined positions a plurality of symbols including picture symbols and a wild symbol regarded as any of the picture symbols;

a symbol display device having a matrix of arrangement areas in which the plurality of symbols in the plurality of symbol arrays are arranged.

The control method includes the steps of: after a predetermined maximum bettable amount of or less game media are bet, having the symbol display device rearrange the plurality of symbols in the plurality of arrangement areas;

executing paying out of game media or awarding of a free game, according to the relation among the plurality of symbols rearranged;

when a predetermined condition is met, adding in the free game a predetermined number of wild symbols to any symbol array randomly selected from the plurality of symbol arrays;

having the symbol display device rearrange the plurality of symbols in the plurality of arrangement areas, as the free game; and awarding a benefit according to the relation among the plurality of symbols rearranged.

In the above structure, when a predetermined condition is met, a predetermined number of wild symbols are added in the free game to any symbol array randomly selected from the plurality of symbol arrays. Thus, when a free game is run, there is used a symbol array having many wild symbols each of which is deemed as any one of the picture symbols. This results in a higher probability and higher expectation of the player for a benefit.

Figure 56:
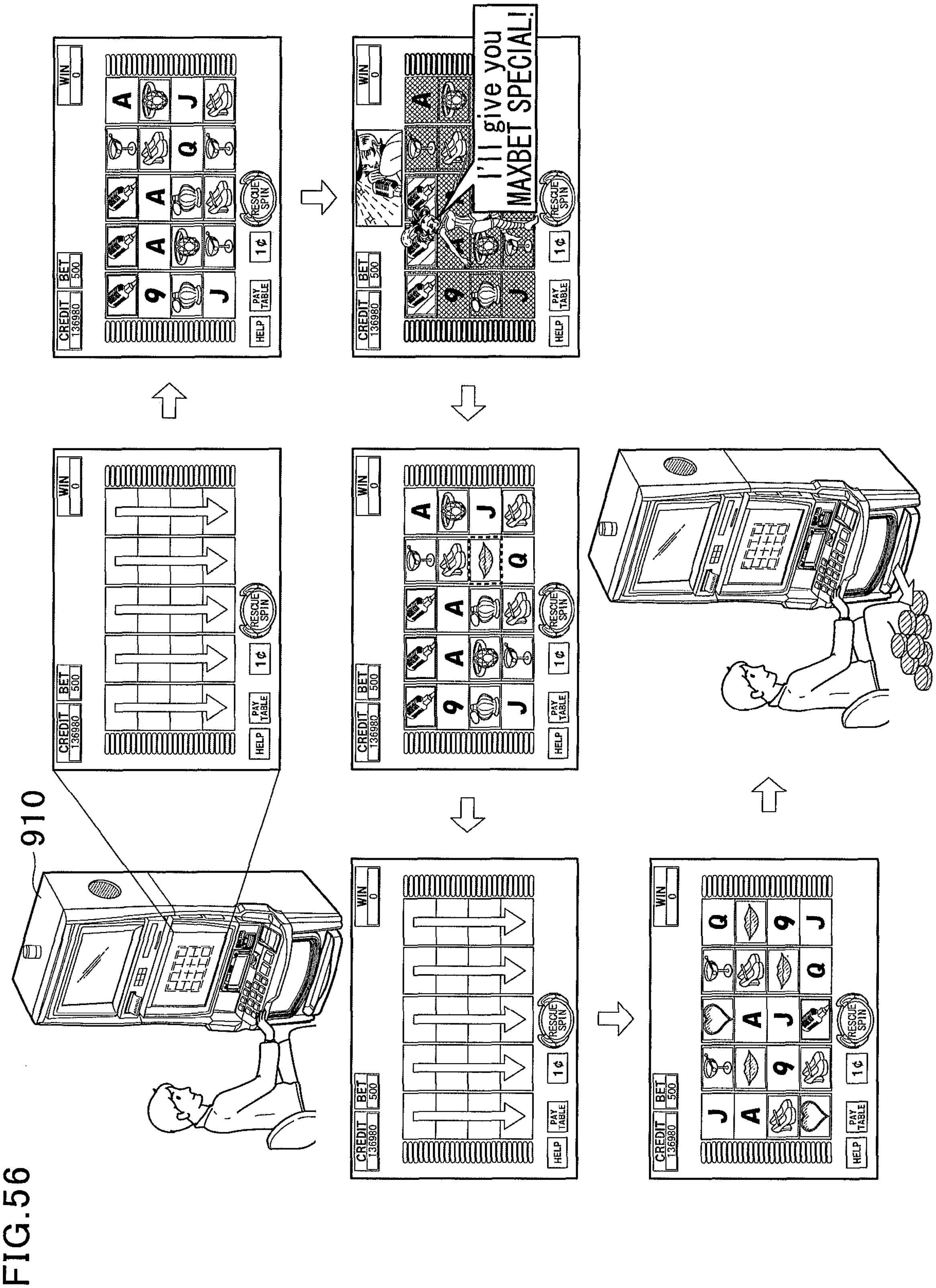
FIG. 56 outlines a game in a slot machine of Sixth Embodiment of the present invention.

The present invention provides a gaming machine wherein, when a player satisfies a predetermined condition, a special gain is rewarded to the player at the time of running a free game awarded as a benefit, so as to cause higher expectation of the player for the benefit to be awarded (see FIG. 56).

[Explanation of Operation Flow]

Figure 57:
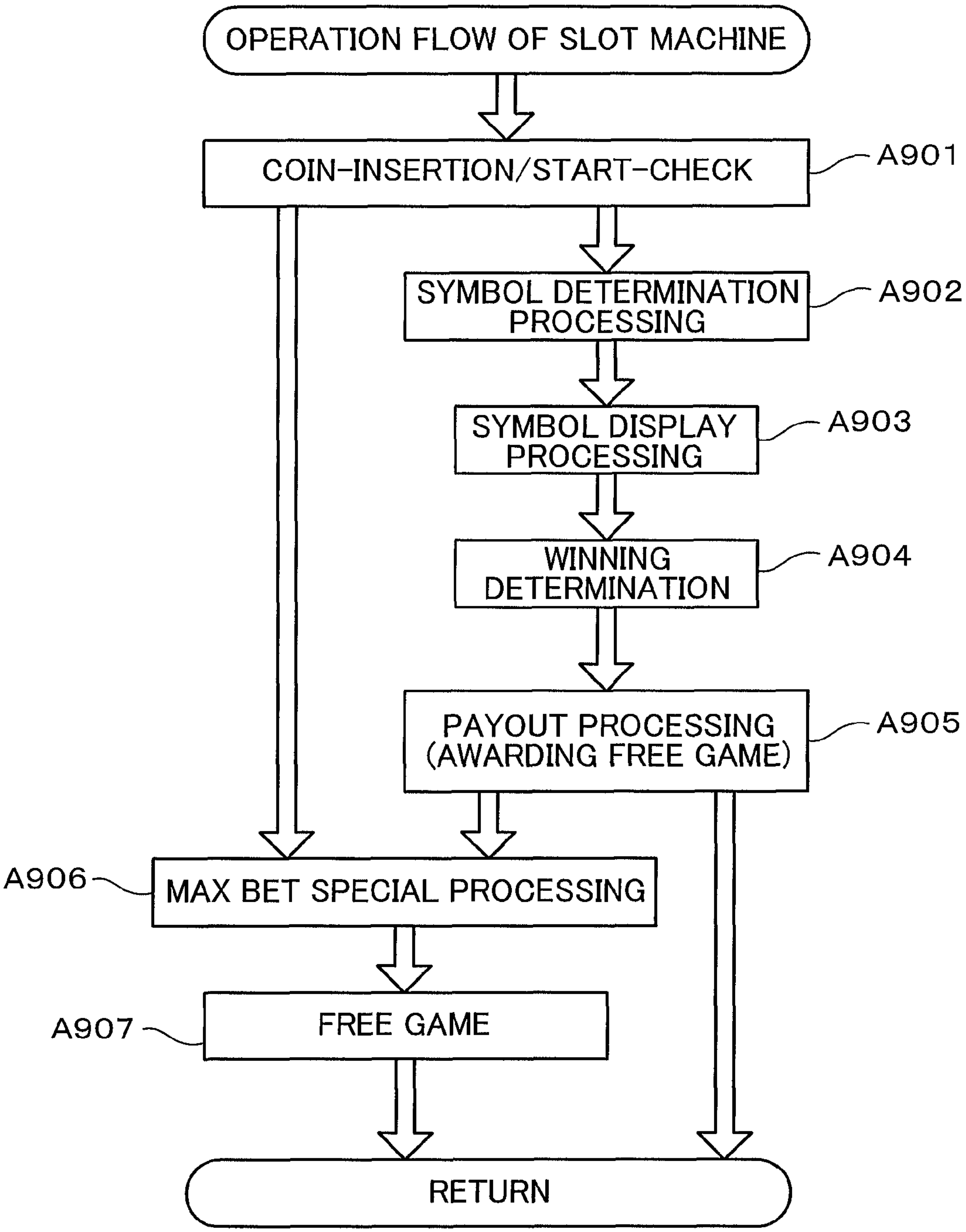
FIG. 57 is a view illustrating a operation flow of the slot machine according to Sixth Embodiment of the present invention.

With reference to FIG. 57, the following describes an operation flow of a slot machine related to Sixth Embodiment. FIG. 57 shows an operation flow of the slot machine related to Sixth Embodiment.

First, the slot machine checks if the bet button unit 480 is pressed by a player, and if the spin button unit 481 is subsequently pressed by the player (Coin-insertion/Start-check: step A901). At the same time, the remaining credit amount is checked.

Next, when the spin button unit 481 has been pressed by the player, the slot machine extracts random number for symbol determination, and determines symbols to be displayed at the time of stopping scrolling of symbol arrays for the player, for a plurality of respective video reels displayed to a display unit 482 (symbol determination process: step A902).

Next, the slot machine starts scrolling of the symbol array of each of the video reels and then stops scrolling so that the determined symbols are displayed for the player (symbol display process: step A903).

When scrolling of the symbol array of each video reel is stopped, the slot machine determines whether or not a combination of symbols displayed for the player is a combination related to winning (winning determination: step A904).

When the combination of symbols displayed for the player is a combination related to winning, the slot machine offers benefits according to the combination to the player (Payout process: step A905). For example, when a combination of symbols related to a payout of coins has been displayed, the slot machine pays out coins of the number corresponding to the combination of symbols to the player.

Further, in this payout processing (step A905), the if the symbol combination displayed for the player relates to awarding of free games, a predetermined number of free games are awarded to the player.

Then, when the free game is awarded, MAX BET SPECIAL processing is executed (step A906). The slot machine checks if a maximum bet has been entered by using bet button F1. If a maximum bet is entered, a predetermined number of wild symbols (serving as almighty symbols) are added in the free game to any symbol array randomly selected from the plurality of symbol arrays.

The slot machine then runs the free game, with the predetermined number of added wild symbols (step A907). According to the result, a benefit of the free game is awarded.

After the above steps, the step A901 is once again executed. The basic functions of the slot machine have been described above.

Next, the following describes a program run by the slot machine 910 of Sixth Embodiment. Note that the explanation for members and program processes that are identical to those described in the foregoing embodiments is omitted as needed in the following description.

The characteristic of Sixth Embodiment of the present invention is the "MAX BET SPECIAL processing" which is executed at the time of executing the bonus game processing. Therefore, the following description mainly describes the bonus game processing and the MAX BET SPECIAL processing. When the bonus game processing and the MAX BET SPECIAL processing of the present embodiment are executed, a series of images shown in FIG. 56 are displayed.

<Bonus Game Processing of Sixth Embodiment>

Figure 58:
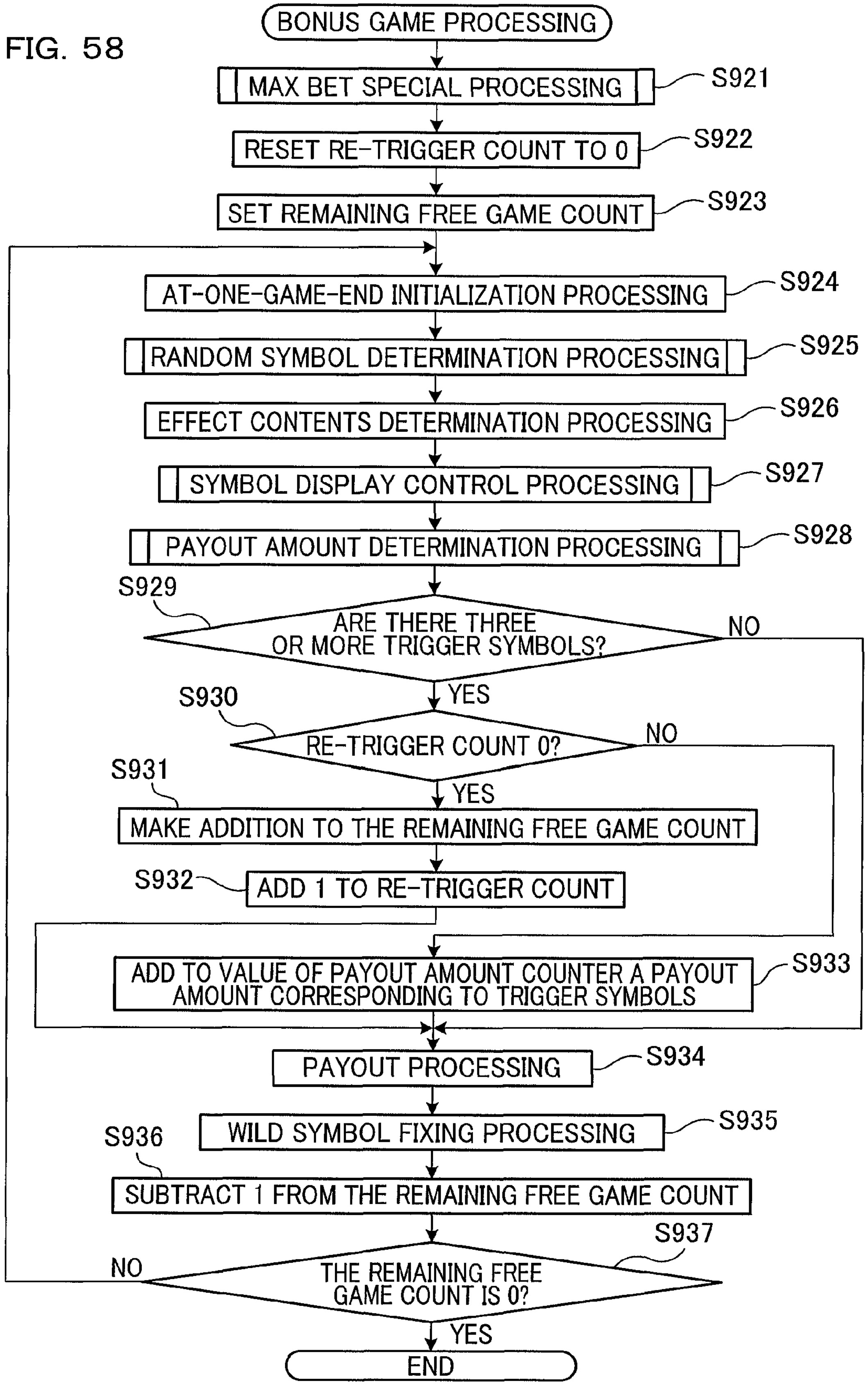
FIG. 58 shows a flowchart of the bonus game processing for the slot machine according to Sixth Embodiment of the present invention.
Figure 59:
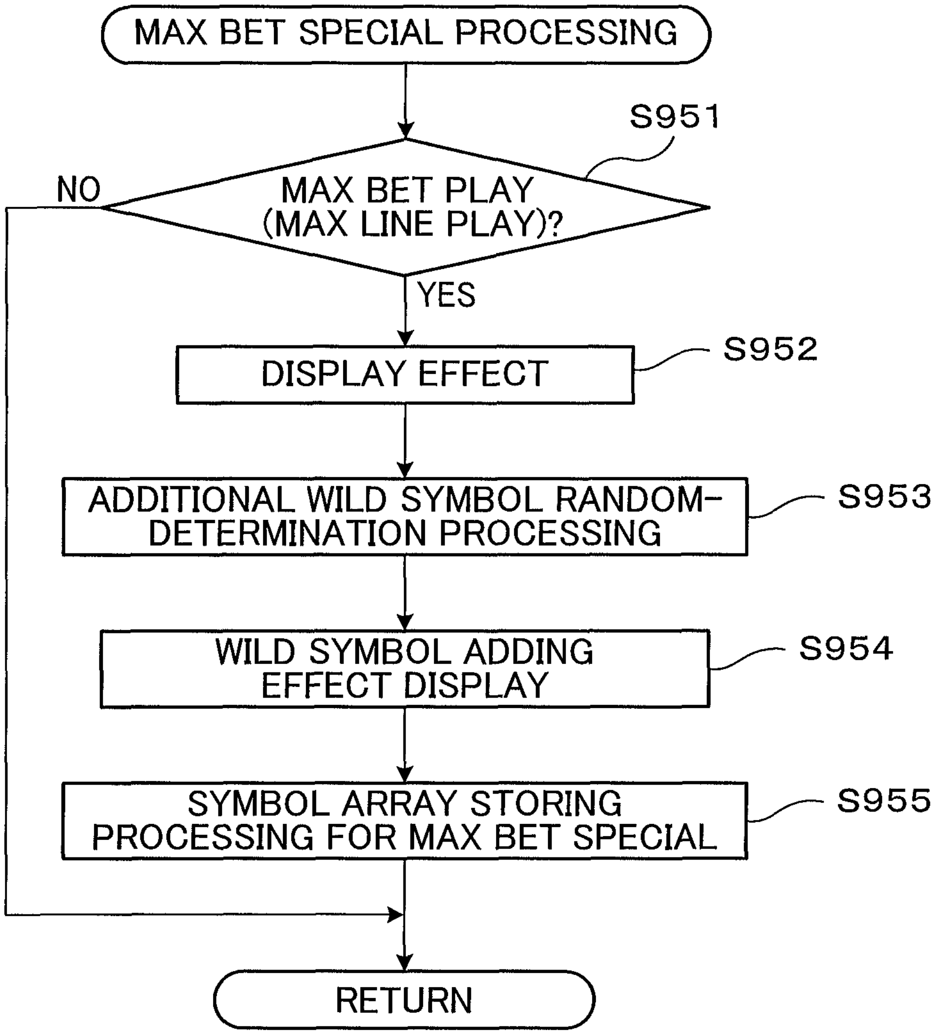
FIG. 59 shows a flowchart of MAX BET SPECIAL processing according to Sixth Embodiment of the present invention.

First, the following describes the bonus game processing of Sixth Embodiment, with reference to FIG. 56 to FIG. 61. FIG. 56 outlines a game in a slot machine 910 of Sixth Embodiment of the present invention. FIG. 57 is a view illustrating an operation flow of the slot machine according to Sixth Embodiment of the present invention. FIG. 58 shows a flowchart of the bonus game processing for the slot machine 910 according to Sixth Embodiment of the present invention. FIG. 59 shows a flowchart of a MAX BET SPECIAL processing according to Sixth Embodiment of the present invention. FIG. 60 is an explanatory diagram of an additional wild symbol random determination table according to Sixth Embodiment of the present invention. FIG. 61 is an explanatory diagram of effect image display according to Sixth Embodiment of the present invention.

The bonus game processing of the present embodiment is executed (step S20), when three trigger symbols (feature symbols 312) are rearranged on an activated payline 160 in step S19 (see FIG. 61(A)). The bonus game processing is executed also when a rescue condition is met in step S173 (step S174).

When the bonus game processing is executed, the main CPU 71 executes the MAX BET SPECIAL processing (step S921).

The MAX BET SPECIAL processing is described below with reference to FIG. 59. When the MAX BET SPECIAL processing is executed, the main CPU 71 first determines whether a Max Bet play (Max Line play) mode is activated (step S951). Specifically, the main CPU 71 determines whether or not a MAX-lines button 44 is pressed to activate all of the fifty paylines 160. If the Max Bet play (Max Line play) mode is not active (step S951: NO), the MAX BET SPECIAL processing is ended.

On the other hand, if it is determined that the Max Bet play (Max Line play) mode is active (step S951: YES), displaying of an effect is executed (step S952). Specifically, as shown in FIG. 61(B), a character 930 is displayed and notifies the player of "Max Bet Special".

Next, the main CPU 71 refers to an additional wild symbol random determination table (FIG. 60) stored in the RAM 73, and executes additional wild symbol random-determination processing (step S953).

Specifically, the main CPU 71 first refers to (A) symbol array random-determination table of the additional wild symbol random determination table, and randomly determines a symbol array out of the first to fifth symbol arrays (video reels 151 to 155) for adding the wild symbols 311*a*. In the symbol array random-determination table of FIG. 60(A), the probability of the first symbol array (video reel 151) being selected is "0". Further, the probability of the second symbol array (video reel 152) being selected is "15/100". Further, the probability of the third symbol array (video reel 153) being selected is "13/100". Further, the probability of the fourth symbol array (video reel 154) being selected is "35/100". Further, the probability of the fifth symbol array (video reel 155) being selected is "37/100". These probabilities are set so as to total "100/100".

Next, the main CPU 71 refers to a (B) stage random-selection table of the additional wild symbol random determination table, to randomly determine a stage (vertical position of the display window 150) for adding the wild symbol 311*a* out of the upper area, the upper middle area, the lower middle area, and the lower area of the symbol array (one of the video reels 151 to 155) determined with reference to the (A) symbol array random-determination table. In the stage random-selection table of FIG. 60(B), the probability of the upper area of the symbol array being selected is "25/100". Further, the probability of the upper middle area of the symbol array being selected is "25/100". Further, the probability of the lower middle area of the symbol array being selected is "25/100". Further, the probability of the lower area of the symbol array being selected is "25/100". These probabilities are set so as to total "100/100".

Next, when the position for adding the wild symbol 311*a* is determined in step S953, a wild symbol adding effect display is executed (step S954). Specifically, the character 930 appeared on an effect screen shown in FIG. 61 (B) indicates the position where the wild symbol 311*a* will be added. Then, as shown in FIG. 61(C), the wild symbol 311*a* appears in the position thus indicated.

Next, the a symbol array storing process for a MAX BET SPECIAL is executed (step S955). This is a process of storing in the RAM 73 a symbol array having 23 symbols as a result of adding the wild symbol 311*a*, for use in the free game. The MAX BET SPECIAL processing is then completed.

Subsequently, the re-trigger count in the re-trigger count storage area of the RAM 73 is set to "0" (step S922). The re-trigger count in this specification is the number indicating how many times a process of increasing remaining free game count has been executed in the free games, the process being executed when three feature symbols 312 serving as the trigger symbols are rearranged on the display window 150. In the present embodiment, the re-trigger count is restricted to "1".

Next, the remaining free game count T in the free game count storage area of the RAM 73 is set to T=10 (step S923). Further, the main CPU 71 displays a free game occurrence image on the lower image display panel 141.

After step S923, the main CPU 71 executes the steps S924 to S937. These steps are substantially identical with the steps described hereinabove, and hence the following will only describe differences between the steps.

Next, the main CPU 71 executes at-one-game-end initialization processing (step S924). For example, data that becomes unnecessary after each free game in the working areas of the RAM 73, such as the symbols randomly determined, is cleared.

The main CPU 71 then executes the random symbol determination processing (step S925). In step S925, to-be-stopped symbols are randomly determined using the symbol arrays of the free game, based on the random number for symbol determination.

The main CPU 71 executes the effect contents determination processing (step S926). The main CPU 71 extracts an effect-use random number, and randomly determines any of the effect contents from the preset plurality of effect contents.

Next, the main CPU 71 executes the symbol display control processing (step S927). In the processing, scrolling of the symbol arrays of each video reel 151-155 is started, and the to-be-stopped symbols determined in the random symbol determination processing of step S925 are successively stopped in predetermined positions (e.g. upper area of the display window 150). That is, four symbols including the to-be-stopped symbols are displayed in the display window 150. For example, when the to-be-stopped symbol is the symbol associated with the code number of "10" and it is to be displayed to the upper area, the symbols associated with the respective code numbers of "11", "12" and "13" are to be displayed to the respective upper middle area, lower middle area, and lower area in the display window 150.

Next, the main CPU 71 executes a payout amount determination processing (step S928). In step S928, a payout amount is determined on the premise that coins whose number is identical with those bet on the base game which has triggered the free game are bet.

Next, after step S928, the main CPU 71 determines whether three feature symbols 312 ("FEATURE") each serving as a trigger symbol are rearranged in the display window 150 (step S929).

When it is determined that three feature symbols 312 ("FEATURE") each serving as a trigger symbol are rearranged (step S929: YES), whether or not the re-trigger count is "0" is determined (step S930). Here, when the re-trigger count is not determined as to be "0" (step S930: NO), the payout amount corresponding to the arrangement of three feature symbols 312 ("FEATURE") each serving as the trigger symbol is added to a payout amount counter (step S933).

On the other hand, when the re-trigger count is determined as to be "0" (step S930: YES), the number of free games to be added ("10 times" in the present embodiment) is added to the remaining free game count (step S931). Through this process, the free game count storage area of the RAM 73, "10" is added to the remaining game count T indicated by remaining game count data.

Next, "1" is added to the re-trigger count stored in the re-trigger count storage area of the RAM 73 (step S932).

Next, in step S929, when it is determined that three feature symbols 312 ("FEATURE") each serving as the trigger symbol are not rearranged on the display window 150 (step S929: NO), the main CPU 71 executes the payout processing after step S932 or step S933 (step S934). This process is not described here because it is identical with S24.

Next, the wild symbol fixing process is executed (step S935). This process is to fix a wild symbol 311*a* arranged in an arrangement area 28 of the display window 150 in the same arrangement area 28 for carrying it over to the next free game.

Thereafter, the main CPU 71 subtracts 1 from the remaining free game count T in the free game count storage area of the RAM 73 (step S936).

Next, the main CPU 71 determines whether the free game count T="0", based on the remaining game data stored in the free game count storage area of the RAM 73 (step S937). When it is determined that T≠0 (step S937: NO), the main CPU 71 brings the process back to S924. On the other hand, when it is determined in step S636 that T=0 (step S937: YES), the main CPU 71 ends the bonus game processing.

As described, with the slot machine 910 of Sixth Embodiment, when the player starts a game in the Max Bet play (Max Line play) mode, a single wild symbol is added in the free game to a symbol array of the video reel randomly selected from the video reels 151 to 155. Thus, when the player who started a game in the Max Bet play (Max Line play) mode plays a free game, there is used a video reel (151 to 155) with an extra wild symbol 311*a* which is deemed as to be any one of the picture symbols ("A", "K", "Q", "J", "10", "9", "COCKTAIL", "SHOES", "PERFUME", "RING", "HEART"). This provides a higher probability of benefit awarding to the player, and causes a higher expectation of the player, who started the game in the Max Bet play (Max Line play) mode, for the benefit awarding.

Further, in Sixth Embodiment, the probability of the first symbol array (video reel 151) to be selected is "0", the probability of the second symbol array (video reel 152) to be selected is "15/100", the probability of the third symbol array (video reel 153) to be selected is "13/100", the probability of the fourth symbol array (video reel 154) to be selected is "35/100", and the probability of the fifth symbol array (video reel 155) to be selected is "37/100", according to the symbol array random-determination table of FIG. 60 (A). Thus, in the free game, the probability of having a wild symbol 311*a* added to the symbol array is increased for the video reel 155 which is rearranged at the end. When the wild symbol 311*a* is to be added to the symbol array of the video reel 155 which is rearranged at the end, the player can enjoy the game with the expectation for the possible benefit until the rearrangement of all the symbols in symbol display window 150 is completed.

Thus, Sixth Embodiment of the present invention is described above. The slot machine 910 of the present embodiment may be altered in various ways. For example, the structure described hereinbelow is also possible.

For example, the slot machine 910 of the present embodiment is adapted so that the MAX BET SPECIAL processing (a process of adding a single wild symbol to a symbol array of a video reel randomly selected from the video reels 151 to 155 free game) is executed when the player starts a game in the Max Bet play (Max Line play) mode. However, the MAX BET SPECIAL processing may be executed when a predetermined winning combination is achieved in a base game.

Further, the slot machine 910 of the present embodiment adds a single wild symbol in a free game to a symbol array of a video reel randomly selected from the video reels 151 to 155, when the player starts a game in the Max Bet play (Max Line play) mode. However, it is possible to add a plurality of wild symbols 311*a* to a plurality of symbol arrays of the video reels 151 to 155.

Further, the slot machine 910 of the present embodiment adds a single wild symbol in a free game to a symbol array of a video reel randomly selected from the video reels 151 to 155, when the player starts a game in the Max Bet play (Max Line play) mode. However, it is possible to replace a predetermined number of picture symbols provided to a symbol array of a video reel randomly selected from the video reels 151 to 155 with one or more wild symbols.

In this case, when a player having started a game in the Max Bet play (Max Line play) mode plays a free game, a symbol array having many wild symbols each of which is deemed as any of the picture symbols. This results in a higher probability and higher expectation of that player for a benefit.

Further, the present embodiment deals with a case where the number of paylines 160 is 50; however, the number of paylines is not limited to this in the present invention.

Further, the present embodiment deals with a case where the slot machine 910 is a video slot machine. However, the slot machine 910 of the present invention may partially adopt a mechanical reel in place of the video reels 151 to 155.

(Outline of Sixth Embodiment)

Further, a first aspect of the present invention relative to Sixth Embodiment is a gaming machine (slot machine 910) described below.

Namely, the gaming machine (slot machine 910) includes: a plurality of symbol arrays (video reels 151 to 155) each of which having in predetermined positions a plurality of symbols including picture symbols ("A", "K", "Q", "J", "10", "9", "COCKTAIL", "SHOES", "PERFUME", "RING", "HEART") and a wild symbol (wild symbol 311*a*) regarded as any of the picture symbols;

a symbol display device (lower image display panel 141) having a matrix of arrangement areas (arrangement areas 28) in which the plurality of symbols in the plurality of symbol arrays are arranged; and a controller (motherboard 70) programmed to execute the following processes of:

(l1) after a predetermined maximum bettable amount of or less game media (coins, credit) are bet, having the symbol display device rearrange the plurality of symbols in the plurality of arrangement areas;

(l2) executing paying out of game media or awarding of a free game, according to the relation among the plurality of symbols rearranged;

(l3) when a predetermined condition is met, adding in the free game a predetermined number of wild symbols to any symbol array randomly selected from the plurality of symbol arrays;

(l4) having the symbol display device rearrange the plurality of symbols in the plurality of arrangement areas, as the free game; and (l5) awarding a benefit according to the relation among the plurality of symbols rearranged.

In the above structure, when a predetermined condition is met, a predetermined number of wild symbols are added in the free game to any symbol array randomly selected from the plurality of symbol arrays. Thus, when a free game is run, there is used a symbol array having many wild symbols each of which is deemed as any one of the picture symbols. This results in a higher probability and higher expectation of the player for a benefit.

Further, a second aspect of the present invention relative to Sixth Embodiment is a gaming machine described below. Namely, the gaming machine is the first aspect of the present invention relative to Sixth Embodiment adapted so that the predetermined condition in the step of (l3) is betting a predetermined maximum bettable amount of game media in the step of (l1).

In the above structure, a predetermined number of wild symbols are added in the free game to any symbol array randomly selected from the plurality of symbol arrays, when the maximum bettable amount of game media is bet. Thus, when a player having bet the maximum bettable amount of game media plays a free game, a symbol array having many wild symbols each of which is deemed as any of the picture symbols. This results in a higher probability and higher expectation of that player for a benefit.

Further, a third aspect of the present invention relative to Sixth Embodiment is a gaming machine described below.

Namely, the gaming machine is the second aspect of the present invention relative to Sixth Embodiment adapted so that, after a predetermined maximum bettable amount of or less game media are bet in the step (l1), the symbol display device rearranges the plurality of symbols in the plurality of arrangement areas, sequentially from one side of the plurality of symbol arrays (in the sequence from the video reels 151 to 155); and in the random selection of (l3), the probability of having the predetermined number of wild symbols being added is the highest for the symbol array which is rearranged at the end in the step of (l1) among the plurality of symbol arrays.

In the above structure, the probability of having the predetermined number of wild symbols being added is made the highest for the symbol array which is rearranged at the end in the step of (l1) among the plurality of symbol arrays. Thus, the symbol array to be rearranged at the end in the free game has the higher probability of having the predetermined number of wild symbols added thereto. When the predetermined number of wild symbols are added to the symbol array to be rearranged at the end, the player can enjoy the game with the expectation for the possible benefit until the rearrangement of all the symbols is completed.

Further, a fourth aspect of the present invention relative to Sixth Embodiment is a gaming machine described below.

Namely, the gaming machine includes: a plurality of symbol arrays each of which having in predetermined positions a plurality of symbols including picture symbols and a wild symbol regarded as any of the picture symbols;

a symbol display device having a matrix of arrangement areas in which the plurality of symbols in the plurality of symbol arrays are arranged; and a controller programmed to execute the following processes of:

(m1) after a predetermined maximum bettable amount of or less game media are bet, having the symbol display device rearrange the plurality of symbols in the plurality of arrangement areas;

(m2) executing paying out of game media or awarding of a free game, according to the relation among the plurality of symbols rearranged;

(m3) when a predetermined condition is met, replacing in a free game a predetermined number of picture symbols in any symbol array randomly selected from the plurality of symbol arrays with one or more wild symbols;

(m4) having the symbol display device rearrange the plurality of symbols in the plurality of arrangement areas, as the free game; and (m5) awarding a benefit according to the relation among the plurality of symbols rearranged.

In the above structure, when a predetermined condition is met, a predetermined number of picture symbols in any symbol array randomly selected from the plurality of symbol arrays are replaced with one or more wild symbols in the free game. Thus, when a free game is run, there is used a symbol array having many wild symbols each of which is deemed as any one of the picture symbols. This results in a higher probability and higher expectation of the player for a benefit.

Further, a fifth aspect of the present invention relative to Sixth Embodiment is a gaming machine described below. Namely, the gaming machine is the fourth aspect of the present invention relative to Sixth Embodiment adapted so that the predetermined condition in the step of (m3) is betting a predetermined maximum bettable amount of game media in the step of (m1).

In the above structure, a predetermined number of picture symbols in any symbol array randomly selected from the plurality of symbol arrays are replaced with one or more wild symbols in the free game, when the maximum bettable amount of game media is bet. Thus, when a player having bet the maximum bettable amount of game media plays a free game, a symbol array having many wild symbols each of which is deemed as any of the picture symbols. This results in a higher probability and higher expectation of that player for a benefit.

Further, a sixth aspect of the present invention relative to Sixth Embodiment is a gaming machine described below.

Namely, the gaming machine is the second aspect of the present invention relative to Sixth Embodiment adapted so that, after a predetermined maximum bettable amount of or less game media are bet in the step (l1), the symbol display device rearranges the plurality of symbols in the plurality of arrangement areas, sequentially from one side of the plurality of symbol arrays; and in the random selection of (m3), the probability of having the predetermined number of picture symbols replaced with one or more wild symbols is the highest for the symbol array which is rearranged at the end in the step of (m1) among the plurality of symbol arrays.

In the above structure, the probability of having the predetermined number of picture symbols replaced with one or more wild symbols is made the highest for the symbol array which is rearranged at the end in the step of (m1) among the plurality of symbol arrays. Thus, the symbol array to be rearranged at the end in the free game has the higher probability of having the predetermined number of symbols therein replaced with one or more wild symbols. When the predetermined number of symbols in the symbol array to be rearranged at the end is replaced with one or more wild symbols, the player can enjoy the game with the expectation for the possible benefit until the rearrangement of all the symbols is completed.

Further, a seventh aspect of the present invention relative to Sixth Embodiment is a control method for a gaming machine described below.

Namely, the gaming machine includes: a plurality of symbol arrays each of which having in predetermined positions a plurality of symbols including picture symbols and a wild symbol regarded as any of the picture symbols;

a symbol display device having a matrix of arrangement areas in which the plurality of symbols in the plurality of symbol arrays are arranged, the method comprising:

The control method includes the steps of: after a predetermined maximum bettable amount of or less game media are bet, having the symbol display device rearrange the plurality of symbols in the plurality of arrangement areas;

executing paying out of game media or awarding of a free game, according to the relation among the plurality of symbols rearranged;

when a predetermined condition is met, adding in the free game a predetermined number of wild symbols to any symbol array randomly selected from the plurality of symbol arrays;

having the symbol display device rearrange the plurality of symbols in the plurality of arrangement areas, as the free game; and awarding a benefit according to the relation among the plurality of symbols rearranged.

In the above structure, when a predetermined condition is met, a predetermined number of wild symbols are added in the free game to any symbol array randomly selected from the plurality of symbol arrays. Thus, when a free game is run, there is used a symbol array having many wild symbols each of which is deemed as any one of the picture symbols. This results in a higher probability and higher expectation of the player for a benefit.

In the detailed description provided above, characteristic parts have mainly been described in order that the present invention can be understood more easily. However, the present invention is not limited to the embodiment shown in the detailed description provided above, and may be applied to other embodiments. The scope of application of the present invention should be construed as Broadly as possible. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. Accordingly, it should be considered that claims cover equivalent structures, too, without departing from the technical idea of the present invention. An object of the abstract is to enable an intellectual property office, general public institutions, persons belonging to the art but not familiar with patent, legal terms, or technical terms to quickly understand technical contents and essences of the present invention through a simple research. It is therefore not an intention of the abstract to limit the scope of the present invention which shall be construed on the basis of the description of the claims. In addition, it is desirable to sufficiently refer to already-disclosed documents and the like, in order to fully understand the objects and effects of the present invention.

The detailed description provided above includes a processing which is executed on a computer or a computer network. The descriptions and expressions provided above are given for the purpose of allowing those skilled in the art to understand the invention most effectively. A process executed in or by respective steps yielding one result or blocks with a predetermined process function described in the present specification shall be understood as a process with no self-contradiction. In addition, in each step or block, an electrical or magnetic signal is transmitted/received, recorded, and the like. In a processing in each step or block, such a signal is embodied in the form of a bit, a value, a symbol, a character, a term, a number, and the like. However, it should be noted that they have been used simply because they are convenient for explanations. A processing in each step or block has sometimes been described using an expression which is common to a human behavior. However, in principle, the processing described in the specification is executed by various devices. In addition, other structures necessary for each step or block are apparent from the above description.

What is claimed is:

1. A gaming machine, comprising:

a housing;

a plurality of input devices supported by the housing, the plurality of input devices including a value-addition mechanism by which gaming media associated with monetary value can be added to the gaming machine; a wager button; and a cash-out button;

a validator;

an award payout mechanism that pays out gaming media;

a display device capable of rearranging a plurality of symbols; and a controller, which, via the validator, identifies gaming media that has been added to the gaming machine; which establishes a credit balance for a player based at least in part on gaming media that has been added to the gaming machine; and which, as a result of a player having wagered gaming media, executes the following processes:

(1) running a game in which symbols selected from the plurality of symbols are rearranged on the symbol display device by moving or appearing to move;

(2) determining whether a specific symbol is to be displayed device after the plurality of symbols have been rearranged and, if so, determining a specific-symbol display location where the specific symbol is to be displayed after the plurality of symbols have been rearranged;

(3) while the plurality of symbols are being rearranged, displaying the symbols in a varying manner; and (4) if the specific symbol is to be displayed by the display device at the specific-symbol display location after the plurality of symbols have been rearranged, displaying on the display device, while all the symbols are being displayed in the varying manner including at the specific-symbol display location and before any of the plurality of symbols has finished being rearranged, an image, other than the specific symbol, that indicates the specific-symbol display location where the specific symbol will be displayed once the plurality of symbols have finished being rearranged and corresponding to the number of times the specific symbol will appear, in total on the display device, once the plurality of symbols have been rearranged.

2. The gaming machine according to claim 1, wherein, in the process (1), either (a) a base game requiring a bet of game media is run, in which game a predetermined amount of game media is awarded according to the symbols selected from the plurality of symbols and rearranged on the display device; or (b) a free game requiring a bet of game media smaller in amount than the game media bet in the base game is run, in which free game game media whose amount is determined in accordance with the symbols selected from the plurality of symbols and rearranged on the display device and the specific symbol is awarded.

3. The gaming machine according to claim 2, wherein, when the free game is run, the controller runs a special game in which the free game is repeated plural times when a predetermined condition has been met in the base game, and after the process (3), when the free game is run, the rearranged specific symbol is fixedly displayed on the display device at the specific-symbol display location.

4. The gaming machine according to claim 1, wherein, the specific symbol includes a wild symbol which can substitute for any types of symbols.

5. The gaming machine according to claim 1, wherein, the symbols selected from the plurality of symbols and rearranged on the symbol display device are randomly determined;

if it is determined in the process (2) that the specific symbol is not to be displayed by the display device after the plurality of symbols have been rearranged, the controller displays on the display device, while all the symbols are being displayed in the varying manner including at the specific-symbol display location and before any of the plurality of symbols has finished being rearranged, a fake image indicating an arbitrary position but the specific symbol is not displayed at the arbitrary position after the plurality of symbols have been rearranged.

6. A game control method of a gaming machine having a plurality of input devices including a value-addition mechanism by which gaming media associated with monetary value can be added to the gaming machine; a validator; a wager button; an award payout mechanism that pays out gaming media; a cash-out button; a display device capable of rearranging a plurality of symbols; and a programmed controller, the method comprising the steps of, under control of the controller:

(1) identifying, via the validator, gaming media that has been added to the gaming machine;

(2) establishing a credit balance for a player based at least in part on gaming media that has been added to the gaming machine;

(3) after gaming value has been bet via the wager button, running a game in which symbols selected from the plurality of symbols are rearranged on the symbol display device by moving or appearing to move;

(4) determining whether a specific symbol is to be displayed by the display device after the plurality of symbols have been rearranged and, if so, determining a specific-symbol display location where the specific symbol is to be displayed after the plurality of symbols have been rearranged;

(5) while the plurality-of symbols are being rearranged, displaying the symbols in a varying manner;

(6) if the specific symbol is to be displayed by the display device at the specific-symbol display location after the plurality of symbols have been rearranged, displaying on the display device, while all the symbols are being displayed in the varying manner including at the specific-symbol display location and before any of the plurality of symbols has finished being rearranged, an image, other than the specific symbol, that indicates the specific-symbol display location where the specific symbol will be displayed once the plurality of symbols have finished being rearranged and corresponding to the number of times the specific symbol will appear, in total on the display device, once the plurality of symbols have been rearranged; and adding an amount of gaming media that has been won, if any, to the credit balance or paying out the amount of gaming media that has been won, if any, in response to operation of the cash-out button.

7. The method according to claim 6, wherein, in the step (3), either (a) a base game requiring a bet of gaming media is run, in which game a predetermined amount of gaming media is awarded according to the symbols selected from the plurality of symbols and rearranged on the display device; or (b) a free game requiring a bet of gaming media smaller in amount than the gaming media bet in the base game is run, in which free game gaming media whose amount is determined in accordance with the symbols selected from the plurality of symbols and rearranged on the display device and the specific symbol is awarded.

8. The method according to claim 7, wherein, when the base game is run, a special game is run in which the free game is repeated plural times when a predetermined condition has been met in the base game; and after the step (5), the specific symbol is fixedly displayed on the display device at the specific-symbol display location while the free game is being run.

9. The method according to claim 6, wherein, the specific symbol includes a wild symbol which can substitute for any types of symbols.

10. The method according to claim 6, wherein, the symbols selected from the plurality of symbols and rearranged on the symbol display device are randomly determined; and if it is determined in the step (4) that the specific symbol is not to be displayed by the display device after the plurality of symbols have been rearranged, while all the symbols are being displayed in the varying manner including at the specific-symbol display location and before any of the plurality of symbols has finished being rearranged, a fake image indicating an arbitrary position is displayed on the display device but the specific symbol is not displayed at the arbitrary position after the plurality of symbols have been rearranged.

11. A gaming machine, comprising:

a housing;

a plurality of input devices supported by the housing, the plurality of input devices including a value-addition mechanism by which gaming media associated with monetary value can be added to the gaming machine; a wager button; and a cash-out button;

a validator;

an award payout mechanism that pays out gaming media;

a display device capable of rearranging a plurality of symbols; and a controller, which, via the validator, identifies gaming media that has been added to the gaming machine; which establishes a credit balance for a player based at least in part on gaming media that has been added to the gaming machine; and which, as a result of a player having wagered gaming media, executes the following processes:

(1) running a game in which symbols selected from the plurality of symbols are rearranged on the symbol display device by moving or appearing to move;

(2) determining whether a specific symbol is to be displayed by the display device after the plurality of symbols have been rearranged and, if so, determining a specific-symbol display location where the specific symbol is to be displayed after the plurality of symbols have been rearranged;

(3) while the plurality of symbols are being rearranged, displaying the symbols in a varying manner; and (4) if the specific symbol is to be displayed by the display device at the specific-symbol display location after the plurality of symbols have been rearranged, displaying on at least one of the symbols, while all the symbols are being displayed in the varying manner including at the specific-symbol display location and before any of the plurality of symbols has finished being rearranged, an image of a character, other than the specific symbol, that indicates the specific-symbol display location where the specific symbol will be displayed once the plurality of symbols have finished being rearranged.

12. The gaming machine according to claim 11, wherein after the plurality of symbols have finished being rearranged, the plurality of symbols except for the specific symbol are again rearranged and displayed in a varying manner while the specific symbol remains fixedly displayed at the specific-symbol display location.

13. The gaming machine according to claim 1, wherein the specific-symbol display location where the specific symbol is to be displayed after the plurality of symbols have been rearranged is a row-by-column cell location.

14. The gaming machine according to claim 1, wherein the image that indicates the specific-symbol display location is selected from a plurality of images that could appear, with each of the plurality of images that could appear corresponding to a different number or range of numbers of times the special symbol will appear.

15. The game control method according to claim 6, wherein the specific-symbol display location where the specific symbol is to be displayed after the plurality of symbols have been rearranged is a row-by-column cell location.

16. The game control method according to claim 6, wherein the image that indicates the specific-symbol display location is selected from a plurality of images that could appear, with each of the plurality of images that could appear corresponding to a different number or range of numbers of times the special symbol will appear.

17. The gaming machine according to claim 11, wherein the specific-symbol display location where the specific symbol is to be displayed after the plurality of symbols have been rearranged is a row-by-column cell location.

18. The gaming machine according to claim 11, wherein the image that indicates the specific-symbol display location is selected from a plurality of images that could appear, with each of the plurality of images that could appear corresponding to a different number or range of numbers of times the special symbol will appear.

* * * * *